United States Patent
Jeon et al.

(10) Patent No.: US 11,985,706 B2
(45) Date of Patent: May 14, 2024

(54) ACCESS PROCEDURES FOR WIRELESS COMMUNICATIONS

(71) Applicant: Comcast Cable Communications, LLC, Philadelphia, PA (US)

(72) Inventors: Hyoungsuk Jeon, Centreville, VA (US); Esmael Dinan, McLean, VA (US); Yunjung Yi, Vienna, VA (US); Hua Zhou, Herndon, VA (US); Bing Hui, Herndon, VA (US); Kyungmin Park, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/832,901

(22) Filed: Mar. 27, 2020

(65) Prior Publication Data

US 2020/0314917 A1 Oct. 1, 2020

Related U.S. Application Data

(60) Provisional application No. 62/825,789, filed on Mar. 28, 2019.

(51) Int. Cl.
*H04W 74/08* (2009.01)
*H04W 74/0833* (2024.01)

(52) U.S. Cl.
CPC ....... *H04W 74/0833* (2013.01); *H04W 74/08* (2013.01)

(58) Field of Classification Search
CPC ......... H04W 74/0833; H04W 74/0841; H04W 74/08
See application file for complete search history.

(56) References Cited

U.S. PATENT DOCUMENTS

| | | | |
|---|---|---|---|
| 2017/0013643 A1 | 1/2017 | Nan et al. | |
| 2018/0116000 A1 | 4/2018 | Ly et al. | |
| 2019/0335515 A1* | 10/2019 | Chen | H04W 76/18 |
| 2020/0107372 A1* | 4/2020 | Agiwal | H04W 80/02 |
| 2020/0260495 A1* | 8/2020 | Kim | H04L 27/26025 |
| 2021/0219349 A1* | 7/2021 | Huang | H04W 74/0833 |

OTHER PUBLICATIONS

"Consideration on 2-step RA", CATT, Jan. 2017, 6 pages (Year: 2017).*
R1-1902747 3GPP TSG RAN WG1 Meeting #96, Athens, Greece, Feb. 25-Mar. 1, 2019, Source: OPPO, Title: On channel structure for 2-step RACH.
R1-1902748 3GPP TSG RAN WG1 Meeting #96, Athens, Greece, Feb. 25-Mar. 1, 2019, Source: OPPO, Title: On procedure for 2-step RACH.
R1-1902784 3GPP TSG RAN WG1 Meeting #96, Athens, Greece, Feb. 25-Mar. 1, 2019, Source: NTT Docomo, Inc., Title: Discussion on channel structure for two-step RACH.

(Continued)

*Primary Examiner* — Quoc Thai N Vu
(74) *Attorney, Agent, or Firm* — Banner & Witcoff, Ltd.

(57) ABSTRACT

Wireless communications are described for access procedures. A wireless device may use a plurality of identifiers to monitor for a response from a base station. The wireless device may determine whether a random access procedure is a success or a failure based on the identifier that the wireless device is able to use to receive the response.

26 Claims, 49 Drawing Sheets

(56) References Cited

OTHER PUBLICATIONS

R1-1902785 3GPP TSG RAN WG1 Meeting #96, Athens, Greece, Feb. 25-Mar. 1, 2019, Source: NTT Docomo, Inc., Title: Discussion on procedure for two-step RACH.
R1-1902790 3GPP TSG RAN WG1 Meeting #96, Athens, Greece, Feb. 25-Mar. 1, 2019, Source: NTT Docomo, Inc., Title: Enhancements to initial access procedure for NR-U.
R1-1902822 3GPP TSG RAN WG1 Meeting #96, Athens, Greece, Feb. 25-Mar. 1, 2019, Source: Ericsson, Title: Channel structure for two-step RACH.
R1-1902823 3GPP TSG RAN WG1 Meeting #96, Athens, Greece, Feb. 25-Mar. 1, 2019, Source: Ericsson, Title: Procedure for two-step RACH.
R1-1902843 3GPP TSG RAN WG1 Meeting #96, Athens, Greece, Feb. 25-Mar. 1, 2019, Source: Motorola Mobility, Lenovo, Title: 2-step RACH procedure.
R1-1902853 3GPP TSG RAN WG1 Meeting #96, Athens, Greece, Feb. 25-Mar. 1, 2019, Source: Xiaomi, Title: NR-U initial access procedure enhancements.
R1-1902871 3GPP TSG RAN WG1 Meeting #96, Athens, Greece, Feb. 25-Mar. 1, 2019, Source: WILUS Inc., Title: Discussion on enhancement to initial access procedure for NR-U.
R1-1902884 3GPP TSG RAN WG1 Meeting #96, Athens, Greece, Feb. 25-Mar. 1, 2019, Source: Ericsson, Title: Enhancements to initial access procedure.
R1-1902917 3GPP TSG RAN WG1 Meeting #96, Athens, Greece, Feb. 25-Mar. 1, 2019, Source: CAICT, Title: Considerations on resource pool design for PUSCH in MsgA of 2-step RACH.
R1-1902918 3GPP TSG RAN WG1 Meeting #96, Athens, Greece, Feb. 25-Mar. 1, 2019, Source: CAICT, Title: A scheme of fallback from 2-step RACH to 4-step RACH.
R1-1902928 3GPP TSG RAN WG1 Meeting #96, Athens, Greece, Feb. 25-Mar. 1, 2019, Source: Potevio, Title: On enhancement to initial access procedure for NR-U.
R1-1902961 3GPP TSG RAN WG1 Meeting #96, Athens, Greece, Feb. 25-Mar. 1, 2019, Source: KDDI, Title: Discussion on channel structure for two-step RACH.
R1-1902963 3GPP TSG RAN WG1 Meeting #96, Athens, Greece, Feb. 25-Mar. 1, 2019, Source: Motorola Mobility, Lenovo, Title: Initial access procedure for NR-U.
R1-1902964 3GPP TSG RAN WG1 Meeting #96, Athens, Greece, Feb. 25-Mar. 1, 2019, Source: KDDI, Title: Discussion on procedure for two-step RACH.
R1-1902977 3GPP TSG RAN WG1 Meeting #96, Athens, Greece, Feb. 25-Mar. 1, 2019, Source: Qualcomm Incorporated, Title: Channel structure for two-step RACH.
R1-1902978 3GPP TSG RAN WG1 Meeting #96, Athens, Greece, Feb. 25-Mar. 1, 2019, Source: Qualcomm Incorporated, Title: Procedures for two-step RACH.
R1-1902986 3GPP TSG RAN WG1 Meeting #96, Athens, Greece, Feb. 25-Mar. 1, 2019, Source: Qualcomm Incorporated, Title: Initial access and mobility procedures for NR unlicensed.
R1-1903050 3GPP TSG RAN WG1 Meeting #96, Athens, Greece, Feb. 25-Mar. 1, 2019, Source: KT Corp., Title: Enhancement to initial access for NR-U.
R1-1903056 3GPP TSG RAN WG1 Meeting #96, Athens, Greece, Feb. 25-Mar. 1, 2019, Source: Huawei, HiSilicon, Title: Channel structure for 2-step RACH.
R1-1903057 3GPP TSG RAN WG1 Meeting #96, Athens, Greece, Feb. 25-Mar. 1, 2019, Source: Huawei, HiSilicon, Title: Discussion on 2-step RACH procedure.
R1-1903186 3GPP TSG RAN WG1 Meeting #96, Athens, Greece, Feb. 25-Mar. 1, 2019, Source: Fraunhofer HHI, Fraunhofer IIS, Title: Discussion on 2-step RACH for NR.
R1-1903435 3GPP TSG RAN WG1 Meeting #96, Athens, Greece, Feb. 25-Mar. 1, 2019, Source: ZTE, Title: Summary of 7.2.1.1 Channel Structure for Two-step RACH.
R1-1903436 3GPP TSG RAN WG1 Meeting #96, Athens, Greece, Feb. 25-Mar. 1, 2019, Source: ZTE, Title: Summary of 7.2.1.2 Procedure for Two-step RACH.
R2-1900136 3GPP TSG RAN WG2 Meeting #105, Athens, Greece, Feb. 25-Mar. 1, 2019, Source: Samsung, Title: Random access response reception in NR-U.
R2-1900137 3GPP TSG RAN WG2 Meeting #105, Athens, Greece, Feb. 25-Mar. 1, 2019, Source: Samsung Electronics , Title: CR—Supporting RAR window size larger than 10ms.
R2-1900138 3GPP TSG RAN WG2 Meeting #105, Athens, Greece, Feb. 25-Mar. 1, 2019, Source: Samsung Electronics, Title: CR—Supporting RAR window size larger than 10ms.
R2-1900139 3GPP TSG RAN WG2 Meeting #105, Athens, Greece, Feb. 25-Mar. 1, 2019, Source: Samsung, Title: Random access resource selection in NR-U.
R2-1900231 3GPP TSG RAN WG2 Meeting #105, Athens, Greece, Feb. 25-Mar. 1, 2019, Source: vivo, Title: Discussion on multiple transmission opportunities for Msg3.
R2-1900232 3GPP TSG RAN WG2 Meeting #105, Athens, Greece, Feb. 25-Mar. 1, 2019, Source: vivo, Title: Enhance RACH with additional transmission opportunities in frequency domain.
R2-1900233 3GPP TSG RAN WG2 Meeting #105, Athens, Greece, Feb. 25-Mar. 1, 2019, Source: vivo, Title: Considerations on RACH counter and timers in NR-U.
R2-1900247 3GPP TSG RAN WG2 Meeting #105, Athens, Greece, Feb. 25-Mar. 1, 2019, Source: MediaTek, Inc., Title: CAPC for RACH and PUCCH in NR-U.
R2-1900248 3GPP TSG RAN WG2 Meeting #105, Athens, Greece, Feb. 25-Mar. 1, 2019, Source: OPPO, Title: Enhancements of 4-steps RACH in NR-U.
R2-1900679 3GPP TSG RAN WG2 Meeting #105, Athens, Greece, Feb. 25-Mar. 1, 2019, Source: ZTE Corporation, Sanechips, Title: 4-step RACH procedure for NR-U.
R2-1900714 3GPP TSG RAN WG2 Meeting #105, Athens, Greece, Feb. 25-Mar. 1, 2019, Source: Intel Corporation, Title: Random access procedure for NR-u.
R2-1901079 3GPP TSG RAN WG2 Meeting #105, Athens, Greece, Feb. 25-Mar. 1, 2019, Source: MediaTek Inc., Title: LBT impact on random access procedure in MAC.
R2-1901093 3GPP TSG RAN WG2 Meeting #105, Athens, Greece, Feb. 25-Mar. 1, 2019, Source: MediaTek Inc., Title: Extended ra-ResponseWindow and RA-RNTI calculation.
R2-1901169 3GPP TSG RAN WG2 Meeting #105, Athens, Greece, Feb. 25-Mar. 1, 2019, Source: Google Inc., Title: Discussion on additional transmission opportunities for msg1 and msg3.
R2-1901211 3GPP TSG RAN WG2 Meeting #105, Athens, Greece, Feb. 25-Mar. 1, 2019, Source: Motorola Mobility, Lenovo, Title: Modifications to RACH procedure due to LBT.
R2-1901212 3GPP TSG RAN WG2 Meeting #105, Athens, Greece, Feb. 25-Mar. 1, 2019, Source: Motorola Mobility, Lenovo, Title: Diversity in RACH transmissions.
R2-1901259 3GPP TSG RAN WG2 Meeting #105, Athens, Greece, Feb. 25-Mar. 1, 2019, Source: Nokia, Nokia Shanghai Bell, Title: Increasing Tx opportunities for RA messages.
R2-1901338 3GPP TSG RAN WG2 Meeting #105, Athens, Greece, Feb. 25-Mar. 1, 2019, Source: Huawei, HiSilicon, Title: RACH procedure for NR-U.
R2-1901339 3GPP TSG RAN WG2 Meeting #105, Athens, Greece, Feb. 25-Mar. 1, 2019, Source: Huawei, HiSilicon, Title: Remaining issues on RAR windows for RACH in NR-U.
R2-1901432 3GPP TSG RAN WG2 Meeting #105, Athens, Greece, Feb. 25-Mar. 1, 2019, Source: Sony, Title: Considerations BWP for initial access for NR unlicensed operations.
R2-1901456 3GPP TSG RAN WG2 Meeting #105, Athens, Greece, Feb. 25-Mar. 1, 2019, Source: InterDigital, Title: Random access in NR-Unlicensed.
R2-1901537 3GPP TSG RAN WG2 Meeting #105, Athens, Greece, Feb. 25-Mar. 1, 2019, Source: Convida Wireless, Title: NR-U LBT Impact on Preamble Transmission Counting.
R2-1901567 3GPP TSG RAN WG2 Meeting #105, Athens, Greece, Feb. 25-Mar. 1, 2019, Source: Convida Wireless, Title: Additional RACH opportunities for NR-U.

(56) References Cited

OTHER PUBLICATIONS

R2-1901673 3GPP TSG RAN WG2 Meeting #105, Athens, Greece, Feb. 25-Mar. 1, 2019, Source: Ericsson, Title: Handling of RA counters and timers in NR-U.
Jul. 20, 2020—European Extended Search Report—EP 20166460.4.
R2-1700205 3GPP TSG RAN WG2 Meeting Ad Hoc, Spokane, USA, Jan. 17-19, 2017, Source: CATT, Title: Consideration on 2-step RA.
R2-1700137 3GPP TSG RAN WG2 NR Adhoc, Spokane, USA, Jan. 17-19, 2017, Source: Sony, Title: 2-step RACH to 4-step RACH fallback.
R1-1700703 3GPP TSG RAN WG1 AH NR Meeting, Spokane, USA, Jan. 16-20, 2017, Source: InterDigital Communications, Title: 2-step random access procedure.
R2-1901677 3GPP TSG RAN WG2 Meeting #105, Athens, Greece, Feb. 25-Mar. 1, 2019, Source: Ericsson, Title: RA-RNTI to handle longer RAR window for NR-U.
R2-1901678 3GPP TSG RAN WG2 Meeting #105, Athens, Greece, Feb. 25-Mar. 1, 2019, Source: Ericsson, Title: Discussions on RACH enhancements for NR-U.
R2-1901679 3GPP TSG RAN WG2 Meeting #105, Athens, Greece, Feb. 25-Mar. 1, 2019, Source: Ericsson, Title: LS on using notifications of suspending power ramping counter in case of LBT failures.
R2-1901752 3GPP TSG RAN WG2 Meeting #105, Athens, Greece, Feb. 25-Mar. 1, 2019, Source: Ericsson, Title: 2-step random access for NR-U.
R2-1901754 3GPP TSG RAN WG2 Meeting #105, Athens, Greece, Feb. 25-Mar. 1, 2019, Source: LG Electronics Inc., Title: 4-step RACH procedure for NR-U.
R2-1901756 3GPP TSG RAN WG2 Meeting #105, Athens, Greece, Feb. 25-Mar. 1, 2019, Source: LG Electronics Inc., Title: Enhanced RACH procedure based on channel busy level in NR-U.
R2-1901785 3GPP TSG RAN WG2 Meeting #105, Athens, Greece, Feb. 25-Mar. 1, 2019, Source: LG Electronics Inc., Title: Remaining consideration on preamble transmission counter and power ramping counter.
R2-1901887 3GPP TSG RAN WG2 Meeting #105, Athens, Greece, Feb. 25-Mar. 1, 2019, Source: Fujitsu, Title: CFRA enhancement for NR-U.
R2-1901888 3GPP TSG RAN WG2 Meeting #105, Athens, Greece, Feb. 25-Mar. 1, 2019, Source: Fujitsu, Title: JE behaviour when the preamble is not transmitted due to LBT failure.
R2-1901906 3GPP TSG RAN WG2 Meeting #105, Athens, Greece, Feb. 25-Mar. 1, 2019, Source: Apple, Title: RACH Enhancements in NR-U.
R2-1901907 3GPP TSG RAN WG2 Meeting #105, Athens, Greece, Feb. 25-Mar. 1, 2019, Source: Xiaomi Communications, Title: Consideration on extending RAR window size.
R2-1901944 3GPP TSG RAN WG2 Meeting #105, Athens, Greece, Feb. 25-Mar. 1, 2019, Source: CMCC, Title: Considerations on BWP switching and multi-activation for NR-U.
R2-1901972 3GPP TSG RAN WG2 Meeting #105, Athens, Greece, Feb. 25-Mar. 1, 2019, Source: CMCC, Title: Discussion of contention-based 2-step RACH procedure.
R2-1901973 3GPP TSG RAN WG2 Meeting #105, Athens, Greece, Feb. 25-Mar. 1, 2019, Source: CMCC, Title: Discussion of of transmission of MsgA.
R2-1902132 3GPP TSG RAN WG2 Meeting #105, Athens, Greece, Feb. 25-Mar. 1, 2019, Source: Qualcomm Incorporated, Title: Configuration and selection for RACH resources.
R2-1902200 3GPP TSG RAN WG2 Meeting #105, Athens, Greece, Feb. 25-Mar. 1, 2019, Source: Qualcomm Incorporated, Title: 4-step RACH procedures for NR-U.
3GPP TSG RAN WG2 Meeting #105, Athens, Greece, Feb. 25-Mar. 1, 2019, Source: RAN2 Chairman (Intel), Title: Chairman Notes.
R2-1902233 3GPP TSG RAN WG2 Meeting #105, Athens, Greece, Feb. 25-Mar. 1, 2019, Source: Session Chair (Huawei), Title: Draft report NB-IoT breakout session.
R2-1902238 3GPP TSG RAN WG2 Meeting #105, Athens, Greece, Feb. 25-Mar. 1, 2019, Source: Session Chair (Nokia), Title: Report from session on Rel-16 LTE Mobility enhancements WI and NR mobility enhancements WI.
R2-190XXXX 3GPP TSG RAN WG2 Meeting #105, Athens, Greece, Feb. 25-Mar. 1, 2019, Source: R2 Vice Chairman (Mediatek), Title: Session notes NRUP IIOT IAB NRU.
3GPP TS 38.211 V15.4.0 (Dec. 2018), Technical Specification, 3rd Generation Partnership Project; Technical Specification Group Radio Access Network; NR; Physical channels and modulation (Release 15).
3GPP TS 38.212 V15.4.0 (Dec. 2018), Technical Specification, 3rd Generation Partnership Project; Technical Specification Group Radio Access Network; NR; Multiplexing and channel coding (Release 15).
3GPP TS 38.213 V15.4.0 (Dec. 2018), Technical Specification, 3rd Generation Partnership Project; Technical Specification Group Radio Access Network; NR; Physical layer procedures for control (Release 15).
BGPP TS 38.214 V15.4.0 (Dec. 2018-12), Technical Specification, 3rd Generation Partnership Project; Technical Specification Group Radio Access Network; NR; Physical layer procedures for data (Release 15).
3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15).
3GPP TS 38.321 V15.4.0 (Dec. 2018), Technical Specification, 3rd Generation Partnership Project; Technical Specification Group Radio Access Network; NR; Medium Access Control (MAC) protocol specification (Release 15).
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15).
3GPP TSG RAN WG1 meeting #96, Athens, Greece, Feb. 25-Mar. 1, 2019; Title: RAN1 Chairman's Notes.
R1-1901526 3GPP TSG RAN WG1 Meeting #96, Athens, Greece, Feb. 25-Mar. 1, 2019, Source: Huawei, HiSilicon, Title: Initial access in NR unlicensed.
R1-1901610 3GPP TSG RAN WG1 Meeting #96, Athens, Greece, Feb. 25-Mar. 1, 2019, Source: ZTE, Sanechips, Title: Discussion on enhancement of initial access procedures for NR-U.
R1-1901626 3GPP TSG RAN WG1 Meeting #96, Athens, Greece, Feb. 25-Mar. 1, 2019, Source: ZTE, Sanechips, Title: Considerations on the channel structure of msgA.
R1-1901627 3GPP TSG RAN WG1 Meeting #96, Athens, Greece, Feb. 25-Mar. 1, 2019, Source: ZTE, Sanechips, Title: Considerations on 2-step RACH Procedures.
R1-1901669 3GPP TSG RAN WG1 Meeting #96, Athens, Greece, Feb. 25-Mar. 1, 2019, Source: vivo, Title: Discussion on channel structure for 2-step RACH.
R1-1901670 3GPP TSG RAN WG1 Meeting #96, Athens, Greece, Feb. 25-Mar. 1, 2019, Source: vivo, Title: Discussion on 2-step RACH procedure.
R1-1901676 3GPP TSG RAN WG1 Meeting #96, Athens, Greece, Feb. 25-Mar. 1, 2019, Source: vivo, Title: Discussion on enhancements to initial access procedure.
R1-1901793 3GPP TSG RAN WG1 Meeting #96, Athens, Greece, Feb. 25-Mar. 1, 2019, Source: MediaTek Inc., Title: On Channel Structure for Two-step RACh.
R1-1901794 3GPP TSG RAN WG1 Meeting #96, Athens, Greece, Feb. 25-Mar. 1, 2019, Source: MediaTek Inc., Title: On procedure for two-step RACH.
R1-1901799 3GPP TSG RAN WG1 Meeting #96, Athens, Greece, Feb. 25-Mar. 1, 2019, Source: MediaTek Inc., Title: Enhancements to Initial Access Procedure.
R1-1901871 3GPP TSG RAN WG1 Meeting #96, Athens, Greece, Feb. 25-Mar. 1, 2019, Source: Charter Communications, Title: Views on random access enhancements.
R1-1901885 3GPP TSG RAN WG1 Meeting #96, Athens, Greece, Feb. 25-Mar. 1, 2019, Source: AT&T, Title: Design of initial access procedures for NR-based access to unlicensed spectrum.

(56) References Cited

OTHER PUBLICATIONS

R1-1901923 3GPP TSG RAN WG1 Meeting #96, Athens, Greece, Feb. 25-Mar. 1, 2019, Source: OPPO, Title: Enhancements to initial access procedure for NR-U.
R1-1901940 3GPP TSG RAN WG1 Meeting #96, Athens, Greece, Feb. 25-Mar. 1, 2019, Source: Fujitsu, Title: Enhancements to initial access procedure and scheduling request procedure for NR-U.
R1-1901991 3GPP TSG RAN WG1 Meeting #96, Athens, Greece, Feb. 25-Mar. 1, 2019, Source: CATT, Title: Discussion of NR-U initial access procedures.
R1-1902041 3GPP TSG RAN WG1 Meeting #96, Athens, Greece, Feb. 25-Mar. 1, 2019, Source: LG Electronics, Title: Initial access and mobility for NR-U.
R1-1902125 3GPP TSG RAN WG1 Meeting #96, Athens, Greece, Feb. 25-Mar. 1, 2019, Source: Nokia, Nokia Shanghai Bell, Title: On enhancements to initial access procedures for NR-U.
R1-1902133 3GPP TSG RAN WG1 Meeting #96, Athens, Greece, Feb. 25-Mar. 1, 2019, Source: Sierra Wireless, Title: Channel structure for two-step RACH considerations.
R1-1902134 3GPP TSG RAN WG1 Meeting #96, Athens, Greece, Feb. 25-Mar. 1, 2019, Source: Sierra Wireless, Title: Procedure for two-step RACH considerations.
R1-1902135 3GPP TSG RAN WG1 Meeting #96, Athens, Greece, Feb. 25-Mar. 1, 2019, Source: Nokia, Nokia Shanghai Bell, Title: On 2-step RACH channel structure.
R1-1902136 3GPP TSG RAN WG1 Meeting #96, Athens, Greece, Feb. 25-Mar. 1, 2019, Source: Nokia, Nokia Shanghai Bell, Title: On 2-step RACH procedure.
R1-1902165 3GPP TSG RAN WG1 Meeting #96, Athens, Greece, Feb. 25-Mar. 1, 2019, Source: Sony, Title: On channel structure for two-step RACH.
R1-1902166 3GPP TSG RAN WG1 Meeting #96, Athens, Greece, Feb. 25-Mar. 1, 2019, Source: Sony, Title: Discussion on procedure for 2-step RACH.
R1-1902170 3GPP TSG RAN WG1 Meeting #96, Athens, Greece, Feb. 25-Mar. 1, 2019, Source: Sony, Title: Enhancements to initial access procedures for NR-U.
R1-1902241 3GPP TSG RAN WG1 Meeting #96, Athens, Greece, Feb. 25-Mar. 1, 2019, Source: Samsung, Title: Channel structure for two-step RACH.
R1-1902242 3GPP TSG RAN WG1 Meeting #96, Athens, Greece, Feb. 25-Mar. 1, 2019, Source: Samsung, Title: Procedure for two-step RACH.
R1-1902258 3GPP TSG RAN WG1 Meeting #96, Athens, Greece, Feb. 25-Mar. 1, 2019, Source: Samsung, Title: Enhancements to initial access procedure for NR-U.
R1-1902324 3GPP TSG RAN WG1 Meeting #96, Athens, Greece, Feb. 25-Mar. 1, 2019, Source: Panasonic, Title: NR-U Prach resource enhancement.
R1-1902326 3GPP TSG RAN WG1 Meeting #96, Athens, Greece, Feb. 25-Mar. 1, 2019, Source: CMCC, Title: Discussion on channel structure for two-step RACH.
R1-1902327 3GPP TSG RAN WG1 Meeting #96, Athens, Greece, Feb. 25-Mar. 1, 2019, Source: CMCC, Title: Discussion on procedure for two-step RACH.
R1-1902393 3GPP TSG RAN WG1 Meeting #96, Athens, Greece, Feb. 25-Mar. 1, 2019, Source: Panasonic, Title: Discussion on channel structure for 2-step RACH.
R1-1902394 3GPP TSG RAN WG1 Meeting #96, Athens, Greece, Feb. 25-Mar. 1, 2019, Source: Panasonic, Title: Discussion on 2-step RACH procedure.
R1-1902466 3GPP TSG RAN WG1 Meeting #96, Athens, Greece, Feb. 25-Mar. 1, 2019, Source: Intel Corporation, Title: Channel structure for two-step RACH.
R1-1902467 3GPP TSG RAN WG1 Meeting #96, Athens, Greece, Feb. 25-Mar. 1, 2019, Source: Intel Corporation, Title: Procedure for two-step RACH.
R1-1902472 3GPP TSG RAN WG1 Meeting #96, Athens, Greece, Feb. 25-Mar. 1, 2019, Source: Intel Corporation, Title: Enhancements to initial access and mobility for NR-unlicensed.
R1-1902533 3GPP TSG RAN WG1 Meeting #96, Athens, Greece, Feb. 25-Mar. 1, 2019, Source: LG Electronics, Title: Channel Structure for Two-Step RACH.
R1-1902534 3GPP TSG RAN WG1 Meeting #96, Athens, Greece, Feb. 25-Mar. 1, 2019, Source: LG Electronics, Title: Discussion on 2step RACH procedure.
R1-1902582 3GPP TSG RAN WG1 Meeting #96, Athens, Greece, Feb. 25-Mar. 1, 2019, Source: InterDigital Inc., Title: On signal structure for two-step RACH.
R1-1902583 3GPP TSG RAN WG1 Meeting #96, Athens, Greece, Feb. 25-Mar. 1, 2019, Source: InterDigital Inc., Title: Perspectives on operation of two-step RACH.
R1-1902588 3GPP TSG RAN WG1 Meeting #96, Athens, Greece, Feb. 25-Mar. 1, 2019, Source: InterDigital Inc., Title: Initial access and mobility procedures in NR-U.
R1-1902658 3GPP TSG RAN WG1 Meeting #96, Athens, Greece, Feb. 25-Mar. 1, 2019, Source: Sharp, Title: Initial access procedure for NR-U.
R1-1902737 3GPP TSG RAN WG1 Meeting #96, Athens, Greece, Feb. 25-Mar. 1, 2019, Source: Spreadtrum Communications, Title: Discussion on initial access and mobility in NR-U.
Sep. 17, 2021—European Office Action—EP 20166460.4.
Nov. 4, 2022—EP Office Action—EP App. No. 20166460.4.

* cited by examiner

User Plane Protocol Stack

Control Plane Protocol Stack

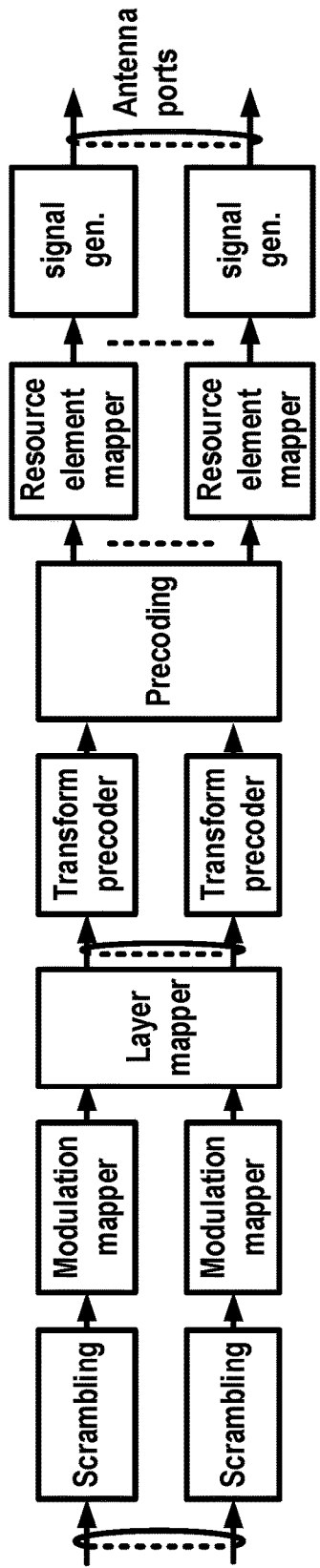
FIG. 4A
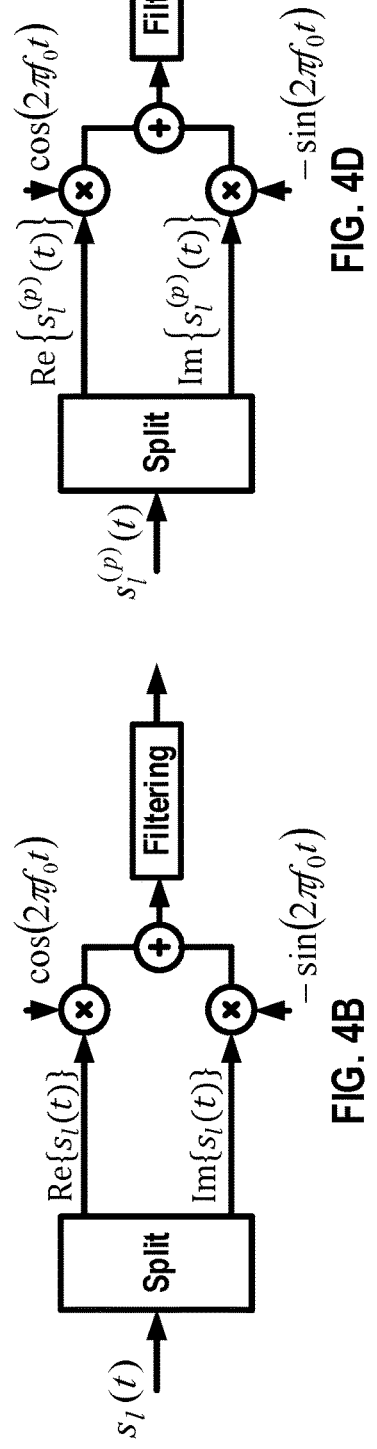
FIG. 4B
FIG. 4D
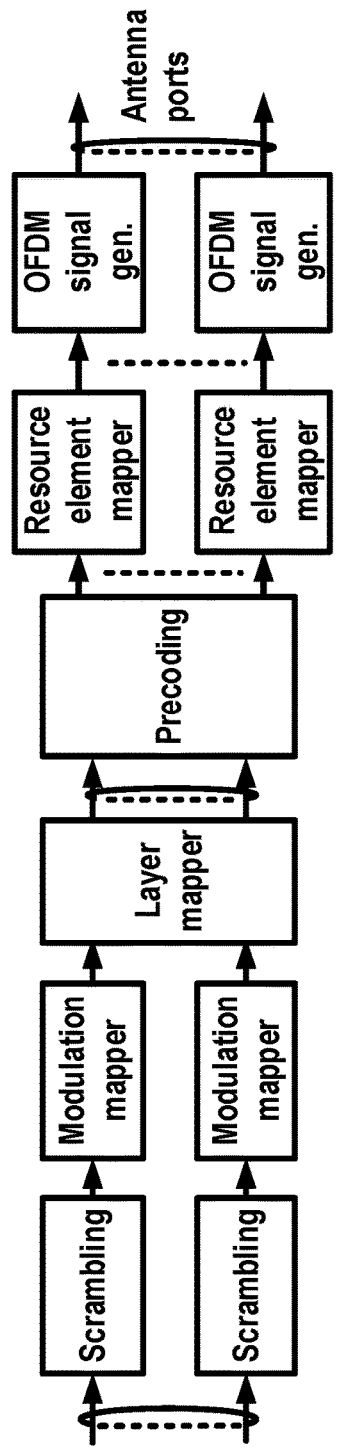
FIG. 4C

```
RACH-ConfigCommon ::=   SEQUENCE {
    rach-ConfigGeneric          RACH-ConfigGeneric,
    totalNumberOfRA-Preambles       INTEGER (1..63)             OPTIONAL,    -- Need S
    ssb-perRACH-OccasionAndCB-PreamblesPerSSB   CHOICE {
        oneEighth   ENUMERATED {n4,n8,n12,n16,n20,n24,n28,n32,n36,n40,n44,n48,n52,n56,n60,n64},
        oneFourth   ENUMERATED {n4,n8,n12,n16,n20,n24,n28,n32,n36,n40,n44,n48,n52,n56,n60,n64},
        oneHalf     ENUMERATED {n4,n8,n12,n16,n20,n24,n28,n32,n36,n40,n44,n48,n52,n56,n60,n64},
        one         ENUMERATED {n4,n8,n12,n16,n20,n24,n28,n32,n36,n40,n44,n48,n52,n56,n60,n64},
        two         ENUMERATED {n4,n8,n12,n16,n20,n24,n28,n32},
        four        INTEGER (1..16),
        eight       INTEGER (1..8),
        sixteen     INTEGER (1..4)
    } OPTIONAL,    -- Need M
    groupBconfigured    SEQUENCE {
        ra-Msg3SizeGroupA       ENUMERATED { b56, b144, b208, b256, b282, b480, b640, b800,
                                b1000, spare7, spare6, spare5, spare4, spare3, spare2, spare1},
        messagePowerOffsetGroupB ENUMERATED { minusinfinity, dB0, dB5, dB8, dB10, dB12, dB15,
dB18},
        numberOfRA-PreamblesGroupA  INTEGER (1..64)
    } OPTIONAL,    -- Need R
    ra-ContentionResolutionTimer    ENUMERATED { sf8, sf16, sf24, sf32, sf40, sf48, sf56, sf64},
    rsrp-ThresholdSSB       RSRP-Range      OPTIONAL,   -- Need R
    rsrp-ThresholdSSB-SUL   RSRP-Range      OPTIONAL,   -- Cond SUL
    prach-RootSequenceIndex CHOICE {
        1839 INTEGER (0..837),
        1139 INTEGER (0..137)
    },
    msg1-SubcarrierSpacing      SubcarrierSpacing   OPTIONAL,   --Need S
    restrictedSetConfig         ENUMERATED {unrestrictedSet, restrictedSetTypeA,
restrictedSetTypeB},
    msg3-transformPrecoding     ENUMERATED {enabled}        OPTIONAL,   -- Need R
    ...
}
```

FIG. 18A

| RACH-ConfigCommon field descriptions |
|---|
| messagePowerOffsetGroupB<br>Threshold for preamble selection (Value in dB). Value minus infinity corresponds to –infinity. Value dB0 corresponds to 0 dB, dB5 corresponds to 5 dB and so on. |
| msg1-SubcarrierSpacing<br>Subcarrier spacing of PRACH. One or more values, e.g., 15 or 30 kHz (<6GHz), 60 or 120 kHz (>6GHz) may be applicable. Corresponds to L1 parameter *prach-Msg1SubcarrierSpacing*. If absent, a wireless device may apply the SCS as derived from the *prach-ConfigurationIndex* in *RACH-ConfigGeneric*. |
| msg3-transformPrecoding<br>may indicates to a wireless device whether transform precoding is enabled for data transmission (e.g., Msg3 in a four-step RA procedure and/or one or more TB transmission in a two-step RA procedure). Absence indicates that it is disabled. |
| numberOfRA-PreamblesGroupA<br>The number of CB preambles per SSB in group A. This may determine implicitly the number of CB preambles per SSB available in group B. The setting may be consistent with the setting of *ssb-perRACH-OccasionAndCB-PreamblesPerSSB*. |
| prach-RootSequenceIndex<br>PRACH root sequence index. May corresponds to L1 parameter *PRACHRootSequenceIndex*. The value range may depend on whether L=839 or L=139. |
| ra-ContentionResolutionTimer<br>The initial value for the contention resolution timer. Value *ms8* corresponds to 8 ms, value *ms16* corresponds to 16 ms, and so on. |
| ra-Msg3SizeGroupA<br>Transport Blocks size threshold in bit below which a wireless device may employ a contention based RA preamble of group A. |
| rach-ConfigGeneric<br>Generic RACH parameters |
| restrictedSetConfig<br>Configuration of an unrestricted set or one of two types of restricted sets. |
| rsrp-ThresholdSSB<br>a wireless device may select the SS block and corresponding PRACH resource for path-loss estimation and (re)transmission based on SS blocks that satisfy the threshold |
| rsrp-ThresholdSSB-SUL<br>a wireless device may select an SUL carrier to perform random access based on this threshold |
| ssb-perRACH-OccasionAndCB-PreamblesPerSSB<br>Number of SSBs per RACH occasion (L1 parameter *SSB-per-rach-occasion*) and the number of Contention Based preambles per SSB (L1 parameter *CB-preambles-per-SSB*). The total number of CB preambles in a RACH occasion may be given by *CB-preambles-per-SSB* * max(1,*SSB-per-rach-occasion*). |
| totalNumberOfRA-Preambles<br>Total number of preambles employed for contention based and contention free random access, excluding preambles employed for other purposes (e.g. for SI request). If the field is absent, a wireless device may use all 64 preambles for RA. |

FIG. 18B

```
RACH-ConfigGeneric ::= SEQUENCE {
    prach-ConfigurationIndex   INTEGER (0..255),
    msg1-FDM                   ENUMERATED {one, two, four, eight},
    msg1-FrequencyStart        INTEGER (0..maxNrofPhysicalResourceBlocks-1),
    zeroCorrelationZoneConfig  INTEGER (0..15),
    preambleReceivedTargetPower  INTEGER (-202..-60),
    preambleTransMax ENUMERATED {n3, n4, n5, n6, n7, n8, n10, n20, n50, n100, n200},
    powerRampingStep           ENUMERATED {dB0, dB2, dB4, dB6},
    ra-ResponseWindow          ENUMERATED {sl1, sl2, sl4, sl8, sl10, sl20, sl40, sl80},
    ...
}
```

FIG. 18C

```
RACH-ConfigDedicated ::=   SEQUENCE {
    cfra              CFRA                OPTIONAL,    -- Need N
    ra-Prioritization RA-Prioritization   OPTIONAL,    -- Need N
    ...
}

CFRA ::= SEQUENCE {
    occasions SEQUENCE {
        rach-ConfigGeneric     RACH-ConfigGeneric,
        ssb-perRACH-Occasion   ENUMERATED {oneEighth, oneFourth, oneHalf, one, two, four,
                                           eight, sixteen} OPTIONAL   -- Cond SSB-CFRA
    } OPTIONAL,   -- Need S
    resources CHOICE {
        ssb   SEQUENCE {
            ssb-ResourceList       SEQUENCE (SIZE(1..maxRA-SSB-Resources)) OF CFRA-SSB-Resource,
            ra-ssb-OccasionMaskIndex   INTEGER (0..15)
        },
        csirs SEQUENCE {
            csirs-ResourceList    SEQUENCE (SIZE(1..maxRA-CSIRS-Resources)) OF CFRA-CSIRS-Resource,
            rsrp-ThresholdCSI-RS  RSRP-Range
        }
    },
    ...
}

CFRA-SSB-Resource ::= SEQUENCE {
    ssb                SSB-Index,
    ra-PreambleIndex INTEGER (0..63),
    ...
}

CFRA-CSIRS-Resource ::=   SEQUENCE {
    csi-RS             CSI-RS-Index,
    ra-OccasionList  SEQUENCE (SIZE(1..maxRA-OccasionsPerCSIRS)) OF INTEGER (0..maxRA-Occasions-1),
    ra-PreambleIndex INTEGER (0..63),
    ...
}
```

FIG. 18D

PRACH Mask Index values

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 19

```
BWP ::=                              SEQUENCE {
    locationAndBandwidth             INTEGER (0..37949),
    subcarrierSpacing                SubcarrierSpacing,
    cyclicPrefix                     ENUMERATED { extended }
        OPTIONAL -- Need R
}

BWP-Uplink ::=                       SEQUENCE {
    bwp-Id                               BWP-Id,
    bwp-Common                           BWP-UplinkCommon
        OPTIONAL, -- Need M
    bwp-Dedicated                        BWP-UplinkDedicated
        OPTIONAL, -- Need M
    ...
}

BWP-UplinkCommon ::=                 SEQUENCE {
    genericParameters                    BWP,
    rach-ConfigCommon                    SetupRelease { RACH-ConfigCommon }
        OPTIONAL,        -- Need M
    pusch-ConfigCommon                   SetupRelease { PUSCH-ConfigCommon }
        OPTIONAL,        -- Need M
    pucch-ConfigCommon                   SetupRelease { PUCCH-ConfigCommon }
        OPTIONAL,        -- Need M
    ...
}

BWP-UplinkDedicated ::=              SEQUENCE {
    pucch-Config                         SetupRelease { PUCCH-Config }
        OPTIONAL,        -- Need M
    pusch-Config                         SetupRelease { PUSCH-Config }
        OPTIONAL,        -- Cond SetupOnly
    configuredGrantConfig                SetupRelease { ConfiguredGrantConfig }
        OPTIONAL,        -- Need M
    srs-Config                           SetupRelease { SRS-Config }
        OPTIONAL,        -- Need M
    beamFailureRecoveryConfig            SetupRelease { BeamFailureRecoveryConfig }
        OPTIONAL, -- Cond SpCellOnly
    ...
}

BWP-Downlink ::=                     SEQUENCE {
    bwp-Id                               BWP-Id,
    bwp-Common                           BWP-DownlinkCommon
        OPTIONAL, -- Need M
    bwp-Dedicated                        BWP-DownlinkDedicated
        OPTIONAL, -- Need M
    ...
}

BWP-DownlinkCommon ::=               SEQUENCE {
    genericParameters                    BWP,
    pdcch-ConfigCommon                   SetupRelease { PDCCH-ConfigCommon }
        OPTIONAL, -- Need M
    pdsch-ConfigCommon                   SetupRelease { PDSCH-ConfigCommon }
        OPTIONAL, -- Need M
    ...
}

BWP-DownlinkDedicated ::=            SEQUENCE {
    pdcch-Config                         SetupRelease { PDCCH-Config }
        OPTIONAL, -- Need M
    pdsch-Config                         SetupRelease { PDSCH-Config }
        OPTIONAL, -- Need M
    sps-Config                           SetupRelease { SPS-Config }
        OPTIONAL,        -- Need M
    radioLinkMonitoringConfig            SetupRelease { RadioLinkMonitoringConfig }
        OPTIONAL, -- Need M
    ...
}
```

FIG. 24

```
ServingCellConfig ::=                    SEQUENCE {
    tdd-UL-DL-ConfigurationDedicated  TDD-UL-DL-ConfigDedicated
    OPTIONAL,       -- Cond TDD initialDownlinkBWP                    BWP-DownlinkDedicated
    OPTIONAL,       -- Cond ServCellAdd
    downlinkBWP-ToReleaseList             SEQUENCE (SIZE (1..maxNrofBWPs)) OF BWP-Id
    OPTIONAL,       -- Need N
    downlinkBWP-ToAddModList              SEQUENCE (SIZE (1..maxNrofBWPs)) OF BWP-Downlink
    OPTIONAL,       -- Need N
    firstActiveDownlinkBWP-Id             BWP-Id
    OPTIONAL,       -- Cond SyncAndCellAdd
    bwp-InactivityTimer                   ENUMERATED { ms2, ms3, ms4, ms5, ms6, ms8, ms10, ms20, ms30,
                                                        ms40,ms50, ms60, ms80, ms100, ms200, ms300, ms500,
                                                        ms750, ms1280, ms1920, ms2560, spare10, spare9, spare8,
                                                        spare7, spare6, spare5, spare4, spare3, spare2, spare1 }
    OPTIONAL,       -- Need R
    defaultDownlinkBWP-Id                 BWP-Id
        OPTIONAL,       -- Need S uplinkConfig                          UplinkConfig
    OPTIONAL,       -- Cond ServCellAdd-UL
    supplementaryUplink                   UplinkConfig
    OPTIONAL,       -- Cond ServCellAdd-SUL pdcch-ServingCellConfig               SetupRelease { PDCCH-ServingCellConfig }
    OPTIONAL,       -- Need M
    pdsch-ServingCellConfig               SetupRelease { PDSCH-ServingCellConfig }
    OPTIONAL,       -- Need M
    csi-MeasConfig                        SetupRelease { CSI-MeasConfig }
    OPTIONAL,       -- Need M
    sCellDeactivationTimer                ENUMERATED { ms20, ms40, ms80, ms160, ms200, ms240,
                                                        ms320, ms400, ms480, ms520, ms640, ms720,
                                                        ms840, ms1280, spare2,spare1}
    OPTIONAL,       -- Cond ServingCellWithoutPUCCH
    crossCarrierSchedulingConfig          CrossCarrierSchedulingConfig
    OPTIONAL,       -- Need M
    tag-Id                                TAG-Id,
    ue-BeamLockFunction                   ENUMERATED {enabled}
    OPTIONAL,       -- Need R
    pathlossReferenceLinking              ENUMERATED {pCell, sCell}
    OPTIONAL,       -- Cond SCellOnly
    servingCellMO                         MeasObjectId
    OPTIONAL,       -- Cond MeasObject
    ...
}

UplinkConfig ::=                     SEQUENCE {
    initialUplinkBWP                      BWP-UplinkDedicated
    OPTIONAL,       -- Cond ServCellAdd
    uplinkBWP-ToReleaseList               SEQUENCE (SIZE (1..maxNrofBWPs)) OF BWP-Id
    OPTIONAL,       -- Need N
    uplinkBWP-ToAddModList                SEQUENCE (SIZE (1..maxNrofBWPs)) OF BWP-Uplink
    OPTIONAL,       -- Need N
    firstActiveUplinkBWP-Id               BWP-Id
        OPTIONAL,       -- Cond SyncAndCellAdd pusch-ServingCellConfig               SetupRelease { PUSCH-ServingCellConfig }
    OPTIONAL,       -- Need M
    carrierSwitching                      SetupRelease { SRS-CarrierSwitching }
    OPTIONAL,       -- Need M
    ...
}
```

FIG. 25

| Numerology μ | Subcarrier spacing Δf=2^μ·15 [kHz] | Cyclic prefix | Num of symbols per slot | Num of slots per frame | Num of slots per subframe | Min Num of PRB | Max num of PRB |
|---|---|---|---|---|---|---|---|
| 0 | 15 | Normal | 14 | 10 | 1 | 20 | 275 |
| 1 | 30 | Normal | 14 | 20 | 2 | 20 | 275 |
| 2 | 60 | Normal | 14 | 40 | 4 | 20 | 275 |
| 2 | 60 | Extended | 12 | 40 | 4 | 20 | 275 |
| 3 | 120 | Normal | 14 | 80 | 8 | 20 | 275 |
| 4 | 240 | Normal | 14 | 160 | 16 | 20 | 138 |

** PRB: Physical resource block

FIG. 31

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

FIG. 45

ACCESS PROCEDURES FOR WIRELESS COMMUNICATIONS

CROSS-REFERENCE TO RELATED APPLICATIONS

This application claims the benefit of U.S. Provisional Application No. 62/825,789, titled "RAR of Two-Step RACH" and filed on Mar. 28, 2019. The above-referenced application is hereby incorporated by reference in its entirety.

BACKGROUND

Wireless communications may use access procedures to establish communication between devices. In an access procedure, a communication device may establish timing synchronization with another communication device by exchanging messages, such as a random access preamble and a corresponding response.

SUMMARY

The following summary presents a simplified summary of certain features. The summary is not an extensive overview and is not intended to identify key or critical elements.

Wireless communications are described for access procedures. Base stations and wireless devices may use random access procedures to establish communications. One or more identifiers may be included and/or used in messages between a base station and a wireless device, such as in preambles and/or packets, to indicate information such as a success or a failure of a random access procedure. A message from the wireless device may include a first identifier, such as a cell-radio network temporary identifier (C-RNTI). The wireless device may monitor for a response from the base station using the first identifier as well as using a second identifier, such as a random access-radio network temporary identifier (RA-RNTI). A success of a random access procedure (e.g., a two-step random access procedure) may be indicated by the wireless device being able to receive the response based on the first identifier. A failure of a random access procedure and/or an indication to fallback to a different random access procedure (e.g., a four-step random access procedure) may be indicated by the wireless device being able to receive the response based on the second identifier. Such procedures may reduce delay in determining a success or a failure of a random access procedure.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 18A shows an example common random access resource configuration (e.g., a RACH-ConfigCommon IE).

FIG. 18B shows an example random access common configuration (e.g., RACH-ConfigCommon) Information Element (IE).

FIG. 18C shows an example random access common configuration of a RACH-ConfigGeneric Information Element (IE).

FIG. 18D shows an example dedicated random access resource configuration (e.g., a RACH-ConfigDedicated IE).

FIG. 19 shows example random access occasion mask index values for a random access occasion mask parameter (e.g., ra-ssb-OccasionMaskIndex).

FIG. 24 shows an example BWP configuration information element (e.g., a BWP IE).

FIG. 25 shows an example serving cell configuration information element.

FIG. 31 shows an example table for determining the size of a RAR window.

FIG. 45 shows an example table of backoff parameter values.

DETAILED DESCRIPTION

Figure 1:
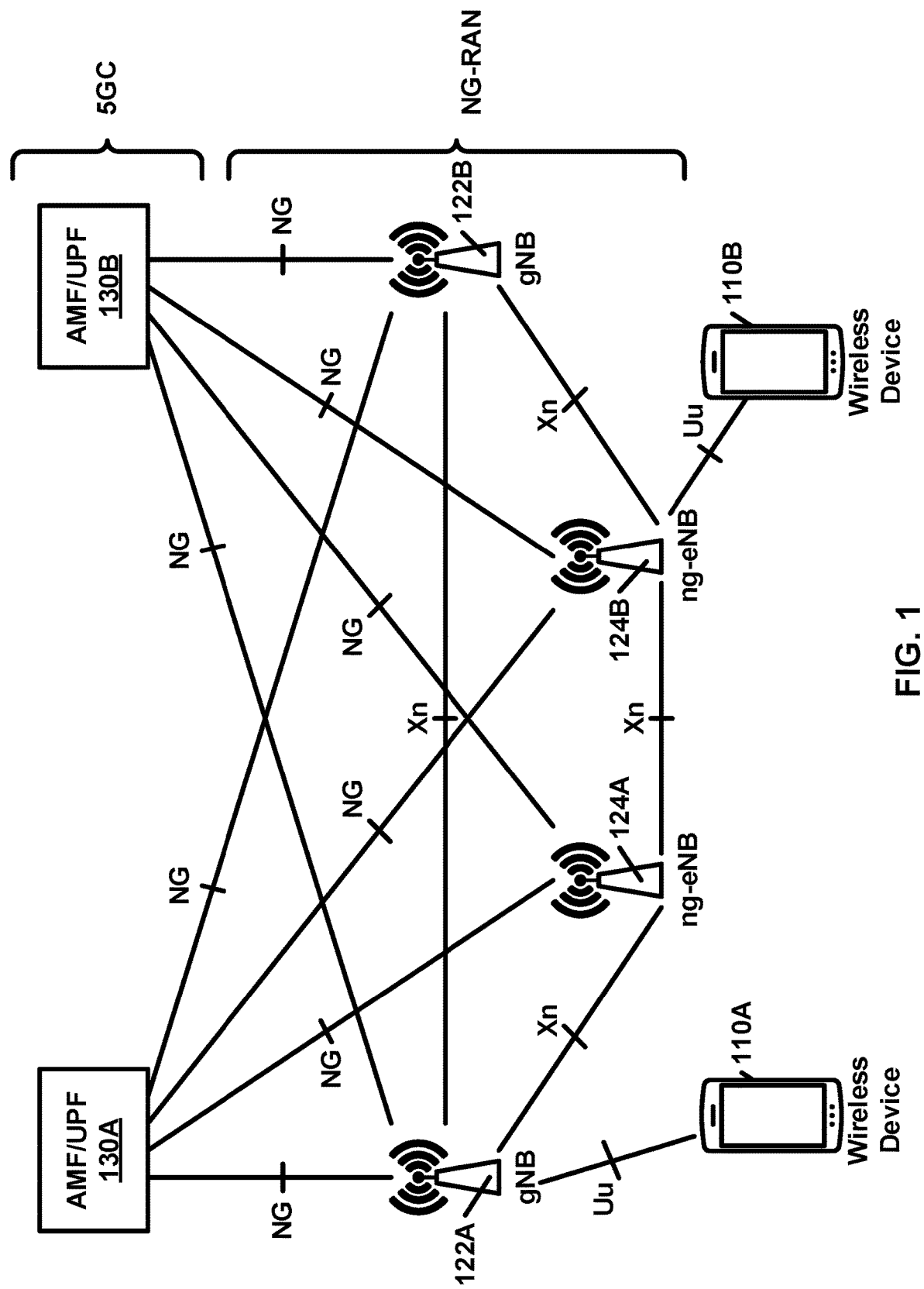
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to one or more access procedures for wireless communications in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
NUL Normal Uplink
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying
RA Random Access
RACH Random Access CHannel
RAN Radio Access Network
RAP Random Access Preamble
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSB Synchronization Signal Block
SSS Secondary Synchronization Signal
sTAG secondary Timing Advance Group
SUL Supplementary Uplink
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF)

functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide, for example, NG interface management, wireless device (e.g., UE) context management, wireless device (e.g., UE) mobility management, transport of NAS messages, paging, PDU session management, configuration transfer, and/or warning message transmission, combinations thereof, and/or the like.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
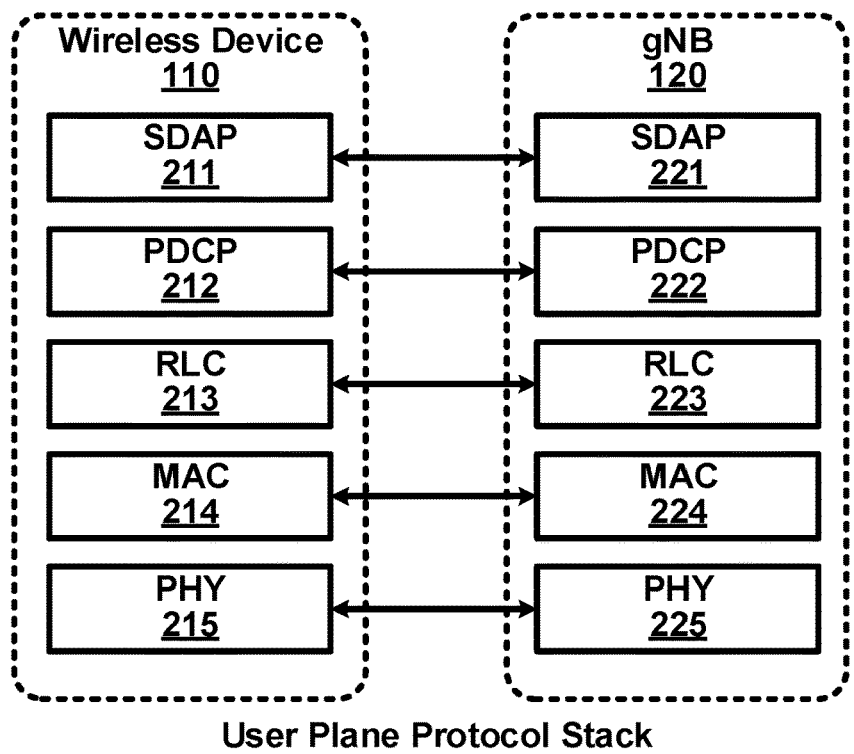
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
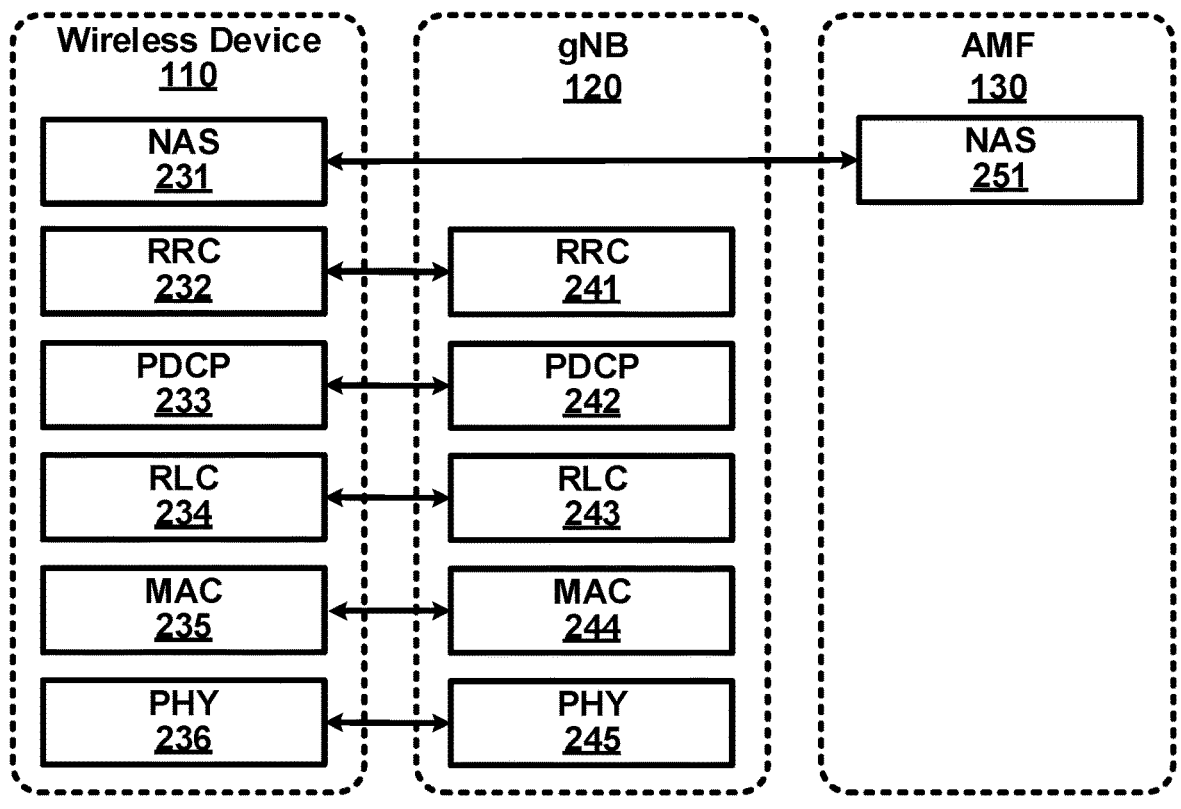
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a TB. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., TB). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
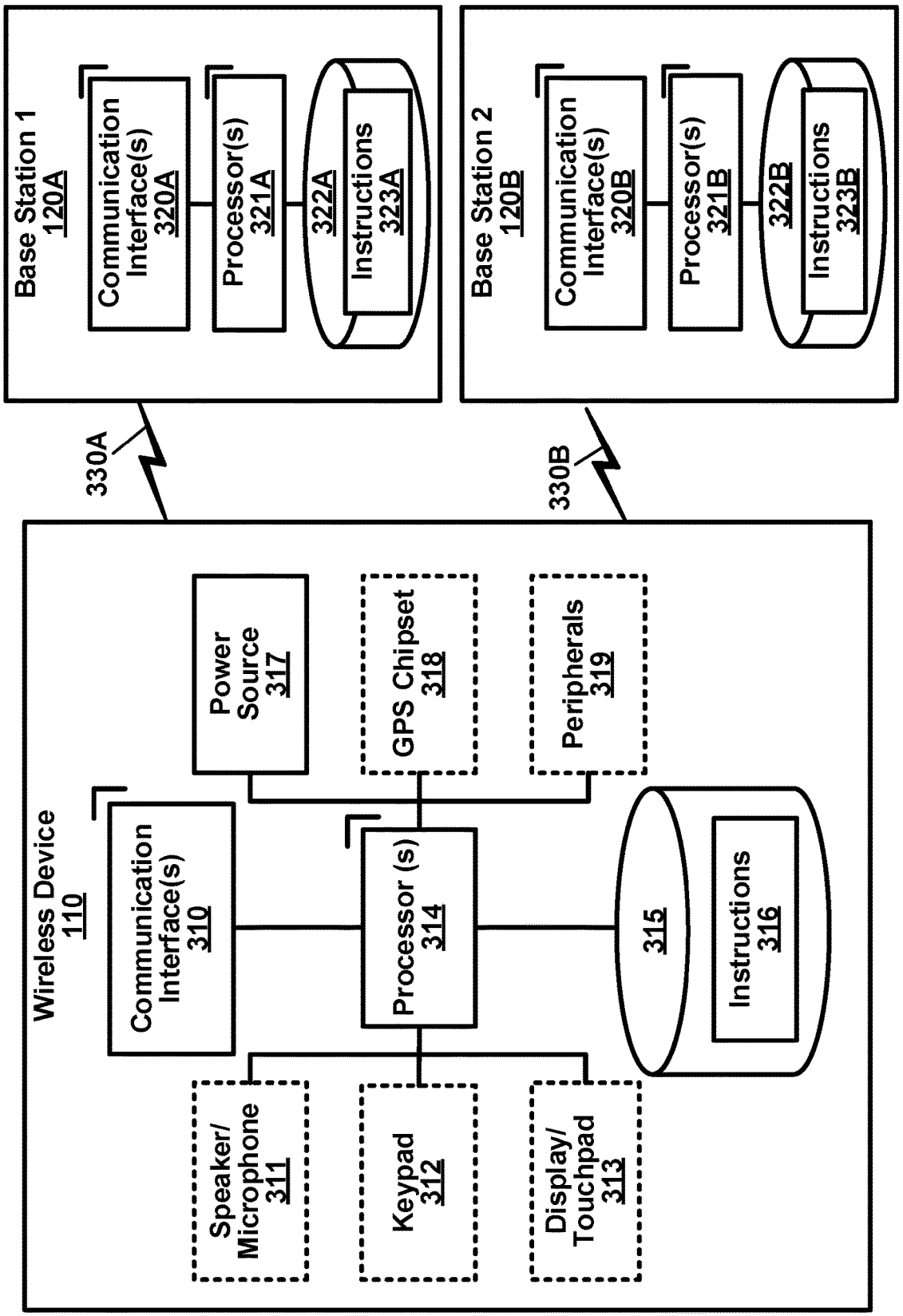
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a RA procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message comprises the sCellToReleaseList. The wireless device may perform SCell additions or modification, for example, if the received RRC Connection Reconfiguration message comprises the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive TBs, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may comprise processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
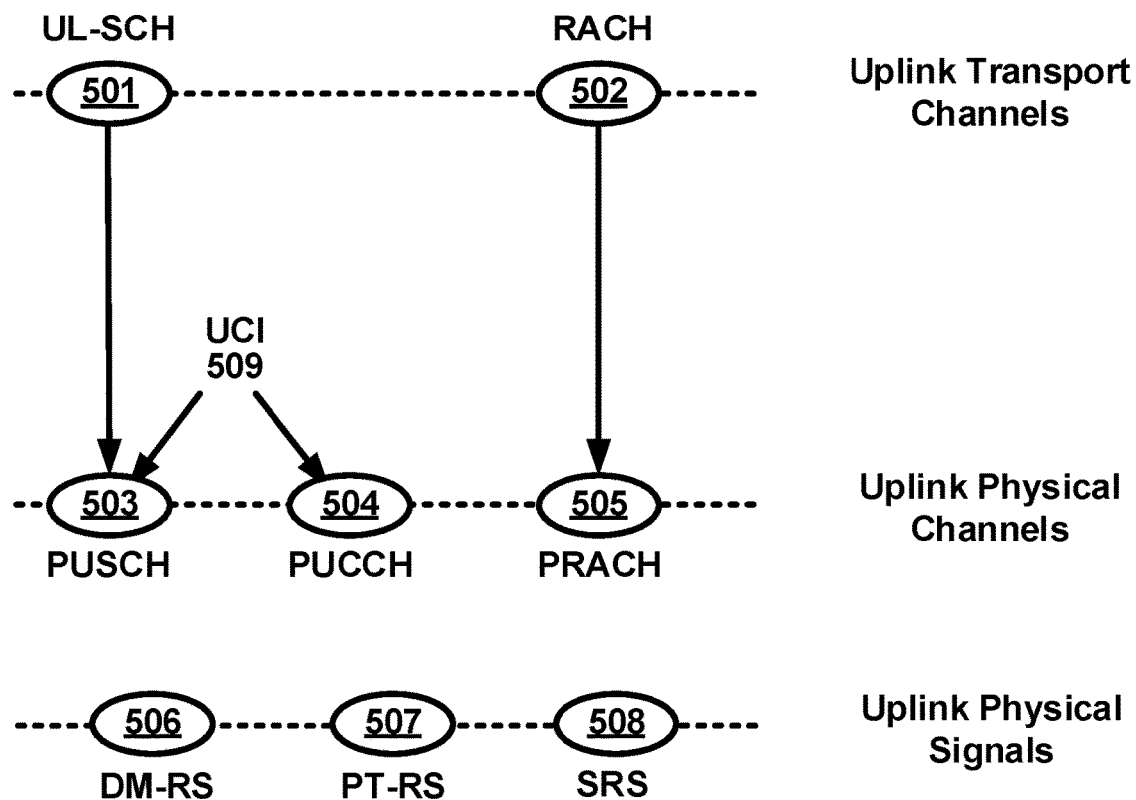
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
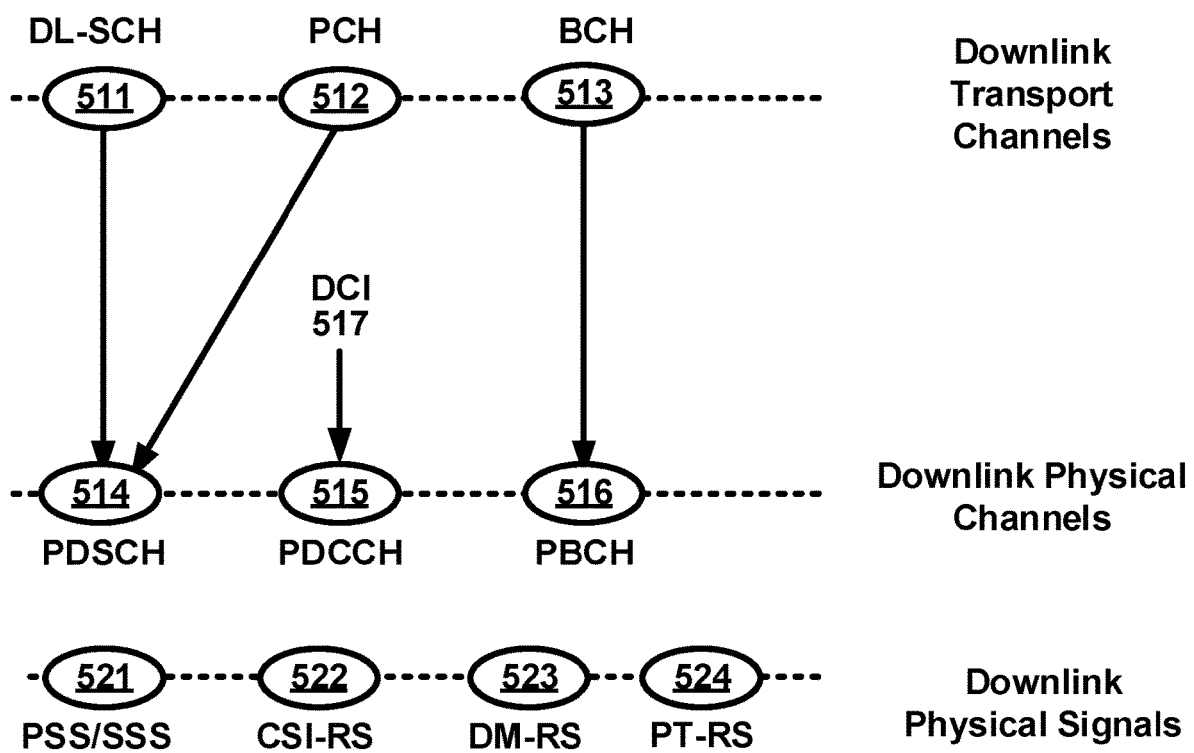
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block (SSB) may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SSB/PBCH, for example, if the downlink CSI-RS 522 and SSB/PBCH are spatially quasi co-located and resource elements associated with the downlink CSI-RS 522 are outside of the PRBs configured for the SSB/PBCH.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
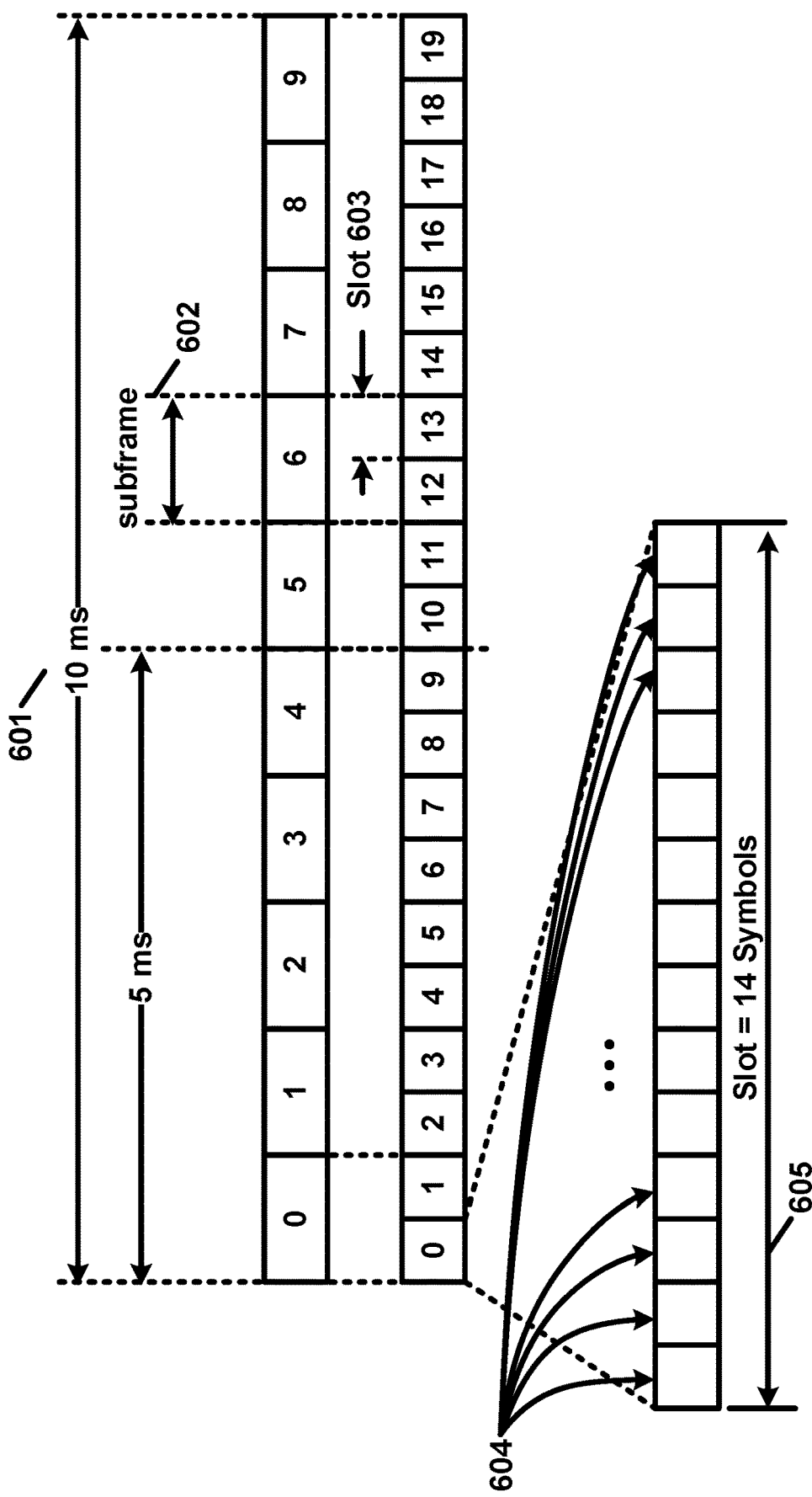
FIG. 6 shows an example transmission time and/or reception time for a carrier.

FIG. 6 shows an example transmission and/or reception time of a carrier, as well as an example frame structure, for a carrier. A multicarrier OFDM communication system may comprise one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame structure. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may comprise a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
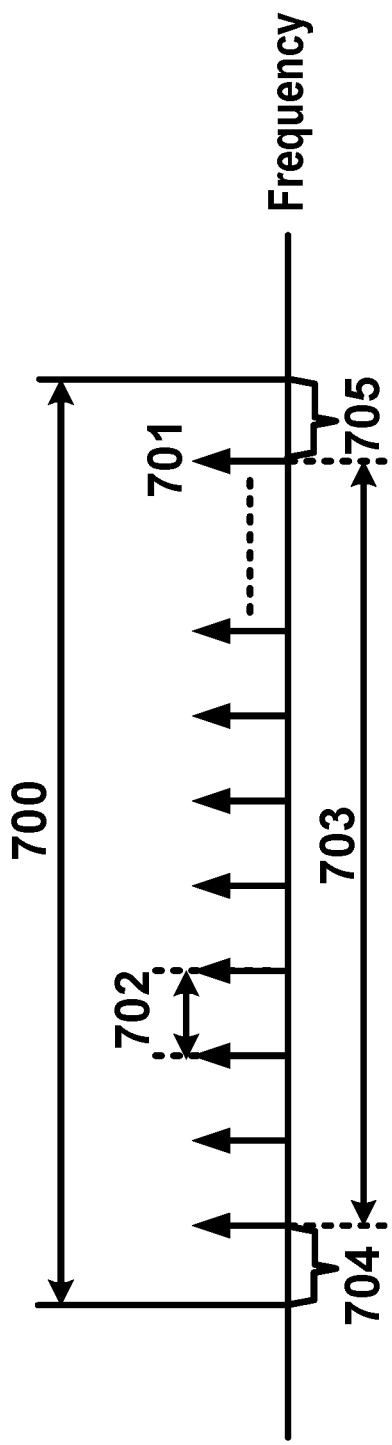
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
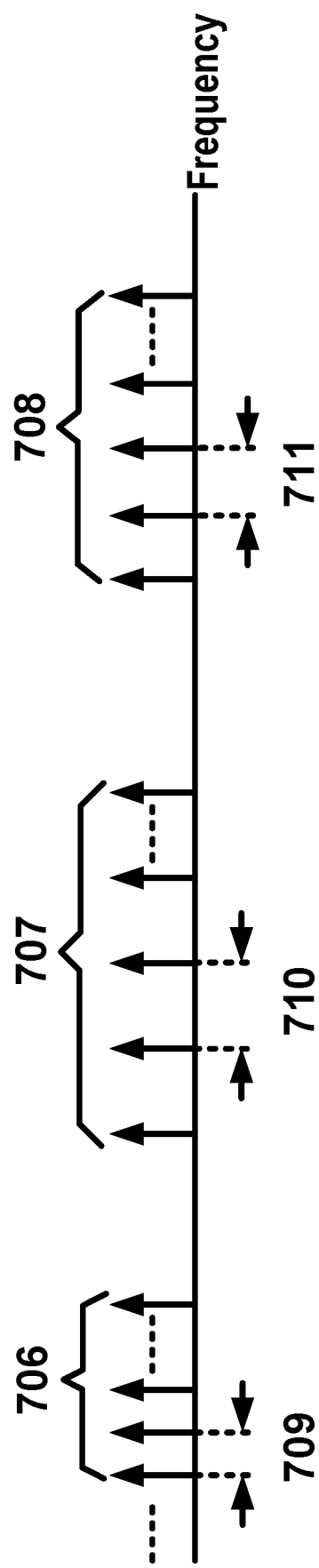

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
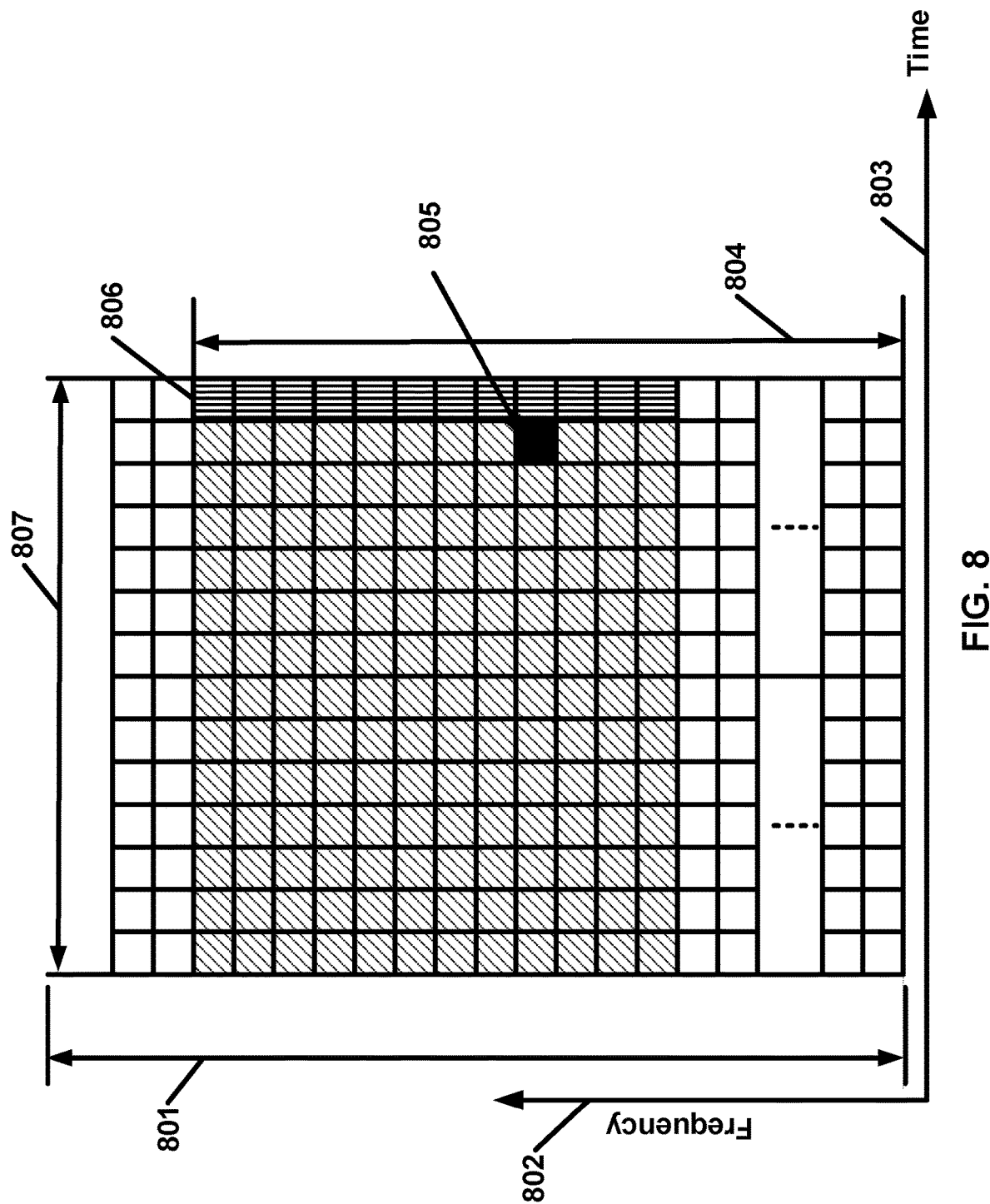
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a BWP of a carrier. A carrier may comprise multiple BWPs. A first BWP of a carrier may have a different frequency location and/or a different bandwidth from a second BWP of the carrier.

A base station may send (e.g., transmit), to a wireless device, a downlink control information comprising a downlink or uplink resource block assignment. A base station may send (e.g., transmit) to and/or receive from, a wireless device, data packets (e.g., TBs). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more TBs. The DCI may indicate a downlink assignment indicating parameters for receiving one or more TBs. The DCI may be used by the base station to initiate a contention-free RA at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
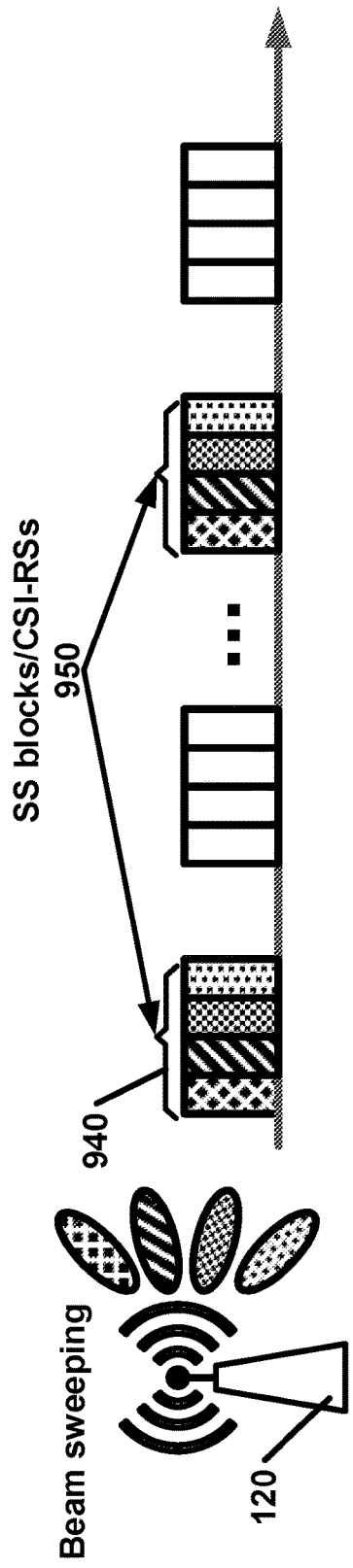
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
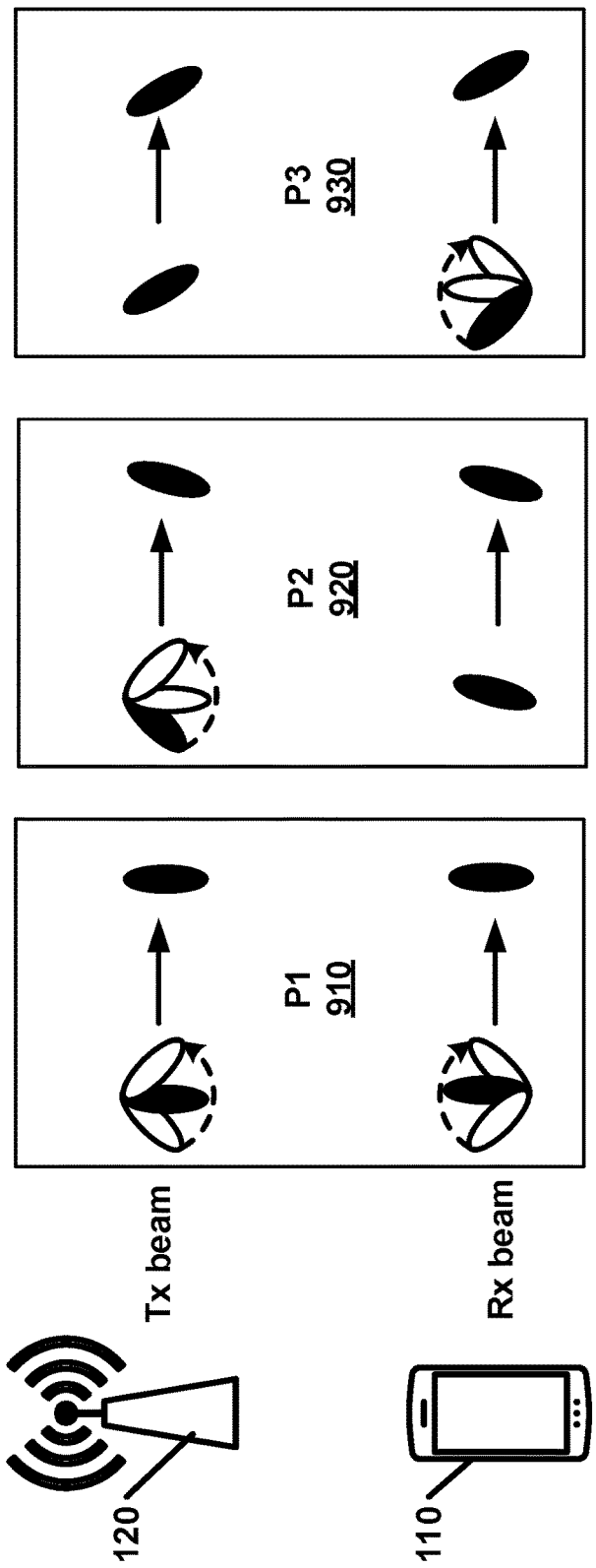
FIG. 9B shows an example downlink beam management procedure.

FIG. 9B shows an example of a beam management procedure, such as a new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell.

Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
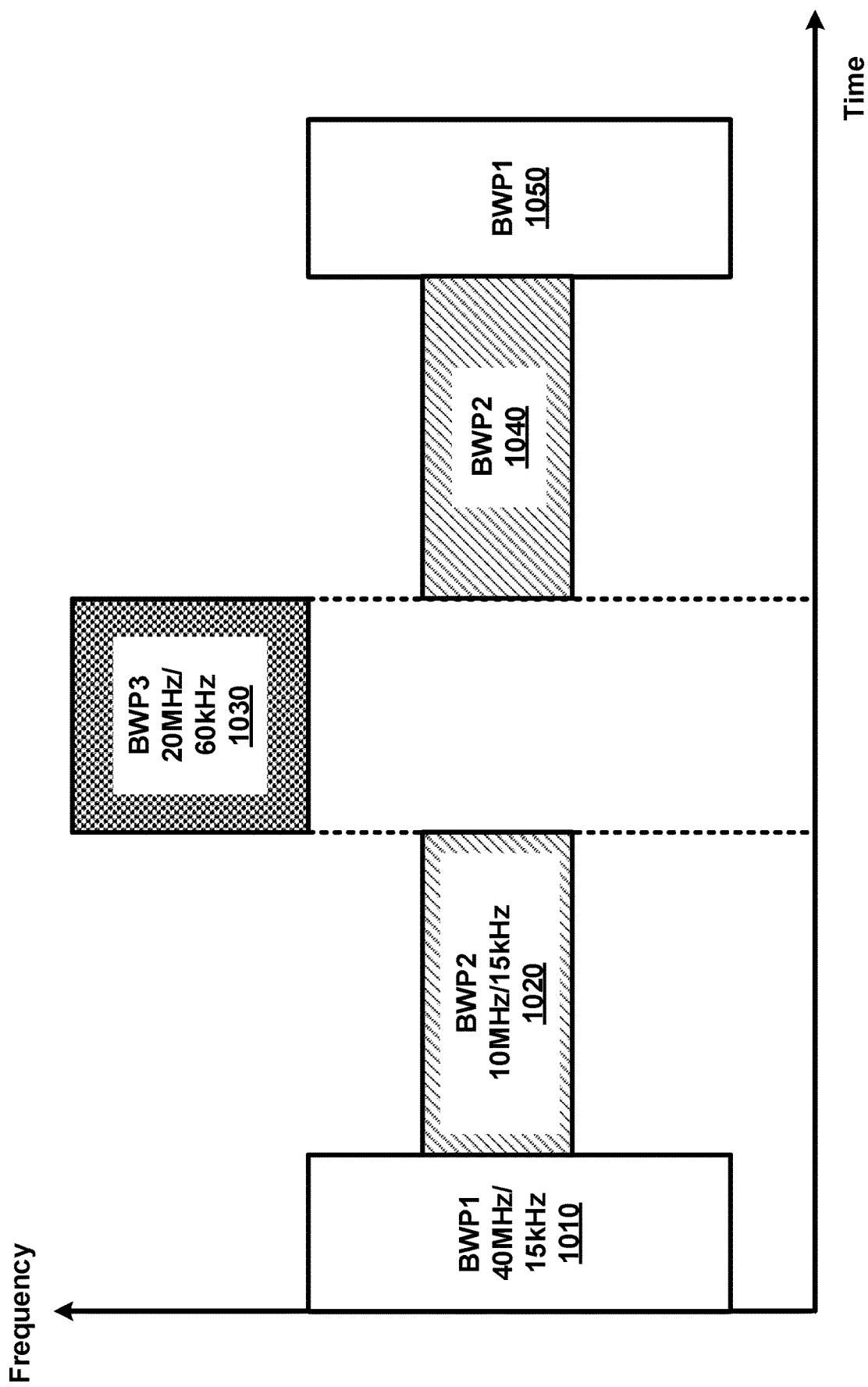
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a RA procedure. If a wireless device is configured with a secondary carrier on a primary cell, the wireless device may be configured with an initial BWP for RA procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
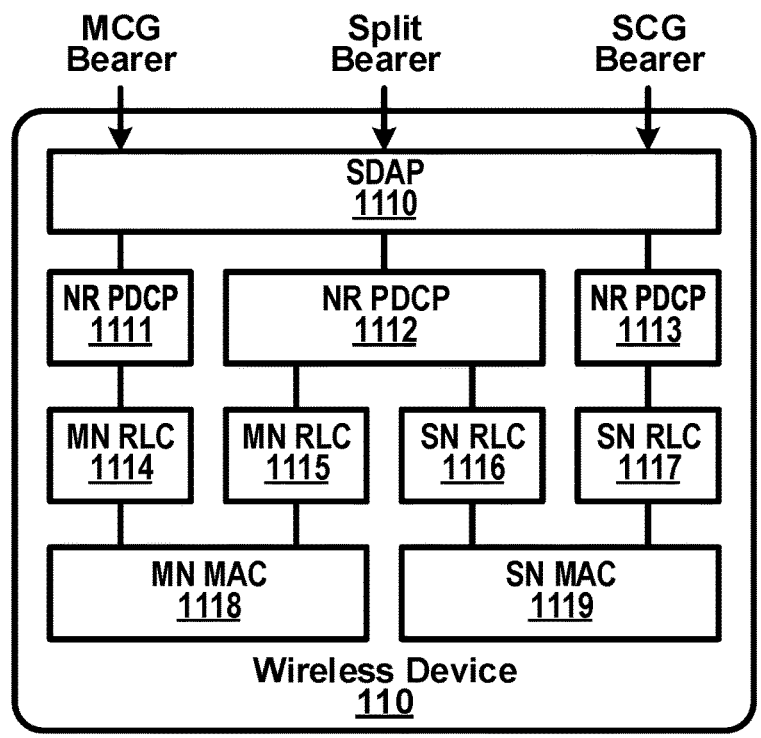
FIG. 11A and FIG. 11B show examples of multi connectivity.
Figure 11B:
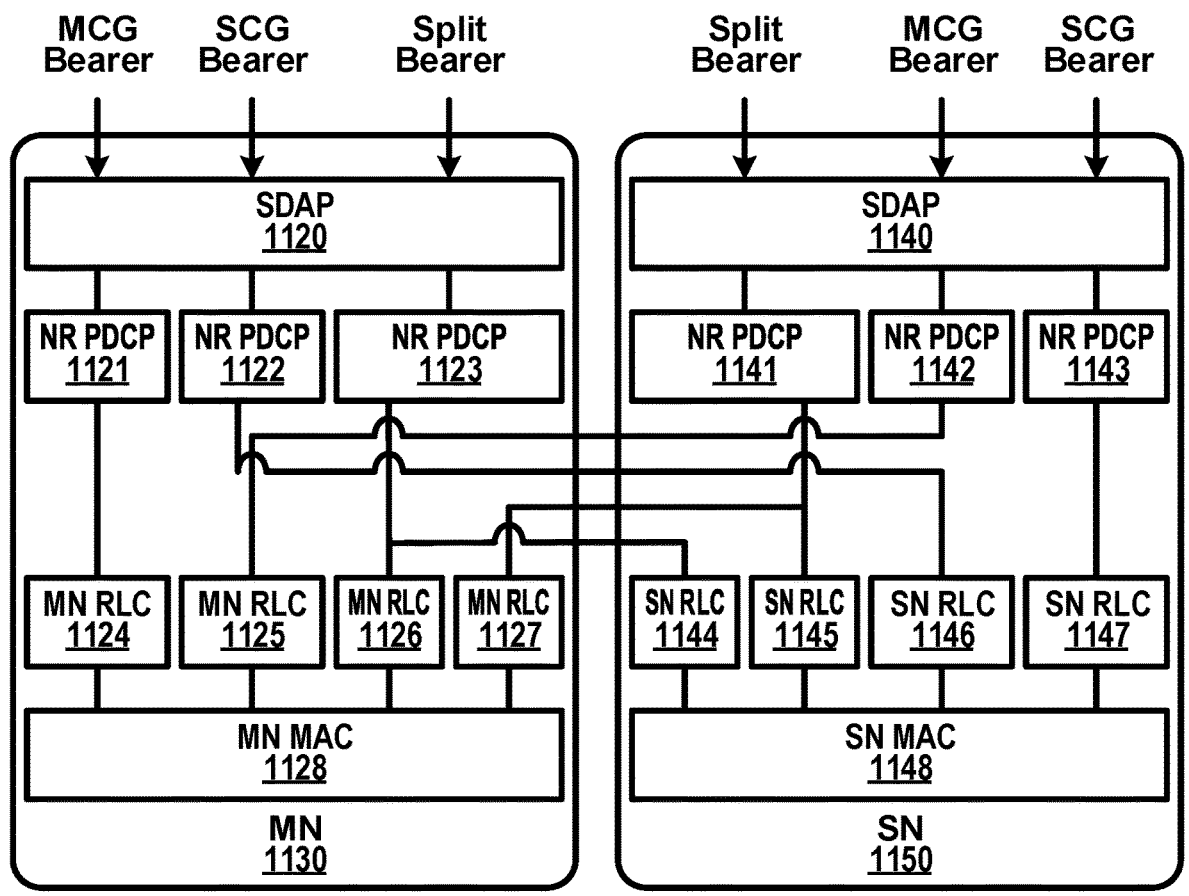

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a RA problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG.

A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
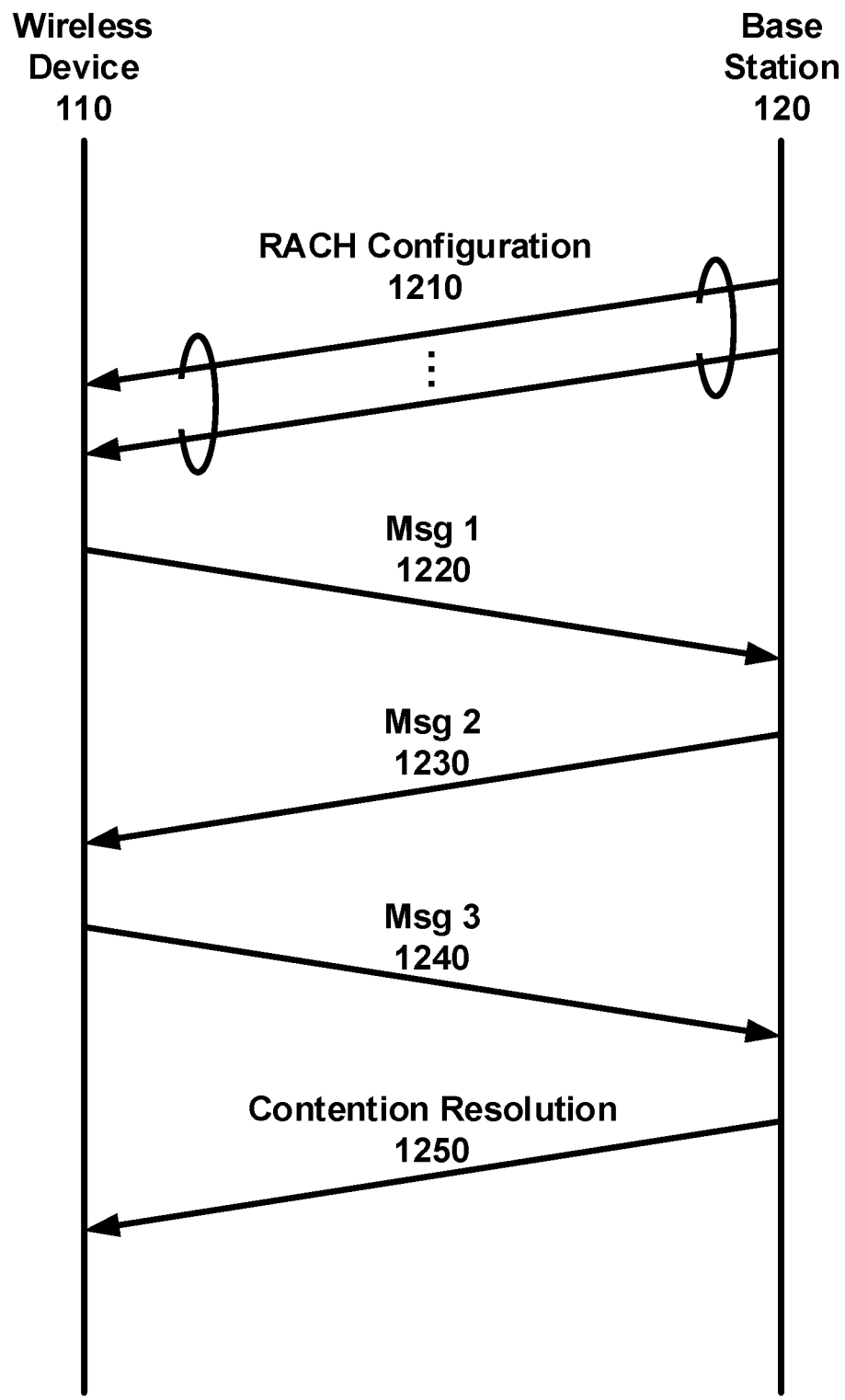
FIG. 12 shows an example of a random access procedure.

FIG. 12 shows an example of a RA procedure. One or more events may trigger a RA procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a RA procedure.

A RA procedure may comprise or be one of at least a contention based RA procedure and/or a contention free RA procedure. A contention based RA procedure may comprise one or more Msg 1 1220 transmissions, one or more Msg2 1230 transmissions, one or more Msg3 1240 transmissions, and contention resolution 1250. A contention free RA procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step RA procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step RA procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step RA procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble (RAP), initial preamble power (e.g., RAP initial received target power), an RSRP threshold for a selection of a SS block and corresponding PRACH resource, a power-ramping factor (e.g., RAP power ramping step), a RAP index, a maximum number of preamble transmissions, preamble group A and group B, a threshold (e.g., message size) to determine the groups of RAPs, a set of one or more RAPs for a system information request and corresponding PRACH resource(s) (e.g., if any), a set of one or more RAPs for a beam failure recovery request and corresponding PRACH resource(s) (e.g., if any), a time window to monitor RAR(s), a time window to monitor response(s) on a beam failure recovery request, and/or a contention resolution timer.

The Msg1 1220 may comprise one or more transmissions of a RAP. For a contention based RA procedure, a wireless device may select an SS block with an RSRP above the RSRP threshold. If RAPs group B exists, a wireless device may select one or more RAPs from a group A or a group B, for example, depending on a potential Msg3 1240 size. If a RAPs group B does not exist, a wireless device may select the one or more RAPs from a group A. A wireless device may select a RAP index randomly (e.g., with equal probability or a normal distribution) from one or more RAPs associated with a selected group. If a base station semi-statically configures a wireless device with an association between RAPs and SS blocks, the wireless device may select a RAP index randomly with equal probability from one or more RAPs associated with a selected SS block and a selected group.

A wireless device may initiate a contention free RA procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a RAP index corresponding to a selected SS block or a CSI-RS from a set of one or more RAPs for a beam failure recovery request, for example, if at least one of the SS blocks with an RSRP above a first RSRP threshold among associated SS blocks is available, and/or if at least one of CSI-RSs with a RSRP above a second RSRP threshold among associated CSI-RSs is available.

A wireless device may receive, from a base station, a RAP index via PDCCH or RRC for a contention free RA procedure. The wireless device may select a RAP index, for example, if a base station does not configure a wireless device with at least one contention free PRACH resource associated with SS blocks or CSI-RS. The wireless device may select the at least one SS block and/or select a RAP corresponding to the at least one SS block, for example, if a base station configures the wireless device with one or more contention free PRACH resources associated with SS blocks and/or if at least one SS block with a RSRP above a first RSRP threshold among associated SS blocks is available. The wireless device may select the at least one CSI-RS and/or select a RAP corresponding to the at least one CSI-RS, for example, if a base station configures a wireless device with one or more contention free PRACH resources associated with CSI-RSs and/or if at least one CSI-RS with a RSRP above a second RSPR threshold among the associated CSI-RSs is available.

A wireless device may perform one or more Msg1 1220 transmissions, for example, by sending (e.g., transmitting) the selected RAP. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected RAP via a selected PRACH occasions. The wireless device may determine a transmit power for a transmission of a selected RAP at least based on an initial preamble power and a power-ramping factor. The wireless device may determine an RA-RNTI associated with a selected PRACH occasion in which a selected RAP is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a RAR, Msg 2 1230. The wireless device may start a time window (e.g., ra-ResponseWindow) to monitor a RAR. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one RAR identified by a RA-RNTI, or for at least one response to a beam failure recovery request identified by a C-RNTI, at a time that a timer for a time window is running A wireless device may determine that a reception of RAR is successful, for example, if at least one RAR comprises a random access preamble identifier (RAPID) corresponding to a RAP sent (e.g., transmitted) by the wireless device. The wireless device may determine that the contention free RA procedure is successfully completed, for example, if a reception of a RAR is successful. The wireless device may determine that a contention free RA procedure is successfully complete, for example, if a contention free RA procedure is triggered for a beam failure recovery request and if a PDCCH transmission is addressed to a C-RNTI. The wireless device may determine that the RA procedure is successfully completed, and may indicate a reception of an acknowledgement for a system information request to upper layers, for example, if at least one RAR comprises a RAPID. The wireless device may stop sending (e.g., transmitting) remaining preambles (if any) after or in response to a successful reception of a corresponding RAR, for example, if the wireless device has signaled multiple preamble transmissions.

The wireless device may perform one or more Msg 3 1240 transmissions, for example, after or in response to a successful reception of RAR (e.g., for a contention based RA procedure). The wireless device may adjust an uplink transmission timing, for example, based on a timing advanced command indicated by a RAR. The wireless device may send (e.g., transmit) one or more TBs, for example, based on an uplink grant indicated by a RAR. Subcarrier spacing for PUSCH transmission for Msg3 1240 may be provided by at least one higher layer (e.g., RRC) parameter. The wireless device may send (e.g., transmit) a RAP via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same RAR comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a RA procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the RA procedure is successfully completed.

RA procedures may be used to establish communications between a wireless device and a base station associated with a cell. A four-step RA procedure (e.g., such as shown in FIG. 12 and described above) may have an associated latency. The associated latency for the four-step RA procedure may be a minimum of a quantity (e.g., fourteen or any other quantity) of transmission time intervals (TTIs). A TTI may be any transmission time interval or other time duration. A minimum latency of fourteen TTIs may comprise, for example, three TTIs after a message from step 1 1220 of a four-step RA procedure, one TTI for a message from step 2 1230 of a four-step RA procedure, five TTIs after the message from step 2, one TTI for a message from step 3 1240 of a four-step RA procedure, three TTIs after the message from step 3, and one TTI for a message from step 4 1250 of a four-step procedure (e.g., 3+1+5+1+3+1=14). The minimum latency may comprise any quantity of TTIs. Any of the above-references messages may comprise any quantity of TTIs. Reducing the number of steps in an RA procedure may reduce latency. A four-step RA procedure may be reduced to a two-step RA procedure, for example, by using parallel transmissions. A two-step RA procedure may have an associated latency. The associated latency for a two-step RA procedure may be a minimum of four TTIs and which may be less than an associated latency for a four-step RA procedure. A minimum latency of four TTIs may be a minimum of a quantity (e.g., four or any other quantity) of TTIs. A minimum latency of four TTIs may comprise, for example, three TTIs after a message from step 1 of a two-step RA procedure, and one TTI for a message from step 2 of a two-step RA procedure.

Figure 13:
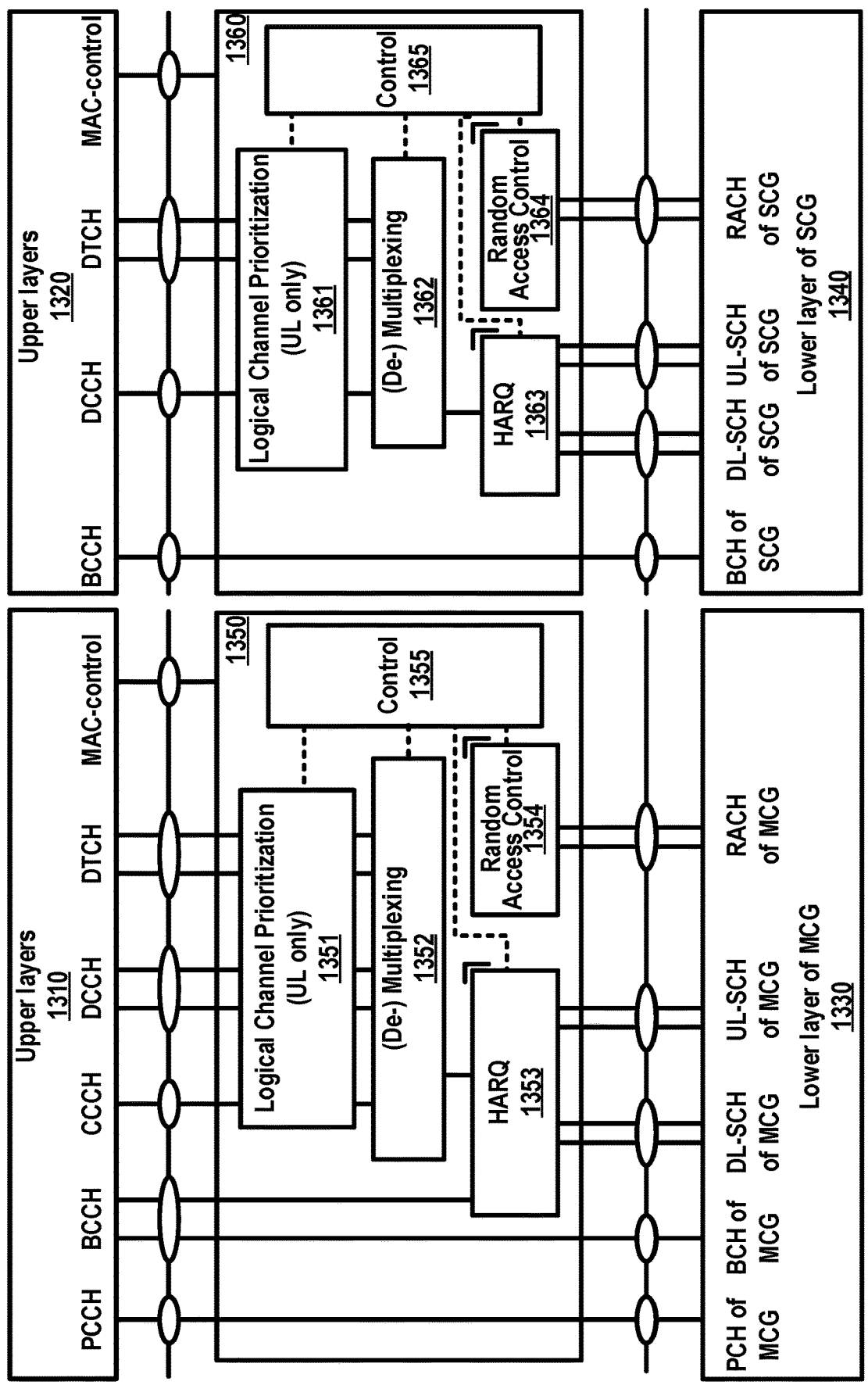
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a RA problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto TBs to be delivered to the physical layer on transport channels (e.g., in uplink), demultiplexing (e.g., (De-) Multiplexing 1352 and/or (De-) Multiplexing 1362) of MAC SDUs to one or different logical channels from TBs delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a RA process (e.g., Random Access Control 1354 and/or Random Access Control 1364).

Figure 14:
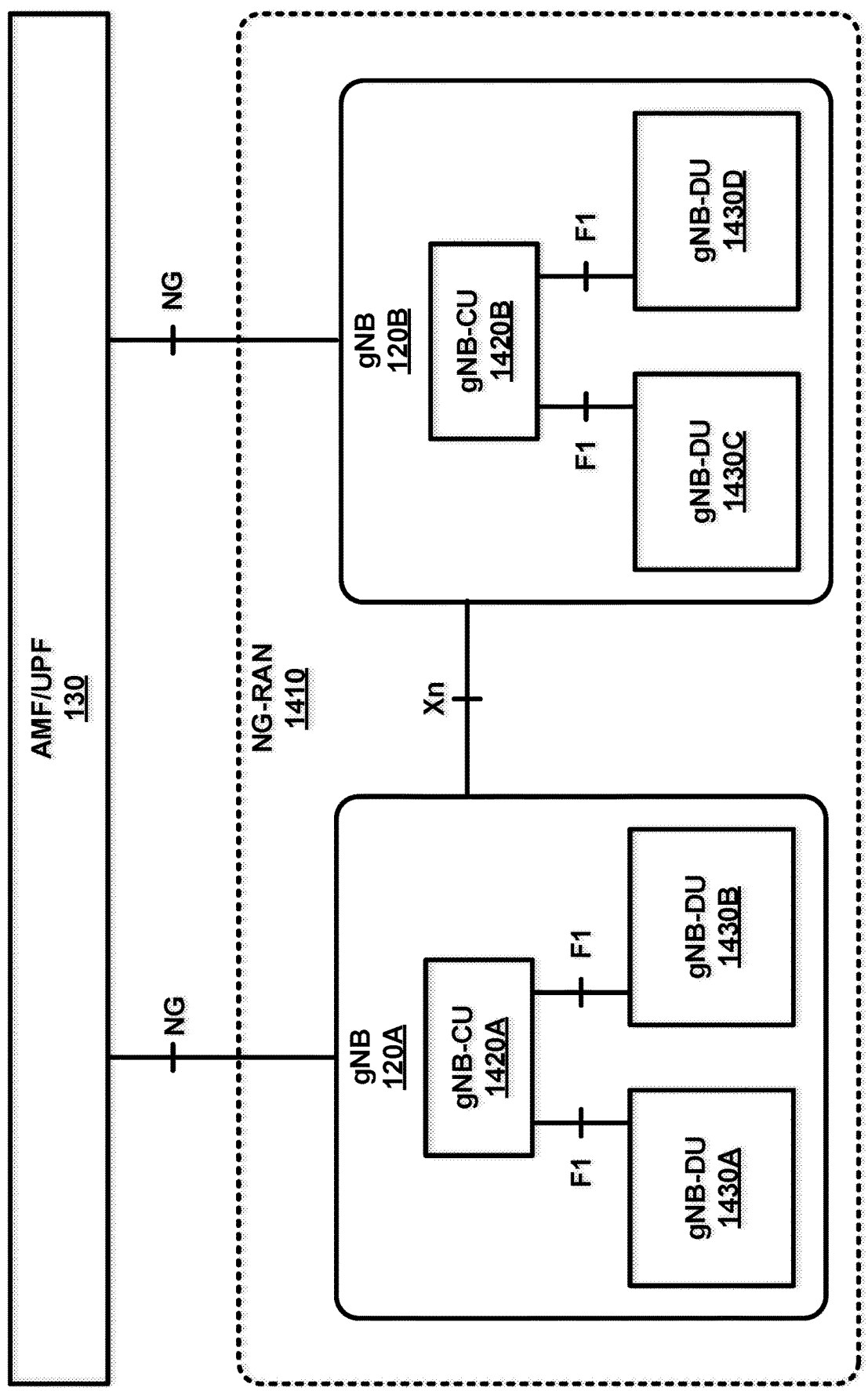
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
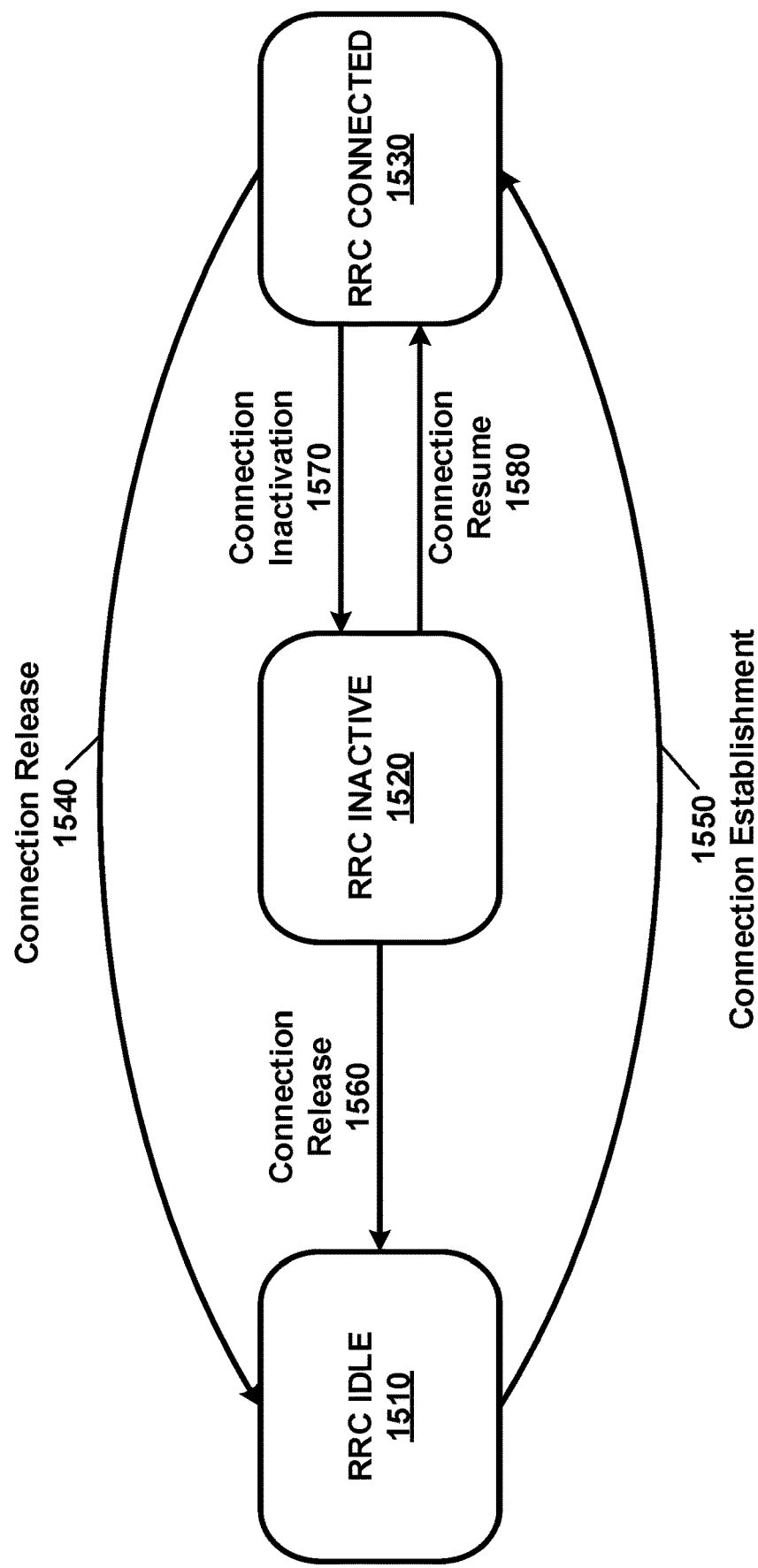
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a RA procedure by the wireless device and/or a context retrieve procedure (e.g., UE context retrieve). A context retrieve procedure may comprise: receiving, by a base station from a wireless device, a RAP; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a RA procedure to resume an RRC connection and/or to send (e.g., transmit) one or more packets to a base station (e.g., to a network). The wireless device may initiate a RA procedure to perform an RNA update procedure, for example, if a cell selected belongs to a different RNA from an RNA for the wireless device in an RRC inactive state. The wireless device may initiate a RA procedure to send (e.g., transmit) one or more packets to a base station of a cell that the wireless device selects, for example, if the wireless device is in an RRC inactive state and has one or more packets (e.g., in a buffer) to send (e.g., transmit) to a network. A RA procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A wireless device may initiate a random access (RA) procedure on a cell to establish communications to a base station. A four-step RA procedure (e.g., as shown in FIG. 12) may have an associated latency. The associated latency of the four-step RA procedure may be a minimum of fourteen transmission time intervals (TTI) (or any other duration). 3GPP TR 38.804 v14.0.0, for example, indicates a minimum latency of fourteen TTIs. Referring to the four-step RA procedure of FIG. 12, the latency may comprise, for example, 3 TTIs after a message from step 1 (e.g., Msg1 1220), 1 TTI for a message from step 2 (e.g., Msg2 1230), 5 TTIs after the message from step 2, 1 TTI for a message from step 3 (e.g., Msg 3 1240) of a four-step RA procedure, 3 TTIs after the message from step 3, and 1 TTI for a message from step 4 (e.g., contention resolution 1250) of a four-step procedure. The sum total of the TTIs in such a four-step RA procedure may be equal to fourteen (e.g., 3+1+5+1+3+1=14). Reducing the number/quantity of steps in an RA procedure may reduce latency. By using parallel transmissions, for example, a four-step RA procedure may be reduced to a two-step RA procedure. A two-step RA procedure may have an associated latency. The associated latency of the 2-step RA procedure may be a minimum of four TTIs and may be less than an associated latency for a four-step RA procedure. 3GPP TR 38.804 v14.0.0 indicates a minimum latency of four TTIs comprising, for example, 3 TTIs after a message from step 1 of a two-step RA procedure and 1 TTI for a message from step 2 of a two-step RA procedure.

Figure 16:
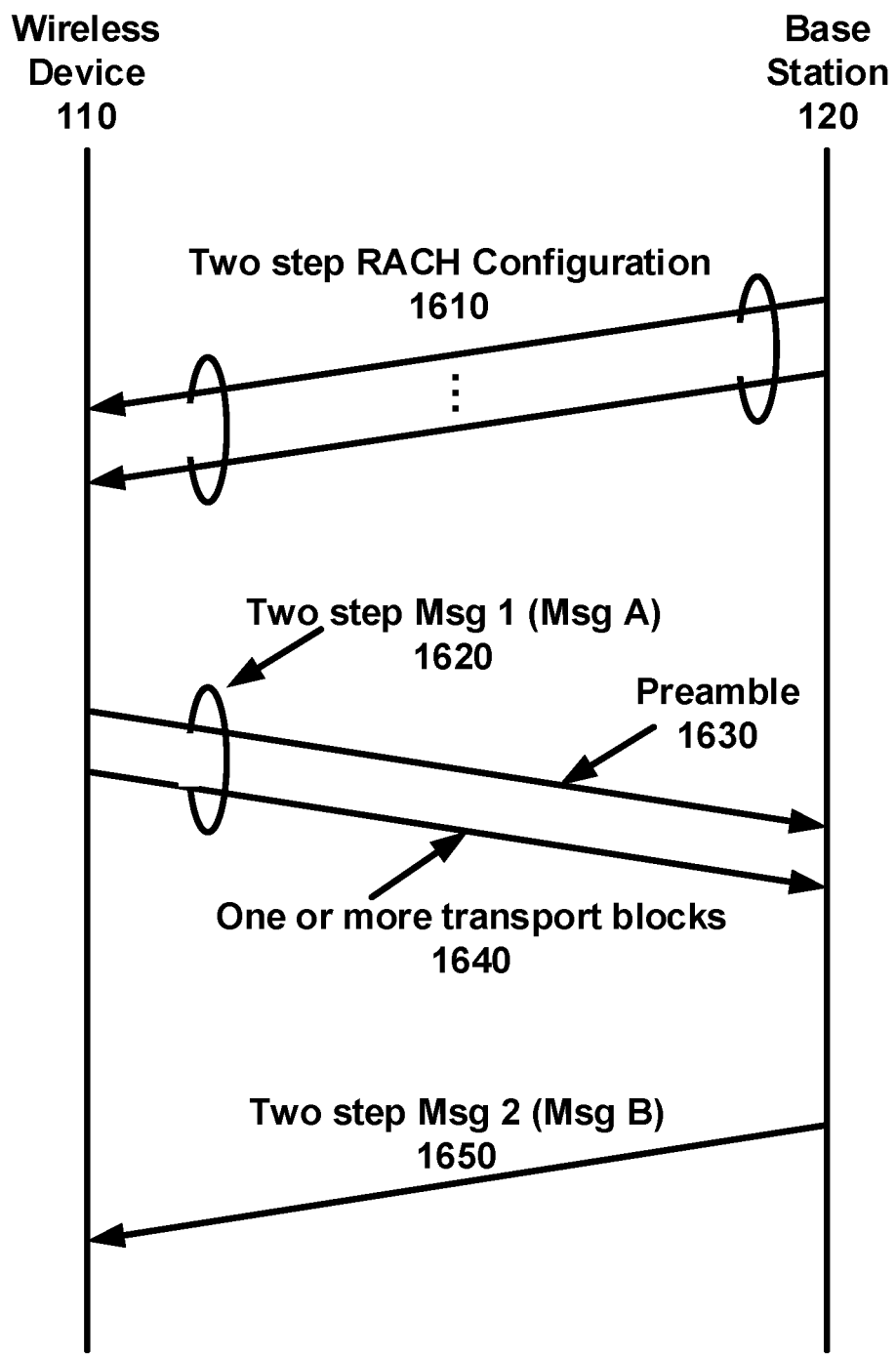
FIG. 16 shows an example of a two-step RA procedure.

FIG. 16 shows an example of a two-step RA procedure. The two-step RA procedure may comprise an uplink (UL) transmission of a two-step Msg1 1620 that may comprise a random access preamble (RAP) transmission 1630 and one or more transport blocks transmission 1640, followed by a downlink (DL) transmission of a two-step Msg2 1650 that may comprise a response (e.g., random access response (RAR)) corresponding to the uplink transmission. The response may comprise contention resolution information. The two-step Msg1 1620 may be referred to as a message A (MsgA). The two-step Msg2 1650 may be referred to as a message B (MsgB).

A base station may send/transmit one or more RRC messages to configure a wireless device with one or more parameters of two step RACH configuration 1610. The one or more RRC messages may be broadcasted, multicasted, and/or unicasted to one or more wireless devices. The one or more RRC messages may be wireless device-specific messages (e.g., a dedicated RRC message transmitted to a wireless device with RRC INACTIVE 1520 or RRC CONNECTED 1530). The one or more RRC messages may comprise parameters for sending/transmitting a two-step Msg1 (Msg A) 1620. The parameter may indicate at least one of the following: a PRACH resource allocation, a preamble format, SSB information (e.g., a total number/quantity of SSBs, downlink resource allocation of SSB transmission, a transmission power of SSB transmission, and/or other information), uplink radio resources for one or more transport block transmissions, and/or associations between PRACH resource allocation and the uplink radio resources (or associations between the uplink radio resources and downlink reference signals).

A wireless device may send/transmit, via a cell and to a base station, an RAP for UL time alignment and/or one or more transport blocks (e.g., delay-sensitive data, wireless device ID, security information, device information, such as IMSI, and/or other information) in a UL transmission of a two-step RA procedure. A base station may send/transmit a two-step Msg2 1650 (e.g., an RAR), for example, in a DL transmission of the two-step RA procedure. The two-step Msg2 1650 may comprise at least one of the following: a timing advance command indicating the TA value, a power control command, a UL grant (e.g., radio resource assignment, and/or MCS), a wireless device ID for contention resolution, an RNTI (e.g., C-RNTI or TC-RNTI), and/or other information. The two-step Msg2 1650 (e.g., an RAR) may comprise a preamble indicator/identifier corresponding to the preamble 1630, a positive or negative acknowledgement of a reception of the one or more transport blocks 1640, and/or an indication of a successful decoding of the one or more transport blocks 1640.

A wireless device initiating a two step RA procedure may transmit a first message (e.g., Msg A) comprising at least one preamble and at least one transport block. The at least one transport block may comprise an identifier that the wireless device may use for a contention resolution. The identifier may comprise, for example, a C-RNTI (e.g., for a wireless device in a connected state such as RRC Connected). The identifier may be a random number that the wireless device may generate (e.g., for a wireless device not assigned/associated with a C-RNTI). The identifier may be generated, for example, based on a subscriber information of the wireless device (e.g., T-IMSI).

The wireless device may start to monitor a downlink control channel (e.g., a search space configured in a PDCCH) for a second message, such as Msg B, (e.g., an RAR) corresponding to the first message (e.g., Msg A). The wireless device may start to monitor the downlink control channel, for example after or in response to transmitting the first message (e.g., Msg A). The second message (e.g., Msg B) may be scrambled by an RNTI determined/calculated based on at least one of following: a time resource index (e.g., an index of a first OFDM symbol and/or an index of a first slot) of a PRACH occasion in which the at least one preamble is transmitted, a frequency resource index of a PRACH occasion in which the at least one preamble is transmitted, a time resource index (e.g., an index of a first OFDM symbol and/or an index of a first slot) of a PUSCH occasion in which the at least one transport block is transmitted, a frequency resource index of a PUSCH occasion in which the at least one transport block is transmitted, and/or an indicator (e.g., 0 or 1) of an uplink carrier via which the first message (e.g., Msg A) is transmitted. The wireless device may determine that the two step RA procedure has successfully completed based on one or more conditions, for example, if the wireless device receives the second message (e.g., Msg B). The one or more conditions may comprise, for example, the second message (e.g., Msg B) comprising a preamble index matched to the at least one preamble that the wireless device transmits to the base station. The one or more conditions may comprise, for example, the second message (e.g., Msg B) comprising a contention resolution identifier matched to the identifier that the wireless device transmits to the base station for the contention resolution. The wireless device may receive the second message (e.g., Msg B) indicating a retransmission of the at least one transport block. The second message (e.g., Msg B) may indicate a retransmission of the at least one transport block. The second message (e.g., Msg B) may comprise an uplink grant for the retransmission. A two-step RA procedure may reduce RA latency in comparison with a four-step RA procedure, for example, by integrating a random access preamble transmission (e.g., a process to obtain a timing advance value) with one or more transport block transmissions.

A wireless device may send/transmit, via a cell and to a base station, an RAP in parallel with one or more TBs at least during a portion of time, for example, in a UL transmission of a two-step RA procedure. The wireless device may acquire one or more configuration parameters for the UL transmission, for example, before the wireless device starts a two-step RA procedure (e.g., at step 1610 in FIG. 16). The one or more configuration parameters may indicate at least one of the following: a PRACH resource allocation, a preamble format, SSB information (e.g., a number/quantity of transmitting SSBs, downlink resource allocation of SSB transmissions, a transmission power of SSB transmission, and/or other information), uplink radio resources (in terms of time, frequency, code/sequence/signature) for one or more transport block transmissions, and/or power control parameters of one or more TB transmissions (e.g., cell and/or UE specific power adjustments used for calculating received target power, inter-cell interference control parameter that may be used as a scaling factor of pathloss measurement, reference signal power to calculate for pathloss measurement, and/or one or more margins).

A wireless device may generate an RAP. A two-step RACH configuration may comprise RAP generating parameters (e.g., a root sequence) that may be used by the wireless device to generate an RAP. The wireless device may use the RAP generating parameters to generate one or more candidate preambles. The wireless device may select (e.g., randomly select) one of the candidate preambles as the RAP. The RAP generating parameters may be SSB-specific and/or cell-specific. RAP generating parameters for a first SSB may be different from, or the same as, RAP generating parameters for a second SSB. A base station may send/transmit a control message (e.g., an RRC message for a handover, and/or a PDCCH order for a secondary cell addition) that may comprise a preamble index of an RAP dedicated to a wireless device, for example, to initiate a two-step RA procedure. The one or more candidate preambles may be classified or organized into groups that may indicate (and/or be associated with) an amount of data for transmission. The amount of data may indicate one or more TBs that remain in the buffer. Each of the candidate preamble groups may be associated with a range of a data size.

A first group of the candidate preamble groups may comprise RAPs associated with (e.g., indicated for) small data transmissions. A second group may comprise RAPs associated with (e.g., indicated for) large/larger data transmissions. A base station may send/transmit an RRC message comprising one or more thresholds with which a wireless device may determine a group of RAPs (e.g., by comparing the one or more thresholds and the amount of data). The wireless device may be able to indicate a size of data for transmission, for example, by sending/transmitting an RAP determined/selected from a specific group of RAPs.

A wireless device may send/transmit the RAP via a RACH resource indicated by a two-step RACH configuration. The wireless device may send/transmit the RAP, for example, in a two-step RA procedure. The wireless device may send/transmit one or more TBs via a UL radio resource (e.g., a PUSCH resource) indicated by a two-step RACH configuration. A first transmission of the RAP and a second transmission of the one or more TBs may be scheduled in a TDM (time-division multiplexing), a FDM (frequency-division multiplexing), and/or a CDM (code-division multiplexing) manner(s). The transmission of the RAP may be overlapped in time (e.g., partially or entirely) with the transmission of the one or more TBs. The two-step RACH configuration may indicate an overlapped portion of radio resources between the RAP and one or more TB transmissions. The two-step RACH configuration may indicate one or more UL radio resources associated with one or more RAPs (or RAP groups) and/or the RACH resource. A wireless device may determine at least one UL radio resource via which the wireless device may send/transmit one or more TBs as a part of a two-step RACH procedure, for example, based on a determination/selection of an RAP, an RAP group, and/or a RACH resource. One or more downlink reference signals (SSBs or CSI-RSs), for example, may be associated with one or more RACH resources and/or one or more RAPs. A wireless device may determine at least one RACH resource (e.g., PRACH occasion) among the one or more RACH resources and/or at least one RAP among the one or more RAPs. The wireless device may determine at least one UL radio resource (e.g., PUSCH occasions) where the wireless device transmits one or more TBs as a part of a two-step RACH procedure, for example, based on a selection of the at least one RAP and/or the at least one RACH resource (e.g., PRACH occasions). The one or more UL radio resources may be indicated based on a frame structure (e.g., shown in FIG. 6), and/or an OFDM radio structure (e.g., shown in FIG. 8), for example, with respect to an SFN (SNR=0), a slot number, and/or an OFDM symbol number for a time domain radio resource, and/or with respect to a subcarrier number, a number of resource elements, a number of resource blocks, an RBG number, and/or a frequency index for a frequency domain radio resource. The one or more UL radio resources may be indicated based on a time offset and/or a frequency offset with respect to one or more RACH resources of a selected RAP. The UL transmissions may occur, for example, in the same subframe (or slot/mini-slot), in consecutive subframes (or slot/mini-slot), or in the same burst. The one or more UL radio resources (e.g., PUSCH occasions) may be, for example, periodic resources of configured grant Type 1 or Type 2. A PRACH resource and one or more associated UL radio resources for a two-step Msg1 may be allocated with a time offset and/or frequency offset, for example, such as provided (e.g., configured, determined, indicated, etc.) by RRC messages (e.g., as a part of RACH config) and/or predefined (e.g., as a mapping table).

Figures 17A, 17B, 17C:
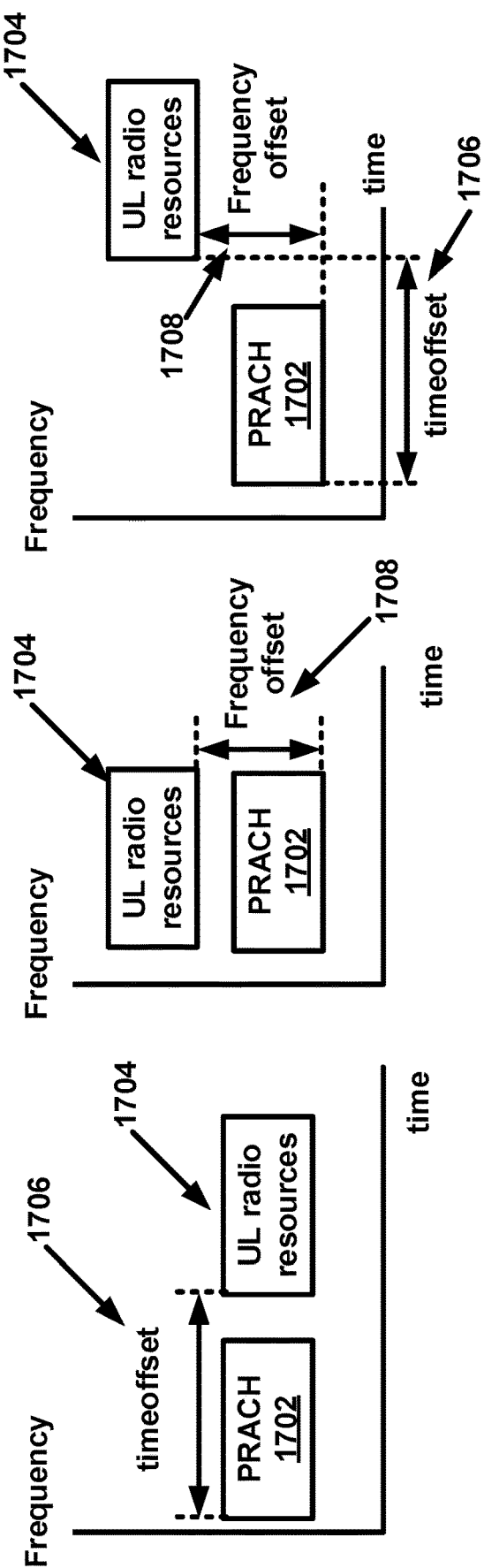
FIG. 17A, FIG. 17B, and FIG. 17C show examples of radio resource allocations of a PRACH resource and one or more associated UL radio resources based on a time offset, a frequency offset, and a combination of a time offset and a frequency offset, respectively.

FIG. 17A, FIG. 17B, and FIG. 17C show examples of radio resource allocations of a PRACH resource and one or more associated UL radio resources. The radio resource allocations may be based on a time offset, a frequency offset, and/or a combination of a time offset and a frequency offset, respectively. FIG. 17A, FIG. 17B, and FIG. 17C show examples of resource allocations of a RACH resource (e.g., PRACH occasion) and a UL radio resource (e.g., a PUSCH occasion). FIG. 17A shows an example of a PRACH occasion TDMed with a PUSCH occasion. FIG. 17B shows an example of a PRACH occasion FDMed with a PUSCH occasion. FIG. 17C shows an example of a PRACH occasion TDMed and FDMed with a PUSCH occasion.

A base station may acquire a UL transmission timing, for example, by detecting an RAP sent (e.g., transmitted) PRACH resource 1702. A base station may use the acquired UL transmission timing for detecting and/or decoding subsequent UL transmission(s). The base station may detect and/or decode one or more TBs sent (e.g., transmitted) via one or more associated UL radio resources 1704, for example, based on the UL transmission timing acquired from the RAP detection, the time offset 1706 and/or the frequency offset 1708. A base station may send (e.g., transmit) one or more downlink reference signals (e.g., SSBs or CSI-RSs). Each of the one or more SSBs may have one or more associated PRACH resources 1702 and/or UL radio resources 1704 provided by (e.g., configured by, indicated by, etc.) a two-step RACH configuration. A wireless device may measure one or more SSBs. The wireless device may select at least one SSB, for example, based on measured received signal strength (and/or based on other selection rule). The wireless device may respectively send (e.g., transmit) an RAP and/or one or more TBs: via PRACH resources 1702 associated with the at least one SSB, and/or via UL radio resources 1704 associated with the PRACH resources 1702 and/or UL radio resources 1704 associated with the at least one SSB.

A base station may use the RAP transmission to adjust UL transmission time for a cell and/or to aid in channel estimation for one or more TBs. A portion of the UL transmission for one or more TBs in a two-step RACH procedure may comprise one or more of: a wireless device ID, a C-RNTI, a service request such as buffer state reporting (e.g., a buffer status report) (BSR), a user data packet, and/or other information. A wireless device in an RRC CONNECTED state may use a C-RNTI as an identifier of the wireless device (e.g., a wireless device ID). A wireless device in an RRC INACTIVE state may use a C-RNTI (if available), a resume ID, and/or a short MAC-ID as an identifier of the wireless device. A wireless device in an RRC IDLE state may use a C-RNTI (if available), a resume ID, a short MACID, an IMSI (International Mobile Subscriber Identifier), a T-IMSI (Temporary-IMSI), and/or a random number as an identifier of the wireless device.

In a two-step RACH procedure, the UL transmission may comprise one or more TBs that may be sent (e.g., transmitted) in one or more ways. First resource(s) allocated for one or more TBs may be multiplexed with second resource(s) allocated for an RAP transmission in time and/or frequency domains. One or more resources may be configured (e.g., by a base station) to be reserved for the UL transmission that may be indicated to a wireless device before the UL transmission. A base station may send (e.g., transmit) in a two-step Msg2 1650 (e.g., an RAR) that may comprise a contention resolution message and/or an acknowledgement (ACK or NACK) message of the one or more TBs, for example, based on one or more TBs sent (e.g., transmitted) by a wireless device in a two-step Msg1 1620 of a two-step RA procedure. A wireless device may send (e.g., transmit) one or more second TBs after the reception of an RAR. The wireless device may send (e.g., transmit) an indicator, such as buffer state reporting, in a two-step Msg1 1620 of a two-step RA procedure. The indicator may indicate to a base station an amount of data the wireless device to send (e.g., transmit) and/or an amount of data remains in a buffer. The base station may determine a UL grant based on the indicator. The wireless device may receive (e.g., from a base station) the UL grant to via an RAR.

A wireless device may receive two separate responses in a two-step/RA procedure: a first response for RAP transmission, and a second response for one or more TB transmission. A wireless device may monitor or continue to monitor a common search space to detect the first response with a random access RNTI generated based on time and frequency indices of a PRACH resource in which the wireless device may send (e.g., transmit) an RAP. A wireless device may monitor or continue to monitor a common search space and/or a wireless device specific search space to detect the second response. The wireless device may employ a C-RNTI (e.g., if configured) and/or a random access RNTI generated based on one or more time indices and/or one or more frequency indices of a PRACH resource in which the wireless device may send (e.g., transmit) an RAP, for example, to detect the second response. The wireless device-specific search space may be predefined and/or configured by an RRC message.

One or more events may trigger a two-step RA procedure. The one or more events may be one or more of: an initial access from RRC_IDLE, a RRC connection re-establishment procedure, a handover, a DL or a UL data arrival during RRC_CONNECTED if UL synchronization status is non-synchronized, a transition from RRC_Inactive, a beam failure recovery procedure, and/or a request for other system information. A PDCCH order, a wireless device (e.g., a MAC entity of a wireless device), and/or a beam failure indication may initiate a RA procedure.

A two-step RA procedure may be initiated based on one or more case-based procedures, services, or radio conditions. One or more wireless devices may be configured (e.g., by a base station in the cell under its coverage) to use a two-step RA procedure, for example, based on a cell identified and/or indicated as small (e.g., there may be no need for a TA). A wireless device may acquire the configuration, via one or more RRC messages (e.g., system information blocks, multicast and/or unicast RRC signaling), and/or via L1 control signaling (e.g., PDCCH order) used to initiate a two-step RA procedure.

A wireless device (e.g., a stationary or near stationary wireless device such as a sensor-type wireless device) may have a stored and/or persisted TA value. A two-step RA procedure may be initiated based on the stored and/or persisted TA value. A base station having macro coverage may use broadcasting and/or dedicated signaling to configure a two-step RA procedure with one or more wireless devices having stored and/or persisted TA values under the coverage.

A wireless device in an RRC connected state may perform a two-step RA procedure. The two-step RA procedure may be initiated if a wireless device performs a handover (e.g., network-initiated handover), and/or if the wireless device requires or requests a UL grant for a transmission of delay-sensitive data and there are no physical-layer uplink control channel resources available to send (e.g., transmit) a scheduling request. A wireless device in an RRC INACTIVE state may perform a two-step RA procedure, for example, for a small data transmission while remaining in the RRC INACTIVE state or for resuming a connection. A wireless device may initiate a two-step RA procedure, for example, for initial access such as establishing a radio link, re-establishment of a radio link, handover, establishment of UL synchronization, and/or a scheduling request if there is no UL grant.

The following description presents one or more examples of a RACH procedure. The procedures and/or parameters described in the following may not be limited to a specific RA procedure. The procedures and/or parameters described in the following may be applied for a four-step RA procedure and/or a two-step RA procedure. An RA procedure may refer to a four-step RA procedure and/or a two-step RA procedure in the following description.

Wireless communications may comprise search procedures. A wireless device may perform a search procedure, for example, to determine a cell for communicating with a base station. A wireless device may perform a cell search. The wireless device may acquire time and frequency synchronization with a cell. The wireless device may detect a first physical layer cell ID of the cell, for example, during the cell search procedure. The wireless device may perform the cell search, for example, if the wireless device has received one or more synchronization signals (SS) for example, the primary synchronization signal (PSS) and the secondary synchronization signal (SSS). The wireless device may assume/determine that reception occasions of one or more of a physical broadcast channel (PBCH), a PSS, and/or an SSS are in consecutive symbols. The wireless device may assume/determine that reception occasions of one or more of PBCH, PSS, and/or SSS correspond to an SSB, for example, based on being in consecutive symbols. A wireless device may assume/determine that an SSS, a PBCH demodulation reference signal (DM-RS), and/or PBCH data have the same (or similar) energy per resource element (EPRE). A wireless device may assume/determine that the ratio of PSS EPRE to SSS EPRE in an SS/PBCH block is a particular value (e.g., either 0 dB, 3 dB, or any other value). A wireless device may assume/determine that the ratio of PDCCH DM-RS EPRE to SSS EPRE is within a particular range (e.g., from −8 dB to 8 dB, or any other range), for example, if the wireless device has not received dedicated higher layer parameters.

A wireless device may determine a first symbol index for one or more candidate SS/PBCH blocks (SSBs). The first symbol index for one or more candidate SSBs may be determined according to a subcarrier spacing of the SSBs, for example, for a half frame with SSBs. Index 0 may correspond to the first symbol of the first slot in a half frame. The first symbol of the one or more candidate SSBs may have indexes {2, 8}+14·n for 15 kHz subcarrier spacing, where, for example, n=0, 1 for carrier frequencies smaller than or equal to 3 GHz (or any other frequency), and for example, n=0, 1, 2, 3 for carrier frequencies larger than 3 GHz and smaller than or equal to 6 GHz (or any other frequency). For example, n may be an index indicating a numerology configured at the carrier frequencies. The one or more candidate SSBs in a half frame may be indexed in an ascending order in time, for example, from 0 to L−1. The wireless device may determine some bits (for example, two least significant bits (LSB) for L=4, three LSB bits for L>4, or any other quantity of bits) of an SSB index per half frame from, for example, a one-to-one mapping with one or more indexes of a DM-RS sequence transmitted in the PBCH.

Access procedures (e.g., random access (RA) procedures) may be used to establish communications between a wireless device and a base station in a cell. Prior to initiation of a random access procedure, a base station may send (e.g., transmit) one or more RRC messages to configure the wireless device with one or more parameters of a RACH configuration. The one or more RRC messages may be broadcasted and/or multicasted to one or more wireless devices. The one or more RRC messages may be wireless device-specific messages (e.g., a dedicated RRC messages transmitted to a wireless device with RRC INACTIVE 1520 or RRC CONNECTED 1530). The one or more RRC messages may comprise one or more parameters for transmitting at least one preamble via one or more random access resources. The one or more parameters may indicate at least one of the following: a PRACH resource allocation, a preamble format, SSB information (e.g., total number/quantity of SSBs, downlink resource allocation of SSB transmission, an SSB index corresponding to a beam transmitting the one or more RRC messages, a transmission power of SSB transmission, and/or other information), and/or uplink radio resources for one or more transport block transmissions.

A base station may send/transmit one or more downlink reference signals. The one or more downlink reference signals may comprise one or more discovery reference signals. A wireless device may determine/select a first downlink reference signal among the one or more downlink reference signals. The first downlink reference signal may comprise one or more synchronization signals and a physical broadcast channel (SS/PBCH). A wireless device may determine/adjust/change a downlink synchronization based on the one or more synchronization signals. The one or more downlink reference signals may comprise one or more channel state information-reference signals (CSI-RSs).

The one or more RRC messages may comprise one or more parameters indicating one or more downlink control channels (e.g., PDDCH). Each of the one or more downlink control channels may be associated with at least one of the one or more downlink reference signals. The first downlink reference signal may comprise system information (e.g., master information block (MIB) and/or system information block (SIB)). A base station may send/transmit the system information, for example, via the physical broadcast channel (PBCH), physical downlink control channel (PDCCH), and/or physical downlink shared channel (PDSCH).

The one or more system information may comprise at least one information element (e.g., PDCCH-Config, PDCCH-ConfigSIB1, and/or PDCCH-ConfigCommon). The at least one information element may be used, for example, to configure a wireless device with one or more control parameters. The one or more control parameters may comprise one or more parameters of one or more control resource sets (e.g., CORESET). The one or more control parameters may comprise, for example, parameters of a first common CORESET #0 (e.g., controlResourceSetZero), and/or a second common CORESET (e.g., commonControlResourceSet). The one or more control parameters may further comprise one or more search space sets. The one or more control parameters may, for example, comprise the parameters of a first search space for the system information block (e.g., searchSpaceSIB1), and/or a first common search space #0 (e.g., searchSpaceZero), a first random access search space (e.g., ra-SearchSpace), and/or a first paging search space (e.g., pagingSearchSpace). The wireless device may use the one or more control parameters to acquire the one or more downlink control channels.

A wireless device may monitor a set of one or more candidates for the one or more downlink control channels in the one or more control resource sets. The one or more control resource sets may be on a first active downlink frequency band, for example, an active bandwidth part (BWP), on a first activated serving cell. The first activated serving cell may be configured with the one or more control parameters based on the one or more search space sets. The wireless device may decode each of the one or more downlink control channels in the set of candidates for the one or more downlink control channels, for example, based on a first format of first downlink control information (DCI). The set of candidates for the one or more downlink control channels may be indicated by (and/or defined in terms of) the one or more search space sets. The one or more search space sets may comprise, for example, one or more common search space sets (e.g., Type0-PDCCH, Type0A-PDCCH, Type1-PDCCH, Type2-PDCCH, and/or Type3-PDCCH), and/or one or more wireless device-specific search space sets.

A wireless device may monitor the set of candidates for the one or more downlink control channels, for example, in a Type0-PDCCH common search space set. The Type0-PDCCH common search space set may be configured by the at least one information element (e.g., the PDCCH-ConfigSIB1 in the MIB). The Type0-PDCCH common search space set may be configured by the one or more search space sets, for example, a searchSpaceSIB1 in the PDCCH-ConfigCommon, or the searchSpaceZero in the PDCCH-ConfigCommon. The Type0-PDCCH common search space set may be configured for a first format of a first downlink control information scrambled by a first radio network temporary identifier, for example, a system information-radio network temporary identifier (SI-RNTI).

The wireless device may monitor the set of candidates for the one or more downlink control channels. The wireless device may monitor the set of candidates for the one or more downlink control channels, for example, in a Type1-PDCCH common search space set. The Type1-PDCCH common search space set may be configured by, for example, the one or more search space sets (e.g., the ra-searchSpace in the PDCCH-ConfigCommon). The Type1-PDCCH common search space set may be configured for a second format of a second downlink control information scrambled by a second radio network temporary identifier. The second radio network temporary identifier may comprise at least one of: for example, a random access-radio network temporary identifier (RA-RNTI), a temporary cell-radio network temporary identifier (TC-RNTI), a C-RNTI, and/or an RNTI that may be generated by a wireless device (e.g., generated for a two-step RA procedure).

A wireless device may determine (e.g., during a cell search) that a first control resource set for a first common search space (e.g., Type0-PDCCH) is present. The first control resource set may comprise one or more resource blocks and one or more symbols. The one or more RRC messages may comprise one or more parameters indicating one or more monitoring occasions of the one or more downlink control channels. The wireless device may determine, for example, a number/quantity of consecutive resource blocks and a number/quantity of consecutive symbols for the first control resource set of the first common search space. One or more bits (e.g., a four most significant bits or any other bits) of the at least one information element (e.g., PDCCH-ConfigSIB1), for example, may indicate the number/quantity of consecutive resource blocks and the number/quantity of consecutive symbols. The wireless device may determine, for example, one or more monitoring occasions of the one or more downlink control channels from one or more bits (e.g., a four least significant bits or any other bits) of the at least one information element (e.g., PDCCH-ConfigSIB1). The one or more monitoring occasions of the one or more downlink control channels associated with a first downlink reference signal (e.g., SSB or CSI-RS) may be determined, for example, based on one or more system frame numbers and one or more slot indexes of the first control resource set. The first downlink reference signal with a first index may overlap in time with the first frame number and the first slot index.

A wireless device may determine a first downlink channel among the one or more downlink control channels, based on a first downlink reference signal (e.g., SSB or CSI-RS). The first downlink channel may be, for example, a first downlink control channel, or a first system information block (e.g., SIB1). The wireless device may determine and/or assume that a demodulation reference signal antenna port associated with a reception of the first downlink channel is quasi co-located (QCLed) with the first downlink reference signal. The demodulation reference signal antenna port associated with the reception of the first downlink channel and the first downlink reference signal (e.g., the corresponding SS/PBCH block) may be, for example, quasi co-located with respect to at least one of the following: an average gain, QCL-TypeA, and/or QCL-TypeD.

A wireless device (e.g., a physical layer of the wireless device) may receive, from higher layers, one or more SS/PBCH block indexes. The wireless device (e.g., physical layer of the wireless device) may receive one or more configuration parameters of one or more physical random access channel (PRACH) transmission parameters (e.g., the one or more PRACH transmission parameters may indicate PRACH preamble format, preamble index, a corresponding RA-RNTI, time resources, and/or frequency resources for PRACH transmission), and/or parameters for determining one or more sequences and their shifts in the PRACH preamble sequence set (e.g., set type). The wireless device (e.g., physical layer of the wireless device) may provide (e.g., to higher layers) one or more corresponding sets of reference signal received power (RSRP) measurements.

Random access procedure may comprise one or more transmissions of a random access preamble (e.g., Msg1) in one or more PRACH occasions. The random access procedure may comprise one or more transmissions of one or more random access response (RAR) messages, for example, via one or more physical downlink channels (e.g., Msg2). The random access procedure may comprise one or more Msg3 in one or more physical uplink channels (e.g., PUSCH), and one or more physical downlink channels (PDSCH) for contention resolution. The random access procedure may be triggered based on (e.g., upon request of) one or more PRACH transmissions, for example, by higher layers or by one or more control orders (e.g., a PDCCH order). A random access procedure may comprise (e.g., for a two-step RA procedure) a first transmission of one or more first messages (e.g., Msg A) comprising at least one random access preamble transmitted via one or more PRACH occasions and at least one transport block transmitted via one or more PUSCH occasions; and a second transmission of one or more second messages (e.g., Msg B, RARs, etc.).

A wireless device (e.g., MAC entity of a wireless device) may determine/select one or more random access resources for a random access procedure. The wireless device (e.g., MAC entity of the wireless device) may determine/select a first downlink reference signal. The wireless device (e.g., MAC entity of the wireless device) may determine/select the first downlink reference signal (e.g., a first SS/PBCH block (SSB), or a first channel state information-reference signal (CSI-RS)) with the first reference signal received power (RSRP) above a first RSRP threshold. The first RSRP threshold may be determined/defined based on a type of reference signal (e.g., rsrp-ThresholdSSB may be for a SSB, and rsrp-ThresholdCSI-RS for a CSI-RS). The first RSRP threshold may be broadcasted, semi-statically configured, and/or predefined. The wireless device (e.g., a MAC entity of the wireless device) may determine/select the first downlink reference signal for a contention-free random access procedure, for example, for beam failure recovery or a system information request. The wireless device (e. g., a MAC entity of the wireless device) may determine/select the first downlink reference signal for a contention-based random access procedure.

A wireless device may select one or more random access resources. The one or more random access resources may comprise one or more random access preambles, one or more time resources, and/or one or more frequency resources for PRACH transmission. The one or more random access resources may be predefined. The one or more random access resources may be configured/indicated/provided by one or more RRC messages. The one or more random access resources may be configured/indicated/provided by one or more downlink control orders (e.g., a PDCCH order). The one or more random access resources may be determined based on the first downlink reference signal. A wireless device may transmit at least one preamble via at least one random access resource (e.g., at least one PRACH occasion) corresponding to the first downlink reference signal. The at least one preamble may be transmitted using a first PRACH format with a first signal transmission power via the at least one random access resource. The one or more PRACH resources may comprise one or more PRACH occasions.

The one or more RRC messages may comprise one or more random access parameters. A common (or generic) random access configuration message (e.g., RACH-Config-Common and/or RACH-ConfigGeneric) may comprise, for example, at least one of the following: a total quantity of random access preambles (e.g., totalNumberOfRA-Preambles), one or more PRACH configuration index (e.g., prach-ConfigurationIndex), a number/quantity of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number/quantity of random access preamble transmission that may be performed (e.g., preambleTransMax), a window length for a random access response (RAR) (e.g., Msg2) (e.g., ra-ResponseWindow), a number/quantity of SSBs per random access channel (RACH) occasion and a number/quantity of contention-based preambles per SSB (e.g., ssb-perRACH-OccasionAndCB-PreamblesPerSSB). The total number/quantity of random access preambles may be, for example, a multiple of the number/quantity of SSBs per RACH occasion. The window length for RAR may be indicated (e.g., defined) as a number/quantity of slots. A dedicated random access configuration message (e.g., RACH-ConfigDedicated) may comprise, for example, one or more RACH occasions for contention-free random access (e.g., occasions), and/or one or more PRACH mask index for random access resource selection (e.g., ra-ssb-OccasionMaskIndex).

The one or more random access parameters (e.g., ssb-perRACH-OccasionAndCB-PreamblesPerSSB) may provide the wireless device with a first number/quantity (e.g., N) of the one or more downlink reference signals (e.g., SS/PBCH blocks) that may be associated with a first PRACH occasion. The one or more random access parameters (e.g., ssb-perRACH-OccasionAndCB-PreamblesPerSSB) may provide the wireless device with a second number/quantity (e.g., R) of the one or more random access preambles for the first downlink reference signal and for the first PRACH occasion. The one or more random access preambles may be contention based preambles. The first downlink reference signal may be a first SS/PBCH block. According to the first number/quantity (e.g., if N<1) of the one or more downlink reference signals, the first SS/PBCH block may be mapped to at least one (e.g., 1/N) consecutive valid PRACH occasions. According to the second number/quantity (e.g., R), at least one preamble with consecutive indexes associated with the first SS/PBCH block may start from the first preamble index for the first valid PRACH occasion.

The one or more PRACH configuration indexes may indicate (e.g., specify) information about a preamble format and/or PRACH resources. The one or more PRACH configuration indexes (e.g., prach-ConfigurationIndex) may indicate, for example, a preamble format, a periodicity for the one or more PRACH time resources, one or more PRACH subframe numbers, a number/quantity of PRACH slots within the one or more PRACH subframes, a PRACH starting symbol number, and/or a number/quantity of time domain PRACH occasions within the first PRACH slot.

The one or more random access parameters may comprise an association period for mapping the one or more SS/PBCH blocks to the one or more PRACH occasions. The one or more SS/PBCH block indexes may be mapped to the one or more PRACH occasions based on an order. The order may be, for example, as follows: (1) in increasing order of the indexes of the at least one preamble in the first PRACH occasion; (2) in increasing order of the indexes of the one or more frequency resources (e.g., for frequency multiplexed PRACH occasions); (3) in increasing order of the indexes of the one or more time resources (e.g., for time multiplexed PRACH occasions) in the first PRACH slot; and/or (4) in increasing order of the indexes for the PRACH slots.

The PRACH transmission triggered by the one or more control orders (e.g., PDCCH order), and/or one or more PRACH mask indexes (e.g., ra-ssb-OccasionMaskIndex), may indicate the one or more PRACH occasions. The one or more PRACH occasions may be associated with the first SS/PBCH block index indicated by the one or more control orders. The PRACH occasions may be mapped (e.g., consecutively) for the first SS/PBCH block index. A wireless device may determine and/or select the first PRACH occasion indicated by a first PRACH mask index value for the first SS/PBCH block index in the first association period. The first association period may be a first mapping cycle. The wireless device may reset the one or more indexes of the one or more PRACH occasions for the first mapping cycle.

A wireless device may receive (e.g., from a base station) one or more messages indicating RA parameters of a four-step RA procedure (such as shown in FIG. 12) and/or a two-step RA procedure (such as shown in FIG. 16). The one or more messages may be a broadcast RRC message, a wireless device specific RRC message, and/or a combination thereof. The one or more messages may comprise a RA configuration (e.g., at least one of: RACH-ConfigCommon, RACH-ConfigGeneric, and/or RACH-ConfigDedicated). A wireless device may receive, from a base station, a common and/or a generic random access resource configuration (e.g., at least RACH-ConfigCommon and/or RACH-ConfigGeneric), for example, based on a contention based (e.g., four-step and/or a two-step) RA procedure. A wireless device may receive, from a base station, a dedicated random access resource configuration (e.g., at least RACH-ConfigDedicated), for example, based on a contention free (four-step and/or a two-step) RA procedure.

A base station may send (e.g., transmit), to a wireless device, one or more messages indicating RA parameters. The one or more messages may be broadcast via RRC message, via wireless device specific RRC message, and/or via a combination thereof. The one or more messages may comprise at least one of a common, generic, and/or dedicated random access resource configuration (e.g., RACH-ConfigCommon, RACH-ConfigGeneric, and/or RACH-ConfigDedicated). A wireless device may receive, from a base station, a common and/or a generic random access resource configuration (e.g., RACH-ConfigCommon and/or RACH-ConfigGeneric), for example, for a contention based RA procedure. A wireless device may receive, from a base station, at least a dedicated random access resource configuration (e.g., RACH-ConfigDedicated), for example, for a contention free RA procedure.

FIG. 18A shows an example common random access resource configuration (e.g., a RACH-ConfigCommon IE). FIG. 18B shows example field descriptions of a common random access resource configuration (e.g., a RACH-ConfigCommon IE). FIG. 18C shows an example generic random access resource configuration (e.g., a RACH-ConfigGeneric IE), and example field descriptions. FIG. 18D shows an example dedicated random access resource configuration (e.g., a RACH-ConfigDedicated IE).

A RA procedure may be initiated in different ways, for example, based at least on one of a common random access resource configuration (e.g., RACH-ConfigCommon), a generic random access resource configuration (e.g., RACH-ConfigGeneric), and/or a dedicated random access resource configuration (e.g., RACH-ConfigDedicated). The RA procedure may be initiated by a PDCCH order sent (e.g., transmitted) by a base station, by the wireless device (e.g., a MAC entity of a wireless device) of a wireless device, and/or by RRC. A RA procedure may be ongoing at any point in time in a wireless device (e.g., a MAC entity of a wireless device). A RA procedure on an SCell may be initiated by a PDCCH order with an index (e.g., ra-PreambleIndex) different from 0b000000. The wireless device may continue with the ongoing procedure and/or start with the new procedure (e.g. for an SI request), for example, if the wireless device (e.g., a MAC entity of a wireless device) receives a request for a RA procedure at a time that another RA procedure is already ongoing in the wireless device (e.g., a MAC entity of a wireless device).

A base station may send (e.g., transmit) one or more RRC messages to configure a wireless device that include one or more parameters. A random access index parameter (e.g., prach-ConfigIndex) may indicate an available set of random access resource occasions (e.g., PRACH occasions) for transmission of the RAP. A random access power parameter (e.g., preambleReceivedTargetPower) may indicate an initial RAP power.

As shown in FIG. 18A, a RSRP SSB threshold parameter (e.g., rsrp-ThresholdSSB) may indicate an RSRP threshold for a selection of the SSB and corresponding RAP and/or random access resource occasion (e.g., PRACH occasion). The RSRP SSB threshold parameter may refer to a RSRP SSB threshold parameter in a beam failure recovery configuration (e.g., BeamFailureRecoveryConfig IE), for example, if the RA procedure is initiated for beam failure recovery.

A RSRP CSI-RS threshold parameter (e.g., rsrp-ThresholdCSI-RS) may indicate an RSRP threshold for the selection of CSI-RS and corresponding RAP and/or random access resource occasion (e.g., PRACH occasion). A RSRP CSI-RS threshold parameter may be set to a value calculated by multiplying the RSRP CSI-RS threshold parameter in a beam failure recovery configuration (e.g., BeamFailureRecoveryConfig IE) by a power control offset parameter (e.g., powerControlOffset), for example, if the RA procedure is initiated for beam failure recovery. A RSRP SSB SUL parameter (e.g., rsrp-ThresholdSSB-SUL) may indicate an RSRP threshold for the selection between the NUL carrier and the SUL carrier.

A power control offset parameter (e.g., powerControlOffset) may indicate a power offset between a RSRP SSB threshold parameter (e.g., rsrp-ThresholdSSB) and a RSRP CSI-RS threshold parameter (e.g., rsrp-ThresholdCSI-RS) to be used, for example, if the RA procedure is initiated for beam failure recovery. A power ramping step parameter (e.g., powerRampingStep) may indicate a power-ramping factor. A power ramping step high priority parameter (e.g., powerRampingStepHighPriority) may indicate a power-ramping factor in case of a differentiated RA procedure. A preamble index parameter (e.g., ra-PreambleIndex) may indicate a RAP index.

FIG. 18B shows an example random access common configuration (e.g., RACH-ConfigCommon) Information Element (IE). The random access common configuration (e.g., RACH-ConfigCommon) IE may include parameters, which may indicate various properties.

The parameter messagePowerOffsetGroupB may indicate a threshold for preamble selection. The value of messagePowerOffsetGroupB may be in dB. For example, the value minus infinity in RACH-ConfigCommon may correspond to −infinity. The value dB0 may correspond to 0 dB, the value dB5 may correspond to 5 dB, and so on.

The msg1-SubcarrierSpacing parameter in RACH-ConfigCommon may indicate a subcarrier spacing of PRACH. One or more values, e.g., 15 or 30 kHz (<6 GHz), 60 or 120 kHz (>6 GHz) may be applicable to the msg1-Subcarrier-Spacing parameter. There may also be a layer 1 parameter (e.g., 'prach-Msg1SubcarrierSpacing) corresponding to msg1-SubcarrierSpacing. A wireless device may apply the Subcarrier Spacing (SCS) as derived from the prach-ConfigurationIndex in RACH-ConfigGeneric, for example, if this parameter is absent.

A base station may employ the msg3-transformPrecoding parameter to indicate to a wireless device whether transform precoding is enabled for data transmission (e.g., Msg3 in a four-step RA procedure and/or one or more TB transmission in a two-step RA procedure). An absence of msg3-transformPrecoding may indicate that transform precoding is disabled.

The numberOfRA-PreamblesGroupA parameter may indicate a number of contention based (CB) preambles per SSB in group A. The numberOfRA-PreamblesGroupA parameter may also implicitly indicate and/or be used to determine the number/quantity of CB preambles per SSB available in group B. A value configured for numberOfRA-PreamblesGroupA may be set and/or determined as consistent with a value configured for ssb-perRACH-OccasionAndCB-PreamblesPerSSB.

The prach-RootSequenceIndex parameter may indicate a PRACH root sequence index. There may be a layer 1 parameter (e.g., 'PRACHRootSequenceIndex') corresponding to ssb-perRACH-OccasionAndCB-PreamblePerSSB. The value range of prach-RootSequenceIndex may depend on a size of preamble, e.g., whether a preamble length (L) is L=839 or L=139.

The ra-ContentionResolutionTimer parameter may indicate an initial value for the contention resolution timer in milliseconds. A ra-ContentionResolutionTimer value of ms8 in RACH-ConfigCommon may indicate a contention resolution timer of 8 ms. A value of ms16 may indicate a 16 ms contention resolution timer, and so on.

The ra-Msg3SizeGroupA parameter may indicate a transport blocks size threshold, which may be specified in a number/quantity of bits. A wireless device may employ a contention based RA preamble of group A, for example, if the transport block size is below ra-Msg3SizeGroupA.

The rach-ConfigGeneric parameter may indicate one or more generic RACH parameters in RACH-ConfigGeneric. The restrictedSetConfig parameter may indicate a configuration of an unrestricted set, or one of two types of restricted sets.

The rsrp-ThresholdSSB parameter may indicate a threshold for SS block selection. A wireless device may select the SS block and corresponding PRACH resource, for example, for pathloss estimation and (re)transmission based on SS blocks that satisfy the threshold.

The rsrp-ThresholdSSB-SUL parameter may indicate a threshold for uplink carrier selection. A wireless device may select an SUL carrier to perform random access based on this threshold.

The parameter ssb-perRACH-OccasionAndCB-PreamblesPerSSB may indicate a number/quantity of SSBs per RACH occasion and a number of contention based preambles per SSB. There may be layer 1 one or more parameters (e.g., 'SSB-per-rach-occasion' and/or 'CB-preambles-per-SSB') corresponding to the ssb-perRACH-OccasionAndCB-PreamblesPerSSB parameter. A total number/quantity of CB preambles in a RACH occasion may be indicated and/or determined (e.g., by calculating): CB-preambles-per-SSB*max(1,SSB-per-rach-occasion).

The totalNumberOfRA-Preambles parameter may indicate a total number/quantity of preambles employed for contention based and contention free random access. The totalNumberOfRA-Preambles parameter may or may not, for example, comprise one or more preambles employed for other purposes (e.g., for SI request). A wireless device may use one or more of 64 preambles for RA, for example, if the totalNumberOfRA-Preambles parameter is absent.

FIG. 18C shows an example random access common configuration of a RACH-ConfigGeneric Information Element (IE). The parameters of such a random access generic configuration (e.g., RACH-ConfigGeneric) may take various values.

The msg1-FDM Parameter may indicate a number/quantity of PRACH transmission occasions FDMed in one time instance. There may be a layer 1 parameter (e.g., 'prach-FDM') corresponding to the msg1-FDM parameter.

The msg1-FrequencyStart parameter may indicate an offset of PRACH transmission occasion (e.g., lowest PRACH transmission occasion) in a frequency domain with respect to a particular PRB (e.g., PRB 0). A base station may configure a value of msg1-FrequencyStart such that the corresponding RACH resource may be within the bandwidth of the UL BWP. A layer 1 parameter (e.g., 'prach-frequency-start') may correspond to the msg1-FrequencyStart parameter. The powerRampingStep parameter may indicate power ramping steps for PRACH.

The prach-ConfigurationIndex parameter may indicate a PRACH configuration index. For example, a radio access technology (e.g., LTE, NR, or any other access technology) may predefine one or more PRACH configurations. The value of prach-ConfigurationIndex may indicate one of the one or more PRACH configurations. A layer 1 parameter (e.g., 'PRACHConfigurationIndex') may correspond to a prach-ConfigurationIndex.

The preambleReceivedTargetPower parameter may indicate a target power level at the network receiver side. Multiples of a particular value (e.g., in dBm) may, for example, be chosen for the preambleReceivedTargetPower field. The RACH-ConfigGeneric IE of FIG. 18C shows an example in which multiples of 2 dBm may be chosen (e.g. −202, −200, −198, . . . ).

The preambleTransMax parameter may indicate a number/quantity of RA preamble transmissions performed before declaring a failure. The preambleTransMax parameter may, for example, indicate a maximum number/quantity of RA preamble transmissions performed before declaring a failure.

The ra-ResponseWindow parameter may indicate an RAR window length in number/quantity of slots (or subframes, mini-slots, and/or symbols). A base station may configure a value lower than or equal to a particular value (e.g., 10 ms or any other duration). The value of ra-ResponseWindow may be larger than a particular value (e.g., 10 ms or any other duration).

The zeroCorrelationZoneConfig parameter may indicate an index of preamble sequence generation configuration (e.g., N-CS configuration). A radio access technology (e.g., LTE, NR, and/or any other access technology) may predefine one or more preamble sequence generation configurations. The zeroCorrelationZoneConfig parameter may indicate one of the one or more preamble sequence generation configurations. A wireless device may determine a cyclic shift of a preamble sequence, for example, based on a value of zeroCorrelationZoneConfig. The zeroCorrelationZoneConfig parameter may indicate and/or may be used to determine a property of random access preambles (e.g., a zero correlation zone).

FIG. 18D shows an example random access dedicated configuration (e.g., RACH-ConfigDedicated) Information Element (IE). The random access dedicated configuration (e.g., RACH-ConfigDedicated) IE may include various parameters, which may indicate various properties, and which are described in greater detail below.

The csi-RS parameter may indicate an identifier (e.g., ID) of a CSI-RS resource defined in the measurement object associated with this serving cell. The ra-OccasionList parameter may indicate one or more RA occasions. A wireless device may employ the one or more RA occasions, for example, if the wireless device performs a contention-free random access (CFRA) procedure (e.g., based on, after, or upon selecting the candidate beam identified by this CSI-RS).

The ra-PreambleIndex parameter may indicate an RA preamble index to use in the RA occasions associated with this CSI-RS. The ra-ssb-OccasionMaskIndex parameter may indicate a PRACH Mask Index for RA Resource selection. The mask may be valid for one or more SSB resources signaled in ssb-ResourceList.

The rach-ConfigGeneric parameter may indicate a configuration of contention free random access occasions for the CFRA procedure. The ssb-perRACH-Occasion parameter may indicate a number/quantity of SSBs per RACH occasion.

The ra-PreambleIndex parameter may indicate a preamble index that a wireless device may employ if performing CF-RA, e.g., based on, after, or upon selecting the candidate beams indicated (e.g., identified) by this SSB. The ssb parameter in the RACH-ConfigDedicated IE may indicate an identifier (e.g., ID) of an SSB transmitted by a serving cell.

The cfra parameter in the RACH-ConfigDedicated IE may indicate one or more parameters for contention free random access to a given target cell. A wireless device may perform contention based random access, for example, if the parameter (e.g., cfra) is absent.

The ra-prioritization field may indicate one or more parameters which apply for prioritized random access procedure to a given target cell. A SSB-CFRA field in RACH-ConfigDedicated may be present, for example, if the value of the resources field in CFRA is set to ssb. Otherwise, the SSB-CFRA field may be not present.

A base station may send (e.g., transmit) one or more RRC messages to configure a wireless device that include one or more parameters. A random access index parameter (e.g., prach-ConfigIndex) may indicate an available set of random access resource occasions (e.g., PRACH occasions) for transmission of the RAP. A random access power parameter (e.g., preambleReceivedTargetPower) may indicate an initial RAP power.

A RSRP SSB threshold parameter (e.g., rsrp-Threshold-SSB) may indicate an RSRP threshold for a selection of the SSB and corresponding RAP and/or random access resource occasion (e.g., PRACH occasion). The RSRP SSB threshold parameter may refer to a RSRP SSB threshold parameter in a beam failure recovery configuration (e.g., BeamFailureRecoveryConfig IE), for example, if the RA procedure is initiated for beam failure recovery.

A RSRP CSI-RS threshold parameter (e.g., rsrp-ThresholdCSI-RS) may indicate an RSRP threshold for the selection of CSI-RS and corresponding RAP and/or random access resource occasion (e.g., PRACH occasion). A RSRP CSI-RS threshold parameter may be set to a value calculated by multiplying the RSRP CSI-RS threshold parameter in a beam failure recovery configuration (e.g., BeamFailureRecoveryConfig IE) by a power control offset parameter (e.g., powerControlOffset), for example, if the RA procedure is initiated for beam failure recovery. A RSRP SSB SUL parameter (e.g., rsrp-ThresholdSSB-SUL) may indicate an RSRP threshold for the selection between the NUL carrier and the SUL carrier.

A power control offset parameter (e.g., powerControlOffset) may indicate a power offset between a RSRP SSB threshold parameter (e.g., rsrp-ThresholdSSB) and a RSRP CSI-RS threshold parameter (e.g., rsrp-ThresholdCSI-RS) to be used, for example, if the RA procedure is initiated for beam failure recovery. A power ramping step parameter (e.g., powerRampingStep) may indicate a power-ramping factor. A power ramping step high priority parameter (e.g., powerRampingStepHighPriority) may indicate a power-ramping factor in case of a differentiated RA procedure. A preamble index parameter (e.g., ra-PreambleIndex) may indicate a RAP index.

FIG. 19 shows example random access occasion mask index values for a random access occasion mask parameter (e.g., ra-ssb-OccasionMaskIndex). The random access occasion mask index values may define random access resource occasion(s) (e.g., PRACH occasion) associated with an SSB in which the wireless device (e.g., a MAC entity of a wireless device) may send (e.g., transmit) a RAP.

An occasion list parameter (e.g., ra-OccasionList) may define a random access resource occasion(s) (e.g., PRACH occasion) associated with a CSI-RS in which the wireless device (e.g., a MAC entity of a wireless device) may send (e.g., transmit) a RAP. A preamble maximum transmission parameter (e.g., preambleTransMax) may define the maximum quantity of RAP transmissions. A SSB mapping parameter (e.g., ssb-perRACH-OccasionAndCB-PreamblesPerSSB) may define a quantity of SSBs mapped to each random access resource occasion (e.g., PRACH occasion). A quantity of RAPs mapped to each SSBA RAP occasion parameter may indicate: a set of RAPs and/or random access resource occasions (e.g., PRACH occasions) for SI request, if any; and/or a set of RAPs and/or random access resource occasions (e.g., PRACH occasions) for beam failure recovery request, if any. A response window parameter (e.g., ra-ResponseWindow) may indicate a time window to monitor RAR(s). A contention resolution timer parameter (e.g., ra-ContentionResolutionTimer) may indicate a configuration for the Contention Resolution Timer.

A RA procedure may be initiated for beam failure detection and recovery. A wireless device may be configured by RRC with a beam failure recovery procedure that may be used for indicating to the serving base station of a SSB or CSI-RS, for example, if beam failure is detected on the serving SSB(s)/CSI-RS(s). Beam failure may be detected by counting beam failure instance indication from the lower layers of the wireless device (e.g., a MAC entity of a wireless device). A base station may configure, via RRC, the parameters in a beam failure recovery configuration (e.g., BeamFailureRecoveryConfig) for a beam failure detection and recovery procedure. A beam failure maximum count parameter (e.g., beamFailureInstanceMaxCount) may indicate a maximum count value for the beam failure detection. A beam failure timer parameter (e.g., beamFailureDetectionTimer) may indicate a configuration for a timer for the beam failure detection. A beam failure recovery timer parameter (e.g., beamFailureRecoveryTimer) may indicate a configuration for a timer for a beam failure recovery procedure. A RSRP SSB threshold (e.g., rsrp-ThresholdSSB) may indicate an RSRP threshold for the beam failure recovery.

A power ramping step parameter (e.g., powerRampingStep) may indicate a power ramping factor for a beam failure recovery. A preamble target power parameter (e.g., preambleReceivedTargetPower) may indicate a target power for the beam failure recovery. A maximum quantity of preambles parameter (e.g., preambleTransMax) may indicate a maximum quantity of preambles for the beam failure recovery. A response window parameter (e.g., ra-ResponseWindow) may indicate a time window to monitor response(s) for the beam failure recovery using contention-free RAP. A random access configuration index parameter (e.g., prach-ConfigIndex) may indicate a preamble format and PRACH subframe assignment index for the beam failure recovery. An occasion mask index parameter (e.g., ra-ssb-OccasionMaskIndex) may indicate a SSB mask index for the beam failure recovery. An occasion list parameter (e.g., ra-OccasionList) may indicate random access resource occasions for the beam failure recovery.

A wireless device may use one or more parameters for a RA procedure. A wireless device may use at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and/or TEMPORARY_C-RNTI.

A wireless device may perform random access resource selection for selecting one or more preambles and one or more random access resource occasions (e.g., PRACH occasions) (or resources comprising time, frequency, and/or code). A wireless device may determine one or more operations have occurred or settings configured. A RA procedure may be initiated for beam failure recovery. The beamFailureRecoveryTimer may be running or not configured. The contention-free random access resources for beam failure recovery request associated with any of the SSBs and/or CSI-RSs may be explicitly provided by RRC signaling. At least one of the SSBs may be available, for example, based on SS-RSRP above a threshold (e.g., rsrp-ThresholdSSB) among the SSBs in a candidate beam list (e.g., candidateBeamRSList), and/or the CSI-RSs with CSI-RSRP above a threshold (e.g., rsrp-ThresholdCSI-RS) among the CSI-RSs in a candidate beam list (e.g., candidateBeamRSList). The wireless device may select an SSB with SS-RSRP above a threshold (e.g., rsrp-ThresholdSSB) among the SSBs in a candidate beam list (e.g., candidateBeamRSList) or a CSI-RS with CSI-RSRP above a threshold (e.g., rsrp-ThresholdCSI-RS) among the CSI-RSs in a candidate beam list (e.g., candidateBeamRSList), for example, based these observations by the wireless device. A wireless device may set a PREAMBLE_INDEX to a preamble index parameter (e.g., ra-PreambleIndex) corresponding to the SSB in a candidate beam list (e.g., candidateBeamRSList) which is quasi-collocated with the selected CSI-RS, for example, if CSI-RS is selected, and there is no ra-PreambleIndex associated with the selected CSI-RS. The wireless device may set the PREAMBLE_INDEX to the preamble index parameter corresponding to the selected SSB or CSI-RS from the set of RAPs for beam failure recovery request.

A RA procedure may be initiated and/or a preamble index parameter (e.g., ra-PreambleIndex) may be explicitly provided via PDCCH and/or RRC signaling. The preamble index parameter may not be 0b000000, and/or a contention-free random access resource associated with SSBs and/or CSI-RSs may not be explicitly provided by RRC signaling. A wireless device may set the PREAMBLE_INDEX to the signaled preamble index parameter.

A RA procedure may be initiated, and/or the contention-free random access resources associated with SSBs may be explicitly provided, via RRC, and at least one SSB with SS-RSRP above a threshold (e.g., rsrp-ThresholdSSB) among the associated SSBs may be available. The wireless device may select an SSB with SS-RSRP above the threshold (e.g., rsrp-ThresholdSSB) among the associated SSBs. The wireless device may set the PREAMBLE_INDEX to a preamble index parameter (e.g., ra-PreambleIndex) corresponding to the selected SSB.

A wireless device may initiate a RA procedure. Contention-free random access resources associated with CSI-RSs may be explicitly provided via RRC signaling, and at least one CSI-RS with CSI-RSRP above a threshold (e.g., rsrp-ThresholdCSI-RS) among the associated CSI-RSs may be available. A wireless device may select a CSI-RS with CSI-RSRP above a threshold (e.g., rsrp-ThresholdCSI-RS) among the associated CSI-RSs. The wireless device may set the PREAMBLE_INDEX to a preamble index parameter (e.g., ra-PreambleIndex) corresponding to the selected CSI-RS.

A wireless device may initiate a RA procedure, for example, based on at least one of the SSBs with SS-RSRP above a threshold (e.g., rsrp-ThresholdSSB) being available. A wireless device may select an SSB with SS-RSRP above a threshold (e.g., rsrp-ThresholdSSB). Alternatively, the wireless device may select any SSB. The wireless device may perform random access resource selection, for example, if Msg3 1240, two-step Msg1 1620, and/or one or more TBs 1640 are being retransmitted. A wireless device may select the same group of random access preambles as was employed for the random access preamble transmission attempt corresponding to the first transmission of Msg3, two-step Msg1 1620, and/or one or more TBs 1640. A wireless device may select a preamble index parameter (e.g., ra-PreambleIndex) randomly (e.g., with equal probability from the RAPs associated with the selected SSB and the selected RAPs group), for example, if the association between RAPs and SSBs is configured. If the association between RAPs and SSBs is not configured, a wireless device may select a preamble index parameter (e.g., ra-PreambleIndex) randomly (e.g., with equal probability from the RAPs within the selected RAPs group). A wireless device may set the PREAMBLE_INDEX to the selected a preamble index parameter (e.g., ra-PreambleIndex).

A wireless device may determine the next available random access resource occasion (e.g., PRACH occasion) from the random access resource occasions (e.g., PRACH occasions) corresponding to the selected SSB permitted by the restrictions given by the occasion mask index parameter (e.g., ra-ssb-OccasionMaskIndex), for example, if configured, if an SSB is selected, and/or an association between random access resource occasions (e.g., PRACH occasions) and SSBs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected SSB). The wireless device (e.g., a MAC entity of a wireless device) may take into account the possible occurrence of measurement gaps, for example, if determining the next available random access resource occasion (e.g., PRACH occasion) corresponding to the selected SSB.

A wireless device may determine the next available random access resource occasion (e.g., PRACH occasion) from the random access resource occasions (e.g., PRACH occasions) in an occasion list parameter (e.g., ra-OccasionList) corresponding to the selected CSI-RS, for example, if a CSI-RS is selected and an association between random access resource occasions (e.g., PRACH occasions) and CSI-RSs is configured. The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers, corresponding to the selected CSI-RS). The wireless device (e.g., a MAC entity of a wireless device) may take into account the possible occurrence of measurement gaps during determining the next available random access resource occasion (e.g., PRACH occasion) corresponding to the selected CSI-RS.

A wireless device may determine the next available random access resource occasion (e.g., PRACH occasion) from the random access resource occasions (e.g., PRACH occasions), for example, permitted by the restrictions given by an occasion mask index parameter (e.g., ra-ssb-OccasionMaskIndex), if configured. The occasion mask index parameter may correspond to the SSB in the candidateBeamRSList, which may be quasi-collocated with the selected CSI-RS, if a CSI-RS is selected and/or if there is no contention-free random access resource associated with the selected CSI-RS. The wireless device (e.g., a MAC entity of a wireless device) may take into account the possible occurrence of measurement gaps, for example, during determining the next available random access resource occasion (e.g., PRACH occasion) corresponding to the SSB which may be quasi-collocated with the selected CSI-RS.

A wireless device may determine a next available random access resource occasion (e.g., PRACH occasion). The wireless device (e.g., a MAC entity of a wireless device) may select a random access resource occasion (e.g., PRACH occasion) randomly (e.g., with equal probability among the random access resource occasions (e.g., PRACH occasions) occurring simultaneously but on different subcarriers). The wireless device (e.g., a MAC entity of a wireless device) may take into account a possible occurrence of measurement gaps during determining the next available random access resource occasion (e.g., PRACH occasion).

A wireless device may perform a RAP transmission, for example, based on a selected PREABLE INDEX and random access resource occasion (e.g., PRACH occasion). A wireless device may increment a power ramping counter (e.g., PREAMBLE_POWER_RAMPING_COUNTER) by 1, for example, if a notification of suspending power ramping counter has not been received from lower layers (e.g., lower layer entities of the wireless device); and/or if SSB selected is not changed (e.g., a same SSB as a previous RAP transmission). The wireless device may select a value of DELTA_PREAMBLE that may be predefined and/or semi-statistically configured by a base station. The wireless device may set PREAMBLE_RECEIVED_TARGET_POWER to preambleReceivedTargetPower+DELTA_PREAMBLE+ (PREAMBLE_POWER_RAMPING_COUNTER−1)× PREAMBLE_POWER_RAMPING_STEP. The wireless device (e.g., via an entity of the wireless device) may instruct a physical layer entity of the wireless device to send (e.g., transmit) the RAP via the selected random access resource (e.g., PRACH), corresponding RA-RNTI (if available), PREAMBLE_INDEX, and/or PREAMBLE_RECEIVED_TARGET_POWER. The wireless device may determine an RA-RNTI associated with the random access resource occasion (e.g., PRACH occasion) in which the RAP is sent (e.g., transmitted). The RA-RNTI associated with the PRACH in which the RAP is sent, may be determined as:

$$\text{RA-RNTI}=1+s\_id+14\times t\_id+14\times 80\times f\_id+14\times 80\times 8\times \text{ul\_carrier\_id} \quad \text{Equation (1)}$$

s_id may be the index of the first OFDM symbol of the specified PRACH (0≤s_id<14). t_id may be the index of the first slot of the specified PRACH in a system frame (0≤t_id<80). f_id may be the index of the specified PRACH in the frequency domain (0≤f_id<8). ul_carrier_id may be the UL carrier used for Msg1 1220 transmission (0 for NUL carrier, and 1 for SUL carrier, or vice versa).

A wireless device may monitor a downlink control channel (e.g., after or in response to transmitting an RAP) for a downlink control message (e.g., an RAR) corresponding to the RAP. The wireless device may not account for a possible occurrence of a measurement gap to determine a time instant at which the wireless device may start to monitor a downlink control channel.

The wireless device may start an RAR window (e.g., ra-ResponseWindow), configured in beam management configuration parameters (e.g., BeamFailureRecoveryConfig), at a first downlink control channel (e.g., PDCCH) occasion from an end of the RAP transmission, for example, if the wireless device performs a contention-free RA procedure for a beam failure recovery request. The wireless device may monitor the first downlink control channel of an SpCell for a response to a beam failure recovery request (e.g., identified by a C-RNTI). The wireless device may monitor the downlink control channel, for example, if (e.g., while) the random access window is running The wireless device may start an RAR window (e.g., ra-ResponseWindow), configured in an RA configuration parameter (e.g., RACH-ConfigCommon) at a first downlink control channel occasion from an end of an RAP transmission, for example, if the wireless device does not perform a contention-free RA procedure for beam a failure recovery request. The wireless device may monitor the first downlink control channel occasion of the SpCell for RAR(s) identified by an RA-RNTI. The wireless device may monitor the downlink control channel, for example, during an RA response window (e.g., ra-ResponseWindow).

The wireless device may receive a downlink assignment via a downlink control channel (e.g., PDCCH). The wireless device may receive a downlink control signal (e.g., message) comprising one or more RARs. For example, the downlink control signal (e.g., message) is a TB (e.g., a MAC PDU) comprising one or more RARs. The MAC PDU may comprise a MAC subPDU with an RAP indicator (e.g. identifier) corresponding to an RAP that the wireless device transmits to a base station. The wireless device may determine that RAP reception is successful, for example, if the MAC PDU comprises the MAC subPDU with the RAP indicator corresponding to the RAP that the wireless device transmits to the base station. The MAC subPDU may comprise a preamble index (e.g., RAPID), for example, for an RA procedure initiated for a system information request.

In a RA procedure, a wireless device may receive, from a base station, at least one RAR as a response of Msg1 1220 or two-step Msg1 1620. The at least one RAR may be scrambled by a particular radio network temporary identifier (e.g., RA-RNTI). The wireless device may monitor a search space set (e.g., the Type1-PDCCH common search space) for first downlink control information (e.g., DCI format 1_0). The first downlink control information may comprise the at least one RAR. A base station may send (e.g., transmit) the at least one RAR in a form of DCI format 1_0 for a random access procedure initiated by PDCCH order, MAC layer, and/or RRC layer. The DCI format 1_0 may comprise, for example, at least one of the following fields: one or more random access preamble index, SS/PBCH index, PRACH mask index, UL/SUL indicator, frequency and time domain resource assignments, modulation and/or coding schemes.

A wireless device may monitor for the first downlink control information (e.g., DCI format 1_0) during a time window. The time window may be indicated by the one or more RRC messages. The time window may start at a first symbol of a first control resource set. The wireless device may be configured by the one or more parameters in the one or more RRC messages to receive the first downlink control information on the first control resource set. The wireless device may determine a length of the time window based on the one or more parameters in the one or more RRC messages (e.g., ra-ResponseWindow). The length of the time window may be defined as a number/quantity of slots.

The wireless device may stop the time window after, or in response to, a reception of the one or more random access responses (e.g., the wireless device may determine that the RAR was received successfully). A reception of the one or more random access responses may be determined as successful, for example, if the one or more random access responses comprise a preamble index (e.g., a random access preamble identity: RAPID) corresponding to a preamble that the wireless device sent (e.g., transmitted) to a base station. The RAPID may be associated with the PRACH transmission. The one or more random access responses may comprise an uplink grant indicating one or more uplink resources granted for the wireless device. The wireless device may send (e.g., transmit) one or more transport blocks (e.g., Msg 3) via the one or more uplink resources.

Figure 20A:
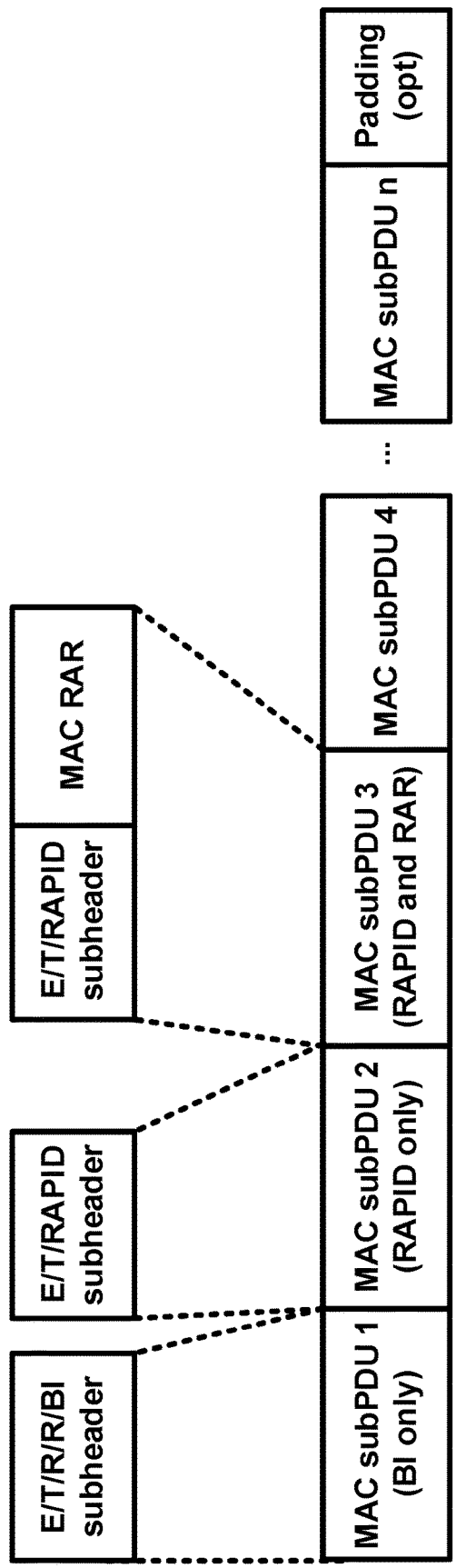
FIG. 20A, FIG. 20B, and FIG. 20C show respectively examples of RAR, MAC subheader with backoff indicator (BI), and a MAC subheader with a RAPID.
Figure 20B:
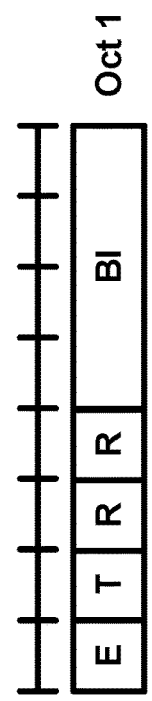
Figure 20C:
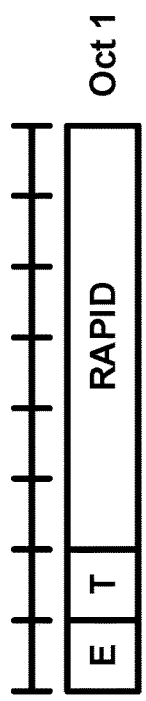

FIG. 20A, FIG. 20B, and FIG. 20C show respectively examples of RAR, MAC subheader with backoff indicator (BI), and a MAC subheader with a RAPID. A wireless device may receive from a base station at least one RAR as a response of Msg1 1220 (as shown in FIG. 12) or two-step Msg1 1620 (shown in FIG. 16) using an RA procedure. An RAR may be in a form of MAC PDU comprising one or more MAC subPDUs and/or (optionally) padding. FIG. 20A is an example of an RAR. A MAC subheader may be octet-aligned. Each MAC subPDU may comprise one or more of the following: a MAC subheader with BI only; a MAC subheader with RAPID only (e.g., acknowledgment for SI request); a MAC subheader with RAPID and MAC RAR. FIG. 20B shows an example of a MAC subheader with BI. A MAC subheader with BI may comprise one or more header fields (e.g., E/T/R/R/BI) as shown in FIG. 20B and described below. A MAC subPDU with BI may be placed at the beginning of the MAC PDU, if included. MAC subPDU(s) with RAPID only, and/or MAC subPDU(s) with RAPID and MAC RAR, may be placed anywhere after a MAC subPDU with BI and, before padding as shown in FIG. 20A. A MAC subheader with RAPID may comprise one or more header fields (e.g., E/T/RAPID) as shown in FIG. 20C. Padding may be placed at the end of the MAC PDU, if present. Presence and length of padding may be implicit, for example, based on TB size, and/or a size of MAC subPDU(s).

A field (e.g., an E field) in a MAC subheader may indicate an extension field that may be a flag indicating if the MAC subPDU (including the MAC subheader) is the last MAC subPDU or not in the MAC PDU. The E field may be set to "1" to indicate at least one more MAC subPDU follows. The E field may be set to "0" to indicate that the MAC subPDU including this MAC subheader is a last MAC subPDU in the MAC PDU. A field (e.g., a T field) may be a flag indicating whether the MAC subheader contains a RAPID or a BI (e.g., one or more backoff values may predefined and BI may indicate one of backoff value). The T field may be set to "0"

to indicate the presence of a field (e.g., a BI field) in the subheader. The T field may be set to "1" to indicate the presence of a RAPID field in the subheader. A field (e.g., an R field) may indicate a reserved bit that may be set to "0." A field (e.g., a BI field) may indicate an overload condition in the cell. A size of the BI field may be 4 bits. A field (e.g., a RAPID field) may be a RAPID field that may identify and/or indicate the transmitted RAP. A MAC RAR may not be included in the MAC subPDU, for example, based on the RAPID in the MAC subheader of a MAC subPDU corresponding to one of the RAPs configured for an SI request.

There may be one or more MAC RAR formats. At least one MAC RAR format may be employed in a four-step or a two-step RA procedure.

Figure 21:
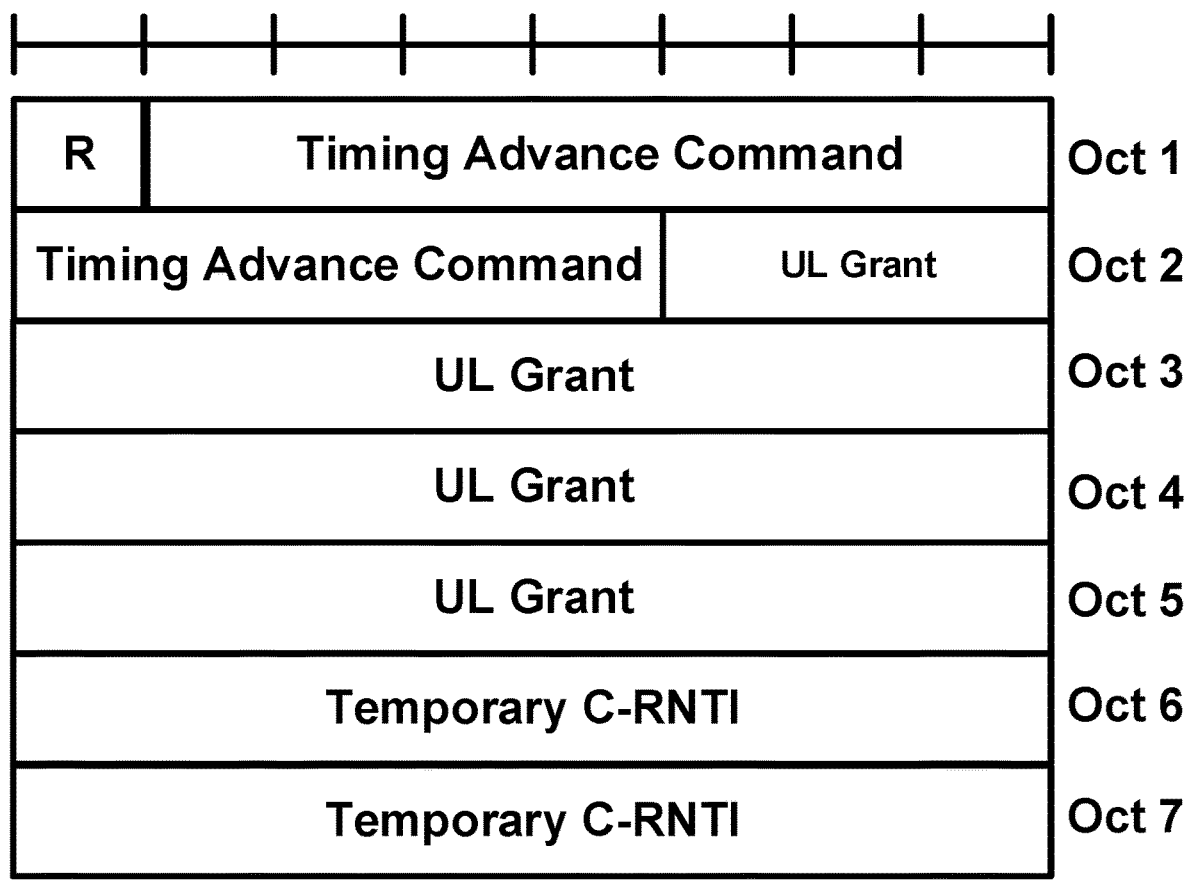
FIG. 21 shows an example MAC RAR format.

FIG. 21 shows an example MAC RAR format. The MAC RAR may be fixed size as shown in FIG. 21. The MAC RAR may comprise one or more of the following fields: an R field that may indicate a reserved bit, which may be set to "0"; a timing advance (TA) command field that may indicate the index value for TA employed to control the amount of timing adjustment; a UL grant field that indicates the resources to be employed on an uplink; and an RNTI field (e.g., temporary C-RNTI and/or C-RNTI) that may indicate an identity that is employed during RA. An RAR may comprise one or more of following for a two-step RA procedure: a UE contention resolution identity, an RV ID for retransmission of one or more TBs, decoding success or failure indicator of one or more TB transmissions, and one or more fields from the MAC RAR formats.

A base station may multiplex, in a MAC PDU, RARs for two-step and/or four-step RA procedures. A wireless device may not use an RAR length indicator field. The wireless device may determine the boundary of each RAR in the MAC PDU based on pre-determined RAR size information, for example, based on RARs for two-step and four-step RA procedures having the same size.

Figure 22:
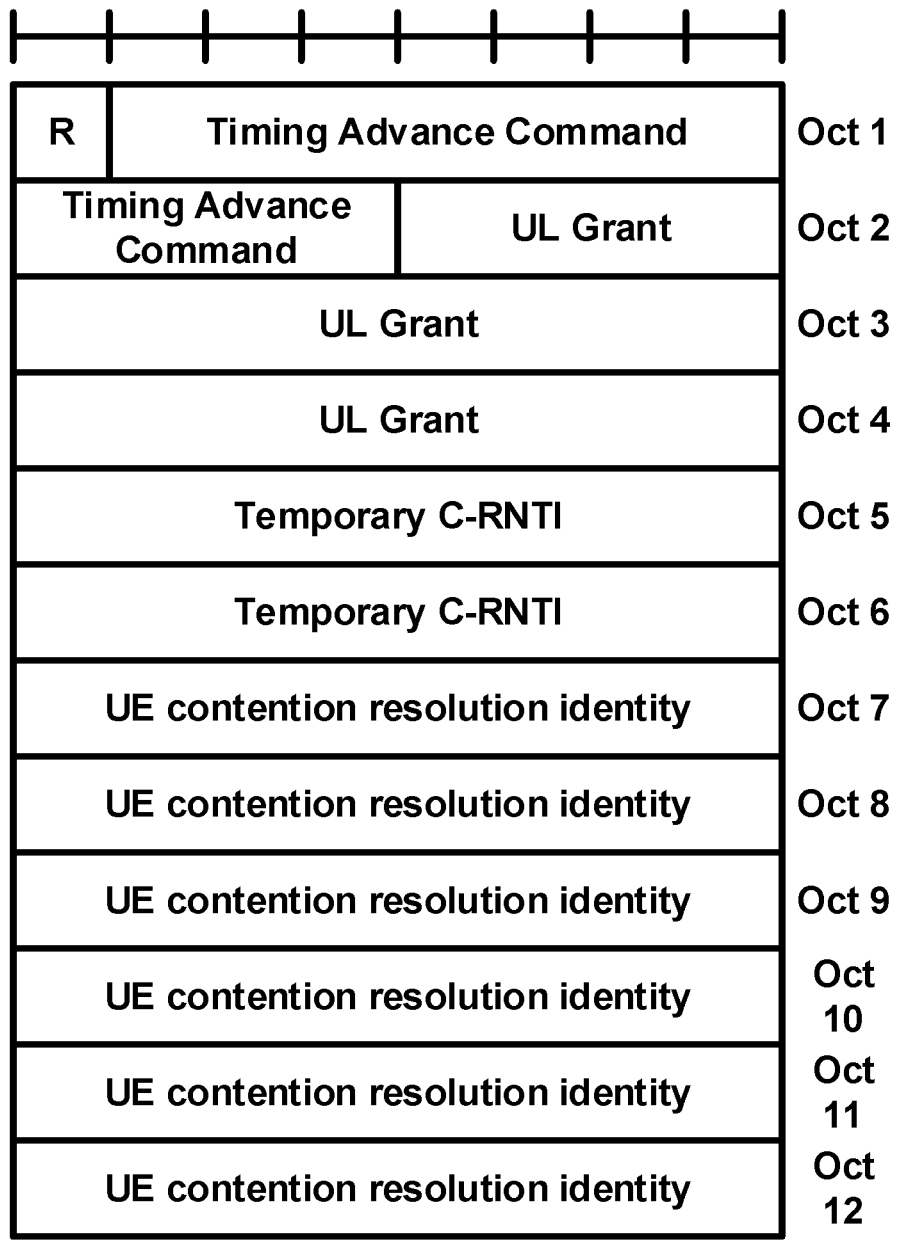
FIG. 22 shows an example RAR format.

FIG. 22 shows an example RAR format. The RAR format may be employed in a MAC PDU, for example, that may multiplex RARs for two-step and four-step RA procedures. The RAR shown in FIG. 22 may use a fixed size, for example, using the same format for two-step and four-step RA procedures.

Figures 23A, 23B:
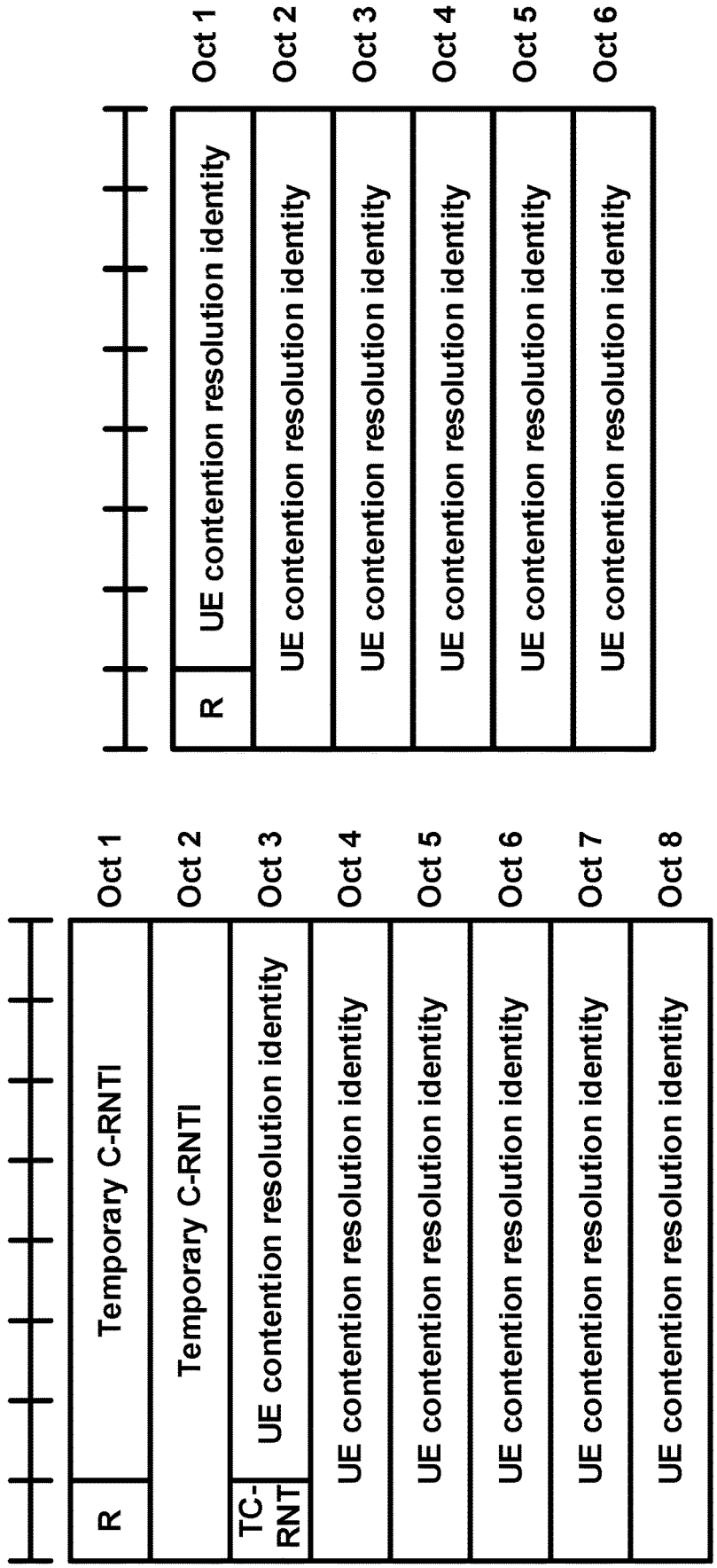
FIG. 23A and FIG. 23B show example RAR formats.

FIG. 23A, and FIG. 23B show example RAR formats. The RAR formats may be employed for a two-step RA procedure. An RAR for a two-step RA procedure may have a different format, size, and/or fields, from an RAR for a four-step RA procedure. An RAR may have a field to indicate a type of RAR (e.g., a reserved "R" field as shown in FIG. 21, for example, based on RARs for two-step and four-step RA procedures being multiplexed into a MAC PDU, and/or the RARs having different formats between two-step and four-step RA procedure). FIG. 23A, and FIG. 23B may be employed to indicate a type of RAR. A field for indicating an RAR type may be in a subheader (such as a MAC subheader) and/or in an RAR. An RAR may comprise different types of fields that may correspond with an indicator in a subheader and/or in an RAR. A wireless device may determine the boundary of one or more RARs in a MAC PDU, for example, based on one or more indicators.

A serving cell may be configured with one or multiple BWPs. a maximum number of BWP per serving cell may be a first number. BWP switching for a serving cell may be used to activate an inactive BWP and deactivate an active BWP at a determined time. BWP switching may be controlled by a PDCCH message (e.g., signal) indicating a downlink assignment or an uplink grant (e.g., by the bwp-Inactivity-Timer, by RRC signaling, or by the wireless device (e.g., MAC entity of the wireless device) itself upon initiation of RA procedure). The DL BWP and UL BWP indicated by a first active downlink BWP identifier (e.g., firstActiveDownlinkBWP-Id) and a first active uplink BWP identifier (e.g., firstActiveUplinkBWP-Id) respectively may be active without receiving a message (e.g., signal) via PDCCH indicating a downlink assignment or an uplink grant, for example, based on or in response to addition of an SpCell or activation of an SCell. The active BWP for a serving cell may be indicated by either an RRC message or PDCCH message (e.g., signal). A DL BWP may be paired with a UL BWP, and BWP switching may be common for both UL and DL, for example, based on an unpaired spectrum.

An activated serving cell may be configured with a BWP. A BWP may be activated and the wireless device (e.g., MAC entity of the wireless device) may: send (e.g., transmit) via a UL-SCH on the BWP; send (e.g., transmit) via a RACH on the BWP; monitor or continue to monitor the PDCCH on the BWP; send (e.g., transmit) a PUCCH signal on the BWP; send (e.g., transmit) an SRS signal on the BWP; receive a DL-SCH message on the BWP; and/or (re-)initialize any suspended configured uplink grants of configured grant Type 1 on the active BWP. The BWP activation may be based on a stored configuration, if any.

An activated serving cell may be configured with a BWP. The BWP may be deactivated and the wireless device (e.g., MAC entity of the wireless device) may: not send (e.g., transmit) via a UL-SCH on the BWP; not send (e.g., transmit) via a RACH on the BWP; may not monitor or continue to not monitor the PDCCH on the BWP; not send (e.g., transmit) via a PUCCH on the BWP; not report CSI for the BWP; not send (e.g., transmit) an SRS signal on the BWP; not receive a DL-SCH message on the BWP; clear any configured downlink assignment and configured uplink grant of configured grant Type 2 on the BWP; and suspend any configured uplink grant of configured grant Type 1 on the inactive BWP.

The wireless device (e.g., MAC entity of the wireless device) may switch the active UL BWP to BWP indicated by an initial uplink BWP parameter (e.g., initialUplinkBWP), for example, based on or in response to initiation of the RA procedure on a serving cell and/or, PRACH occasions not being configured for the active UL BWP. The wireless device (e.g., MAC entity of the wireless device) may switch the active DL BWP to BWP indicated by an initial downlink BWP parameter (e.g., initialDownlinkBWP), for example, based on the serving cell being a SpCell. The wireless device (e.g., MAC entity of the wireless device) may perform the RA procedure on the active DL BWP of SpCell and active UL BWP of this serving cell.

The wireless device (e.g., MAC entity of the wireless device) may switch the active DL BWP to the DL BWP with the same BWP index (e.g., bwp-Id) as the active UL BWP, for example, based on or in response to initiation of the RA procedure on a serving cell, the PRACH occasions being configured for the active UL BWP, the serving cell is a SpCell, and/or if the active DL BWP does not have the same BWP index (e.g., bwp-Id) as the active UL BWP. The wireless device (e.g., MAC entity of the wireless device) may perform the RA procedure on the active DL BWP of SpCell and active UL BWP of this serving cell.

The wireless device (e.g., MAC entity of the wireless device) may switch the active DL BWP to the DL BWP with the same BWP index (e.g., bwp-Id) as the active UL BWP, for example, based on or in response to initiation of the RA procedure on a serving cell, the PRACH occasions being configured for the active UL BWP, the serving cell is a SpCell, and/or if the active DL BWP does not have the same BWP index (e.g., bwp-Id) as the active UL BWP. The wireless device (e.g., MAC entity of the wireless device) may perform the RA procedure on the active DL BWP of SpCell and active UL BWP of this serving cell.

The wireless device (e.g., MAC entity of the wireless device) may perform BWP switching to a BWP indicated by a PDCCH message, for example, based on the wireless device (e.g., MAC entity of the wireless device) receiving a PDCCH message for BWP switching of a serving cell; there being no ongoing RA procedure associated with this serving cell; and/or the ongoing RA procedure associated with this serving cell being successfully completed upon reception of the PDCCH message addressed to C-RNTI. A wireless device may determine whether to switch BWP or ignore the PDCCH message for BWP switching, for example, based on the wireless device (e.g., MAC entity of the wireless device) receiving a PDCCH message for BWP switching for a serving cell while a RA procedure associated with that serving cell is ongoing in the wireless device (e.g., MAC entity of the wireless device). The wireless device may perform BWP switching to a BWP indicated by the PDCCH message, for example, based on the PDCCH reception for BWP switching addressed to the C-RNTI for successful RA procedure completion. The wireless device (e.g., MAC entity of the wireless device) may stop the ongoing RA procedure and may initiate a RA procedure on the new activated BWP, for example, based on or in response to reception of the PDCCH message for BWP switching other than successful contention resolution, and/or the wireless device (e.g., MAC entity of the wireless device) deciding to perform BWP switching. The wireless device (e.g., MAC entity of the wireless device) may continue with the ongoing RA procedure on the active BWP, for example, based on the wireless device deciding to ignore the PDCCH message for BWP switching.

The wireless device (e.g., MAC entity of the wireless device), for each activated serving cell, may start or restart a BWP inactivity timer (e.g., bwp-InactivityTimer) associated with the active DL BWP. The start or restart may be based on the BWP inactivity timer (e.g., bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, and/or the active DL BWP not being the initial downlink BWP parameter (e.g., initialDownlinkBWP). The start or restart may be based on a PDCCH message addressed to C-RNTI or CS-RNTI indicating downlink assignment or uplink grant is received on the active BWP. The start or restart may be based on a PDCCH message addressed to C-RNTI or CS-RNTI indicating downlink assignment or uplink grant being received for the active BWP. The start or restart may be based on a MAC PDU being sent (e.g., transmitted) in a configured uplink grant, and/or received in a configured downlink assignment: if there is no ongoing RA procedure associated with this serving cell; and/or if the ongoing RA procedure associated with this serving cell is successfully completed upon reception of this PDCCH message addressed to C-RNTI.

The wireless device (e.g., MAC entity of the wireless device), for each activated serving cell, may start or restart the BWP inactivity timer (e.g., bwp-InactivityTimer) associated with the active DL BWP, for example, based on the BWP inactivity timer (e.g., bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The start or restart may be based on the default downlink BWP parameter (e.g., defaultDownlinkBWP) not being configured, the active DL BWP not being the initial downlink BWP parameter (e.g., initialDownlinkBWP), a PDCCH message for BWP switching being received on the active DL BWP, and/or the wireless device (e.g., MAC entity of the wireless device) switching the active BWP.

The wireless device (e.g., MAC entity of the wireless device), for each activated serving cell, may stop the BWP inactivity timer (e.g., bwp-InactivityTimer) associated with the active DL BWP of this serving cell, if running, for example, based on the BWP inactivity timer (e.g., bwp-InactivityTimer) being configured, the default downlink BWP parameter (e.g., defaultDownlinkBWP) being configured, and the active DL BWP not being the BWP indicated by the default downlink BWP parameter (e.g., defaultDownlinkBWP), the default downlink BWP parameter (e.g., defaultDownlinkBWP) not being configured, the active DL BWP not being the initial downlink BWP parameter (e.g., initialDownlinkBWP), and/or RA procedure being initiated on this serving cell. The wireless device (e.g., MAC entity of the wireless device) may stop the BWP inactivity timer (e.g., bwp-InactivityTimer) associated with the active DL BWP of SpCell, if running, for example, based on if the serving cell is SCell The wireless device (e.g., MAC entity of the wireless device) may perform BWP switching to a BWP indicated by the default downlink BWP parameter (e.g., defaultDownlinkBWP), for example, based on the BWP inactivity timer (bwp-InactivityTimer) being configured, the default downlink BWP parameter (e.g., defaultDownlinkBWP) being configured, and/or the active DL BWP is not the BWP indicated by the default downlink BWP parameter (e.g., defaultDownlinkBWP). The wireless device (e.g., MAC entity of the wireless device) may perform BWP switching to a BWP indicated by the default downlink BWP parameter (e.g., defaultDownlinkBWP), for example, based on the default downlink BWP parameter (e.g., defaultDownlinkBWP) not being configured, the active DL BWP not being the initial downlink BWP parameter (e.g., initialDownlinkBWP), the BWP inactivity timer (e.g., bwp-InactivityTimer) associated with the active DL BWP expiring, and/or the default downlink BWP parameter (e.g., defaultDownlinkBWP) being configured. Otherwise the wireless device (e.g., MAC entity) may perform BWP switching to the initial downlink BWP parameter (e.g., initialDownlinkBWP).

A wireless device, configured for operation in BWPs of a serving cell, may be configured by higher layers for the serving cell a set of at most a first threshold value (e.g., 4, 8, 16, 32 or any other quantity) of BWPs for reception by the wireless device in a DL bandwidth (e.g., a DL BWP set) by a BWP downlink parameter (e.g., BWP-Downlink) and a set of at most a second threshold value (e.g., 4, 8, 16, 32 or any other quantity) BWPs for transmissions by the wireless device in an UL bandwidth (e.g., a UL BWP set) by a BWP uplink parameter (e.g., BWP-Uplink) for the serving cell.

An initial active DL BWP may be defined by a location and number of contiguous PRBs, a subcarrier spacing, and a cyclic prefix, for the control resource set for a downlink common search space (e.g., Type0-PDCCH common search space). A wireless device may be provided (e.g., configured with, indicated by, etc.) an initial active UL BWP by a higher layer initial uplink BWP parameter (e.g., initialuplinkBWP) for example, for operation on the primary cell or on a secondary cell. The wireless device may be provided (e.g., configured with, indicated by, etc.) an initial UL BWP on the supplementary carrier by a higher layer initial uplink BWP parameter (e.g., initialUplinkBWP) in a supplementary uplink, for example, based on the wireless device being configured with a supplementary carrier.

The wireless device may be provided by (e.g., configured by, indicated by, etc.) a higher layer first active downlink BWP index parameter (e.g., firstActiveDownlinkBWP-Id) a first active DL BWP for reception and, by a higher layer first active uplink BWP index parameter (e.g., firstActiveUplinkBWP-Id), a first active UL BWP for transmissions on the primary cell, for example, based on a wireless device having a dedicated BWP configuration.

The wireless device may be configured with the following parameters for the serving cell for each DL BWP or UL BWP in a set of DL BWPs or UL BWPs, respectively: a subcarrier spacing provided by (e.g., configured by, stored in, indicated by, etc.) a parameter (e.g., a higher layer parameter such as, for example, subcarrierSpacing); a cyclic prefix provided by (e.g., configured by, stored in, indicated by, etc.) a parameter (e.g., a higher layer parameter such as, for example, cyclicPrefix); a first PRB and a number of contiguous PRBs indicated by a parameter (e.g., a higher layer parameter such as, for example, locationAndBandwidth) that may be interpreted as RIV, setting $N_{BWP}^{size}=275$, and the first PRB being a PRB offset relative to the PRB indicated by parameters (e.g., a higher layer parameter such as, for example, offsetToCarrier and subcarrierSpacing); an index in the set of DL BWPs or UL BWPs via a parameter (e.g., a higher layer parameter such as, for example, bwp-Id); and/or a set of BWP-common and a set of BWP-dedicated parameters via parameters (e.g., a higher layer parameter such as, for example, bwp-Common and bwp-Dedicated).

A DL BWP from the set of configured DL BWPs with index provided by (e.g., configured by, indicated by, etc.) higher layer BWP index parameter (e.g., bwp-Id) for the DL BWP is linked with an UL BWP from the set of configured UL BWPs with index provided (e.g., configured by, indicated by, etc.) by higher layer BWP index parameter (e.g., bwp-Id) for the UL BWP if the DL BWP index and the UL BWP index are equal, for example, based on unpaired spectrum operation A wireless device may not expect to receive a configuration where the center frequency for a DL BWP is different than the center frequency for an UL BWP if the BWP index parameter (bwp-Id) of the DL BWP is equal to the bwp-Id of the UL BWP, for example, based on unpaired spectrum operation.

A wireless device may be configured to control resource sets for every type of common search space and for wireless device-specific search space, for example, for each DL BWP in a set of DL BWPs on the primary cell. The wireless device may not expect to be configured without a common search space on the PCell, or on the PSCell, in the active DL BWP. The wireless device may be configured resource sets for PUCCH transmissions, for example, for each UL BWP in a set of UL BWPs.

A wireless device may receive PDCCH messages and PDSCH messages via a DL BWP according to a configured subcarrier spacing and CP length for the DL BWP. A wireless device may send (e.g., transmit) PUCCH messages and PUSCH messages via an UL BWP according to a configured subcarrier spacing and CP length for the UL BWP.

A field (e.g., a BWP indicator field) value may indicate the active DL BWP, from the configured DL BWP set, for DL receptions, for example, based on a BWP indicator field being configured in DCI format 1_1. The BWP indicator field value may indicate the active UL BWP, from the configured UL BWP set, for UL transmissions, for example, based on a BWP indicator field being configured in DCI format 0_1.

The wireless device may prepend zeros to the information field until its size is the one required for the interpretation of the information field for the UL BWP or DL BWP prior to interpreting a DCI format 0_1 or DCI format 1_1 information fields, respectively, for example, based on a BWP indicator field being configured in DCI format 0_1 or DCI format 1_1 and/or indicating an UL BWP or a DL BWP different from the active UL BWP or DL BWP, respectively, for each information field in the received DCI format 0_1 or DCI format 1_1; and/or the size of the information field being smaller than the one required for the DCI format 0_1 or DCI format 1_1 interpretation for the UL BWP or DL BWP that is indicated by the BWP indicator, respectively. The wireless device may use a number of least significant bits of DCI format 0_1 or DCI format 1_1 equal to the one required for the UL BWP or DL BWP indicated by BWP indicator prior to interpreting the DCI format 0_1 or DCI format 1_1 information fields, respectively, for example, based on the size of the information field being larger than the one required for the DCI format 0_1 or DCI format 1_1 interpretation for the UL BWP or DL BWP that is indicated by the BWP indicator, respectively. The wireless device may set the active UL BWP or DL BWP to the UL BWP or DL BWP indicated by the BWP indicator in the DCI format 0_1 or DCI format 1_1, respectively.

A wireless device may expect to detect a DCI format 0_1 indicating active UL BWP change, or a DCI format 1_1 indicating active DL BWP change, for example, based on a corresponding PDCCH message being received within a first threshold (e.g., 3, 4, 5, or any other quantity) of symbols of a slot.

A wireless device may be provided by (e.g., configured by, indicated by, etc.) a higher layer default downlink BWP index parameter (e.g., defaultDownlinkBWP-Id) a default DL BWP among the configured DL BWPs, for example, for the primary cell. The default DL BWP may be the initial active DL BWP, for example, based on a wireless device not being provided (e.g., configured by, indicated by, etc.) a default DL BWP by higher layer default downlink BWP index parameter (e.g., defaultDownlinkBWP-Id.)

A wireless device may be configured for a secondary cell with higher layer default downlink BWP index parameter (e.g., defaultDownlinkBWP-Id) indicating a default DL BWP among the configured DL BWPs. The wireless device may be configured with higher layer BWP inactivity timer parameter (e.g., bwp-InactivityTimer) indicating a timer value. The wireless device procedures on the secondary cell may be the same as on the primary cell, using a timer value for the secondary cell and the default DL BWP for the secondary cell.

The wireless device may increment a timer every interval of a first duration (e.g., 1 millisecond or any other duration) for frequency range 1, or every second duration (e.g., 0.5 milliseconds or any other duration) for frequency range 2, for example, based on the wireless device being configured by higher layer BWP inactivity timer parameter (e.g., bwp-InactivityTimer), a timer value for the primary cell and the timer is running, the wireless device not detecting a DCI format for PDSCH reception on the primary cell for paired spectrum operation, if the wireless device not detecting a DCI format for PDSCH reception, and/or a DCI format for PUSCH transmission on the primary cell for unpaired spectrum operation during the interval. A wireless device may increment a timer every interval of a first duration (e.g., 1 millisecond or any other duration) for frequency range 1 or every second duration (e.g., 0.5 milliseconds or any other duration) for frequency range 2, for example, based on a wireless device being configured by higher layer BWP inactivity timer parameter (e.g., BWP-InactivityTimer), a timer value for a secondary cell, the timer being running, the wireless device not detecting a DCI format for PDSCH reception on the secondary cell for paired spectrum operation, the wireless device not detecting a DCI format for PDSCH reception, and/or a DCI format for PUSCH transmission on the secondary cell for unpaired spectrum operation during the interval. The wireless device may deactivate the secondary cell if the timer expires.

The wireless device may use the indicated DL BWP and the indicated UL BWP on the secondary cell as the respective first active DL BWP and first active UL BWP on the secondary cell or supplementary carrier, for example, based on a wireless device being configured by a higher layer first active downlink BWP index parameter (e.g., firstActive-DownlinkBWP-Id), a first active DL BWP, and by higher layer first active uplink BWP index parameter (e.g., firstActiveUplinkBWP-Id), and/or a first active UL BWP on a secondary cell or supplementary carrier. A wireless device does not expect to send (e.g., transmit) HARQ-ACK information on a PUCCH resource indicated by a DCI format 1_0 or a DCI format 1_1, for example, based on paired spectrum operation, the wireless device changes its active UL BWP on the PCell between a time of a detection of the DCI format 1_0 or the DCI format 1_1, and/or a time of a corresponding HARQ-ACK information transmission on the PUCCH. A wireless device may not expect to monitor or continue to monitor PDCCH if the wireless device performs RRM via a bandwidth that is not within the active DL BWP for the wireless device.

FIG. 24 shows an example BWP configuration information element (e.g., a BWP IE). A BWP IE may be used to configure a BWP. The network may configure at least an initial BWP comprising at least a downlink BWP and one (e.g., if the serving cell is configured with an uplink) or two (e.g., if using supplementary uplink (SUL)) uplink BWPs, for example, for each serving cell. The network may configure additional uplink and downlink BWPs for a serving cell.

The BWP configuration may be split into uplink and downlink parameters and/or into common and dedicated parameters. Common parameters (e.g., BWP-UplinkCommon and BWP-DownlinkCommon) may be cell specific and/or the network may ensure the necessary alignment with corresponding parameters of other wireless devices. Common parameters of the initial BWP of the PCell may be provided via system information. The network may provide the common parameters via dedicated signaling.

A field, IE, or prefix (e.g., cyclic prefix) may indicate whether to use the extended cyclic prefix for this BWP. The wireless device may use the normal cyclic prefix (CP), for example, if the CP is not set. Normal CP may be supported for all numerologies and slot formats. Extended CP may be supported only for 60 kHz subcarrier spacing (or some other frequency subcarrier spacing). A parameter (e.g., locationAndBandwidth) may indicate a frequency domain location and/or a bandwidth of this BWP. The value of the field may be interpreted as a RIV. A first PRB may be a PRB determined by a subcarrier spacing parameter (e.g., subcarrierSpacing) of this BWP and/or an offset parameter (e.g., offsetToCarrier (configured in SCS-SpecificCarrier contained within FrequencyInfoDL)) corresponding to this subcarrier spacing. A BWP-pair (e.g., UL BWP and DL BWP with the same index) may have the same center frequency, for example, based on use of TDD. The subcarrier spacing parameter may indicate subcarrier spacing to be used in this BWP for channels and reference signals unless explicitly configured elsewhere. The value kHz15 may correspond to $\mu=0$, kHz30 to $\mu=1$, and so on. The values 15, 30, or 60 kHz may be used. A BWP index (e.g., bwp-Id) may indicate an identifier for a BWP.

Other parts of the RRC configuration may use the BWP index (e.g., BWP-Id) to associate with a particular BWP. A BWP ID=0 may be associated with an initial BWP and/or may not be used with other BWPs. The network (NW) may trigger the wireless device to switch UL or DL BWP using a DCI field. The four code points in the DCI field may map to the RRC-configured BWP index (e.g., BWP-Id). The DCI code point may be equivalent to the BWP ID (initial=0, first dedicated=1, . . . ), for example, for up to three configured BWPs (in addition to the initial BWP). The BWPs may be identified by DCI code points 0 to 3, for example, if the NW configures 4 dedicated BWPs. It may not be possible to switch to the initial BWP using the DCI field, for example, with this configuration. The BWP index (e.g., bwp-Id) may indicate an identifier for a BWP. Other parts of the RRC configuration may use the BWP index (e.g., BWP-Id) to associate themselves with a particular BWP. A BWP ID=0 may be associated with the initial BWP and may not be used in other BWPs.

The NW may trigger the wireless device to switch an UL BWP and/or a DL BWP using a DCI field. The four code points in that DCI field may map to the RRC-configured BWP index (e.g., BWP-ID). The DCI code point may be equivalent to the BWP index (e.g., BWP ID where initial=0, first dedicated=1, . . . ), for example, for up to three configured BWPs (in addition to the initial BWP). The BWPs may be identified by DCI code points 0 to 3, for example, if the NW configures four dedicated BWPs. It may not be possible to switch to the initial BWP using the DCI field, for example, with this configuration. A common random access configuration (e.g., rach-ConfigCommon) may indicate configuration of cell specific RA parameters that the wireless device may use for contention based random access, contention free random access, and/or contention based beam failure recovery. The NW may configure SSB-based RA (including RACH-ConfigCommon) for UL BWPs, for example, based on the linked DL BWPs allowing the wireless device to acquire the SSB associated to the serving cell. An uplink control channel configuration (e.g., PUCCH-config) may indicate an uplink control channel configuration (e.g., PUCCH configuration) for one BWP of the regular UL or SUL of a serving cell. The network may configure PUCCH on the BWPs of one of the uplinks (UL or SUL), for example, if the wireless device is configured with SUL.

The network may configure PUCCH-Config for each SpCell. The network may configure one additional SCell of a cell group with an uplink control channel configuration (e.g., PUCCH-Config for a PUCCH SCell), for example, if supported by the wireless device. The IE BWP-Id may be used to refer to BWP. The initial BWP may be referred to by a zero index (e.g., BWP-Id 0). The other BWPs may be referred to by a non-zero index (e.g., BWP-Id 1 to a maximum number/quantity of BWPs (e.g., maxNrofBWPs)).

FIG. 25 shows an example serving cell configuration information element. A serving cell configuration (e.g., ServingCellConfig IE) may be used to configure (e.g., add or modify) the wireless device with a serving cell. The serving cell may be the SpCell or an SCell of an MCG or SCG. The parameters of the serving cell configuration may comprise wireless device specific parameters and/or cell specific parameters (e.g. additionally configured BWPs).

An inactivity timer (e.g., bwp_InactivityTimer) may be configured to have a duration in milliseconds (ms) after which the wireless device may fall back to the default BWP. A value 0.5 ms may be applicable for carriers greater than 6 GHz. If the network releases the timer configuration, the wireless device may stop the timer without switching to the default BWP.

A default downlink BWP index (e.g., defaultDownlinkBWP-Id) may correspond to a default L1 downlink BWP parameter (e.g., 'default-DL-BWP'). The initial BWP may be referred to by a BWP index (e.g., BWP-Id=0). The ID of the downlink BWP may be used after timer expiry. This ID field may be wireless device specific. The wireless device may use the initial BWP as default BWP, for example, if the field is absent.

A downlink BWP list (e.g., downlinkBWP-ToAddModList) may indicate a list of additional downlink BWPs to be added or modified. A downlink BWP release list (e.g., downlinkBWP-ToReleaseList) may indicate a list of additional downlink BWPs to be released.

The active DL BWP index may contain the ID of the DL BWP to be activated, for example, based on or upon performing the reconfiguration in which it is received, for example, if an active DL BWP index (e.g., firstActiveDownlinkBWP-Id) is configured for an SpCell. The RRC reconfiguration may not impose a BWP switch (which may correspond to L1 parameter 'active-BWP-DL-Pcell'), for example, if the field is absent. The field may contain the ID of the downlink BWP to be used upon MAC-activation of an SCell, for example, if configured for an SCell. The initial BWP may be referred to by a zero index (e.g., BWP-Id=0).

An initial DL BWP parameter (e.g., initialDownlinkBWP) may indicate a dedicated (e.g., UE-specific) configuration for the initial downlink bandwidth-part. An active UL BWP index (e.g., firstActiveUplinkBWP-Id) may contain an ID of the DL BWP to be activated upon performing the reconfiguration in which it is received, for example, if configured for an SpCell. The RRC reconfiguration may not impose a BWP switch (e.g., corresponding to L1 parameter 'active-BWP-UL-Pcell'), for example, if the field is absent. The field may contain the ID of the uplink BWP to be used upon MAC-activation of an SCell, for example, if configured for an SCell. The initial BWP may be used in a BWP parameter (e.g., BandwidthPartId=0). An initial uplink BWP parameter (e.g., initialUplinkBWP) may indicate a dedicated (UE-specific) configuration for the initial uplink bandwidth-part.

A type of LBT procedure (e.g., CAT1, CAT2, CAT3, and/or CAT4) may be configured via control messages (e.g., RRC, MAC CE, and/or DCI) per a cell, for example, in an unlicensed band. A type of LBT procedure (e.g., CAT1, CAT2, CAT3, and/or CAT4) may be configured via control messages (e.g., RRC, MAC CE, and/or DCI) per BWP. A type of LBT procedure (e.g., CAT1, CAT2, CAT3, and/or CAT4) may be determined at least based on a numerology configured in a BWP. BWP switching may change a type of LBT procedure.

A wireless device may be configured (e.g., by a base station) with one or more UL carriers associated with one DL carrier of a cell. One of one or more UL carriers configured with a DL carrier may be referred to as a supplementary uplink (SUL) carrier or a normal UL (NUL or may be referred to as a non-SUL) carrier. A base station may enhance UL coverage and/or capacity by configuring an SUL carrier. A base station may configure a BWP configuration per an uplink (e.g., per uplink carrier) associated with a cell. One or more BWPs on an SUL may be configured (e.g., by a base station) separately from one or more BWPs on a NUL. A base station may control an active BWP of an SUL independently of an active BWP of a NUL. A base station may control two or more uplink transmissions on two or more ULs (e.g., NUL and SUL) to avoid overlapping PUSCH transmissions in time.

A base station may avoid configuring parallel uplink transmissions via a SUL and an NUL of a cell, wherein the parallel uplink transmissions may be PUCCH transmissions (and/or PUSCH transmissions) via SUL and PUCCH transmissions (and/or PUSCH) via NUL. A base station may send (e.g., transmit) one or more RRC message (e.g., wireless device specific RRC signaling) to configure and/or reconfigure a location of a PUCCH transmissions on an SUL carrier and/or on a NUL carrier. A wireless device may receive (e.g., from a base station) one or more RRC messages comprising configuration parameters for a carrier. The configuration parameters may indicate at least one of: an RA procedure configuration, BWP configurations (e.g., number of DL/UL BWPs, a bandwidth and/or index of configured DL/UL BWP, and/or initial, default, and/or active DL/UL BWP), a PUSCH configuration, a PUCCH configuration, an SRS configuration, and/or a power control parameter.

An SUL carrier and a NUL carrier may be configured (e.g., by a base station) to support a RA procedure (e.g., initial access). Support for a RA to a cell configured with SUL is shown in FIG. 12, described above. A RACH configuration 1210 of an SUL may be configured (e.g., by a base station) independent of a RACH configuration 1210 of an NUL. One or more parameters associated with Msg1 1220, Msg 2 1230, Msg 3 1240, and/or contention resolution 1250 via an SUL may be configured independent of one or more parameters associated with Msg1 1220, Msg 2 1230, Msg 3 1240, and/or contention resolution 1250 via an NUL. One or more parameters associated with PRACH transmissions in Msg 1 1220 via an SUL may be independent of one or more parameters associated with PRACH transmission via an NUL.

A wireless device may determine which carrier (e.g., between NUL and SUL) to use, for example, based on an RA procedure in licensed bands and/or a measurement (e.g., RSRP) of one or more DL pathloss references A wireless device may select a first carrier (e.g., SUL or NUL carrier) if a measured quality (e.g., RSRP) of DL pathloss references is less than a broadcast threshold (e.g., an RRC parameter, rsrp-ThresholdSSB-SUL in FIG. 18A). One or more uplink transmissions associated with the RA procedure may remain on the selected carrier, for example, based on a wireless device selecting a carrier between SUL carrier and NUL carrier for an RA procedure.

An NUL and an SUL may be configured (e.g., by a base station) with a TAG. A wireless device may employ a TA value received during a RA procedure via a second carrier (e.g., NUL) of the cell, for example, based on an uplink transmission of a first carrier (e.g., SUL) of a cell.

Figure 26:
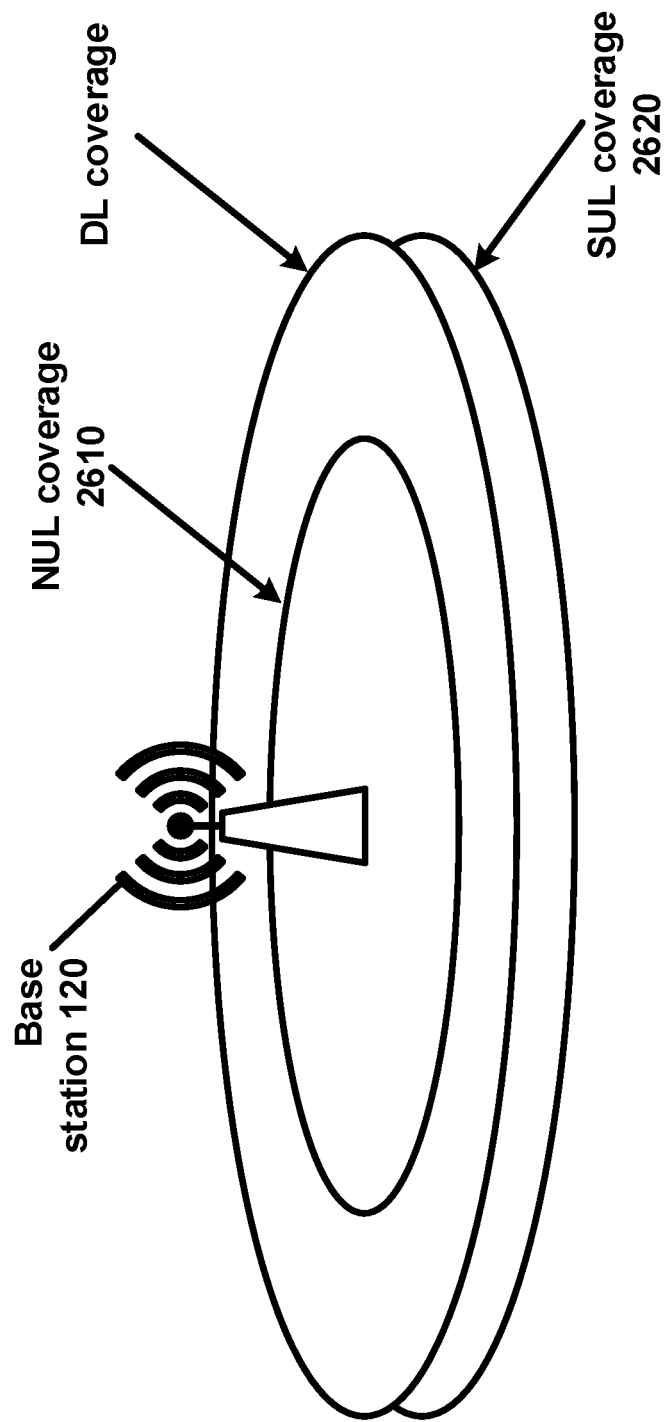
FIG. 26 shows an example of a coverage of a cell configured with a DL and two ULs.

FIG. 26 shows an example of a coverage of a cell configured with a DL and two ULs. A base station may configure a NUL and DL over a first frequency (e.g., high frequency). An SUL may be configured over a second frequency (e.g., low frequency) to support uplink transmission (e.g., in terms of coverage and/or capacity) of a cell. A broadcast threshold (e.g., an RRC parameter, rsrp-ThresholdSSB-SUL) for a wireless device to select a carrier may be determined such that a wireless device located outside a NUL coverage 2610 but inside an SUL coverage 2620 may start a RA procedure via an SUL. A wireless device located inside a NUL coverage 2610 may start a RA procedure via a NUL. A wireless device may use a RACH configuration associated with a selected carrier for a RA procedure.

A wireless device may perform a contention based RA procedure and/or a contention free RA procedure. A wireless device may perform a RA procedure on an UL selected based on a broadcast threshold (e.g., rsrp-ThresholdSSB-SUL). A base station may not indicate (e.g., explicitly) to the wireless device which carrier to start a RA procedure. A base station may indicate which carrier a wireless device performs a RA procedure by sending a RACH configuration with an SUL indicator (e.g., 0 may indicates a NUL carrier, 1 may indicate an SUL carrier or vice versa). A base station may indicate (e.g., explicitly) to a wireless device which UL carrier is to be used for a contention free or contention based RA procedure. A base station may indicate a contention free RA procedure by sending a RACH configuration with a dedicated preamble index. A base station may indicate a contention based RA procedure by sending a RACH configuration without a dedicated preamble index.

It may be beneficial for a network to receive one or more measurements of NUL carrier(s) and/or SUL carrier(s) to initiate a (contention free or contention based) RA procedure for a wireless device. A base station may configure a wireless device (e.g., a wireless device in RRC Connected) with one or more measurements on one or more DL reference signals associated with NUL carrier(s) and/or SUL carrier(s) of a cell.

A base station may select a carrier between NUL carrier(s) and/or SUL carrier(s), for example, based on the quality of the one or more measurements and/or if a wireless device sends quality information of one or more measurements on one or more DL reference signals associated with NUL carrier(s) and/or SUL carrier(s). A base station may indicate, to a wireless device, a selected carrier via RRC signaling (e.g., handover) and/or PDCCH order (e.g., SCell addition) for initiating a (contention free or contention based) RA procedure. For load balancing between NUL carrier(s) and/or SUL carrier(s), a base station may select one of NUL and SUL carrier by taking into consideration congestion in NUL carrier(s) and/or SUL carrier(s). A base station may better select a carrier (e.g., NUL or SUL) of a target cell for a (contention free or contention based) RA procedure for a handover, for example, based on one or more measurement reports associated with NUL carrier(s) and/or SUL carrier(s). A base station may better select a carrier (e.g., NUL or SUL) of an SCell (e.g., if the SCell is configured with at least a NUL carrier and an SUL carrier) for a (contention free or contention based) RA procedure for an SCell addition, for example, based on one or more measurement reports associated with NUL carrier(s) and/or SUL carrier(s).

A source base station may make a decision on a handover to one or more target cells, for example, for a handover of a wireless device. A source base station may indicate a handover decision to a target base station associated with one or more target cells that the source base station selects. A target base station may indicate to a wireless device (e.g., through a cell of a source gNB) which carrier (between NUL carrier(s) and SUL carrier(s)) to use via a handover command. A handover command received by a wireless device may comprise an SUL indicator (e.g., 1 bit) along with one or more RACH parameters (e.g., dedicated preamble index, and/or PRACH mask index), wherein the SUL indicator may indicate if the one or more RACH parameters are associated with an SUL or NUL carrier.

It may be useful that a source base station informs a target base station about measured results on NUL carrier(s) and SUL carrier(s), e.g., high frequency carrier(s) and low frequency carrier(s), so that the target base station determines a carrier on which a wireless device may perform a (contention free or contention based) RA procedure for a handover. The source base station may need to know whether SUL carrier(s) is (are) configured in the target gNB, and/or which carrier is allowed to be used for a handover, for example, if a source base station configures DL measurements on one or more cells association with a NUL carrier(s) and/or SUL carrier(s) of a target gNB. A target base station may inform a source base station of one or more configurations of NUL carrier(s) and/or SUL carrier(s) of one or more cells in the target gNB. A source base station may configure DL measurement on one or more cells in the target gNB, based on one or more configurations indicating carrier configurations at the one or more cells in the target gNB.

A base station may be aware of whether SUL carrier(s) is (are) configured in an SCell, and/or which carrier is allowed to be used for an SCell addition. A base station may configure DL measurements on NUL carrier(s) and/or SUL carrier(s). A base station may configure a wireless device with one or more RACH configurations for an SCell, e.g., a first RACH configuration for an SUL carrier, a second RACH configuration for a NUL carrier, and so on. A base station may send (e.g., transmit), to a wireless device via a PDCCH order comprising a parameter indicating in which carrier the wireless device starts a (contention free or contention based) RA procedure. A PDCCH order triggering a (contention free or contention based) RA procedure may comprise one or more parameters indicating at least one of at least one preamble (e.g., preamble index), one or more PRACH resources (e.g., PRACH mask index), an SUL indicator, and/or a BWP indicator. A wireless device receiving a PDCCH order may send (e.g., transmit) at least one preamble via one or more PRACH resources of a BWP indicated by a BWP indicator of a carrier indicated by an SUL indicator, for example, for a RA procedure. A wireless device may determine a RA procedure unsuccessfully completed. The wireless device may consider the RA procedure unsuccessfully completed, for example, if a wireless device receives no RAR corresponding to one or more preambles sent by the wireless device during a RA procedure. There may be a number of preamble transmissions allowed during a RA procedure (e.g., preambleTransMax in FIG. 18B), wherein the number of preamble transmissions may be semi-statically configured by RRC. The wireless device may consider a RA procedure unsuccessfully completed, for example, if a wireless device receives no RAR corresponding to the number of preamble transmissions. A wireless device may indicate a problem to upper layer(s), for example, after an unsuccessful completion of a RA procedure, and after the indicated problem. The upper layers(s)

may trigger radio link failure that may lead to prolonged RA delay and degraded user experience.

A base station (source base station and/or a target gNB) configuring a wireless device with a RACH configuration for a RA (for a handover and/or SCell addition) may not allow to reuse the RACH configuration if the RA is unsuccessfully completed.

An amount of data traffic carried over a network may be expected to change over time. A quantity of users and/or devices may increase. Each user and/or device may access an increasing quantity and/or variety of services (e.g., video delivery, large files, images, etc.). Network access may not only require high capacity, but also may cause provisioning very high data rates to meet user expectations for interactivity and/or responsiveness. More spectrum may be needed for operators to meet the increasing demand. It may be beneficial that more spectrum be made available for deploying macro cells as well as small cells for communications systems, for example, considering user expectations of high data rates along with seamless mobility.

There may be increasing interest from operators in deploying some complementary access utilizing unlicensed spectrum to meet traffic growth, for example, striving to meet the market demands Operator-deployed Wi-Fi networks and the 3GPP standardization of interworking solutions with Wi-Fi (e.g., LTE/WLAN interworking) may indicate operator interest. This interest may indicate that unlicensed spectrum, if present, may be an effective complement to licensed spectrum for network operators to help address traffic increase. In at least some systems (e.g., LTE), licensed assisted access (LAA) and/or new radio on unlicensed band(s) (NR-U) may offer an alternative for operators to make use of unlicensed spectrum for managing a network. This use of unlicensed spectrum may offer new possibilities for optimizing a network's efficiency.

LBT may be implemented for transmission in a cell (which may be referred to as an LAA cell and/or a NR-U cell). An LAA cell, NR-U cell, and/or any other cell may be interchangeable and may refer a cell operating in unlicensed band. The cell may be operated as non-standalone or stand-alone, with or without an anchor cell in licensed band, configured in an unlicensed band. An LBT procedure may comprise a clear channel assessment. In an LBT procedure, a wireless device and/or a base station may apply a clear channel assessment (CCA) check before using the channel. The CCA may utilize at least energy detection to determine the presence or absence of other signals on a channel in order to determine whether a channel is occupied or clear. A regulation of a country may alter configurations of the LBT procedure. European and Japanese regulations may mandate the usage of LBT in the unlicensed bands, for example, in a 5 GHz unlicensed band. Carrier sensing via LBT may be used for equitable sharing of the unlicensed spectrum.

Discontinuous transmission on an unlicensed carrier with limited maximum transmission duration may be enabled Channel reservation may be enabled by the transmission of signals (e.g., by an NR-U node), after gaining channel access via a successful LBT operation. Channel reservation may enable other nodes that receive a sent (e.g., transmitted) signal with energy above a certain threshold a capability to sense the channel to be occupied. Functions that may need to be supported by one or more signals for operation in unlicensed band with discontinuous downlink transmission may include one or more of: detection of the downlink transmission in unlicensed band (including cell identification) by wireless devices; and/or time and frequency synchronization of wireless devices.

DL transmission and frame structure design for an operation in unlicensed band may use subframe boundary alignment according to carrier aggregation timing relationships across serving cells aggregated by CA. Base station transmissions may not start at the subframe boundary. LAA, NR-U, and/or any other technologies may support sending messages via PDSCH, for example, if not all OFDM symbols are available for transmission in a subframe according to LBT. Delivery of necessary control information for the PDSCH may also be supported.

LBT procedures may be used for coexistence of 3GPP systems (e.g., LTE, NR, and/or any other communications system or technology) with other operators and technologies operating in unlicensed spectrum. LBT procedures on a node attempting to send (e.g., transmit) on a carrier in unlicensed spectrum may require the node to perform a clear channel assessment to determine if the channel is free for use. An LBT procedure may involve, at least, energy detection to determine if the channel is being used. Regulatory requirements in some regions, (e.g., in Europe) may specify an energy detection threshold. If a node receives energy greater than a threshold, the node may determine that the channel is not clear. While nodes may follow such regulatory requirements, a node may optionally use a lower threshold for energy detection than that specified by regulatory requirements. NR-U and/or other technologies may use a mechanism to adaptively change the energy detection threshold. A mechanism may be used to adaptively lower the energy detection threshold from an upper bound. An adaptation mechanism may not preclude static or semi-static setting of the threshold. A Category 4 LBT mechanism or other type of LBT mechanisms may be implemented.

Various LBT mechanisms may be used. An LBT procedure may not be performed by the transmitting entity, for example, for some signals. A Category 1 (CAT1, e.g., no LBT) may be used. A channel in an unlicensed band may be held by a base station for DL transmission. A wireless device may take over the channel for UL transmission. The wireless device may perform the UL transmission without performing LBT. A Category 2 (CAT2, e.g. LBT without random back-off) may be used. The duration of time that the channel may be sensed to be idle before the transmitting entity sends may be deterministic. A Category 3 (CAT3, e.g. LBT with random back-off with a contention window of fixed size) may be used. A transmitting entity may draw a random number N within a contention window. A size of the contention window may be specified by a minimum and maximum value of N. The size of the contention window may be fixed. The random number N may be used in the LBT procedure to determine the duration of time that the channel is sensed to be idle before the transmitting entity sends via the channel A Category 4 (CAT4, e.g. LBT with random back-off with a contention window of variable size) may be used. A transmitting entity may draw a random number N within a contention window. The size of contention window may be specified by the minimum and maximum value of N. The transmitting entity may vary the size of the contention window based on drawing the random number N. The random number N may be used in the LBT procedure to determine the duration of time that the channel is sensed to be idle before the transmitting entity sends (e.g., transmits) on the channel.

A wireless device may use uplink LBT. The UL LBT may be different from the DL LBT (e.g. by using different LBT mechanisms or parameters). The UL may be based on scheduled access that affects a wireless device's channel contention opportunities. Other UL LBT configurations include, but are not limited to, multiplexing of multiple wireless devices in a subframe (slot, and/or mini-slot).

A DL transmission burst may be a continuous transmission from a DL transmitting node with no transmission immediately before or after from the same node via the same component carrier (CC). An UL transmission burst from a wireless device perspective may be a continuous transmission from a wireless device with no transmission immediately before or after from the same wireless device via the same CC. An UL transmission burst may be defined from a wireless device perspective. An UL transmission burst may be defined from a base station perspective. A base station may operate DL+UL via a same unlicensed carrier. DL transmission burst(s) and UL transmission burst(s) may be scheduled in a TDM manner via the same unlicensed carrier. An instant in time may be part of a DL transmission burst or an UL transmission burst.

Channel observation time (COT) sharing may be used. COT sharing may be a mechanism (e.g., enabled by ETSI-BRAN) wherein one device acquires a COT using CAT4 LBT and another device shares it using a 25 µs LBT with a gap, for example, provided the amount of transmission does not exceed the MCOT limit for the given priority class. COT sharing may allow a concession for UL via an unlicensed band in which a base station sends (e.g., transmits) a grant to a wireless device before it can be sent (e.g., transmitted) via the UL. The delay between the grant and the corresponding UL transmission may be a period of time (e.g., at least 4 ms). A pause (e.g., 4 ms) may not be accounted in the COT duration. A base station may indicate the remaining time to one or more wireless devices via a PDCCH, for example, if the base station acquired a COT and sent a message indicating the COT via the DL without exhausting the full COT. The wireless device may perform UL transmissions with dynamic grant and/or configured grant (e.g., Type 1, Type2, autonomous UL) with 25 µs LBT in the configured period.

Single and multiple DL to UL and UL to DL switching within a shared COT may be supported. LBT requirements to support single or multiple switching points, may be different for different gaps. No-LBT may be used, for example, for a gap of less than 16 µs. A one-shot LBT may be used, for example, for a gap of between 16 µs and 25 µs. A one-shot LBT may be used, for example, for single switching point, and for the gap from DL transmission to UL transmission exceeding 25 µs. A one-shot LBT may be used, for example, for multiple switching points, and for the gap from DL transmission to UL transmission exceeding 25 µs.

A signal that facilitates detection with low complexity may be useful for wireless device power saving, improved coexistence, spatial reuse (which may be within the same operator network), serving cell transmission burst acquisition, etc. Operation of at least some technologies (e.g., NR-U) may use a signal comprising at least SS/PBCH block burst set transmission. Other channels and signals may be sent together as part of the signal. The design of this signal may determine that there are no gaps within the time span the signal is sent, for example, at least within a beam. Gaps may be needed for beam switching. The occupied channel bandwidth may be satisfied. A block-interlaced based message via a PUSCH may be used. The same interlace structure for messages via a PUCCH and/or a PUSCH may be used. Interlaced based messages via a PRACH may be used.

An initial active DL/UL BWP may be approximately 20 MHz for a first unlicensed band (e.g., 5 GHz band). An initial active DL/UL BWP may be approximately 20 MHz for a second unlicensed band (e.g., 6 GHz band), if similar channelization as the first unlicensed band (e.g., 5 GHz band) is used for the second unlicensed band (e.g., 6 GHz band). Wideband may be configured (e.g., by a base station) with one or more BWPs. Four BWPs may be configured (e.g., by a base station), for example, with about 20 MHz bandwidth configured for each BWP, or 80 MHz allocated for the four BWPs. An active BWP (DL and/or UL) may be switched one to another at least based on BWP switching mechanism. The wideband may be configured (e.g., by a base station) with one or more subbands. Four subbands may be configured (e.g., by a base station), for example, with about 20 MHz configured for each subband, or 80 MHz allocated for the four subbands. A wireless device may perform an LBT procedure subband by subband, and may send (e.g., transmit) data via scheduled resources on one or more subbands where the LBT procedure indicates idle.

HARQ acknowledge and negative acknowledge (A/N) for the corresponding data may be sent in the same shared COT. The HARQ A/N may be sent in a separate COT from the one the corresponding data was sent. Flexible triggering and/or multiplexing of HARQ feedback may be used for one or more DL HARQ processes, for example, if UL HARQ feedback is sent on unlicensed band. The dependencies of HARQ process information to the timing may be removed. UCI messages via PUSCH may carry HARQ process ID, NDI, RVID. Downlink Feedback Information (DFI) may be used for transmission of HARQ feedback for a configured grant.

CBRA and CFRA may be supported on an SpCell. CFRA may be supported on SCells. An RAR may be sent via an SpCell, for example, in a non-standalone configuration. An RAR may be sent via an SpCell and/or via an SCell, for example, in a standalone configuration. A predefined HARQ process ID for an RAR may be used.

Carrier aggregation between a licensed band PCell (e.g., NR (PCell)) and an SCell (e.g., NR-U (SCell)) may be supported. An SCell may have both DL and UL, or DL-only. Dual connectivity between various licensed band PCells (e.g., LTE (PCell)) and PSCells (e.g., NR-U (PSCell)) may be supported. Stand-alone cells (e.g., NR-U) in which all carriers are in one or more unlicensed bands may be supported. A cell (e.g., an NR cell) with a DL in an unlicensed band and an UL in a licensed band, or vice versa, may be supported. Dual connectivity between licensed band cells (e.g., a NR (PCell) and NR-U (PSCell)) may be supported.

An operating bandwidth may be an integer multiple of 20 MHz, for example, if an absence of Wi-Fi cannot be guaranteed (e.g., by regulation) in a band (e.g., sub-7 GHz) via which a communications network or system (e.g., NR-U) is operating. LBT may be performed in units of 20 MHz, for example, for bands where absence of Wi-Fi cannot be guaranteed (e.g., by regulation). Receiver assisted LBT (e.g., RTS/CTS type mechanism) and/or on-demand receiver assisted LBT (e.g., for example receiver assisted LBT enabled only if needed) may be used. Techniques to enhance spatial reuse may be used. Preamble detection may be used.

Channel congestion may cause an LBT failure. The probability of successful LBT may increase for random access and/or for data transmission, for example, if the wireless device selects a cell/BWP/channel with a lowest congestion load. A channel occupancy-aware RACH procedure may reduce LBT failure. In such a procedure, the random access backoff time for the wireless device may be adjusted based on channel conditions (e.g., based on channel occupancy and/or RSSI measurements). To adjust the random access backoff time, a base station may, for example, (semi-statically and/or dynamically) transmit a random access backoff. The random access backoff may be predefined in at least some cases. The random access backoff may be incremented, based on (e.g., after or in response to) one or more random access response reception failures corresponding to one or more random access preamble attempts.

A base station may send (e.g., transmit) a SS/PBCH burst set in one contiguous burst. DRS transmission may comprise an SS/PBCH burst set in one contiguous burst. The base station may send (e.g., transmit) one or more CSI-RSs and/or the remaining minimum system information (RMSI)-CORESET(s) and/or the PDSCH(s) carrying RMSI associated with the SS/PBCH block(s) in the contiguous burst (e.g., DRS transmission). A base station may transmit one or more messages/signals comprising the SS/PBCH burst, the CSI-RS(s), the RMSI-CORESET(s), and/or the PDSCH(s) carrying RMSI in one burst in time domain that results in limiting the required number of channel access and short channel occupancy in an unlicensed band. An access technology (e.g., LTE, NR, and/or any other access technology) may support a stand-alone operation and/or dual-connectivity deployments.

A base station (e.g., deployed in an unlicensed band) may transmit DRS comprising signals and/or channels that are required for cell acquisition. The DRS may comprise the transmission of at least one of reference signals, paging and/or OSI signals. In some examples and/or access technolog(ies), a base station may not send (e.g., transmit) at least one of: RMSI-CORESET, PDSCH and/or CSI-RS signal(s)/channel(s) in the DRS.

The base station may send (e.g., transmit) a DRS within a duration of a DRS transmission window. The DRS transmission window may have a fixed length (e.g., 5 ms or any other duration) and/or a fixed periodicity (e.g., 20 ms or any other duration). The length and/or the periodicity of the DRS transmission window may be semi-statically configured by a base station. A duration of the DRS (e.g., comprising SS/PBCH blocks and other multiplex signals/channels) sent (e.g., transmitted) within the DRS transmission window may be limited to a particular time duration (e.g., 1 ms or any other duration). The duration of the DRS within the window may be limited depending on the periodicity of DRS. The base station may send (e.g., transmit) one or more message indicating a number/quantity of candidate SSB positions within DRS transmission window (e.g., up to 64). The base station may send (e.g., transmit) a number/quantity of SSBs within DRS transmission window (e.g., up to 8). The transmitted SSBs within the DRS window may not overlap in time domain.

Transmission(s) of SS/PBCH block(s) may not be guaranteed (or may be blocked, cancel, rescheduled, postponed, and/or delayed) in an unlicensed band due to LBT failure. One or more SS/PBCH blocks may be dropped at certain time instances, for example, due to LBT failure. Predefined transmission position of SS/PBCH block(s) may be inefficient. There may be a need to opportunistically schedule one or more SS/PBCH block(s), for example, depending on a success and/or failure of LBT performed on a channel in an unlicensed band. One or more SS/PBCH bursts (e.g., an entire SS/PBCH burst set) may be shifted in time to the next transmission instance. A start of an SS/PBCH burst may be truncated, and/or one or more dropped SSBs (e.g., due to the truncation) may be cyclically wrapped at the end of the burst set transmission. The network may schedule one or more SSBs, for example, and/or send (e.g., transmit) a message indicating the timing information of the scheduled one or more SSBs. A base station may indicate the SS/PBCH block transmission occasion time index and the associated SS/PBCH block index in the SS/PBCH block to allow the wireless device to derive the timing information.

A base station may determine a COT duration for SS/PBCH burst transmission. The base station may determine a COT duration may at least based on a subcarrier spacing of the SS/PBCH burst transmission and/or a number of SS/PBCH blocks in the burst transmission. The base station may use CAT2 LBT for the SS/PBCH burst transmission, for example, that may provide a short COT of 1 ms (or any other duration). A type of LBT may be determined based on one or more priorities. A base station may use higher priority CAT4 LBT with a shorter random backoff, which may provide a short COT of 2 ms (or any other duration). The base station may use a lower priority CAT4 LBT with a longer random backoff, which may provide longer COT (e.g., up to 10 ms or any other duration).

Semi-static resource allocation of PRACH may be supported as baseline design in an access technology (e.g., LTE, NR, and/or any other access technology). A base station may semi-statically configure a wireless device with an association between one or more PRACH occasions/preambles and SS/PBCH block(s). For example, the base station may configure the wireless device with a number/quantity of SS/PBCH blocks associated with one PRACH occasion based on one or more higher layer parameters. A value of configured number/quantity of SS/PBCH blocks associated with one PRACH occasion may be less than or greater than one (or any other value). One SS/PBCH block may be mapped to multiple (e.g., consecutive) PRACH occasions, or vice versa. A base station may support a mapping from different SS/PBCH blocks to non-overlapping subsets of RACH preamble indices within one PRACH occasion, for example, if more than one SS/PBCH blocks are mapped to one PRACH occasion.

One or more PRACH periodicities may be supported (e.g., 10, 20, 40, 60, and 160 ms or any other duration). A wireless device may not wait until the next configured PRACH occasion without transmitting RACH preamble, for example, if the wireless device determines an LBT failure.

There may be one or more enhancements implemented in an access technology (e.g., LTE, NR, or any other access technology) for an operation in an unlicensed band. One or more transmission opportunities for PRACH may be configured in time, frequency, code, and/or combination thereof. A base station may configure a wireless device with one or more PRACH resources across one or more LBT sub-bands/carriers, for example, for contention-free and/or contention-based RA. A base station may configure a wireless device with one or more PRACH resources dynamically (e.g., via DCI for a connected mode wireless device), for example, in the time domain. PRACH resources configured to a wireless device may comprise one or more first PRACH resources dynamically configured (e.g., via DCI) and/or one or more second PRACH resource semi-statically configured (e.g., via a RRC message). A base station may dynamically configure one or more PRACH resources within a COT in which the base station may send (e.g., transmit) one or more SSBs. The base station may dynamically schedule the one or more PRACH resources (e.g., via paging for idle mode wireless device and/or via DCI (or any control signal)) for a connected mode wireless device. The one or more RACH resources may follow one or more SSBs (e.g., DRS transmission).

A wireless device may send (e.g., transmit) one or more preambles. The one or more preambles may be limited before reception of a random access response (e.g., Msg2) in a RAR window. The one or more preambles may be allowed before starting an RAR window. The number/quantity of allowed preamble transmissions may be predefined and/or indicated by a message, for example, RMSI in an RRC message and/or PDCCH order in a DL control signal. Groupwise SSB-to-RO mapping may be supported (e.g., by frequency first-time second manner) in which grouping may be in a time domain.

A wireless device may perform LBT for accessing a channel before transmitting PRACH in an unlicensed band. The wireless device may send (e.g., transmit) the PRACH, for example, if the channel is free. The wireless device may postpone the PRACH transmission, for example, if the channel is busy. A base station may reserve a time duration for the wireless device before sending (e.g., transmitting) a signal via a PRACH to perform an LBT procedure, such as an LBT gap for a RACH occasion (RO). The base station may schedule RACH occasions based on (e.g., after or in response to) a SS/PBCH burst transmission. Scheduling ROs based on (e.g., after or in response) to the SS/PBCH burst transmission may help a wireless device to avoid LBT failure for the RACH transmission(s). The wireless device may determine no interference and/or no hidden nodes based on (e.g., after or in response to) detecting SS/PBCH block. The wireless device may skip an LBT and send (e.g., transmit) a signal via a PRACH based on (e.g., after or in response to) a reception of at least one SSB. The wireless device may send (e.g., transmit) at least one preamble without an LBT procedure (and/or with performing a particular LBT procedure, such as a CAT2 LBT procedure), for example, if the gap between DL/UL switching point (e.g., between a SSB reception and selected RACH resource) is small (or below a threshold).

The base station may configure a wireless device with an association between (e.g., SSB-to-RO mapping) SS/PBCH blocks and RACH. A base station may send (e.g., transmit) an RRC message indicating the SSB-to-RO mapping that may be time independent. The RRC message may indicate a frequency resource and/or preamble of a PRACH transmission. The base station may send (e.g., transmit) a second message indicating a time resource of the PRACH transmission. The network may support contention-free and/or contention-based random access procedures on SCells. A base station may send (e.g., transmit) a random access response (RAR) on an SCell via which the base station may receive a preamble. A base station may send (e.g., transmit) a random access response (RAR) on an SCell via which a base station does not receive a preamble, for example, using a cell identifier associated with a preambled received by the base station.

A base station may share an acquired COT with a wireless device for random access procedure. The base station may allow the wireless device to multiplex PRACH resources in UL portion of an acquired COT. For example, the base station may send (e.g., transmit), to one or more wireless device, an indication via a group-common PDCCH (GC-PDCCH) to schedule PRACH resources within the acquired COT (e.g., for connected, inactive, and/or idle mode wireless device(s)). The base station may send (e.g., transmit) the PDCCH (e.g., GC-PDCCH) to schedule resources after one or more SSBs (e.g., in an RMSI and/or in a DCI). The wireless device may perform a one-shot (e.g. CAT2) LBT procedure or no LBT procedure for a random access preamble (e.g., Msg1) and/or for another message (e.g., Msg3) transmission in the COT acquired by the base station, for example, if the wireless device receives the indication.

A wireless device may share a COT with a base station, for example, if the wireless device acquires the COT (e.g., based on a CAT4 LBT). The wireless device may acquire the COT for Msg1 and/or Msg3 transmission(s). The base station may perform a one-shot (e.g., CAT2) LBT procedure or no LBT procedure before a Msg2 and/or a Msg4 transmission in the COT. A wireless device may acquire the COT for MsgA (e.g., preamble(s), and/or UL data) transmission, for example, for a two-step RA procedure. The base station may perform a one-shot (e.g., CAT2) LBT procedure or no LBT procedure before MsgB (e.g., RAR(s) and/or contention resolution) transmission in the COT.

A base station may configure one or more wireless devices to share one or more RACH resources. The one or more wireless devices may block each other, for example, if the one or more wireless devices send (e.g., transmit) one or more preambles without UL synchronization in the same RACH resource. A preamble transmission time may vary between wireless devices, for example, if the wireless devices are not UL-synchronized, and/or if the wireless devices select different values of backoff timers. The base station may perform an LBT procedure to reserve RACH resources. The RACH resources may be within the base-station-initiated COT. The channel prior to the RACH resource may be occupied by the base station. The wireless device may determine and/or assume that the channel is reserved by the base station for RACH transmission. The wireless device may skip an LBT procedure, for example, if the channel prior to the RACH resource is occupied by the serving base station, and/or if the RACH resource is within the COT of the base station. The base station may indicate any of the above or other information to the wireless device, for example, using an initial signal. The initial signal may comprise COT sharing indication.

The base station may perform an LBT procedure. The base station may send (e.g., transmit) a polling indication to one or more wireless devices, for example, based on (e.g., after or in response to) a success of the LBT procedure. The one or more wireless devices may send (e.g., transmit) one or more preambles with, for example, a one-shot (e.g., CAT2) LBT procedure and/or with a high priority (e.g., CAT4) LBT procedure performed based on (e.g., after or in response to) receiving the polling indication. One or more PRACH occasions may follow the polling indication in the COT that a base station acquired. The wireless device may be configured to send (e.g., transmit) a preamble (e.g., Msg1) with a particular LBT procedure (e.g., one-shot LBT procedure) based on (e.g., after or in response to) receiving the polling indication from the base station. A reception of the polling indication may be a reference time of one or more preamble transmissions for the one or more wireless devices. A base station may configure one or more wireless devices to send (e.g., transmit) at least one preamble (e.g., Msg1) without an LBT procedure and/or with a particular LBT procedure based on (e.g., after or in response to) receiving the polling indication (e.g., being polled by the base station).

A wireless device and/or base station may support one or more active BWPs. The BWP bandwidth may be the same as the bandwidth of a subband for an LBT procedure (e.g., LBT may be carried out on each BWP), which may be implemented, for example, to improve BWP utilization efficiency. The network may activate/deactivate the BWPs based on data volume to be sent (e.g., transmitted).

One or more non-overlapped BWPs may be activated for a wireless device within a wide component carrier. The non-overlapped BWP(s) may be similar to carrier aggregation. The BWP bandwidth may be the same as the bandwidth of a subband for an LBT procedure (e.g., LBT procedure may be a carried out on each BWP), which may be implemented, for example, to improve BWP utilization efficiency. If more than one subband LBT procedure is a success, a wireless device may be required to have the capability to support one or more narrow RF or a wide RF, which may comprise the one or more activated BWPs.

A single wideband BWP may be activated for a wireless device within a component carrier. The bandwidth of wideband BWP may be in the same unit of subband as the subband for an LBT procedure. If, for example, the subband for the LBT procedure is 20 MHz in a 5 GHz band, the wideband BWP bandwidth may comprise a multiple of 20 MHz. The actual transmission bandwidth may be subject to a subband with an LBT success, which may result in dynamic bandwidth transmission within this active wideband BWP.

Active BWP switching may be achieved by use of scheduling DCI. The network may indicate to a wireless device a new active BWP to use for an upcoming, and/or any subsequent, data transmission/reception. A wireless device may monitor multiple, configured BWPs to determine which BWP has been acquired for DL transmission(s) by the base station. A wireless device may be configured with monitoring occasion periodicity and/or an offset for each configured BWP. The wireless device may attempt to determine if a BWP has been acquired by the base station during one or more monitoring occasions. Based on (e.g., after or in response to) a wireless device determining that the channel is acquired, the wireless device may continue with a BWP as its active BWP, for example, at least until indicated otherwise and/or maximum channel occupancy time (MCOT) has been reached. A wireless device may attempt blind detection of PDCCH in configured CORESETs, and/or perform measurements on aperiodic or periodic resources (e.g., Type 1 or Type 2 configured grant), for example, if the wireless device has determined that a BWP is active.

A base station may configure a wireless device with a carrier aggregation with at least one SCell operating in an unlicensed band. A configured set of serving cells for the wireless device may comprise at least one SCell operating in the unlicensed band according to a particular frame structure (e.g., frame structure Type 3 in LTE or any other frame structure in any other access technology).

A failure of a random access may occur due to an LBT procedure, for example, in an unlicensed band. At least one LBT procedure may be performed, for example, prior to DL and/or UL transmission in an unlicensed band. In a random access procedure (e.g., in FIG. 12), Msg 1 1220, Msg 2 1230, Msg 3 1240, and contention resolution 1250 may require at least one LBT procedure before the transmission for contention-based random access (e.g., at least 4 LBTs). For contention-free random access, Msg 1 1220 and Msg2 1230 may require at least one LBT (e.g., at least 2 LBTs).

Figure 27:
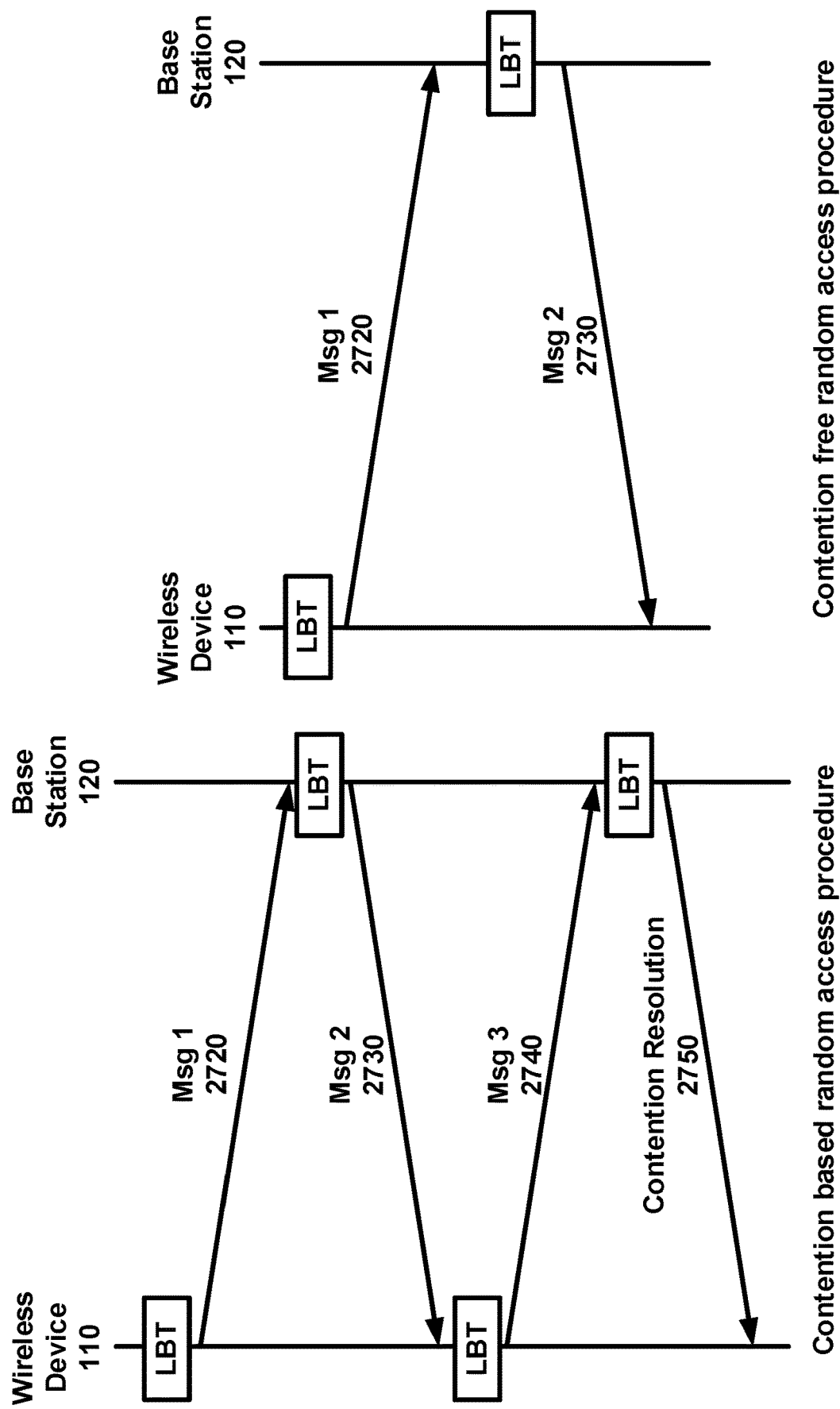
FIG. 27 shows contention based and contention-free random access procedures with LBT.

FIG. 27 shows contention based and contention-free random access procedures with LBT. A successful contention based random access procedure may use Msg 1 2720, Msg 2 2730, Msg 3 2040, and contention resolution 2750 to perform the RA procedure with the wireless device 110 and base station 127. The wireless device may perform a first LBT, determine that the medium is clear, and send Msg 1 2720 to a base station 120. The base station 120 may perform a second LBT, determine that the medium is clear, and send Msg 2 2730 to the wireless device 110. The wireless device 110 may perform a third LBT, determine the medium is clear, and send Msg 1 2740 to the base station 120. The base station 120 may perform a fourth LBT, determine that the medium is clear, and sends contention resolution 2750 to the wireless device 110.

A successful contention-free based RA procedure may use Msg 1 2720 and Msg 2 2730 to perform the RA procedure with the wireless device 110 and the base station 120. The wireless device 110 may perform a first LBT, determine that the medium is clear, and send Msg 1 2720 to the base station 120. The base station 120 may perform a second LBT, determine that the medium is clear, and send Msg 2 2730 to the wireless device 110.

A failure of a RA may occur due to LBT, for example, in an unlicensed band. At least one LBT may be performed prior to DL and/or UL transmission. Msg 1 1220, Msg 2 1230, Msg 3 1240, and/or contention resolution 1250 may require at least one LBT before the transmission (e.g., at least 4 LBTs), for example, in a contention based random access procedure. Msg 1 1220 and Msg2 1230 may require at least one LBT each (e.g., at least 2 LBTs), for example, for a contention-free random access procedure. A base station and/or a wireless device may not send (e.g., transmit) a message (e.g., Msg 1 2720, Msg 2 2730, Msg 3 2740, and/or contention resolution 2750) for a RA procedure, for example, if the LBT procedure has failed prior to sending the message (e.g., CCA in LBT determines that a channel in an unlicensed band is busy (e.g., occupied by another device)).

A failure of an LBT procedure may result in degrading a user experience (e.g., in terms of QoS, capacity (e.g., throughput), and/or coverage). A base station and/or a wireless device may wait until the channel becomes idle. This waiting may result in a latency problem to make a radio link connection between a base station and a wireless device. A failure of an LBT during a RA procedure may lead a long delay for a wireless device to receive an UL grant and/or TA value from a base station. This delay may result in a call drop and/or traffic congestion. A failure of an LBT procedure in a RA procedure for an SCell addition may lead a cell congestion (e.g., load imbalancing) on one or more existing cells (e.g., if an SCell may not take over traffic from the one or more existing cells in time).

An efficiency of RA procedure operating in an unlicensed band may degrade with LBT failure, which may cause a latency/delay, and/or performance degradation. A wireless device and/or a base station may have one or more transmission opportunities in a time and/or frequency domain during an RA procedure. Selecting one or more SSBs and performing one or more LBT procedures via one or more PRACH occasions associated with the one or more SSBs may increase a success rate of LBT procedures. A wireless device may measure a plurality of downlink reference signals (e.g., SSBs or CSI-RSs, if CSI-RS is configured by RRC). The wireless device may select two or more SSBs by comparing RSRPs of the plurality of downlink reference signals and a threshold. The threshold may comprise a RSRP threshold SSB parameter (e.g., rsrp-ThresholdSSB) if the plurality of downlink reference signals are SSBs. The threshold may comprise a RSRP threshold CSI-RS parameter (e.g., rsrp-ThresholdCSI-RS) if the plurality of downlink reference signals are CSI-RSs. The wireless device may select two or more downlink referencing signals (SSBs or CSI-RSs) having RSRPs that are higher than the threshold. The wireless device may determine one or more PRACH occasions associated with the selected two or more downlink reference signals (e.g., SSBs), for example, based on SSBs being configured with the wireless device. The wireless device may determine the one or more PRACH transmissions based on an association between PRACH occasions and SSBs that may be indicated by one or more RRC parameters (e.g., ra-ssb-OccasionMaskIndex). The wireless device may determine one or more PRACH occasions associated with the selected two or more downlink reference signals (e.g., CSI-RSs), for example, based on CSI-RSs being configured with the wireless device. The wireless device may determine the one or more PRACH transmissions based on an association between PRACH occasions and CSI-RSs that may be indicated by one or more RRC parameters (e.g., ra-OccasionList).

Figure 28:
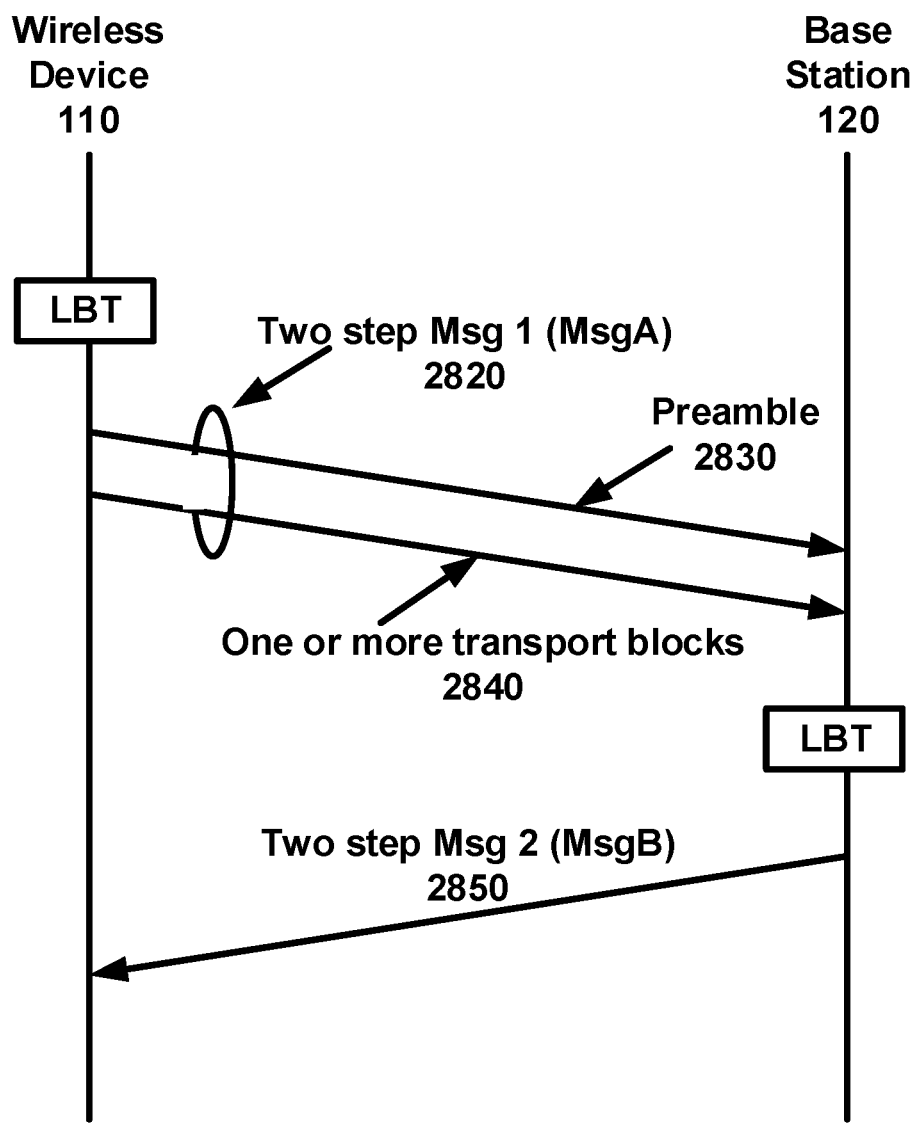
FIG. 28 shows an example diagram of a two-step RA procedure with LBT.

FIG. 28 is an example diagram of a two-step RA procedure with LBT. A two-step RA procedure may employ LBT in an unlicensed band. A base station and/or a wireless device may not send (e.g., transmit) a message (e.g., two-step Msg 1 2820, preamble 2830, one or more TBs 2840, and/or two-step Msg 2 2850) for a RA procedure if LBT is failed prior to sending (e.g., transmitting) the message (e.g., CCA in LBT determines that a channel in unlicensed band is busy, e.g., occupied by other device). The transmissions of the preamble 2830 and for one or more TBs 2840 may have a same LBT procedure and/or different LBT procedures.

Radio resources for transmissions of a preamble 2830 and one or more TBs 2840 may be configured in a same channel (or a same subband or a same BWP or a same UL carrier), where a wireless device performs an LBT procedure for the transmissions (e.g., based on a regulation). An LBT result on the same channel (or the same subband or the same BWP or the same UL carrier) may be applied for transmissions of the preamble 2830 and for one or more TBs 2840.

Figure 29:
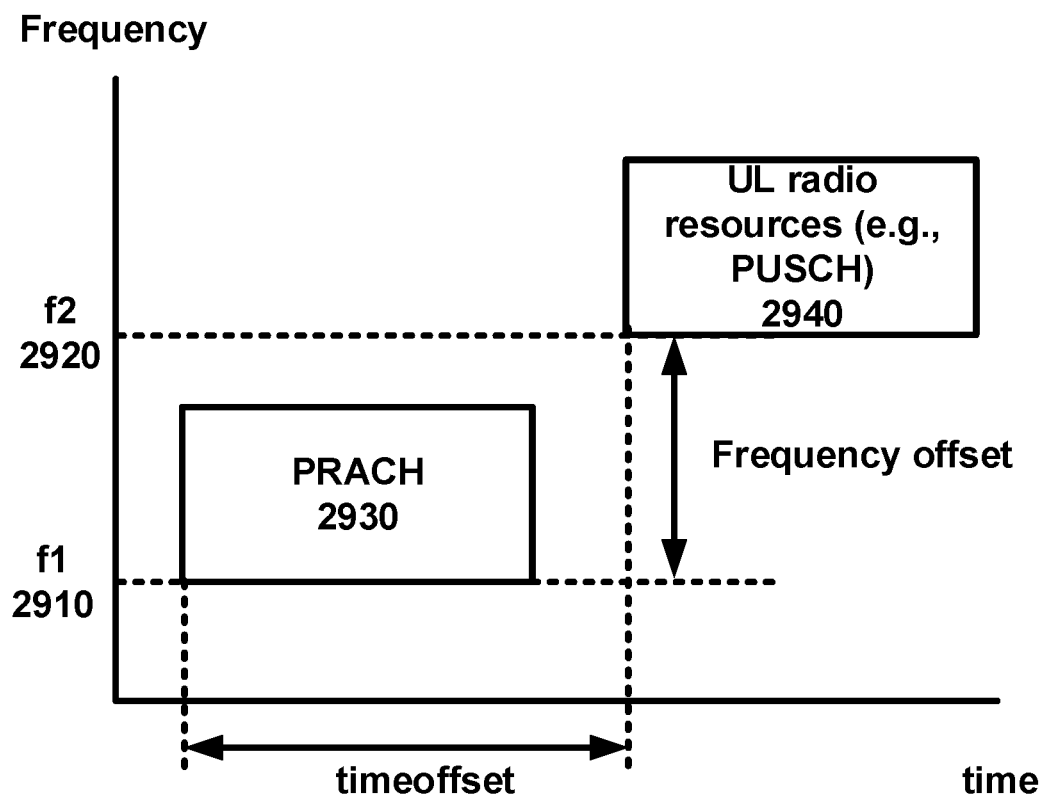
FIG. 29 shows an example of radio resource allocation for a two-step RA procedure.

FIG. 29 is an example of radio resource allocation for a two-step RA procedure. PRACH resource 2930 and UL radio resources 2940 may be time-multiplexed, for example, based on a frequency offset in FIG. 29 being zero. PRACH 2930 resource and UL radio resources 2940 may be frequency-multiplexed, for example, based on a timeoffset in FIG. 29 being zero. The frequency offset in FIG. 29 may be an absolute number in terms of Hz, MHz, and/or GHz, and/or a relative number (e.g., one of index from a set of frequency indices that are predefined/preconfigured). The timeoffset in FIG. 29 may be an absolute number in terms of micro-second, milli-second, and/or second and/or a relative number (e.g., in terms of subframe, slot, mini-slot, OFDM symbol). PRACH resource 2930 for transmission of the preamble 2830 and UL radio resources for transmission of one or more TBs 2840 may be subject to one LBT procedure if f1 2910 and f2 2920 are configured in the same channel (or a same subband or a same BWP or a same UL carrier). One LBT procedure before a PRACH resource 2930 may be performed by a wireless device (e.g., based on a regulation of unlicensed band). A quantity of LBT procedures may be determined based on a value of the timeoffset. One LBT procedure before a PRACH resource 2930 may be performed by a wireless device, for example, if the value of a time offset is equal to and/or less than a threshold (e.g., that may be configured and/or defined by a regulation). The one LBT procedure may determine idle and a wireless device may perform a transmission of the preamble 2830 via PRACH resource 2930 followed by a second transmission of one or more TBs 2840 via the UL radio resources 2940 with no LBT procedure (the transmission order may be switched if the UL radio resources 2940 is allocated before PRACH resource 2930 in time domain). PRACH and UL radio resources may be allocated closely enough in time domain. A wireless device may perform a first LBT procedure before a PRACH resource 2930 and perform a second LBT before UL radio resources 2940. Depending on the value of timeoffset, the wireless device may determine a type of LBT.

For example, if the value of timeoffset is less than 16 us, the wireless device may not perform an LBT before UL radio resources 2940. For example, if the value of timeoffset is between 16 μs and 25 μs, the wireless device may perform a CAT 2 LBT before UL radio resources 2940.

A wireless device may perform an LBT procedure and apply a result (e.g., idle or busy) of the LBT procedure to the transmission of the preamble 2830 and UL radio resources for transmission of one or more TBs 2840. A bandwidth of BWP and/or UL carrier (e.g., where f1 2910 and f2 2920 are configured), may be larger than a particular value (e.g., 20 MHz). The bandwidth may be less than the particular value (e.g., 20 MHz). A wireless device may perform the transmissions of the preamble 2830 and for one or more TBs 2840, for example, if the channel is idle. A transmission of the preamble 2830 may be followed by a transmission of one or more TBs 2840 (or vice versa).

A wireless device may perform a first transmission of the preamble 2830 that may be partially overlapped in time (e.g., based on frequency separation) with a second transmission of one or more TBs 2840. A wireless device may not perform the transmissions of the preamble 2830 and for one or more TBs 2840, for example, based on the channel being busy. A wireless device may perform a particular LBT procedure (e.g., CAT2 LBT) for the first transmission, for example, after or in response to the first transmission (and/or after or in response to an LBT procedure performed for the first transmission).

Wireless communications may comprise random access procedures, for example, to establish communications between a wireless device and a base station. Different random access procedures may be performed. For example, a two-step RA procedure or a four-step RA procedure may be performed. A two-step RA procedure may be performed initially. A wireless device and/or a base station may fallback to a contention-free RA procedure (e.g., a four-step RA procedure), for example, if a two-step RA procedure is unsuccessful. Performing a two-step procedure may be faster (e.g., may require less latency to complete) than performing a four-step RA procedure. If a two-step procedure fails, a wireless device may determine (and/or be required to) fallback to performing a contention resolution RA procedure (e.g., based on a four-step RA procedure). The contention RA procedure may comprise a UL transmission of TB(s) comprising a wireless device identifier (e.g., Msg 3 1240) and/or a contention resolution using the wireless device identifier (e.g., Contention resolution 1250). The wireless device may have to wait for a failure determination before falling back to the four-step RA procedure. Delaying a fallback to a four-step RA procedure may result in problems such as an increase in delay/latency for successfully completing a RA procedure, an increase in likelihood and/or occurrences of a radio link failure, and/or other issues such as those relating to delayed communications.

As described further herein, RA procedures may be improved to address the above and/or other issues relating to communication delay. A wireless device may perform a two-step RA procedure and/or a four-step RA procedure. The wireless device may send (e.g., transmit) a preamble to a base station. The wireless device may send (e.g., transmit) an identifier to the base station. The wireless device may send (e.g., transmit) the preamble and the identifier in the same message. The wireless device may monitor a downlink channel (e.g., PDCCH) for a response (e.g., an RAR). The wireless device may receive, via the downlink channel (e.g., PDCCH) a DCI that may be scrambled using an identifier (e.g., cyclic redundancy check (CRC) bits of the DCI may be scrambled by the identifier). The DCI may indicate a DL assignment of a transmission of the response. The wireless device may receive the response based on the DL assignment. The wireless device may receive the response using a random access (RA)-RNTI, e.g., if the DCI is scrambled by the RA-RNTI. The wireless device may receive the response using a C-RNTI, e.g., if the DCI is scrambled by the C-RNTI. If the wireless device receives a response (e.g., RAR) from the base station based on (e.g., using) the RA-RNTI, the wireless device may proceed to performing contention resolution (e.g., based on a four-step RA procedure). If the wireless device receives a response based on (e.g., using) the C-RNTI (or any identifier that may be included in a message sent by the wireless device, such as a message comprising the preamble and the identifier), the wireless device may determine that the random access procedure was successful. The format of a response received based on (e.g., using) the RA-RNTI may be the same to the one of a response used in a four-step RA procedure (e.g., a MAC RAR format for a four-step RA procedurea in FIG. 21). Using or reusing the existing response format may provide flexibility for a base station to multiplex one or more responses of different types of RA procedures into a same MAC PDU. The MAC PDU may comprise one or more responses (e.g., RARs or MACsubPDUs). The one or more responses (e.g., RARs or MACsubPDUs) may comprise a response of a four-step RA procedure. The one or more responses (e.g., RARs or MACsubPDUs) may comprise a response (e.g., fallback RAR) of a two-step RA procedure. The wireless device that receives a response based on (e.g., using) C-RNTI may determine that a two-step RA procedure successfully completes based on the C-RNTI. The C-RNTI may be a unique identifier of a wireless device in a cell. A base station may use C-RNTI to transmit a response to a wireless device, e.g., if the base station identifies the wireless device during a two-step RA procedure. Thus, the wireless device that receives, from a base station, a response based on (e.g., using) C-RNTI may determine that a UL transmission (e.g., a preamble 1630 and/or one or more TBs 1640) of a two-step RA procedure completes successfully and/or may determine, based on receiving a response based on (e.g., using) C-RNTI, that the two-step RA procedure completes successfully.

By monitoring for responses from the base station indicating either a successful RA procedure or that indicate contention resolution should be performed, the wireless device may avoid waiting for a success or a failure of a two-step RA procedure, which may avoid an increase in delay/latency for successfully completing a RA procedure, an increase in likelihood and/or occurrences of a radio link failure, and/or other issues such as those relating to delayed communications. The wireless device may be able to reduce the amount of latency that may be otherwise required to complete the random access procedure, for example, by not being required to wait to receive an indication to perform a contention resolution RA procedure (e.g., based on a four-step RA procedure) due to a RA procedure failure (e.g., based on a two-step RA procedure). The improved fallback (or fall back) techniques described herein, may allow a base station to send a response (e.g., RAR) to a wireless device in order to proactively indicate that the wireless device should fallback from a two-step RA procedure to a a four-step RA procedure (e.g., to a contention resolution of the four-step RA procedure).

During an RA procedure, a wireless device may receive a large amount of data (e.g., RRC messages), uplink (UL) grant(s), and/or downlink (DL) grant(s), from a base station. In at least some systems, a response (e.g., a MAC RAR) sent to the wireless device based on (e.g., after or in response to) an RA procedure comprises UL grant(s) (e.g., for a subsequent UL transmission), but may lack DL grant (e.g., DL assignment for a subsequent DL reception of PDSCH). After receiving an UL grant, the wireless device (e.g., that may need to receive PDSCH) may have to perform an additional monitoring step of monitoring a control channel for receiving DL grant information. Such additional monitoring may cause issues such as delay and wasted resources.

As described further herein, a wireless device and/or a base station may use a format of a message (e.g., MAC RAR and/or MACsubPDU) that may indicate one or more responses. The message may comprise an indicator, such as one or more bits indicated in a field (e.g., an R field, or other reserved field). The one or more responses may comprise a success RAR that may indicate a success of a two-step RA procedure. The one or more responses may comprise a failure (e.g., fallback) RAR that may indicate a failure of a two-step RA procedure (e.g., a fallback to a four-step RA procedure from a two-step RA procedure). The format of the message may comprise a field indicating whether the message indicates a success RAR or a failure (e.g., fallback) RAR. The failure RAR (e.g., fallback RAR) may comprise a UL grant. The wireless device may use the UL grant for a UL transmission, such as a Msg3 transmission for a contention resolution. The success RAR may comprise a DL assignment. The wireless device may use the DL assignment to receive a PDSCH message. The PDSCH message may comprise an RRC message. An UL grant (and/or the failure RAR) may indicate, for example, a failure of the two-step RA procedure (e.g., a fallback to a four-step RA procedure), whereas a DL assignment (and/or the success RAR) may indicate, for example, a success of the two-step RA procedure. Alternatively, The UL grant may indicate, for example, a success of two-step RA procedure. The DL assignment may indicate, for example, a failure of a two-step RA procedure (e.g., may indicate, for example, a fallback from the two-step RA procedure to a four-step RA procedure). A wireless device may utilize this unified format of the message (e.g., MAC RAR) to reduce signaling overhead and/or PDCCH monitoring steps (or occasions), for example, rather than monitoring for both an UL grant and also (or again) monitoring for a DL assignment. Instead, the wireless device may receive either UL grant(s) or DL assignment(s) in the message (e.g., MAC RAR). By enabling a wireless device to perform only a single PDCCH monitoring step (or fewer PDCCH monitoring steps) for a message (e.g., MAC RAR) having the proposed format, the wireless device may be able to reduce the quantity of PDCCH monitoring steps that the wireless device may otherwise perform. The wireless device may be able to reduce battery consumption and/or monitoring complexity, for example, by reducing the amount and/or duration of PDCCH monitoring. By reducing monitoring (e.g., avoiding performance of multiple separate monitoring steps), the new message format (e.g., MAC RAR format) may reduce latency of a RA procedure.

In at least some systems, RA procedures may result in congestion (e.g., network congestion, increased traffic, etc.), for example, that may be due to various delay(s). A wireless device may be required to wait before retransmitting a message for an RA procedure. The waiting may be associated with a backoff time that may be required prior to a retransmission. A backoff time may be the same in a cell regardless of whether the wireless device uses a two-step RA procedure or a four-step RA procedure. In at least some instances (e.g., depending on channel conditions at a base station or in a cell), it may be possible that only one of multiple types of RA procedures may be associated with congestion. For example, on some occasions, a two-step RA procedure may be associated with greater congestion (e.g., due to greater traffic resulting from more devices communicating using the two-step RA procedure) than a four-step RA procedure). On other occasions, a two-step RA procedure may be associated with less congestion (e.g., based on less usage by devices using the two-step RA procedure) than a four-step RA procedure.

As described further herein, a wireless device and/or a base station may use a message format (e.g., MAC RAR format) that enables a base station to indicate different backoff times that a wireless device should wait before a retransmission in an RA procedure (e.g., in a two-step RA procedure or a four-step RA procedure). By enabling the base station to indicate different RA procedure backoff times, a base station may be able to better handle differing congestion levels for different RA procedure channel conditions. At least some wireless devices may support multiple types of RA procedures (e.g., both two-step and four-step RA procedures, or other types of RA procedures), while other wireless devices may support fewer or only one type of RA procedure (e.g., a four-step RA procedure). Due to different RA procedure capabilities and requirements, different amounts of congestion may arise across different RA procedures in a cell. Enabling the base station to indicate (and/or the wireless device to determine) different RA procedure backoff times may allow the base station to better handle these different amounts of congestion arising from the different types of RA procedures (or different types of devices that may attempt to connect to the base station) in a cell. Performance may be improved in a network (e.g., for base station and/or wireless devices in a cell), based on using a message format that indicates different backoff times associated with different RA procedures.

PUSCH resources may be configured separately from PRACH resources. A periodicity, an offset, and/or a PUSCH resource size in each PUSCH occasion may be configured by RRC (broadcasting, multicasting, and/or unicasting), for example, configured grant Type 1, configured grant Type 2, and/or DL/UL SPS (e.g., in LTE and NR). One or more PUSCH occasions may be associated with one or more PRACH occasions. One or more PUSCH occasions may be associated with and one or more downlink reference signals (e.g., SSBs and/or CSI-RSs). The association (e.g., between one or more PUSCH occasions and one or more PRACH occasions, and/or between one or more PUSCH occasions and one or more downlink reference signals) may be one-to-one, multi-to-one, one-to-multi, and/or multi-to-multi mapping.

A PUSCH resource configuration of a two-step RA procedure may comprise, for example, a base station configuring a relative location of a PUSCH occasion with respect to the PRACH occasion. The PUSCH occasions and the RACH occasion may have, for example, the same periodicity. One-to-one mapping between the PUSCH occasions and the RACH occasion may be configured for the wireless device. Information bits for the configuration may be reduced. The size of a PUSCH resource may be configured (e.g., based on RRC, MAC CE, and/or DCI) and/or pre-determined.

There may be no time gap and/or a small time gap between a PRACH occasion and its associated PUSCH occasion, for example, for a two-step RA procedure initiated in an unlicensed band. A wireless device configured with no or small time gap between the PRACH occasion and its associated PUSCH occasion may perform a first LBT procedure before the PRACH occasion, and/or the wireless device may not perform a second LBT procedure before the PUSCH occasion associated with the PRACH occasion. A wireless device configured with no or small time gap between the PRACH occasion and its associated PUSCH occasion may perform a first LBT procedure (e.g., CAT 4) before the PRACH occasion, and/or to wireless device may perform a second LBT procedure before the PUSCH occasion associated with the PRACH occasion. The first LBT procedure and the second LBT procedure may be different. For example, the first LBT procedure may correspond to CAT 4, and the second LBT procedure may be a short LBT procedure (e.g., CAT 2).

For a large cell, a round-trip delay may exceed a CP, and a time gap may be configured to alleviate cross-slot interference (e.g., between preamble detection and PUSCH decoding at a base station). In such cases, a guard period in PUSCH resource may be configured and/or predefined, for example to leave a one or more symbol blacks (e.g., a last symbol blank), and/or to avoid the cross-symbol interference. A value of the guard period may depend on the cell size, and/or may be predefined, semi-statically configured, and/or indicated by L1/L2 signaling (e.g., MAC CE and/or DCI).

A base station may configure a PRACH resource and its associated PUSCH resource in the same slot (or subframe), for example, for a time domain resource allocation of PUSCH for two-step RA procedure. The PUSCH resources may overlap with the PRACH, for example, for a frequency domain resource allocation of PUSCH for two-step RA procedure. Overlapping frequency resource allocation may reduce a number/quantity of bits for indication of configured PUSCH and/or PRACH resources. The time domain resource and/or the frequency resource allocation may not be in the same slot (or subframe) and/or may (or may not) be overlapped. A base station may flexibly configure the time domain resource and/or the frequency resource allocation for resource allocation.

A PUSCH occasion for two-step RA procedure may be a time-frequency resource for a payload transmission associated with a PRACH preamble in a first message (e.g., MsgA) of an RA procedure (e.g., two-step RA procedure). One or more examples of a resource allocation of a PUSCH occasion may comprise (but may not be limited to) PUSCH occasions that are separately configured from PRACH occasions. For example, for a PUSCH occasion may be determined based on a periodic resource indicated by a configured grant (e.g., configured grant Type 1/Type 2 and/or SPS). A wireless device may determine the PUSCH occasion further based on an association between the PRACH and PUSCH for a first message (e.g., MsgA) transmission.

Resource allocation of a PUSCH occasion may comprise, for example, that a base station may configure a relative location (e.g., in time and/or frequency) of the PUSCH occasion with respect to a PRACH occasion. The time and/or frequency relation between PRACH preambles in a PRACH occasion and PUSCH occasions may be, for example, a single specification fixed value. A time and/or frequency relation between each PRACH preamble in a PRACH occasion to the PUSCH occasion may be, for example, a single specification fixed value. Different preambles in different PRACH occasions may have different values indicating time and/or frequency relation to different PUSCHoccasions. For instance, time and/or frequency relation between PRACH preambles in a PRACH occasion and PUSCH occasions may be a single semi-statically configured value. A time and/or frequency relation between each PRACH preamble in a PRACH occasion to the PUSCH occasion may also be a semi-statically configured value. Different preambles in different PRACH occasions may have different values. Any combination of above examples may be implemented/configured, and the above time and frequency relations may, for example, not be in the alternative.

A resource allocation for a payload transmission in a PUSCH occasion may be predefined and/or configured, for example, for a two-step RA procedure. A size of a resource in such a PUSCH occasion may be predefined and/or may configured. The resource may be continuous or non-continuous (e.g., a base station may flexible configure the resource). The resource may be partitioned into a plurality of resource groups. A size of each of resource groups within a PUSCH occasion may be the same or different (e.g., depending on the configuration of the two-step RA procedure). Each resource group index may be mapped to one or more preamble index.

A base station may configure a wireless device with one or more parameters indicating a starting point of time and/re frequency for a PUSCH occasion, a number/quantity of resource groups, and a size of each of the resource groups. An index of each of the resource groups may be mapped to a preamble index (e.g., a particular preamble) and/or a particular PPRACH occasion. The wireless device may determine a location of each of resource groups at least based on a preamble index (e.g., in case RO and PUSCH occasion are 1-to-1 mapping) and/or based on an RO index and a preamble index (e.g., in the case of multiple ROs are associated with one PUSCH occasion).

The starting point of time/frequency for a PUSCH occasion may indicate a set of continuous basic unit of PUSCH resources. The size of a resource unit may be a fixed size (e.g., identical size across resource units). The total available number/quantity of basic units may be pre-configured. A wireless device may use one or multiple resource unit for a first message (e.g., MsgA) transmission, for example, depending on the payload size. The starting resource unit index may be mapped to a preamble index. The length and/or size of an occupied PUSCH resource (as the number of resource unit) may be either mapped to preamble index or explicitly indicated (e.g., in UCI). A number/quantity of resource groups and/or detailed mapping among preamble(s), resource group(s), and DMRS port(s) may be pre-defined and/or semi-statically configured (and/or indicated by DCI dynamically), for example, to avoid a blind detection from a base station when multiple preambles are mapped to the same resource group.

A base station may configure one or more MCSs and/or one or more resource sizes for a transmission of payload, for example, for a payload transmission via a PUSCH occasion in a two-step RA procedure. The MCS and/or resource size may be associated with and/or related to a size of the payload. A base station may configure one or more combinations (and/or associations) of a size of the payload, MCS, and resource size. One or more particular modulation types (e.g., pi/2-BPSK, BPSK, QPSK) may be associated with a small size of payload. One or more particular modulation types (e.g., QPSK) may be used for a wireless device with a particular RRC state (e.g., RRC IDLE and/or RRC INACTIVE). A number/quantity of PRBs used for payload transmission may be configured over an entire UL BWP and/or over a part of UL BWP (e.g., this may be predefined and/or semi-statically configured by RRC). One or more repetitions of payload may be supported, for example, a number/quantity of repetitions may be predefined, semi-statically configured, and/or triggered based on one or more conditions (e.g., RSRP of downlink reference signals, and/or a particular RRC state, and/or a type of a wireless device, e.g., stationary, IoT, etc.) for the coverage enhancement of a transmission of payload.

A base station may configure one or more RA configurations (e.g., one or more two-step RA configurations or other RA configurations) for a payload transmission. The one or more RA configurations (e.g., one or more two-step RA configuration or other RA configurations) may indicate one or more combinations of payload size, MCS, and/or resource size. The number/quantity of the one or more two-step RA configurations and one or more parameter values (e.g., payload size, MCS, and/or resource size) for each of the one or more RA configurations (e.g., one or more two-step RA configurations or other RA configurations) may depend on the content of a first message (e.g., MsgA) and/or an RRC state of a wireless device.

Based on configured two-step RA configuration parameters, a wireless device may transmit a first message (e.g., MsgA), for example, comprising at least one preamble via a PRACH occasion and/or a payload via a PUSCH occasion, to a base station. The first message (e.g., MsgA) may comprise an identifier for contention resolution. For example, a wireless device may construct a MAC header as the first message (e.g., MsgA) payload with a plurality of bits (e.g., 56 and/or 72 bits). The first message (e.g., MsgA) may comprise BSR, PHR, RRC messages, a connection request, etc. The first message (e.g., MsgA) may also comprise UCI. The UCI in the first message (e.g., MsgA) may comprise at least one of following: an MCS indication, HARQ-ACK/NACT and/or CSI report. HARQ for the first message (e.g., MsgA) may be combined for an initial transmission of the first message (e.g., MsgA) and one or more retransmissions of the first message (e.g., MsgA) via a PUSCH transmission. The PUSCH transmission of the first message (e.g., MsgA) may indicate a transmission time of the first message (e.g., MsgA). A size of the first message (e.g., MsgA) may vary, for example, depending on various factors such as service, use, priority, network conditions, network configuration parameter(s), etc.

Different (or independent) PRACH occasions may be configured differently for different RA procedures (e.g., two-step, and four-step RAs). The different (or independent) PRACH occasions may reduce receiver uncertainty and/or reduce access delay associated with the different RA procedures. The different (or independent) PRACH resources may be configured for an RA procedure (e.g., a two-step RA procedure) such that a base station identifies whether a received preamble is for a first type of RA procedure (e.g., two-step RA procedure) or a second type of RA procedure (e.g., four-step RA procedure). A base station may have the capability to determine whether to share RACH occasion(s) between multiple types of RA procedures (e.g., two-step RA procedure and four-step RA procedure). A base station may have the capability to determine configured shared PRACH occasions and/or different PRACH occasions, for example, by sending RRC messages (and/or by sending DCI, e.g., dynamically). One or more RACH occasions may be shared between multiple types of RA procedures (e.g., two-step RA procedure and four-step RA procedure). PRACH occasion(s) of a first type of RA procedure (e.g., a two-step RA procedure) may be separate from PRACH occasion(s) of a second type of RA procedure (e.g., a four-step RA procedure). A base station may configure one or more PRACH occasions shared between multiple types of RA procedures (e.g., a two-step RA procedure and a four-step RA procedure) and/or preambles partitioned for the multiple types of RA procedures (e.g., the two-step RA procedure and the four-step RA procedure).

Radio resources for transmissions of the preamble 2130 and one or more TBs 2140 may be configured in different channels, different subbands, different BWPs, and/or different UL carriers (e.g., one in NUL and the other one in SUL) that may require separate LBT procedures. A wireless device may perform a LBT procedure per channel, per subband, per BWP, and/or per UL carrier. For example, a regulation may require a wireless device to perform an LBT per 20 MHz frequency band.

Figure 30:
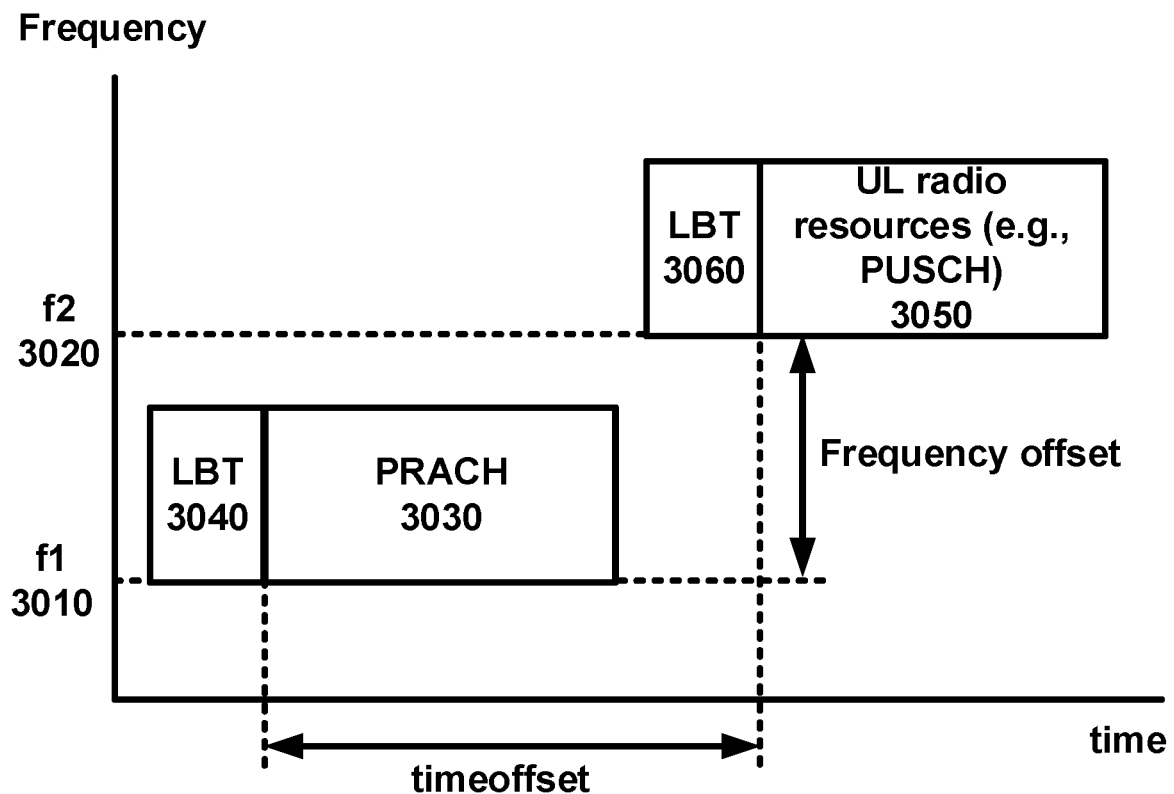
FIG. 30 shows an example of one or more LBT procedures performed for a two-step RA procedure.

FIG. 30 shows an example of one or more LBT procedures performed for a two-step RA procedure. UL radio resources 3050 may be allocated before or aligned with PRACH resources 3030 in time (e.g., frequency offset=0) and/or in frequency (e.g., timeoffset=0). A wireless device may perform a first LBT procedure (e.g., LBT 3040 in FIG. 30) before a first transmission of preamble 2830 (e.g., via PRACH resources 3030) and perform a second LBT procedure (e.g., LBT 3060 in FIG. 30) before a second transmission of one or more TBs 2840 (e.g., via UL radio resources 3050). A wireless device may perform none of, one of, or both of the first transmission and the second transmission, depending on results of the first LBT procedure and second LBT procedure. Separate LBTs before a PRACH message and/or data may provide benefits, such as: earlier transmission of the first transmission and/or second transmission by a wireless device, earlier transmission of a preamble than if a larger LBT were used, and increased probability that a transmission will be successful.

The first transmission may be performed if a first result of the first LBT procedure is idle. The second transmission may be independent of the first result. The second transmission may be performed if a second result of the second LBT procedure is idle. A wireless device may send (e.g., transmit) the preamble 2830, for example, in response to the first LBT procedure being idle. The wireless device may not be able to send (e.g., transmit) one or more TBs 2840 in response to the second LBT procedure being busy. A wireless device may not send (e.g., transmit) the preamble 2830 in response to the first LBT procedure being busy. The wireless device may send (e.g., transmit) one or more TBs 2840 in response to the second LBT procedure being idle. In a two-step RA procedure, one or more TBs may comprise an identifier of the wireless device, for example, so that a base station may identify and/or indicate which wireless device sent (e.g., transmitted) the one or more TBs. The identity may be configured by the base station and/or may be at least a portion of wireless device-specific information (e.g., resume ID, DMRS sequence/index, IMSI, etc.). A base station may identify and/or indicate the wireless device based on the identity in the one or more TBs, for example, based on a wireless device sending (e.g., transmitting) one or more TBs with no preamble 2830 (e.g., if a channel, e.g. PRACH 3030 is busy).

Separate LBT procedures for transmissions of a preamble and one or more TBs may be performed, for example, based on a two-step RA procedure configured in an unlicensed band. A wireless device may be configured (e.g., by a base station) with separate LBT procedures for a wideband operation (e.g., based on a bandwidth greater than 20 MHz). A wireless device may be configured (e.g., by a base station) with a wideband comprising one or more subbands and/or one or more BWPs, for example, based on wideband operation. Some of the one or more subbands may overlap in the frequency domain. Some of the one or more subbands may not overlap in the frequency domain. Some of the one or more BWPs overlap in the frequency domain. Some of the one or more BWPs may not overlap in the frequency domain. Separate LBT procedures may be used for transmissions via the two radio resources, for example, based on a wideband operation and/or two radio resources being allocated with a space larger than a threshold (e.g., 20 MHz). A wideband may comprise one or more subbands, and two radio resources may be allocated in different subbands. A first transmission scheduled in a first subband may use a first LBT procedure, and a second transmission scheduled in a second subband may use a second LBT procedure. The first LBT procedure and the second LBT procedure may be independent of each other.

UL radio resources for transmission of one or more TBs 2840 may be subject to a first LBT procedure (e.g., LBT 3060) and be independent of a second LBT procedure (e.g., LBT 3040) for transmission of the preamble 2830. PRACH resources 2830 for transmission of the preamble 2830 may be subject to a second LBT procedure (e.g., LBT 3060) and be independent of a first LBT procedure (e.g., LBT 3060) for transmission of one or more TBs 2840. A wireless device may perform separate LBT procedures for a first transmissions of the preamble 2830 and a second transmission of one or more TBs 2840, for example, based on f1 2910 and f2 2920 being configured in different channels, different subbands, different BWPs, and/or different UL carriers.

The PRACH resource and/or UL radio resources in FIG. 29, and/or FIG. 30 may be associated with at least one downlink reference signal (e.g., SSB, CSI-RS, DM-RS). A wireless device may receive (e.g., from a base station) at least one control message to indicate such an association. A configuration of each reference signal may have an association with at least one PRACH resource, that may be configured by RRC message and/or PDCCH signals, for example, based on the base station sending (e.g., transmitting) a plurality of downlink reference signals.

A random access response window may be used such that a wireless device may monitor a downlink control channel for a random access response sent (e.g., transmitted) from a base station, for example, as a response to a preamble transmitted by the wireless device. A base station may send (e.g., transmit) a message comprising a value of an RAR window. A message sent by the base station comprising a random access configuration parameters (e.g., RACH-ConfigGeneric) may indicate a value of an RAR window (e.g., ra-ResponseWindow in RACH-ConfigGeneric). The value of an RAR window may be fixed, for example, to 10 ms or other time duration. The value of an RAR window may be defined in terms of a number of slots as shown in RACH-ConfigGeneric. Based on the number/quantity of slots and/or a numerology configured for a random access procedure, a wireless device may determine a size of an RAR window. According to RACH-ConfigGeneric, the ra-ResponseWindow may have any of the following values: sl10, sl20, sl40, and sl80, for numerologies $\mu=0$, $\mu=1$, $\mu=2$, and $\mu=3$, respectively, as shown in the example of FIG. 31. The parameters in each numerology may (or may not) be limited to the case in FIG. 31. For example, the parameters in each numerology may be predefined with different subcarrier spacing, slot duration, and/or cyclic prefix size.

A wireless device may perform an access procedure (e.g., a random access procedure) with a base station. The access procedure (e.g., random access procedure) may comprise one or more retransmissions (e.g., two-step RA procedure and/or four-step RA procedure). A wireless device may perform/send one or more (re)transmissions of one or more preambles during a random access procedure. The wireless device may determine the one or more retransmissions of one or more preambles based on one or more conditions. The wireless device may determine the one or more retransmissions of one or more preambles, for example, if the wireless device determines that a random access response reception is not successful. The wireless device may determine that a random access response reception is not successful, for example, if at least one random access response, comprising one or more random access preamble identifiers that matches the transmitted PREAMBLE_INDEX, has not been received at least until an RAR window (e.g., ra-Response-Window configured by RRC, e.g., in RACH-ConfigCommon) expires. The wireless device may determine that a random access response reception is not successful, for example, if a PDCCH addressed to the C-RNTI has not been received via the Serving Cell via which the preamble was sent/transmitted at least until an RAR window for beam failure recovery (e.g., ra-ResponseWindow configured in BeamFailureRecoveryConfig) expires.

A wireless device may determine the one or more retransmissions of one or more preambles, for example, if the wireless device determines that a contention resolution is not successful. The wireless device may determine, based on Msg 3 for four-step RA procedure and/or MsgB for two-step RA procedure, whether the contention resolution is not successful. The wireless device (e.g., a MAC entity of the wireless device) may start a contention resolution timer (e.g., ra-ContentionResolutionTimer) and/or may restart the contention resolution timer (e.g., ra-ContentionResolution-Timer) at each HARQ retransmission in the first symbol after the end of a Msg3 transmission. The MAC entity of the wireless device may start or restart the contention resolution timer, for example, after the wireless device sends/transmits, to a base station, the Msg3. For a two-step RA procedure, the wireless device may fallback to a four-step RA procedure based on an explicit and/or implicit indication of MsgB. The wireless device may fallback to a four-step RA procedure, for example, if MsgB indicates at least one of: UL grant, TC-RNTI, and/or TA. The wireless device may transmit Msg3 after or in response to determining to fallback to the four-step RA procedure via resource(s) indicated by UL grant in Msg B. In this case, the wireless device may follow the four-step RA procedure, for example by starting the contention resolution timer, and/or determining whether the contention resolution is successful or not.

The wireless device may monitor a PDCCH, for example, at a time that the contention resolution timer (e.g., ra-ContentionResolutionTimer) is running (e.g., regardless of the possible occurrence of a measurement gap). A wireless device may stop the contention resolution timer and determine that a contention resolution is successful, for example, if a notification of a reception of a PDCCH transmission of a cell (e.g., an SpCell) is received from one or more lower layers, and/or if the wireless device determines/identifies that the PDCCH transmission is an indication of a contention resolution corresponding to a Msg3 transmission (or MsgB transmission) performed by the wireless device.

A wireless device may determine one or more retransmission of one or more preambles, for example, if the wireless device determines that a contention resolution is not successful. A wireless device may determine that a contention resolution is not successful, for example, if the wireless device does not receive an indication of a contention resolution at a time that a contention resolution timer (e.g., ra-ContentionResolutionTimer) is running. The wireless device may determine that a contention resolution is not successful, for example, if the contention resolution timer (e.g., ra-ContentionResolutionTimer) expires. The wireless device may discard a temporary C-RNTI (e.g., TEMPORARY_C-RNTI) that may be indicated by an RAR (or Msg B), for example, after or in response to an expiry of the contention resolution timer (and/or the contention resolution being unsuccessful).

A wireless device may determine one or more retransmissions of one or more preambles, for example, for a two-step RA procedure, if the wireless device does not receive a MsgB corresponding to a MsgA during a window configured to monitor MsgB in one or more DL control channels. A wireless device performing a two-step RA procedure may receive a response (e.g., MsgB) indicating a fallback to a four-step RA procedure. The wireless device may start a timer (e.g., ra-ContentionResolutionTimer), for example, after or in response to transmitting one or more TBs (e.g., Msg3) to a base station. The wireless device may determine one or more retransmissions of one or more preambles, for example, if the timer (e.g., ra-ContentionResolutionTimer) expires.

A wireless device be determine a quantity/number of transmissions (e.g., preamble transmissions) during an access procedure (e.g., a random access procedure). A wireless device may adjust/increment a counter for counting a quantity/number of preamble transmissions (e.g., PREAMBLE_TRANSMISSION_COUNTER) by 1 (or another value), for example, based on or in response to a random access response reception being unsuccessful and/or a contention resolution being unsuccessful. The wireless device may determine that a random access procedure is unsuccessfully completed and/or a MAC entity of the wireless device may indicate a random access problem to upper layer(s), for example, if the quantity/number of preamble transmissions satisfy (e.g., reach) a threshold (e.g., if PREAMBLE_TRANSMISSION_COUNTER=preamble-TransMax+1). The wireless device may determine that a random access procedure (and/or one or more retransmissions of one or more preambles) is not completed, for example, if the number/quantity of preamble transmissions does not satisfy (e.g., reach) a threshold, (e.g., if PREAMBLE_TRANSMISSION_COUNTER<preamble TransMax+1).

A wireless device may delay a retransmission of a preamble for a particular period of time (e.g., a backoff time) associated with a retransmission of one or more preamble. The wireless device may set the backoff time to 0 ms (or any other time duration), for example, if a random access procedure is initiated. The wireless device may set (or update) the backoff time, for example, based on a preamble backoff (e.g., PREAMBLE_BACKOFF) that may be determined by a value in a BI field of the MAC subPDU (e.g., BI field in FIG. 20B). The wireless device may set the preamble backoff (e.g., PREAMBLE_BACKOFF) to a value of the BI field of the MAC subPDU using a predefined table. The predefined table may comprise backoff parameter value(s). BI may indicate one of the backoff parameter values. The wireless device may set the preamble backoff (e.g., PREAMBLE_BACKOFF) to 30 ms (or any other time duration), for example, if the wireless device receives BI indicating index 3 (or 0010 in a bit string) and the index 3 is associated with 30 ms (or any other time duration) in the table. The wireless device may set the preamble backoff (e.g., PREAMBLE_BACKOFF) to a value of the BI field of the MAC subPDU multiplied by a scaling factor (e.g., SCALING_FACTOR_BI), for example, if a base station configures the wireless device with a scaling factor (e.g., scalingFactorBI)

by one or more RRC messages. SCALING_FACTOR_BI and scalingFactorBI may have the same value. scalingFactorBI may be configured by a base station for the wireless device. The wireless device may receive a message indicating scalingFactorBI and may store the value of scalingFactorBI as the value of SCALING_FACTOR_BI. The value of SCALING_FACTOR_BI may be maintained and may be used by the wireless device, for example, for multiplying the scaling factor (e.g., SCALING_FACTOR_BI) with the value of the BI field. The wireless device may set (or update) the preamble backoff (e.g., PREMABLE_BACKOFF) based on a BI field, for example, if a downlink assignment has been received via the PDCCH for the RA-RNTI and the received TB is successfully decoded, and/or if the random access response comprises a MAC subPDU with a backoff indicator (e.g., BI in FIG. 20B). The wireless device may set the preamble backoff (e.g., PREAMBLE_BACKOFF) to 0 ms, for example, if a downlink assignment has not been received via the PDCCH for the RA-RNTI and/or the received TB is not successfully decoded, and/or if the random access response does not comprise a MAC subPDU with a backoff indicator (e.g., BI in FIG. 20B).

A wireless device may determine a backoff time, for example, based on the preamble backoff (e.g., PREAMBLE_ BACKOFF). The wireless device may determine the backoff time, for example, if the wireless device determines that a random access response is not successfully received and/or a contention resolution is not successful. The wireless device may use a particular determination/selection mechanism to determine/select the backoff time. The wireless device may determine/select the backoff time, for example, based on a uniform distribution between 0 and the preamble backoff (e.g., PREAMBLE_BACKOFF). The wireless device may use other types of distribution to determine/select the backoff time based on the preamble backoff (e.g., PREAMBLE_BACKOFF).

The wireless device may ignore the preamble backoff (e.g., PREAMBLE_BACKOFF, a value in BI field in FIG. 20B, etc.) and/or may not have a backoff time. The wireless device may determine whether to apply the backoff time to a retransmission of at least one preamble, for example, based on an event type initiating the random access procedure (e.g., a beam failure recovery request, handover, etc.) and/or a type of the random access procedure (e.g., four-step or two-step RA and/or contention-based RA (CBRA) or contention-free RA (CFRA)). The wireless device may apply the backoff time to the retransmission, for example, if the random access procedure is CBRA (e.g., in which a preamble may be selected by the wireless device or a MAC entity of the wireless device) and/or if the wireless device determines that a random access procedure is not completed based on a random access response reception being unsuccessful. The wireless device may apply the backoff time to the retransmission, for example, if the wireless device determines that a random access procedure is not completed based on a contention resolution being unsuccessful.

A wireless device may perform a random access resource selection procedure (e.g., select at least one SSB or CSI-RS and/or select PRACH corresponding to at least one SSB or CSI-RS selected by the wireless device), for example, if the random access procedure is not completed. The wireless device may delay the subsequent random access preamble transmission (or delay a random access resource selection procedure) for the backoff time.

A wireless device may change/switch a channel (e.g., a BWP and/or a subband) to send/transmit at least one preamble for a retransmission. The change/switch may increase the quantity/number of preamble transmission opportunities. A base station may send/transmit, to a wireless device, one or more messages (e.g., broadcast messages and/or RRC messages) indicating a configuration of the one or more channels (e.g., BWPs, transmission/reception beams, SSBs, and/or subbands) for which one or more PRACHs may be configured. A wireless device may determine/select one of the one or more channels (e.g., BWPs and/or subbands) as a channel (e.g., a BWP, a transmission/reception beam, an SSB, and/or a subband) to send/transmit a first preamble. The wireless device may determine/select the channel (e.g., BWP and/or subband) based on an LBT procedure result. The wireless device may perform one or more LBT procedures on one or more channels. The wireless device may determine/select the channel among the channel(s) being determined (e.g., sensed) as idle. The wireless device may determine/select one of the channels being determined as idle, for example, based on a random selection.

The channel may be determined/defined based on a BWP configuration, a subband configuration, and/or another wireless resource configuration. A base station may configure a wireless device with one or more initial DL BWPs and/or UL BWPs. A configuration of each of the one or more initial DL BWPs and/or UL BWPs may comprise a dedicated DL BWP (e.g., BWP-DownlinkDedicated) (e.g., for an initial DL BWP) and/or a dedicated UL BWP (e.g., BWP-UplinkDedicated) (e.g., for an initial UL BWP) configurations. The dedicated DL BWP configurations and/or the dedicated UL BWP configurations may indicate at least one of the following: a subcarrier spacing, a cyclic prefix, a location and a bandwidth of each of the one or more initial DL and/or UL BWPs, a DL control channel configuration, a DL shared channel configuration, a rach-configuration (e.g., rach-ConfigCommon and/or rach-ConfigDedicated), a UL control configuration, and/or a UL shared channel configuration.

One of (e.g., initial) UL BWP(s) may be associated with at least one of (e.g., initial) DL BWP(s). The association may be indicated by configuration parameter(s) in the one or more messages transmitted by the base station and/or may be predefined. The association may be determined/set, for example, by a (e.g., initial) UL BWP configuration (or an (e.g., initial) DL BWP configuration) that may comprise a DL BWP index of one of one or more DL BWPs and/or a UL BWP index of one of one or more UL BWPs. The association may be determined/set by a predefined rule and/or a table. A (e.g., initial) UL BWP may have an association with a (e.g., initial) DL BWP that may have the same BWP index (e.g., UL BWP #0 with DL BWP #0, UL BWP #1 with DL BWP #1, and so on). A wireless device may monitor, for a random access response, a control channel, for example, based on the association. A wireless device may monitor, for a random access response, a control channel of a (e.g., initial) DL BWP associated with a (e.g., initial) UL BWP via which the wireless device sends/transmits at least one preamble. A wireless device may monitor, for a contention resolution, a control channel of a (e.g., initial) DL BWP associated with a (e.g., initial) UL BWP via which the wireless device transmits Msg3.

A wireless device may receive, from a base station, an RRC message indicating the association between one of (e.g., initial) UL BWP(s) and least one of (e.g., initial) DL BWP(s). A serving cell configuration (e.g., ServingCellConfigCommon or ServingCellConfigCommonSIB) in the RRC message may indicate a BWP configuration (e.g., DownlinkConfigCommon or DownlinkConfigCommonSIB for the initial DL BWP and/or UplinkConfigCommonSIB for the initial uplink BWP) for a random access procedure. One or more DL/UL BWP pairs may be configured. Each DL/UL BWP pair may comprise at least one (e.g., initial) DL BWP configuration and one or more (e.g., initial) UL BWP configuration. One (e.g., initial) DL BWP configuration and one or more (e.g., initial) UL BWP configuration may be paired. The RRC message (and/or the one (e.g., initial) DL BWP configuration and/or the serving cell configuration) may comprise parameters indicating one or more transmissions of one or more SSBs (or CSI-RSs). The one or more SSBs may be configured per a BWP (e.g., via the one (e.g., initial) DL BWP configuration) and/or per a cell (e.g., via the serving cell configuration). One or more PRACH resources configured in the one or more (e.g., initial) UL BWP configurations may be associated with the one or more SSBs. A wireless device may switch/change/select a UL BWP for a preamble retransmission among the one or more UL BWPs associated with the one (e.g., initial) DL BWP configuration, for example, if the wireless device determines/selects one of the one or more SSBs. A wireless device may determine/select PRACH resource(s) configured in one or more (e.g., initial) UL BWPs associated with one or more (e.g., initial) DL BWPs. The wireless device may determine/select PRACH resource(s) configured in one or more (e.g., initial) UL BWPs associated with one or more (e.g., initial) DL BWPs, for example, if a wireless device determines/selects one or more SSBs from the one or more (e.g., initial) DL BWPs.

A wireless device and/or a base station may perform an LBT procedure, for example, before sending/transmitting each message (e.g., Msg1, Msg2, Msg3, Msg4, MsgA, and/or MsgB) via an unlicensed band. Each message transmission attempt may experience an LBT failure that may cause a random access delay/latency. A large delay/latency during a random access procedure may not satisfy a control plane requirement. Increasing transmission opportunities configured over a frequency domain (e.g., over one or more channels, BWPs and/or subbands) may enhance the robustness of the random access procedure (e.g., improve the random access delay/latency caused by an LBT failure in an unlicensed band).

A base station may configure a wireless device with a plurality of channels (e.g., a plurality of DL and/or UL BWPs and/or subbands). For a Msg1 (e.g., MsgA) transmission, the wireless device may attempt to perform an LBT procedure in one or more UL BWPs configured with RACH resource(s). The wireless device may perform a Msg1 (e.g., MsgA) transmission via RACH resource(s) in a UL BWP, for example, if at least one LBT procedure is successful on the UL BWP. The probability of LBT success may increase, for example, if each channel status of the one or more UL BWPs is independent of each other.

For Msg2/Msg4 (or MsgB) enhancement, a base station may attempt to perform at least one LBT on a plurality of DL BWPs. The base station may perform a Msg2/Msg4 (MsgB) transmission, for example, if an LBT procedure is successful. A wireless device may monitor a PDCCH in one or more DL BWPs of the plurality of DL BWPs. The one or more DL BWPs may be associated with one or more UL BWPs via which the wireless device may send/transmit at least one of Msg1, Msg3 and/or MsgB. The one or more DL BWPs may be predefined and/or semi-statically configured by an RRC message transmitted by the base station.

For Msg3 enhancement, a base station may send/transmit at least one RAR comprising a plurality of UL grants corresponding to a plurality of BWPs. Each of the UL grants may comprise one or more fields indicating a BWP identifier and/or a time/frequency domain resource in a BWP corresponding to the BWP identifier. The wireless device may perform at least one LBT procedure on one or more of indicated BWPs (e.g., the plurality of BWPs). The wireless device may perform a Msg3 transmission, for example, if an LBT procedure is successful.

A wireless device may send (e.g., transmit) Msg1 and Msg3 via different channels (e.g., UL BWPs and/or subbands). A wireless device may receive Msg2 and Msg4 via different channels (e.g., DL BWPs and/or subbands). A wireless device may send/transmit Msg1 for a preamble retransmission via a channel (e.g., a UL BWP and/or a subband). The channel may be different from a channel via which the wireless device transmitted Msg1 in a previous preamble (re)transmission.

For the retransmission of at least one preamble (or MsgA), a wireless device may select a first channel (e.g., a first subband or a first UL BWP) that may be different from a second channel (e.g., a second subband or a second UL BWP) in which the wireless device may have performed a last preamble transmission (or a last MsgA transmission). In at least some systems, a wireless device may increase a transmit power of the retransmission of at least one preamble (or MsgA), for example, regardless of whether or not the first channel and the second channel are the same.

A wireless device may determine a transmit power of a retransmission of at least one preamble (or MsgA), for example, based on a value of PREAMBLE_POWER_RAMPING_COUNTER. The wireless device may set PREAMBLE_POWER_RAMPING_COUNTER equal to 1 as a random access procedure initialization. The wireless device (e.g., the MAC entity of the wireless device) may, for example, increment PREAMBLE_POWER_RAMPING_COUNTER by 1 for each random access preamble and/or for each transmission of at least one preamble transmitted, based on (e.g., after or in response to) determining that a random access reception is unsuccessful and/or that a contention resolution is unsuccessful. The wireless device (e.g., MAC entity of the wireless device) may increment PREAMBLE_POWER_RAMPING_COUNTER by 1, for example, if PREAMBLE_TRANSMISSION_COUNTER is greater than one; if the notification of suspending power ramping counter has not been received from lower layers (e.g., the notification is received after in response to a preamble transmissions being dropped due to an LBT failurem and/or in response to a spatial filter is changed); and/or if SSB or CSI-RS selected is not changed from the selection in the last random access preamble transmission. The wireless device may determine a value of DELTA_PREAMBLE, for example, based on a preamble format and/or numerology selected for the random access procedure (e.g., one or more values of DELTA_PREAMBLE are predefined associated with one or more preamble format and/or numerology. For a given preamble forma and a numerology, the wireless device may select a particular value of DELTA_PREAMBLE from the one or more values). The wireless device may determine the value of PREAMBLE_RECEIVED_TARGET_POWER according to the formula:

preambleReceivedTargetPower+DELTA_PREAMBLE+(PREAMBLE_POWER_RAMPING_COUNTER−1)×PREAMBLE_POWER_RAMPING_STEP.

The MAC layer of the wireless device may instruct the physical layer to transmit the random access preamble based on a selected PRACH occasion, corresponding RA-RNTI (e.g., if available), PREAMBLE_INDEX and/or PREAMBLE_RECEIVED_TARGET_POWER.

A base station may configure RACH occasion(s) shared between a two-step RA procedure and a four-step RA procedure. Configuring the RACH occasion(s) shared between a two-step RA procedure and a four-step RA procedure may enhance a spectral efficiency. Depending on resource utilization, spectral efficiency, and/or congestion level of a cell, the base station may determine whether to configure the RACH occasion(s) shared between a two-step RA procedure and a four-step RA procedure. The base station may configure one or more associations between one or more downlink reference signals (SSBs or CSI-RSs) and one or more RACH occasions for the two step RA procedure and the four-step RA procedure. A wireless device may receive, from the base station, one or more messages (e.g., broadcast, unicast, and/or multicast) indicating the one or more messages. A first wireless device and a second wireless device may select the same RACH occasion (RO) for transmitting at least one preamble, for example, for the RACH occasion(s) shared between a two-step RA procedure and a four-step RA procedure, if a first wireless device initiating the two-step RA procedure and a second wireless device initiating the four-step RA procedure select the same downlink reference signal. The base station may configure a first group of preambles for the two-step RA procedure and a second group of preambles for the four-step RA procedure. The first group of preambles and the second group of preambles may be partitioned from one or more preambles (e.g., among a plurality of preambles, one or more first preambles of the plurality of preambles are assigned for the two-step RA procedure and one or more second preambles of the plurality of preambles are assigned for the four-step RA procedure). The one or more preambles may be generated from the same parameter set (e.g., a same root sequence). The base station may configure two groups of preambles by configuring different parameter sets: one group for the two-step RA procedure; and another group for the four-step RA procedure. The two-step RA procedure and the four-step RA procedure may share the same group of one or more preambles.

In at least some systems, after or in response to transmitting at least one preamble via an RO, a wireless device may determine an RA-RNTI based on time and frequency resource indicator (e.g., s_id, t_id, f_id, and/or ul_carrier) and start to monitor a downlink control channel (e.g., PDCCH) for an RAR scrambled by the RA-RNTI. A particular DCI format (e.g., DCI format 1_0 scrambled by the RA-RNTI) that the wireless device received from the downlink control channel may indicate a DL assignment of PDSCH where the wireless device receives the RAR.

Example formats of an RAR are described above, for example with respect to FIG. 20A, FIG. 20B, FIG. 20C, FIG. 21, FIG. 22, FIG. 23A and/or FIG. 23B. Different wireless devices initiating different types of RA procedures may select the same RO for preamble transmission, for example, if ROs are shared between one or more different types of RA procedures (e.g., two-step RA procedure and four-step RA procedure). The different wireless devices may start to monitor the same PDCCH for a response based on the same RA-RNTI.

The base station may construct a MAC RAR compatible with the different wireless devices. Such a MAC RAR may multiplex one or more first responses for a two-step RA procedure and one or more second responses for a four-step RA procedure into the same MAC RAR. As described above (e.g., regarding FIG. 20A), each MAC RAR may be for one of a first type of RA procedure (e.g., a two-step RA procedure) and/or a second type of RA procedure (e.g., a four-step RA procedure). The MAC RAR that multiplexes the one or more first responses and the one or more second responses may have a common format, for example, based on whether a first wireless device initiating a two-step RA procedure (or first type of RA procedure) indicates (e.g., identifies) a corresponding response in the MAC RAR and/or based on whether a second wireless device initiating the four-step RA procedure (or second type of RA procedure) indicates (e.g., identifies) a corresponding response in the MAC RAR.

A format of the MAC RAR may be backwards compatible with a variety of RA procedures (e.g., existing two-step and four-step RA procedures). In such a backward compatible format, a first wireless may be device capable of performing a four-step RA procedure (e.g., a wireless device that may be compatible with NR Rel-15) and/or a second wireless device may be capable of performing a two-step RA procedure (and/or four-step RA procedure) (e.g., a wireless device that may be compatible with NR Rel-16). The MAC RAR that multiplexes the one or more first responses and the one or more second responses may have a format (e.g., a common format) based on whether a first wireless device capable of performing a four-step RA procedure determine (e.g., identifies) its corresponding response in the MAC RAR and/or based on whether a second wireless device capable of performing two-step RA procedure (and/or four-step RA procedure) determine (e.g., identifies) its corresponding response in the MAC RAR.

Figure 32:
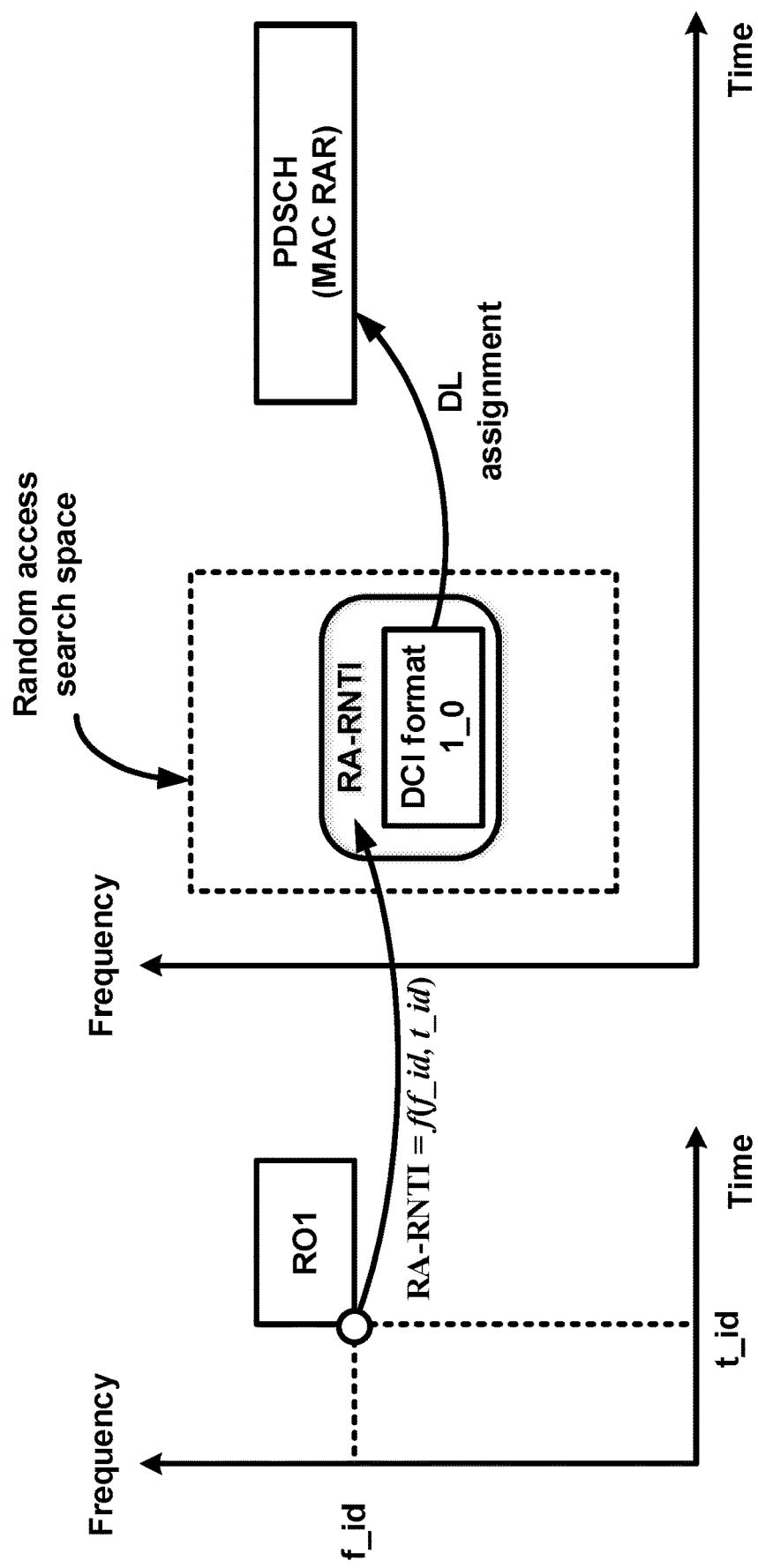
FIG. 32 shows an example for sending/receiving a MAC RAR.

FIG. 32 shows an example for sending/receiving a MAC RAR. A first wireless device may initiate a two-step RA procedure, and/or a second wireless device may initiate a four-step RA procedure. The two-step RA procedure and the four-step RA procedure may share ROs associated with one or more downlink reference signals (SSBs or CSI-RSs). The first wireless device and the second wireless device may select the same downlink reference signal among the one or more downlink reference signals. The first wireless device and the second device may determine the same RO (e.g., RO1 in FIG. 32) for preamble transmission(s).

A base station may semi-statically configure one or more associations between ROs and the one or more downlink reference signals. The first wireless device and/or the second wireless device may determine the same RO using the one or more associations, for example, based on (e.g., after or in response to) selecting the same downlink reference signals. The first wireless device and the second wireless device may determine the same RA-RNTI calculated based on time (e.g., t_id) and frequency (e.g., f_id) resource information of the same RO (e.g., RO1 in FIG. 30). Based on (e.g., after or in response to) transmitting at least one first preamble via the RO1, the first wireless device may start to monitor a PDCCH (e.g., random access search space configured in the PDCCH and/or Type1 PDCCH common search space set) for an RAR corresponding to the at least first preamble. Based on (e.g., after or in response to) transmitting at least one second preamble via the RO1, the second wireless device may start to monitor a PDCCH (e.g., random access search space configured in the PDCCH and/or Type1 PDCCH common search space set) for an RAR corresponding to the at least second preamble.

A MAC RAR format may support a four-step RA procedure. If a content of MAC RAR (e.g., MsgB) of a two-step RA procedure is different from one of the four-step RA procedures, the MAC RAR format may not support the two-step RA procedure. FIG. 20A, FIG. 20B, FIG. 20C, and FIG. 21 described above provide examples of MAC RARs for a four-step RA. Information indicated by one or more fields in FIG. 22, FIG. 23A, and/or 23B show example contents that a MAC RAR (e.g., MsgB) of a two-step RA procedure may comprise.

A first MACsubPDU and/or a second MACsubPDU may be provided, for example, for a MAC RAR to be compatible with both two-step RA and four-step RA procedures (or a plurality of types of RA procedures) and/or to support backward compatibility. The first MACsubPDU (e.g., comprising a first subheader and a first RAR) for a two-step RA procedure and a second MACsubPDU (e.g., comprising a second subheader and a second RAR) for a four-step RA procedure may have the same size. The first subheader of the first MACsubPDU and the second subheader of the second MAC subPDU may have the same size. The first RAR of the first MACsubPDU and the second RAR of the second MAC subPDU may have the same size.

At least some MAC RAR formats may not support both two-step and four-step RA procedures and/or may not support backward compatibility. MAC RARs described herein, however, may be compatible with both a two-step RA procedure and a four-step RA procedure, and/or may support the backward compatibility between two different versions or releases of access technologies (e.g., radio access technologies such as LTE, NR, other 3GPP access technologies, non-3GPP access technologies, etc.). An enhanced MAC RAR format and/or procedures may be used to receive a MAC RAR. The enhanced MAC RAR format and procedures to receive a MAC RAR described herein may support both two-step RA and four-step RA procedures, for example, by using a format (e.g., a common format), and/or may provide backward compatibility. The enhanced MAC RAR format and/or procedures to receive a MAC RAR may increase a spectral efficiency of a radio network, for example, by reducing a search space size and/or reducing a signaling overhead (e.g., by multiplexing two different types of responses into a same format).

A MAC RAR as described herein may comprise at least one of a first MAC sub PDU comprising a first subheader and a first RAR, a second MAC sub PDU comprising at least one of a second subheader and a second RAR, and/or a third MAC sub PDU comprising a third subheader and a third RAR. The first MAC sub PDU, the second MAC sub PDU, and/or the third MAC sub PDU may have the same size. The first subheader, the second subheader, and/or the third subheader may have the same size. The first RAR, the second RAR, and/or the third RAR may have the same size.

The first MAC subPDU may be a random access response for a four-step RA procedure. The first subheader may comprise a first preamble index matched to one of one or more first preambles assigned for the four-step RA procedure. The first RAR may comprise, for example, the RAR shown in FIG. 21 (or any other RAR). The first RAR may comprise, for example, one or more fields indicating TA command, UL grant, and/or TC-RNTI that may be used for a transmission (e.g., msg3 transmission). The second MAC subPDU may be a random access response (e.g., MsgB) for a two-step RA procedure and/or may indicate a fallback to the four-step RA procedure.

The second subheader may comprise a second preamble index matched to one of one or more second preambles assigned for the two-step RA procedure. The second RAR may have the same format as the first RAR. For example, the second RAR may comprise, the RAR shown in FIG. 21 (or any other RAR). The second RAR may comprise, for example, one or more fields indicating TA command, UL grant, and/or TC-RNTI that may be used for (re)transmission of a payload of MsgA.

The third MAC subPDU may be a random access response (e.g., MsgB) for a two-step RA procedure and/or may (e.g., implicitly) indicate a success of transmission (e.g., a MsgA transmission) of the two-step RA procedure. The third subheader may comprise the second preamble index matched to one of the one or more second preambles assigned for the two-step RA procedure. The third RAR may comprise one or more fields indicating a DL assignment (of PDSCH) based on which the wireless device receives PDSCH from a base station.

The PDSCH may comprise a contention resolution identifier that the wireless device may send (e.g., transmit) to the base station. For example, the wireless device may determine (e.g., identify), or determine (e.g., identify) a boundary of, any two MACsubPDUs. Each MACsubPDU from the MAC RAR may be based on a size assigned to be the same among the first MACsubPDU, the second MACsubPDU, and the third MACsubPDU.

The wireless device may determine (e.g., identify) whether each of MACsubPDU corresponds to a two-step or four-step RA procedure (or other type of RA procedure) based on different preamble(s) that may be dedicated to a two-step RA procedure and four-step RA procedure (or other type of RA procedure), respectively. The wireless device may determine (e.g., identify) whether a random access response for the two-step RA procedure is for a fallback to a four-step RA procedure or a success of the two-step RA procedure, for example, based on an indicator in the second MACsubPDU and/or the third MACsubPDU. The random access response may comprise a field indicating the fallback or the success based on its field value (e.g., a field value may comprise an indicator for fallback and/or success) A first value of the indicator may indicate a fallback (e.g., RAR is the second MACsubPDU). A second value of the indicator may indicate a success of the two-step RA procedure. An RAR indicated by the second value may comprise a DL assignment (e.g., RAR is the third MACsubPDU).

The size and/or length among the first MACsubPDU, the second MACsubPDU, and/or the third MACsubPDU may be aligned. To indicate alignment of the size and/or length of the first, second, and/or third MACsubPDUs, the first MACsubPDU may comprise a reserved field, the value of which may indicate whether the MACsubPDUs are aligned. A DL assignment may indicate scheduling information (such as a DCI e.g., DCI format 1_0) of a second PDSCH. The wireless device may consume significant amounts of power (e.g., battery power) to search for the PDCCH, which may be undesirable. The RAR indicating the DL assignment scheduling PDSCH may be beneficial, for example, by comparing the DL assignment indicating scheduling information of the PDSCH, such that the wireless device may reduce battery consumption by avoiding PDCCH searching. The RAR comprising the DL assignment may lack the indicator (e.g., that indicates whether the RAR indicates UL grant or DL assignment). In cases in which the DL assignment lacks the indicator, a MAC RAR comprising such an RAR may be less flexible to be compatible to two-step RA and four-step RA and/or may not support backward compatibility.

Figure 33:
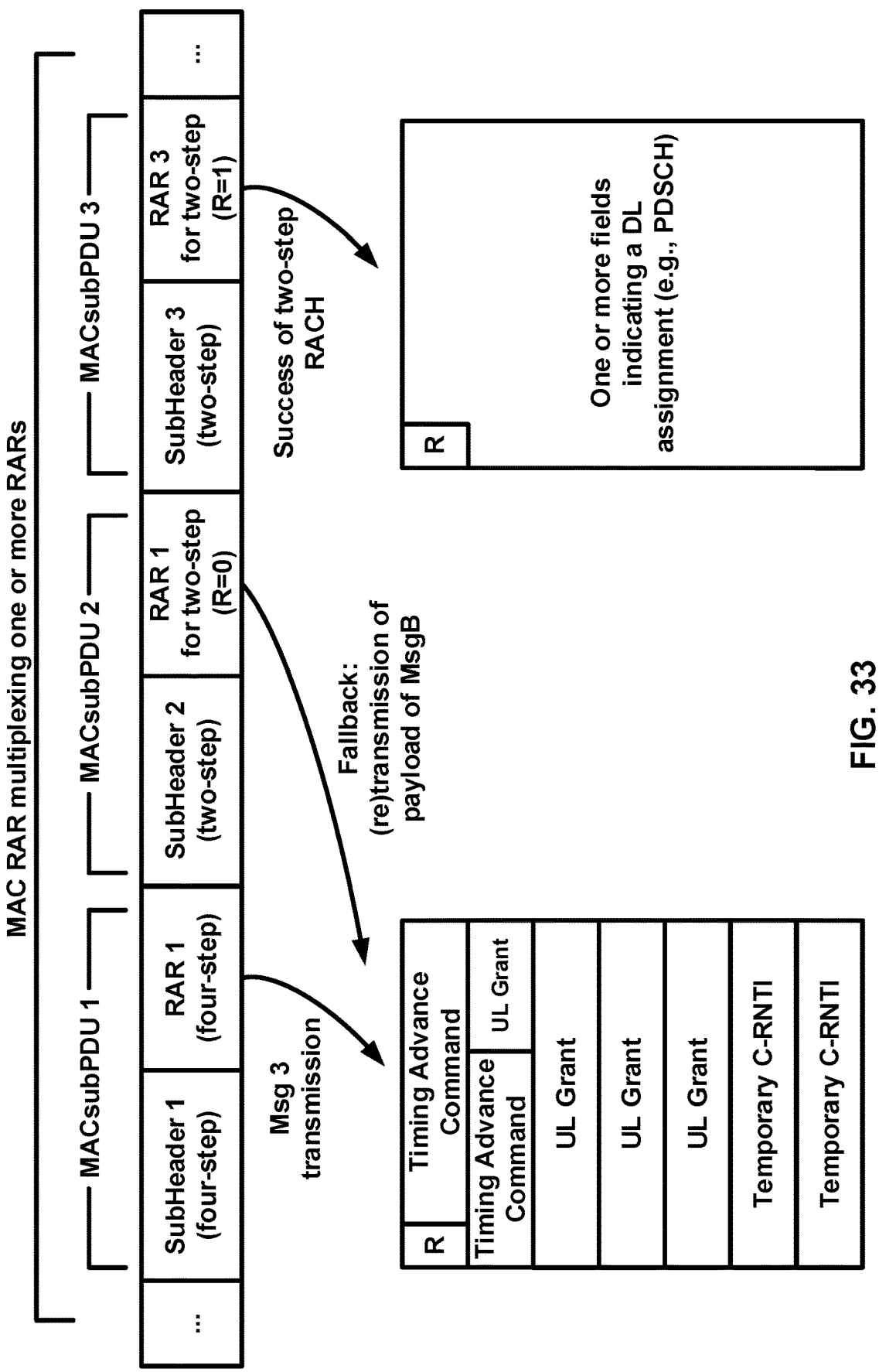
FIG. 33 shows an example MAC RAR that multiplexes one or more RARs
Figure 34:
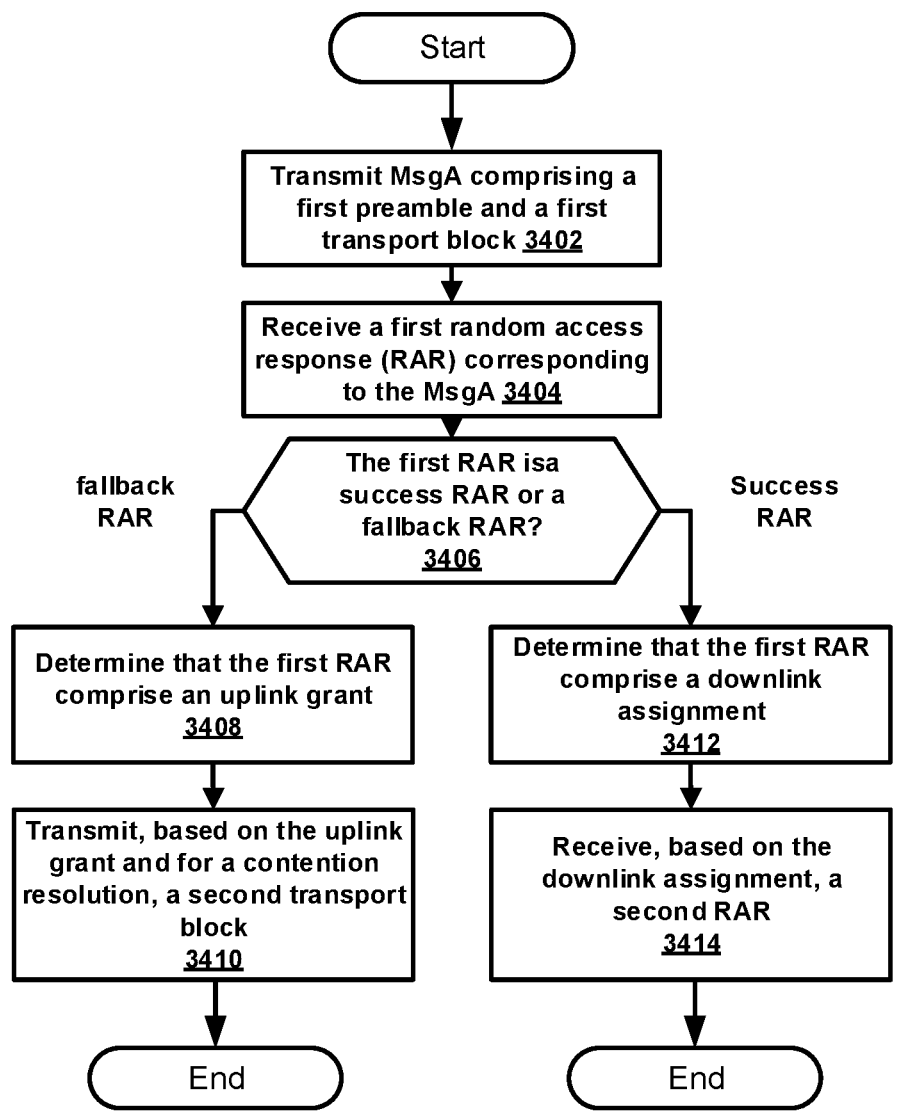
FIG. 34 shows an example RA procedure that may be performed by a wireless device.
Figure 35:
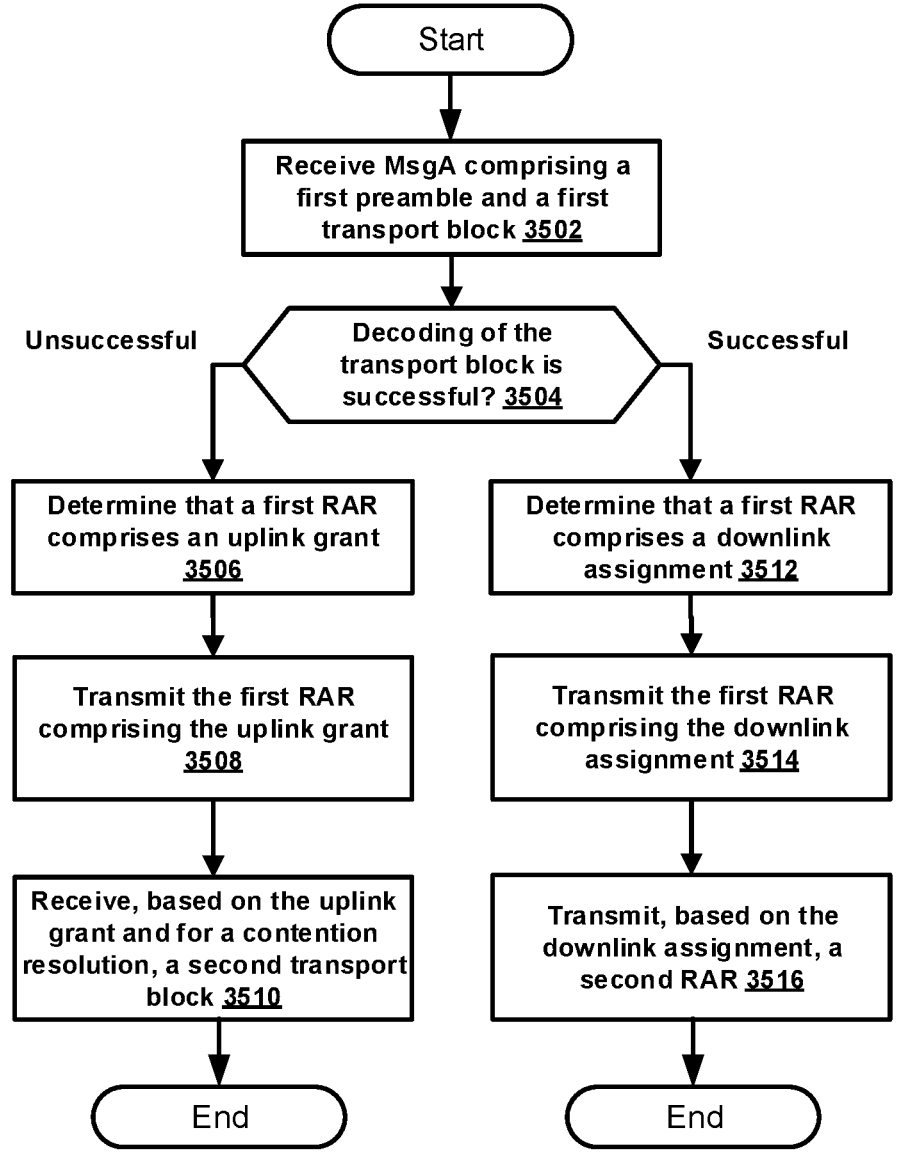
FIG. 35 shows an example of an RA procedure that may be performed by a base station.

FIG. 33 shows an example MAC RAR that multiplexes one or more RARs. FIG. 34 and FIG. 35 show respective flowcharts of a wireless device and a base station configured to perform RA procedures using a MAC RAR that multiplexes one or more MACSubPDUs (such as shown in FIG. 33).

If RO(s) are shared between the two-step RA procedure and the four-step RA procedure, a wireless device may receive a MAC RAR such as shown in in FIG. 33. The example MAC RAR shown in FIG. 33 multiplexes different types of RARs.

The RAR shown in FIG. 33 comprises one or more MACsubPDUs, each of which may indicate various properties about the RA procedure. MACsubPDU 1 may be a subPDU corresponding to the four-step RA procedure. MACsubPDU 2 may be a subPDU that indicates a fallback for the two-step RA procedure. MACsubPDU 3 may correspond to the two-step RA procedure and/or may indicate a DL assignment. A wireless device may receive, based on the DL assignment, a PDSCH. The PDSCH may comprise a contention resolution identifier. MACsubPDU 1, MACsubPDU 2, and/or MACsubPDU 3 may comprise a first field that indicates whether the corresponding RAR is for UL grant for the fallback or DL assignment for receiving a PDSCH. The first field in MACsubPDU 1 may be a reserved bit. For MACsubPDU 2 and MACsubPDU 3, the first field may be valid.

FIG. 34 shows an example RA procedure that may be performed by a wireless device. A wireless device may receive one or more messages comprising one or more configuration parameters of two-step RA procedure. The wireless device may initiate the two-step RA procedure based on the one or more configuration parameters. The wireless device may transmit (e.g., send) a first message (e.g., MsgA) comprising a first preamble and one or more transport blocks (block 3402 of FIG. 34). The wireless device may send (e.g., transmit) the first preamble via a PRACH (e.g., RACH occasion). The wireless device may send (e.g., transmit) one or more transport blocks via a PUSCH (e.g., PUSCH transmission occasions). Based on transmitting (e.g., sending) the first message, the wireless device may determine an RNTI. The wireless device may determine an RNTI, for example, based on time and frequency resource indications of the PRACH (e.g., RACH occasion).

The wireless device may monitor a downlink control channel (e.g., a PDCCH) for a response (e.g., MsgB) corresponding to the first message. The wireless device may start an RAR window, for example, based on (e.g., after or in response to) transmitting the first message (e.g., at a first PDCCH occasion). If the wireless device does not receive any response corresponding to the first message, the wireless device may perform a retransmission of one or more MsgA. If, in response, the wireless device receives DCI (e.g., DCI format 1_0) scrambled by the RNTI, the wireless device may receive the MAC RAR via PDSCH indicated by the DCI (block 3404 of FIG. 34).

The MAC RAR may comprise one or more MACsubPDUs. The wireless device may determine (e.g., identify) each of the one or more MACsubPDUs, for example, based on the MACsubPDUs having a predefined size (e.g., the each of the one or more MAC subPDUs having a same, predefined and/or predetermined size). Each of the one or more MACsubPDUs may comprise a subheader and a RAR.

As part of receiving and/or interpreting the MAC RAR, the wireless device may determine (e.g., detect or identify) a first MACsubPDU comprising a first RAR (block 3404 of FIG. 34) and a first subheader indicating a preamble index matched to the first preamble. The wireless device may determine whether the first RAR is a success RAR or a fallback RAR (block 3406 of FIG. 34). The RAR in the first MACsubPDU may comprise a first indicator (e.g., in a predefined code point) that may indicate whether the RAR corresponds to or is associated with a UL grant for (re) transmission of the one or more transport blocks (block 3408) or corresponds to or is associated with a DL assignment (block 3412). If the first indicator indicates that the RAR indicates a UL grant (block 3408), the wireless device may perform (re)transmission of the one or more transport blocks via a radio resource indicated by the UL grant. The (re)transmission of the one or more transport blocks may be a fallback from the two-step RA procedure to contention resolution based on the four-step RA procedure. The (re) transmission may comprise transmitting, based on the UL grant and for a contention resolution, a second transport block (TB) (block 3410 of FIG. 34). A base station may receive, based on the uplink grant and for contention resolution, the second TB from the wireless device.

The wireless device) may receive a PDSCH transmission comprising a contention resolution identifier, for examplem based on the first indicator indicating that the RAR at least indicates a DL assignment (block 3412 of FIG. 34). The DL assignment may indicate at least one of: frequency domain resource assignment, time domain resource assignment, VRB-To-PRB mapping, modulation and coding scheme (MCS), and/or TB scaling. If the contention resolution identifier matches the contention resolution identifier of MsgB (e.g., in the one or more transport blocks), the wireless device may determine that a contention resolution has successfully completed and/or that the two-step RA procedure successfully completed.

A first MAC RAR of two-step RA procedure and a second MAC RAR of four-step RA procedure may not be multiplexed into one MAC RAR. MAC RARs that do not multiplex two-step and four-step RA procedures into a single RAR may enhance a method of transmitting/receiving separate MAC RARs for two-step RA procedure and four-step RA procedure. Not multiplexing two-step and four-step RAs may provide backward compatibility and support the two-step RA procedure and/or four-step RA procedure.

For a non-multiplexed two-step and four-step RA procedure, a wireless device may transmit at least one preamble via RO(s) that may be shared between two-step RA procedure and/or four-step RA procedure. After or in response to transmitting the at least one preamble, the wireless device may start to monitor a PDCCH for an RAR. The wireless device may receive a particular DCI (e.g., DCI format 1_0) scrambled by a particular RNTI (e.g., RA-RNTI calculated based on time-frequency radio resource(s) of the RO(s)). The particular DCI may comprise a plurality of DL assignments. The plurality of DL assignments may comprise a first DL assignment for a first PDSCH and a second DL assignment for a second PDSCH. If the wireless device initiates the four-step RA procedure, the wireless device may receive, via a first PDSCH, a first MAC RAR (block 3412 of FIG. 34) comprising one or more first RARs for a four-step RA procedure. If the wireless device initiates the two-step RA procedure, the wireless device may receive, via a second PDSCH, a second MAC RAR (block 3414 of FIG. 34) comprising one or more second RARs for the two-step RA procedure.

For non-multiplexed two-step and four-step RA procedures, the network may transmit separate MAC RARs for two-step and four-step RA procedures by allocating two separate PDSCHs based on two DL assignments in the particular DCI. The particular DCI may be based on a DCI used to indicate a PDSCH having a MAC RAR in an existing four-step RA procedure. According to NR Release 15, a wireless device may receive, via a PDCCH, a DCI format 1_0 and may receive a MAC RAR via PDSCH indicated by a DL assignment in the DCI format 1_0. The DCI format 1_0 (e.g., scrambled by Ra-RNTI) may comprise one or more fields indicating the DL assignment and one or more reserved bits. The one or more reserved bits may indicate a second DL assignment based on whether a wireless device initiating the two-step RA procedure receive a corresponding MAC RAR via a second PDSCH indicated by the second DL assignment.

FIG. 35 shows an example of an RA procedure that may be performed by a base station. The receiving and sending steps in FIG. 35 that may be performed by the base station may correspond to the sending and receiving steps, respectively, in FIG. 34 that may be performed by the wireless device. The base station may receive the MsgA sent comprising a first preamble and a first TB (block 3502). The base station may attempt to decode the MsgA. The base station may determine whether decoding the TB of MsgA is successful (block 3504).

If the base station is unsuccessful in decoding the TB (successful branch of block 3504), the base station may determine that a first RAR comprises a UL grant (block 3506), and the base station may send (e.g., transmit) the first RAR comprising the UL grant to the wireless device (3508). The base station may receive, based on the uplink grant and for a contention resolution, a second transport block (block 3510), If the base station successfully decodes the TB (successful branch of block 3504), the base station may determine that a first RAR comprises a DL assignment (block 3512), and the base station may send (e.g., transmit) the first RAR comprising the DL assignment to the wireless device (block 3514). The base station may send (e.g., transmit), to the wireless device and based on the DL assignment, a second RAR (block 3516). If the base station determines that the first RAR comprises a UL grant (block 3506), the base station may send (e.g., transmit) the first RAR comprising the UL grant (block 3508).

Figure 36:
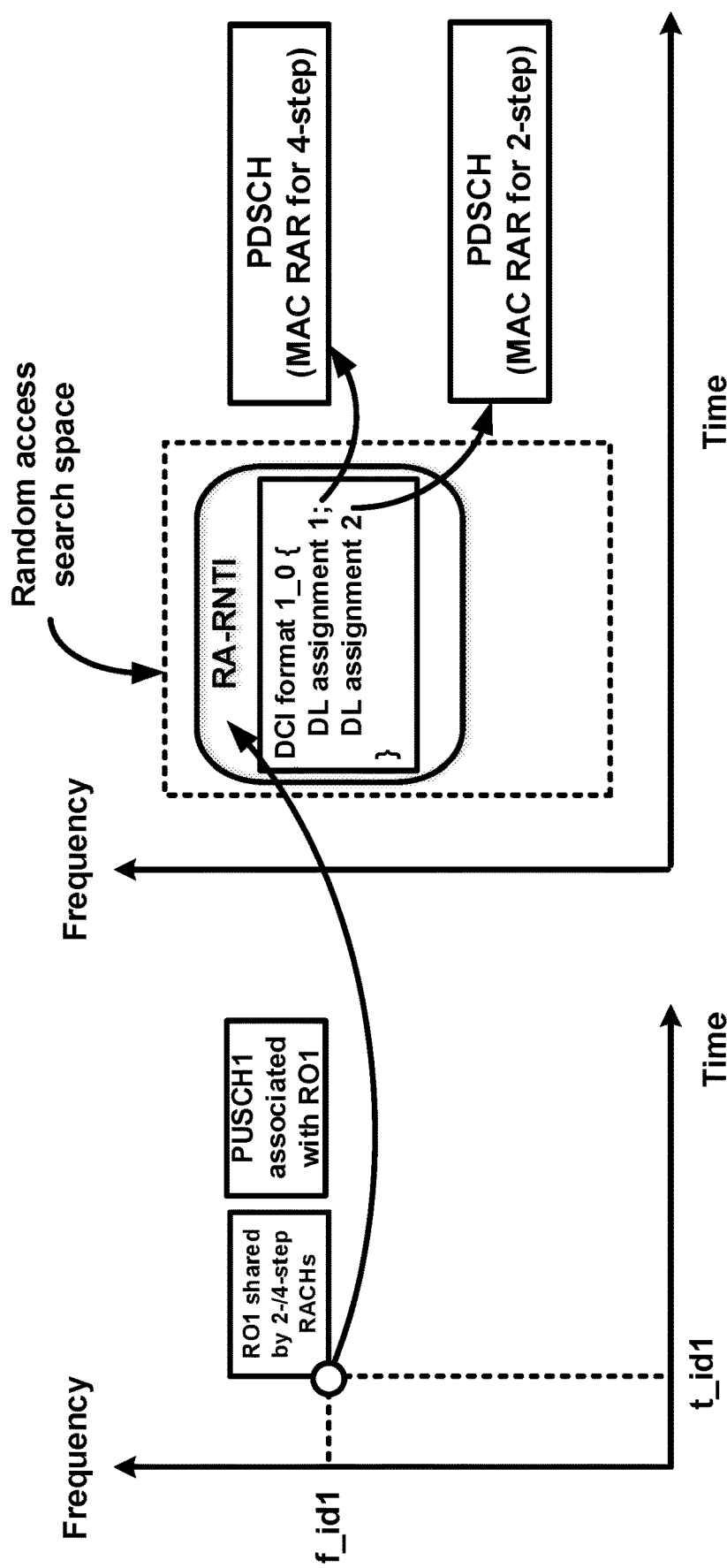
FIG. 36 shows an example of downlink assignments.

FIG. 36 shows an example of downlink assignments. A wireless device may receive, from a base station, one or more messages comprising RA configuration parameters (e.g., two-step RA procedure and/or four-step RA procedure). Based on the RA configuration parameters, the wireless device may initiate an RA procedure (e.g., two-step RA procedure or four-step RA procedure).

The wireless device may select a DL RS (SSB or CSI-RS) among one or more DL RSs. The wireless device may determine RO1 associated with the DL RS (e.g., associated between the RO1 and the DL RS, which may be indicated (e.g., identified) by the RA configuration parameters). If the wireless device initiates a two-step RA procedure, the wireless device may send (e.g., transmit) one or more transport blocks via PUSCH 1 associated with RO1. After or in response to the wireless device sending (e.g., transmitting) at least one preamble via RO1 (and/or the one or more transport blocks via PUSCH1 for the case of two-step RA procedure), the wireless device may start to monitor a PDCCH for a RAR based on an RA-RNTI. The RA-RNTI may be determined, for examplem based on time-frequency radio resource indicators of the RO1.

One or more wireless devices may send (e.g., transmit) one or more preambles, via RO1, which may use the same RA-RNTI (e.g., regardless of whether an RA procedure is two-step or four-step). The wireless device may receive particular DCI (e.g., DCI format 1_0) scrambled by the RA-RNTI. The particular DCI may comprise a plurality of DL assignments. A DL assignment that is sequentially first in the particular DCI may be compatible with a four-step RA procedure. A size of the particular DCI may be predefined and/or determined based on one or more semi-statically configured parameters (e.g., RRC parameters). A size of the DL assignment that is sequentially first in the particular DCI may be predefined and/or determined based on one or more semi-statically configured parameters (e.g., RRC parameters). If the wireless device initiates the four-step RA procedure (and/or is not capable of performing the two-step RA procedure), the wireless device may parse the sequentially first DL assignment in the particular DCI. Except for the sequentially first DL assignment, the wireless device may determine the rest of the particular DCI as reserved bit(s). A number of reserved bit(s) may correspond to the size of the particular DCI minus the size of the DL assignment that is sequentially first in the particular DCI). The wireless device may parse the plurality of DL assignments, for example, if the wireless device is capable of initiating (and/or determines to initiate) the two-step RA procedure.

IA particular DCI (e.g., DCI format 1_0) may comprise a first DL assignment (e.g., DL assignment 1) and a second DL assignment (e.g., DL assignment). A wireless device initiating a four-step RA procedure may receive a MAC RAR via PDSCH indicated by the first DL assignment (e.g., DL assignment 1). The wireless device may ignore (or may not be able to parse) the second DL assignment (e.g., DL assignment 2). The wireless device may determine a number of bits used for indicating the second DL assignment in the particular DCI as reserved bit(s).

A wireless that initiates a two-step RA procedure may receive a MAC RAR via PDSCH indicated by the second DL assignment (DL assignment 2) of FIG. 36. After or in response to receiving and/or parsing the DL assignment, the wireless device may identify a code point of the first DL assignment and/or the second DL assignment based on a predefined standard. In NR release 15, for example, the DCI format 1_0 scrambled by RA-RNTI comprise 16 reserved bits, and the 16 reserved bits may be used to indicate the second DL assignment.

A first DL assignment may comprise one or more first fields indicating at least one of: a first frequency domain resource assignment, a second time domain resource assignment, a first VRB-To-PRB mapping, a first modulation and coding scheme (MCS), and/or a first TB scaling. A second DL assignment may comprise one or more second fields indicating at least one of: a second frequency domain resource assignment, a second time domain resource assignment, a second VRB-To-PRB mapping, a second modulation and coding scheme (MCS), and/or a second TB scaling.

A particular DCI (e.g., DCI format 1_0) may not have enough bits (and/or space) to indicate a second DL assignment. One or more configuration parameters in the first DL assignment may be shared with the second DL assignment, for example, to reduce a number of bits indicating the second DL assignment. The one or more configuration parameters shared between the first DL assignment and the second DL assignment may be predefined, semi-statically configured, and/or dynamically configured.

The first DL assignment and the second DL assignment may be configured with one or more same configuration parameters, for example, to reduce the number of bits indicating the second DL assignment. The one or more same configuration parameters may comprise at least one of: frequency domain resource assignment, time domain resource assignment, VRB-To-PRB mapping, MCS, and/or TB scaling. The second DL assignment may not comprise any of the same (e.g., shared) configuration parameters indicated in the first DL assignment. The second DL assignment may not comprise (e.g., may lack) a field to indicating the MCS, for example, if the first DL assignment and the second DL assignment use the same MCS. The particular DCI may comprise a first DL assignment that also indicates the second DL assignment. The first frequency domain resource assignment and/or the first time domain resource assignment may indicate a second frequency domain resource assignment and/or the second time domain resource assignment.

The second DL assignment may comprise a parameter that indicates a frequency offset (and/or time offset). Based on the frequency offset, the wireless device may determine a second frequency domain assignment (and, respectively, a second time domain assignment) with respect to the first frequency domain assignment (and, respectively, the first time domain assignment). Any combination of the above MAC RAR DL assignments may be implemented. The first MAC RAR received based on the first DL assignment may comprise one or more RARs for the four-step RA procedure. A second MAC RAR which may, for example, be received based on the second DL assignment, may comprise one or more RARs for the two-step RA procedure. The first and second MAC RAR may have the same or different size and/or formats.

A first MAC RAR of a two-step RA procedure and a second MAC RAR of a four-step RA procedure may not be multiplexed into one MAC RAR. Multiplexing of two-step and four-step MAC RARs may enhance transmitting and/or receiving separate MAC RARs for both two-step and four-step RA procedures. Multiplexing of two-step and four-step MAC RARs may provide backward compatibility and/or may support the two-step RA procedure and/or four-step RA procedure.

A wireless device may send (e.g., transmit) at least one preamble via RO(s). The RO(s) may be shared between a two-step RA procedure and/or a four-step RA procedure. After or in response to transmitting the at least one preamble, the wireless device may start to monitor a PDCCH for an RAR. The wireless device may monitor the PDCCH with multiple different identifiers (e.g., RNTIs), for example, based on a type of initiated RA procedure. The wireless device may monitor the PDCCH with an RA-RNTI, for example, if the wireless device initiates a first type of RA procedure (e.g., a four-step RA procedure). The wireless device may monitor the PDCCH with a second identifier such as an RNTI (e.g., a C-RNTI or any other identifier), for example, if the wireless device initiates a second type of RA procedure (e.g., a two-step RA procedure). The wireless device may determine the second identifier (e.g., RNTI), for example, based on time-frequency resource indicator(s) of PUSCH associated with the RO(s). A wireless device that initiates the two-step RA procedure may transmit at least one preamble via PRACH and one or more transport blocks via PUSCH associated with the PRACH. The wireless device may determine the second identifier (e.g., RNTI), for example, based on a time-frequency resource indicator of the PUSCH. A wireless device and/or a base station may determine the second RNTI using other methods. For example, the second identifier (e.g., RNTI) may be determine based on at least one of: a symbol index of the PUSCH, a slot index of the PUSCH, a frequency index of the PUSCH, and/or an identifier of a UL carrier via which the PUSCH is configured. The second identifier (e.g., RNTI) may be determined (e.g., calculated) according to the following formula:

$$\text{second RNTI} = 1 + s\_id + 14 \times t\_id + 14 \times t\_id\_max \times f\_id + 14 \times 80 \times 8 \times ul\_carrier\_id$$

The second identifier (e.g., RNTI) may be determined in using any other method for determining an identifier (e.g., formula, based on other identifiers, etc.).

In the above formula, s_id may refer to the index of the first OFDM symbol of the specified PUSCH (0≤s_id<14); t_id may refer to the index of the first slot of the specified PUSCH in a system frame (0≤t_id<80); f_id may refer the index of the specified PUSCH in the frequency domain (0≤f_id<f_id_max); f_id_max may be predefined (e.g., a number of PRBs in UL BWP where PUSCH is configured) and/or semi-statically configured; and ul_carrier_id (e.g., equal to 0 for NUL carrier, and equal to 1 for SUL carrier, or vice versa) may refer to the UL carrier for which the PUSCH is configured. The wireless device may receive a particular DCI (e.g., DCI format 1_0) that is scrambled by the second RNTI. The particular DCI may comprise a DL assignment a PDSCH via which the wireless device receives an MAC RAR.

Figure 37:
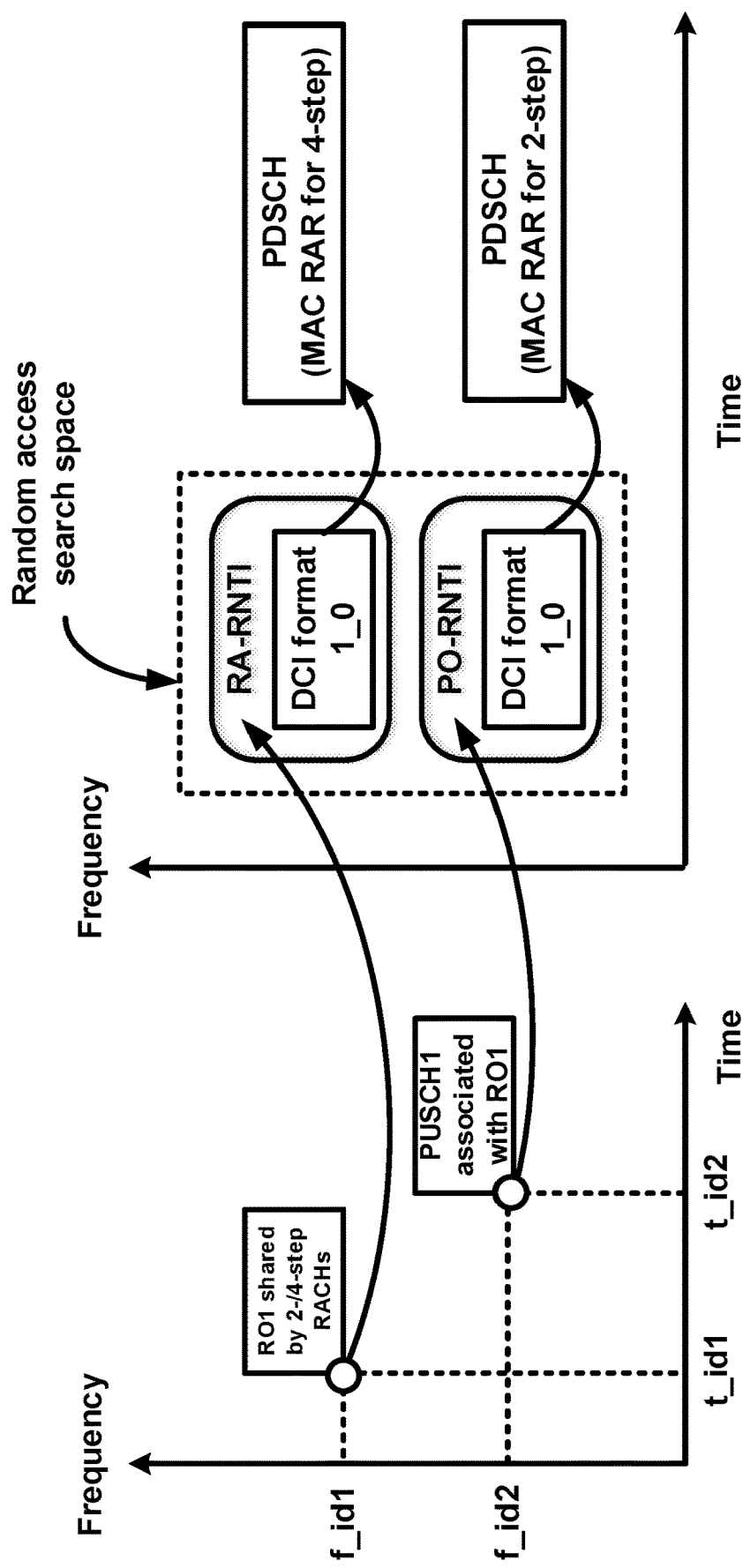
FIG. 37 shows an example of downlink assignments for different types of RA procedures.

FIG. 37 shows an example of downlink assignments for different types of RA procedures. A wireless device may monitor a PDCCH for shared RO(s) between different types of RA procedures. The wireless device may receive, from a base station, one or more message comprising RA configuration parameters (e.g., two-step RA procedure or four-step RA procedure). The wireless device may initiate an RA procedure (e.g., two-step RA procedure or four-step RA procedure). The wireless device may determine (e.g., select) a DL RS (SSB or CSI-RS) among one or more DL RSs. The wireless device may determine RO1 associated with the DL RS (e.g., associated between the RO1, and the DL RS may be indicated (e.g., identified) by the RA configuration parameters). The wireless device may send (e.g., transmit) one or more transport blocks via PUSCH 1 associated with RO1, for example, if the wireless device initiates a two-step RA procedure. After, or in response to transmitting at least one preamble via RO1 (and/or the one or more transport blocks via PUSCH1 for the case of two-step RA procedure), the wireless device may start to monitor a PDCCH for a RAR based on an identifier (e.g., RNTI). The identifier (e.g., RNTI) may be an RA-RNTI, for example, if the wireless device initiates the four-step RA procedure. The identifier (e.g., RNTI) may be a PUSCH-OCCASION-RNTI (PO-RNTI) that may be determined based on time-frequency radio resource indicators of PUSCH1, for example, if the wireless device initiates the two-step RA procedure. The base station may multiplex one or more first MAC RARs (e.g., for a four-step RA procedure) into a first MAC RAR. The base station may schedule to send (e.g., transmit) via a first PDSCH indicated by a first DCI (e.g., a first DCI format 1_0) scrambled by the RA-RNTI. Examples of the first MAC RAR formats are shown in FIG. 20A, FIG. 20B, FIG. 20C, and FIG. 21, described above. The base station may multiplex one or more second MAC RARs (e.g., for two-step RA procedure) into a second MAC RAR. The base station may schedule to send (e.g., transmit) via a second PDSCH indicated by a second DCI (e.g., a second DCI format 1_0) scrambled by the PO-RNTI. Examples of the second MAC RAR formats are shown in FIG. 20A, FIG. 20B, FIG. 20C, FIG. 21, FIG. 22, FIG. 23A and FIG. 23B.

Figure 38:
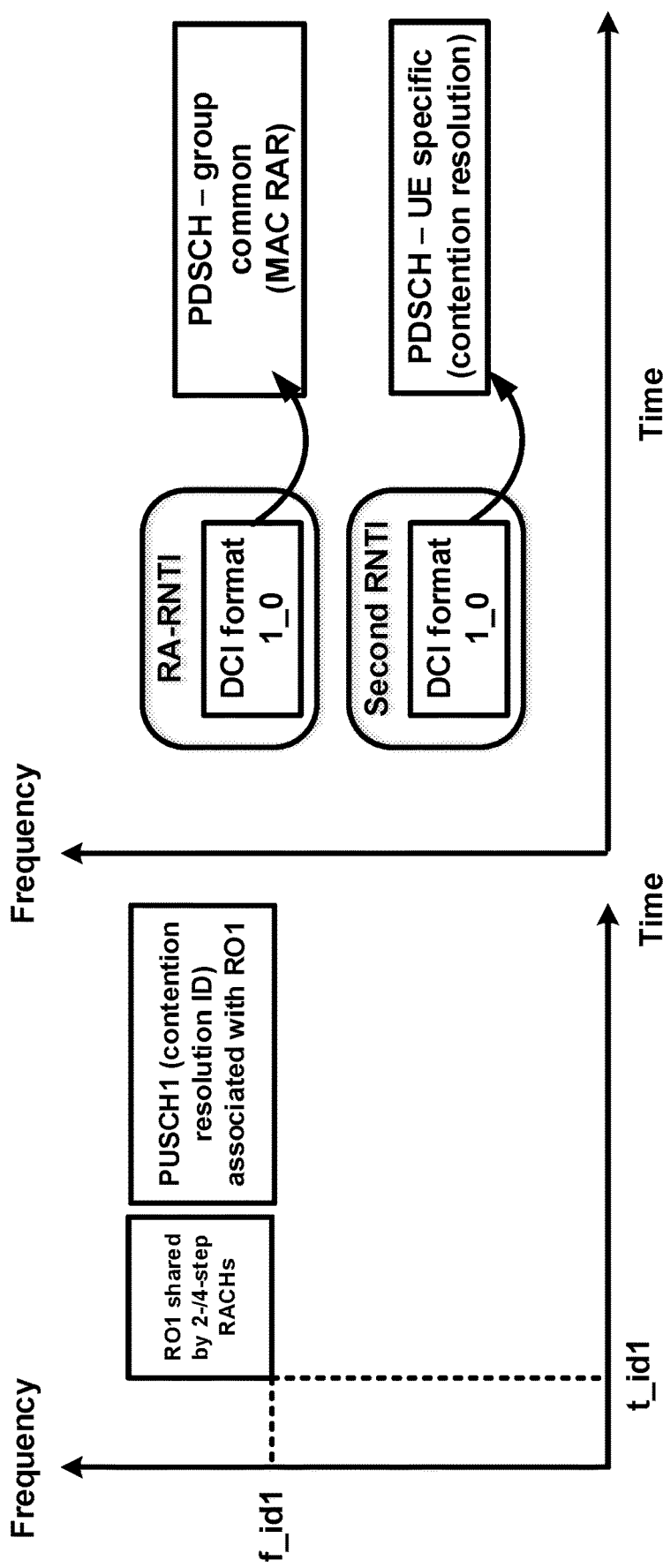
FIG. 38 shows an example of an RA procedure.
Figure 39:
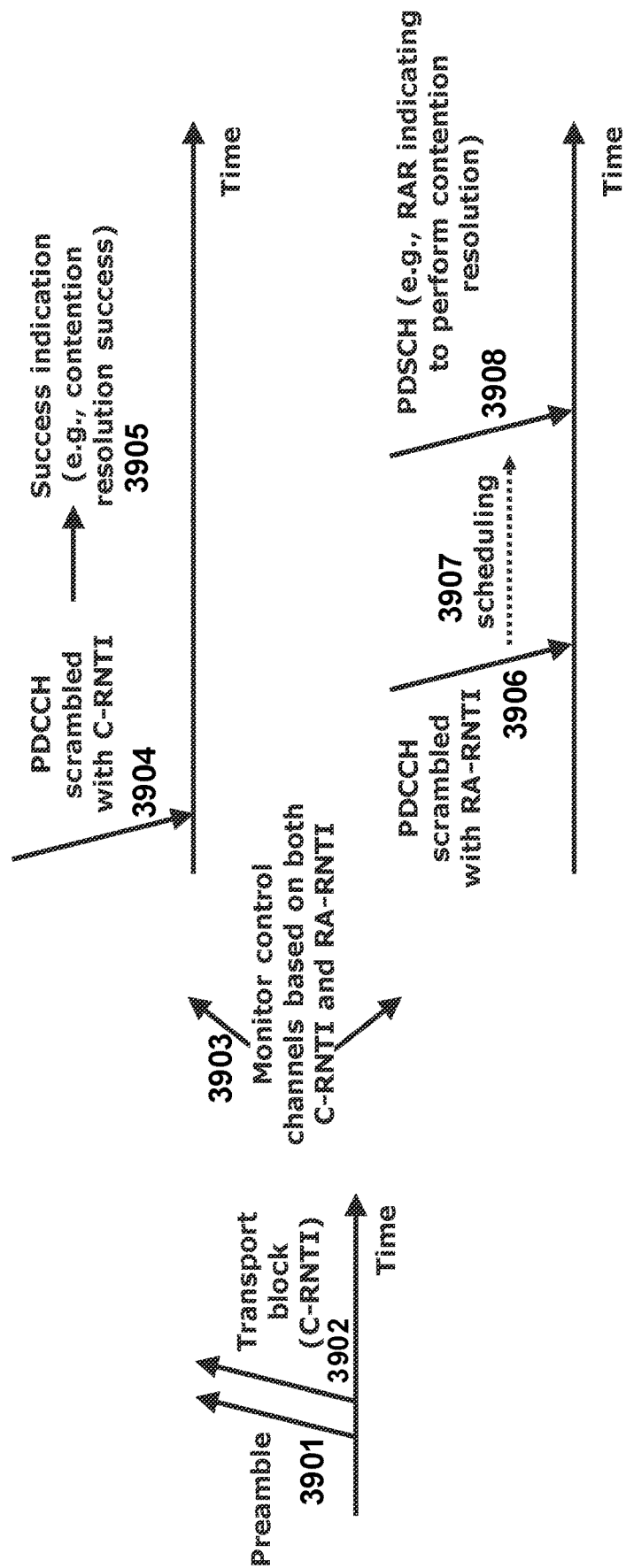
FIG. 39 shows an example of an RA procedure.
Figure 41:
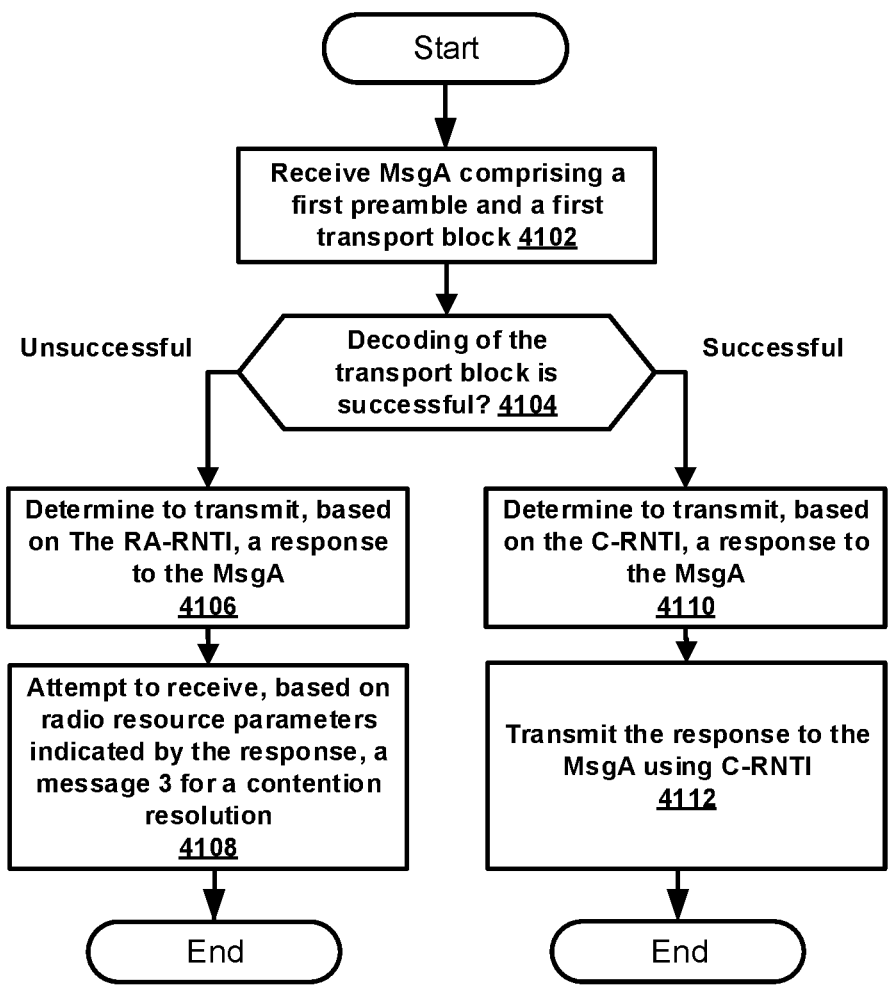
FIG. 41 shows an example of an RA procedure that may be performed by a base station.

FIG. 38 and FIG. 39 show examples of an RA procedure. FIG. 41 shows an example of the RA procedure that may be performed by a wireless device.

Figure 40:
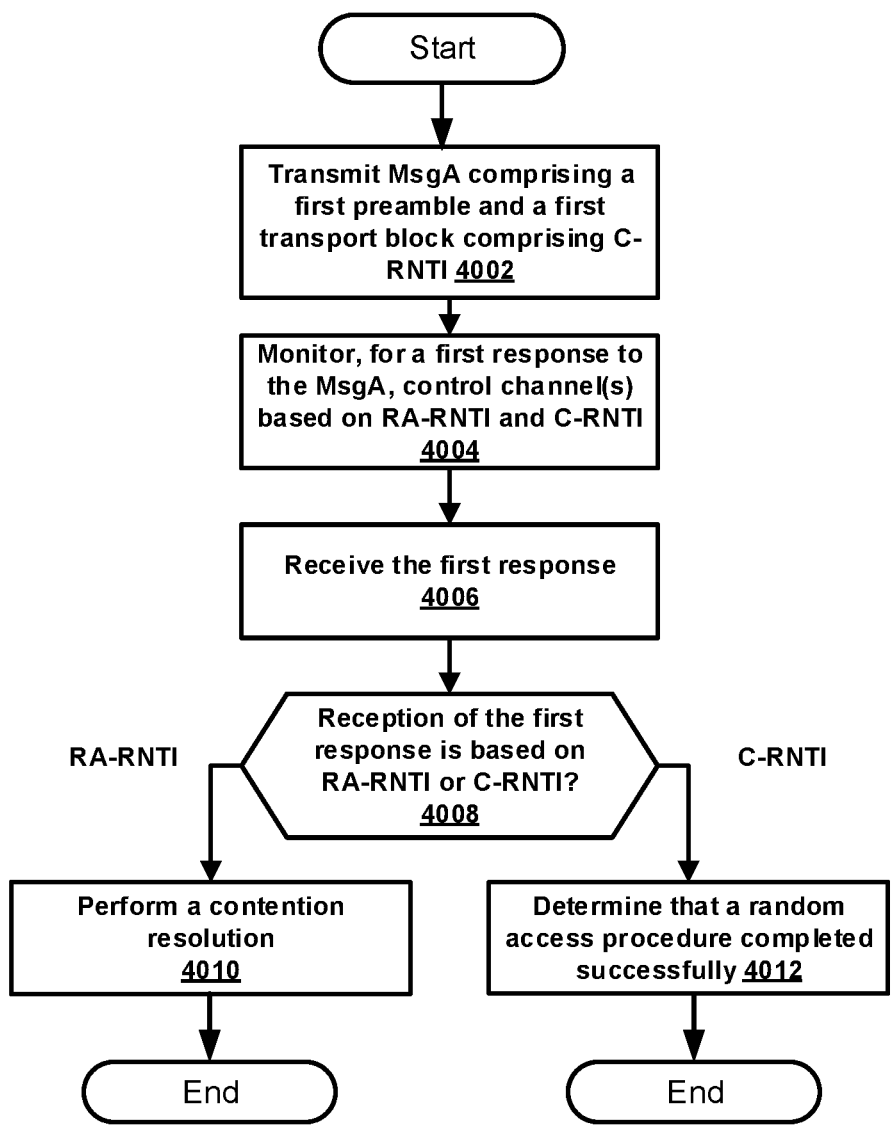
FIG. 40 shows an example of an RA procedure that may be performed by a wireless device.

With respect to FIGS. 38-40, a wireless device may receive, from a base station, one or more message configuring two-step RA configuration parameters. The wireless device may initiate a two-step RA procedure. The wireless device may transmit a first message (e.g., MsgA) comprising at least one preamble 3901 (e.g., transmitted via RO1) and one or more TBs 3902 transmitted via PUSCH1 (block 4002 of FIG. 40). The wireless device may include a contention resolution ID that may be a random identifier that the wireless device may generate, and/or an identifier of the wireless device (e.g., C-RNTI, and/or T-IMSI) (block 4002).

The wireless device may start monitoring PDCCH (e.g., shown with respect to reference numeral 3903) for a response (e.g., a fallback RAR or a success RAR) to the MsgA, for example, based on the RA-RNTI and/or a second RNTI such as a C-RNTI (block 4004 of FIG. 40). The wireless device may detect (or receive) via the PDCCH (e.g., as shown with respect to reference numeral 3903), first DCI and/or second DCI. The first DCI may be scrambled by an RA-RNTI. The second DCI may be scrambled by a sequence generated by the contention resolution ID (e.g., the C-RNTI of the wireless device). A generating rule of the sequence may be predefined and shared between the wireless device and the network. After or in response to transmitting the MsgA, the wireless device may start to monitor the PDCCH to receive at least one of the first DCI and/or the second DCI. The monitoring start time may be different between the first DCI and the second DCI. The wireless device may start to monitor the PDCCH for the first DCI, for example, based on (e.g., after or in response to) sending (e.g., transmitting) the at least one preamble via the RO.

The wireless device may start to monitor the PDCCH for the second DCI based on (e.g., after or in response to) sending (e.g., transmitting) the one or more TBs via the PUSCH1. The wireless device may start to monitor the first DCI and the second DCI based on (e.g., after or in response to) sending (e.g., transmitting) the at least one preamble via the RO. The wireless device may start to monitor the first DCI and the second DCI based on (e.g., after or in response to) sending (e.g., transmitting) the one or more TBs via the PUSCH1. The wireless device may receive the the first DCI via common search space (e.g., random access search space configured in the PDCCH and/or Type1 PDCCH common search space set). The wireless device may receive the second DCI via the common search space. The wireless device may determine whether the response is scrambled based on the RA-RNTI or C-RNTI (block 4008). The location (e.g., search space) at which the wireless device receives the first DCI and/or the second DCI may be predefined. If the wireless device receives, via a PDCCH, a second DCI scrambled with a C-RNTI in a reception 3904, the wireless device may determine a success 3905 (e.g., contention resolution success). If the wireless device receives the second DCI and a PDSCH (which may be received based on a DL assignment in the second DCI) comprises the contention resolution (e.g., C-RNTI), the wireless device may determine that the two-step RA procedure has successfully completed (block 4012).

If the wireless device receives, via a PDCCH, a first DCI scrambled with a RA-RNTI in a reception 3906, the wireless device may determine that the PDCCH indicates scheduling 3907. The scheduling 3907 may correspond to a DL assignment for a PDSCH reception 3908 (e.g., for receiving an RAR indicating to perform contention resolution). If the wireless device receives the first DCI and a PDSCH (which may be received based on a DL assignment in the first DCI) comprises a MAC RAR indicating an preamble index matched to the at least one preamble (e.g., the first response to MsgA is received based on the response being scrambled with the RA-RNTI), the MAC RAR may further indicate UL grant, TA value, TPC, and/or TC-RNTI. The wireless device may perform a Msg3 transmission and contention resolution (block 4010) based on a four-step RA procedure using the UL grant, TA value, TPC, and/or TC-RNTI, for example if the first response to MsgA is based on (e.g., scrambled with) the RA-RNTI.

The wireless device may receive a response comprising both first DCI and the second DCI. If the wireless device receives both the first and second DCI, the wireless device may continue to monitor the PDCCH based on (e.g., after or in response to) receiving the first DCI and/or the second DCI. The DCI that the wireless device determines to process may be left to the implementation of the specific wireless device. For example, the wireless device may ignore the first DCI and process the second DCI. The wireless device may ignore the second DCI and process the first DCI.

A wireless device may receive, random access configuration parameters from a base station. The wireless device may send (e.g., transmit), via uplink resources indicated by the random access configuration parameters, a first message comprising at least one preamble and one or more transport blocks. The wireless device may receive a random access response comprising: a preamble index indicating (e.g., identifying) the at least one preamble; an indicator; and/or one or more fields comprising grant information. The wireless device may determine, based on the indicator, whether the grant information indicate an uplink grant or a downlink grant. The wireless device may also receive, based on the one or more fields indicating the downlink grant, a second message via a downlink channel indicated by the one or more fields. The second message may comprise an identifier of the wireless device. The wireless device may send (e.g., transmit), to the base station, a response to the second message.

The wireless device may receive, from a base station, random access configuration parameters. The wireless device may send (e.g., transmit), via uplink resources indicated by the random access configuration parameters, a first message comprising at least one preamble. The wireless device may receive a random access response comprising: a preamble index indicating (e.g., identifying) the at least one preamble; an indicator; and/or one or more fields. Based on (e.g., after or in response to) the first message further comprising one or more transport blocks, the wireless device may determine, based on the indicator, whether the one or more fields indicate an uplink grant or a downlink grant. The wireless device may receive, based on the one or more fields indicating the downlink grant, a second message via a downlink channel indicated by the one or more fields. The second message may comprise an identifier of the wireless device. The wireless device may send (e.g., transmit), to the base station, a response of the second message. The wireless device may start a timer and/or determine a duration (e.g., a window) and monitor one or more downlink control channel (e.g., at least until the timer expires and/or during the duration).

A starting time of timer and/or a duration (e.g., a window) may comprise an offset. The wireless device may determine a starting time of the timer and/or duration (e.g., window) based on sending (e.g., transmitting) the at least one first preamble and/or the one or more downlink control channel. The wireless device may determine a starting time of the timer and/or duration (e.g., window) based on the sending (e.g., transmitting) the one or more transport blocks and/or the one or more downlink control channel. The one or more transport blocks may comprise the identifier of the wireless device. The at least one preamble and the one or more transport blocks may be multiplexed in time. The wireless device may receive, one or more reference signals amongst which the wireless device may determine a first reference signal associated with the uplink resources. One or more first antenna ports associated with the first reference signal may be quasi co-located with one or more second antenna ports associated with a random access response. The one or more second antenna ports associated with the random access response may be quasi co-located with one or more third antenna ports associated with second message.

The wireless device may receive, from a base station, random access configuration parameters indicating a random access channel and an uplink channel. The wireless device may send (e.g., transmit) to the base station: at least one first preamble via the random access channel; and one or more transport blocks comprising a wireless device identifier via the uplink channel. The wireless device may determine: a first radio network identifier based on the random access channel; and a second radio network identifier based on the wireless device identifier. The wireless device may monitor one or more downlink control channels for: a first response based on the first radio network identifier; and for a second response based on the second radio network identifier. The wireless device may, after or in response to receiving the second response, send (e.g., transmit), via an uplink control channel to the base station, a third response of the second response. The one or more downlink control channel may comprise common search space for the monitoring for a first response. The one or more downlink control channel may comprise a wireless device search space for the monitoring for a second response. The random access channel and the uplink channel may be multiplexed in time.

The wireless device may start a window for monitoring for a response (e.g., a PDCCH transmission). The wireless device may determine a starting time of the window, for example, based on sending (e.g., transmitting) the at least one first preamble and/or the one or more downlink control channels. The wireless device may determine a starting time of the window, for example, based on sending (e.g., transmitting) the one or more transport blocks and/or the one or more downlink control channel. The starting time of the window may comprise an offset. The one or more transport blocks may indicate a contention resolution identifier. The second response may indicate the contention resolution identifier.

FIG. 41 shows an example of an RA procedure that may be performed by a base station. The receiving and sending steps in FIG. 41 that may be performed by the base station may correspond to the sending and receiving steps, respectively, in FIG. 40 that may be performed by the wireless device. The base station may receive the first message (e.g., MsgA) from the wireless device (block 4102). The MsgA may comprise a first preamble and the first TB received from the wireless device (block 4102 of FIG. 4104). The base station may attempt to detect (or identify or determine) the first preamble of the MsgA. The base station may attempt to decode the first TB of the MsgA. The base station may determine whether decoding the TB of MsgA was successful (block 4104 of FIG. 40). If the base station is unsuccessful in decoding the MsgA, the base station may determine to send (e.g., transmit) a response (e.g., fallback RAR such as a RAR shown in FIG. 21) based on the RA-RNTI of the wireless device (block 4106 of FIG. 40). The response transmitted based on (e.g., using) the RA-RNTI may comprise radio resource parameters for an uplink transmission (e.g., for a message 3 transmission). The response transmitted based on (e.g., using) the RA-RNTI may indicate, to the wireless device, to perform a contention resolution. The base station may attempt to receive, from the wireless device and based on radio resource parameters indicated by the response, a message 3 for a contention resolution (block 4108 of FIG. 41). If the base station successfully decodes the TB (successful branch of block 4104), the base station may determine to send (e.g., transmit) a response based on a C-RNTI of the wireless device. The TB that the wireless device successfully decoded may comprise the C-RNTI. The response may comprise a grant (e.g., a DL assignment) for a subsequent transmission (e.g., DL transmission) for the wireless device (block 4110). The base station may send (e.g., transmit) the response, to the wireless device, based on (e.g., using) the C-RNTI (block 4112).

Figure 42:
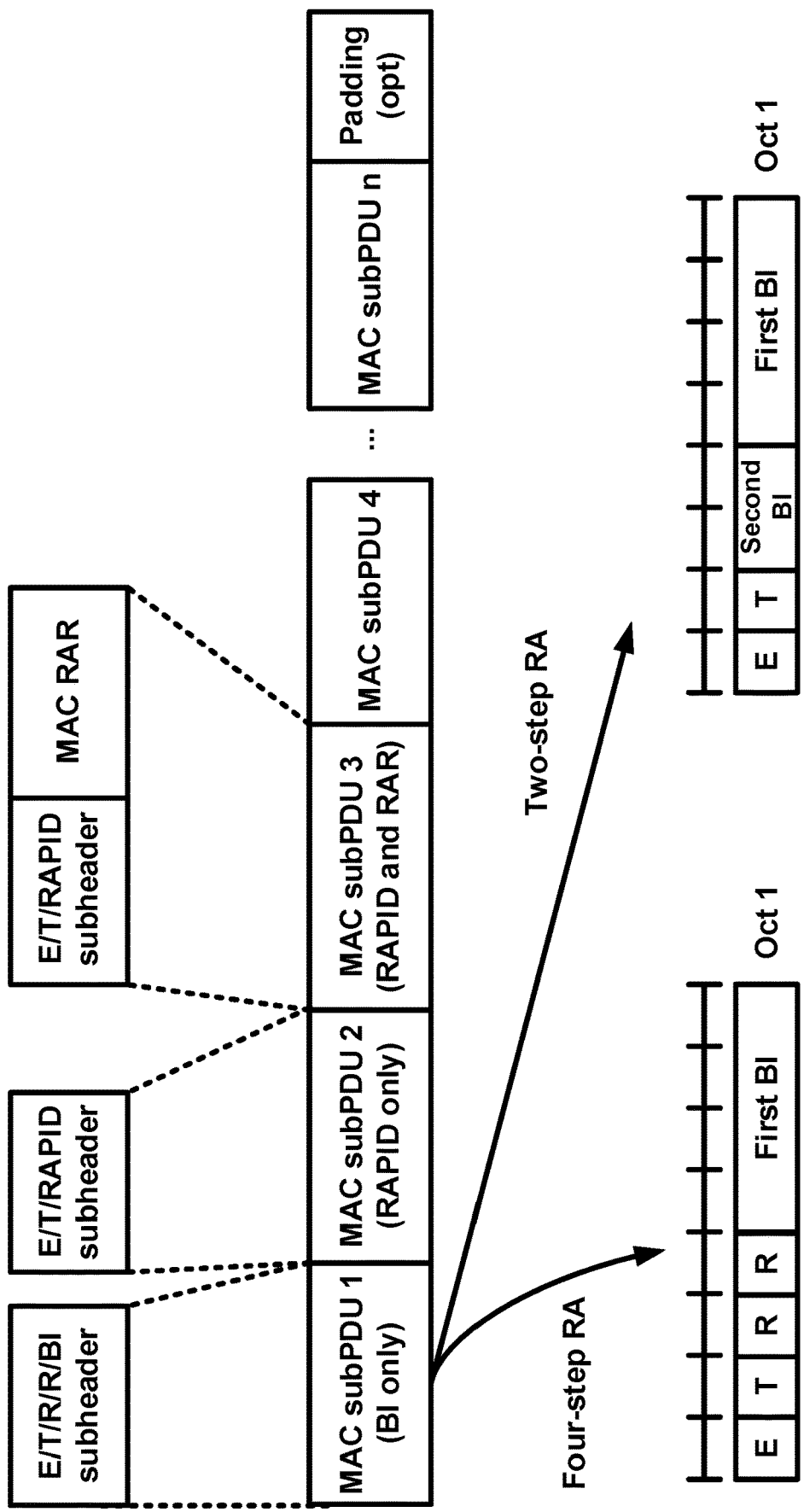
FIG. 42 shows an example of a MAC RAR format.

A MAC RAR may comprise a MACsubPDU. The MAC-subPDU may comprise a backoff indicator (BI), such as as shown in FIG. 20A and FIG. 20B. If a first RAR for a two-step RA procedure and a second RAR for a four-step RA procedure are multiplexed into an MAC RAR (e.g., MAC PDU), the MAC RAR (e.g., MAC PDU) may indicate a single BI based on which a network may control an interference and/or congestion level of the two-step RA procedure and four-step RA procedure in a cell. The network may control the interference and/or congestion level of the two-step RA procedure and the four-step RA procedure separately, for example, if, for example, a number of pre-amble collisions are detected for one type of RA procedure. The network may also indicate separate overload conditions for two-step RA procedure and four-step RA procedure in the cell based on the MAC RAR (e.g., MAC PDU) multiplexing the first RAR and the second RAR. To indicate separate overload conditions, an existing MAC RAR format may be modified such that a MAC RAR (e.g., MAC PDU) comprises a single MAC subPDU indicating a first BI for the four-step RA procedure and a second BI for the two-step RA procedure, for example, as shown in FIG. 42. Such a MAC RAR (e.g., MAC PDU) supports backward compatibility between two-step and four-step RA procedures and/or between different versions and/or releases of radio access technologies (e.g., between NR release 15 wireless device and NR release 16 or later). The MAC RAR may also use reserved bits in an existing MACsubPDU to indicate a BI for the two-step RA procedure.

FIG. 42 shows an example of a MAC RAR (e.g., MAC PDU) format. The MAC RAR (e.g., MAC PDU) may comprise one or more MAC subPDUs. The one or more MAC subPDUs may comprise at least one of: a first MAC subPDU indicating at least one BI, a second MAC subPDU comprising an RAPID, a third MAC subPDU comprising a first RAR for a four-step RA procedure, and/or a fourth MAC subPDU comprising a second RAR for a two-step RA procedure.

The first MAC subPDU may comprise one or more reserved fields (e.g., the two R fields in FIG. 42). A base station may indicate a BI for two-step RA procedure using the one or more reserved fields. A wireless device may use the first BI (e.g., ignore the field indicating the second BI in FIG. 42) to determine a backoff parameter value, for example, if the wireless device initiates a four-step RA procedure. The wireless device may determine a backoff parameter value at least based on the second BI, for example, if the wireless device initiates a two-step RA procedure. One or more second backoff parameter values may be predefined and/or semi-statically configured for the two-step RA procedure (e.g., as shown in table in FIG. 45 for a four-step RA procedure). The second BI may indicate one of the one or more second backoff parameter values. Four (or any other quantity of) backoff parameter values may be predefined and/or semi-statically configured for the two-step RA procedure. Each of the four (or other quantity of) backoff parameter values may be assigned to a particular index. The particular index may take any of the following values: {0, 1, 2, 3}, or {00, 01, 10, 11}, etc. The second BI may indicate the particular index. The wireless device may determine a backoff parameter value associated with the particular index, for example, based on the particular index indicated by the second BI.

The second BI may indicate a scaling factor BI. Based on a value indicated by a first BI field of the MAC subPDU, a wireless device may set a value of PREAMBLE_BACKOFF multiplied with SCALING_FACTOR_BI indicated by a second BI field (e.g., the scaling factor). The one or more scaling factor BI values may be semi-statically configured or predefined. The second BI field in the MAC subPDU of FIG. 42 may indicate one of the one or more scaling factor BI values. The one or more scaling factor BIs may take values such as: {zero, 0.25, 0.5, 0.75}, or other values. The wireless device may set (or update) the PREMABLE_BACKOFF based on the first BI field, for example, if the wireless device has received a downlink assignment on the PDCCH and has successfully decoded the received TB, and/or if the RAR comprises a MAC subPDU1 with a Backoff Indicator (e.g., the first BI in FIG. 42).

The PREAMBLE_BACKOFF may be set to zero. The wireless device may set the PREAMBLE_BACKOFF to 0 ms (or other duration), for example, if the wireless device has not received a downlink assignment on the PDCCH, and/or if the received TB is not successfully decoded, and/or if the RAR does not comprise a MAC subPDU with a BI (e.g., the first BI in FIG. 42).

The wireless device may determine a backoff time, for example, based on the value of PREAMBLE_BACKOFF. The wireless device may determine the backoff time, for example, if the wireless device determines that a random access response is not successful and/or a contention resolution is not successful. The wireless device may employ a selection mechanism to determine the backoff time. The wireless device may determine the backoff time, for example, based on a uniform distribution between 0 and the value of PREAMBLE_BACKOFF. The wireless device may employ any other type of distribution to select the backoff time based on the value of PREAMBLE_BACKOFF. The wireless device may ignore the value of PREAMBLE_ BACKOFF (e.g., a value in the first BI field in FIG. 42) and/or may not use a backoff time.

The wireless device may apply the backoff time to a retransmission. The wireless device may apply the backoff to a retransmission, for example, if the random access procedure is CBRA (e.g., if a preamble is selected by a MAC entity of the wireless device) and/or if the wireless device determines that a random access procedure is not completed based on a RAR reception being unsuccessful. The wireless device may apply the backoff time to the retransmission, for example, if the wireless device determines that a random access procedure has not completed, for example, based on a contention resolution being unsuccessful.

Figure 43:
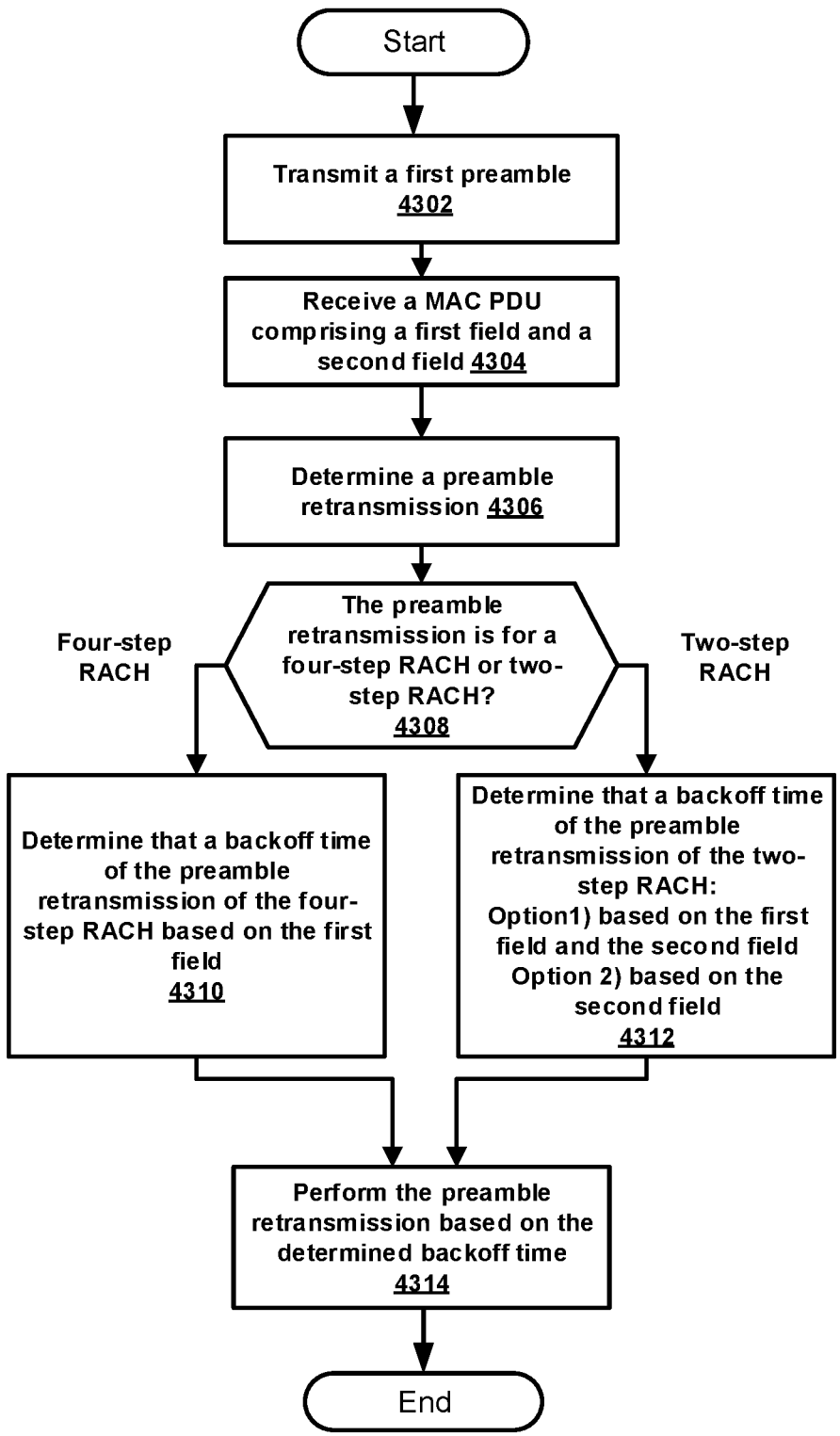
FIG. 43 shows an example of an RA procedure based on a backoff value.

FIG. 43 shows an example of an RA procedure based on a backoff value. A wireless device may receive, from a base station, random access configuration parameters comprising one or more scaling values. The wireless may device send (e.g., transmit), to a base station, at least one first preamble based on the random access configuration parameters (block 4302 of FIG. 43). The wireless device may receive a MAC RAR (e.g., MAC PDU—block 4304) from the base station comprising one or more fields (e.g., a first field and a second field). A first field of the one or more fields may indicate a first backoff parameter value of a four-step RA procedure. A second field of the one or more fields may indicate (or be used for indicating) a second backoff parameter value of a tow-step RA procedure. The second filed may be a scaling value of one or more scaling values that are predefined or semi-statically configured. The wireless device may determine a preamble retransmission (4306), which may comprise determining a range of a backoff time based on one or more of one or more values indicated by the first filed and/or the second field. The wireless device may determine whether the preamble for retransmission is for a four-step RACH or a two-step RACH (block 4308). The wireless device may determine the preamble for retransmission based on (e.g., after or in response to) not receiving (e.g., a determination that the wireless device has not received within a time duration) a random access response corresponding to the at least one first preamble. The wireless device may determine that the backoff time is for retransmission of the four-step RACH based on the first field of the MAC PDU (block 4310). If the wireless device determines that the backoff time is for a two-step RACH (block 4312), the wireless device may determine the backoff time based on values indicated by the first field and the second field of the MAC PDU (e.g., if the second field indicates a scaling value). If the wireless device determines that the backoff time is for a two-step RACH (block 4312), the wireless device may determine the backoff time based on a value indicated by the second field (e.g., if the second field indicates a backoff parameter value). The wireless device may send (e.g., transmit) at least one second preamble after the backoff time expires (block 4314).

The wireless device may start a response window based on a first time instance after sending (e.g., transmitting) the at least one first preamble. The wireless device may determine the first time for the response window based on a first symbol of a first common resource set configured to receive at least one random access response. The wireless device may receive, via a downlink control channel, the at least one random access response. The random access configuration parameters may indicate configuration parameters of the first common resource set. The wireless device may determine whether a RAR reception is not successful based on the one or more MAC PDUs lacking a RAR corresponding to the at least one first preamble.

The wireless device may start a timer, for example based on the backoff time and/or based on determining that the RAR reception was not successful. The wireless device may send (e.g., transmit) the at least one second preamble, for example, based on to an expiration of the timer. The wireless device may determine the backoff time from a range of backoff times. The range may be between zero and a first value. The first value for the range may be determined, for example, based on the backoff parameter value multiplied by the scaling value. The backoff time may also be determined (e.g., selected) from within the range (or between the zero and the first value), for example, based on a uniform distribution.

The wireless device may receive, from a base station, radio resource configuration messages indicating: first configuration parameters (e.g., for a two-step RA procedure). The wireless device may initiate the first type of RA procedure (e.g., a two-step RA procedure), for example, based on receiving the RRC messages indicating the first type of RA procedure. As part of the RA procedure, the wireless device may send (e.g., transmit), to the base station, at least one first preamble and/or one or more TBs (e.g., in a first MsgA) based on the first configuration parameters. The wireless device may receive, from a base station, a MACPDU comprising: a first field indicating a backoff parameter value; and a second field indicating a scaling value. The wireless device may, based on (e.g., after or in response to) the first type of random access procedure, determine a range of a backoff time based on the backoff parameter value and/or the scaling value. The wireless device may determine a preamble retransmission based on failing to receive a RAR corresponding to the at least one first preamble and/or one or more first TBs (e.g., in a first MsgA). The wireless device may determine the backoff time based on the range, and/or based on failing to receive the RAR. The wireless device may send (e.g., transmit) at least one second preamble after the backoff time.

Figure 44:
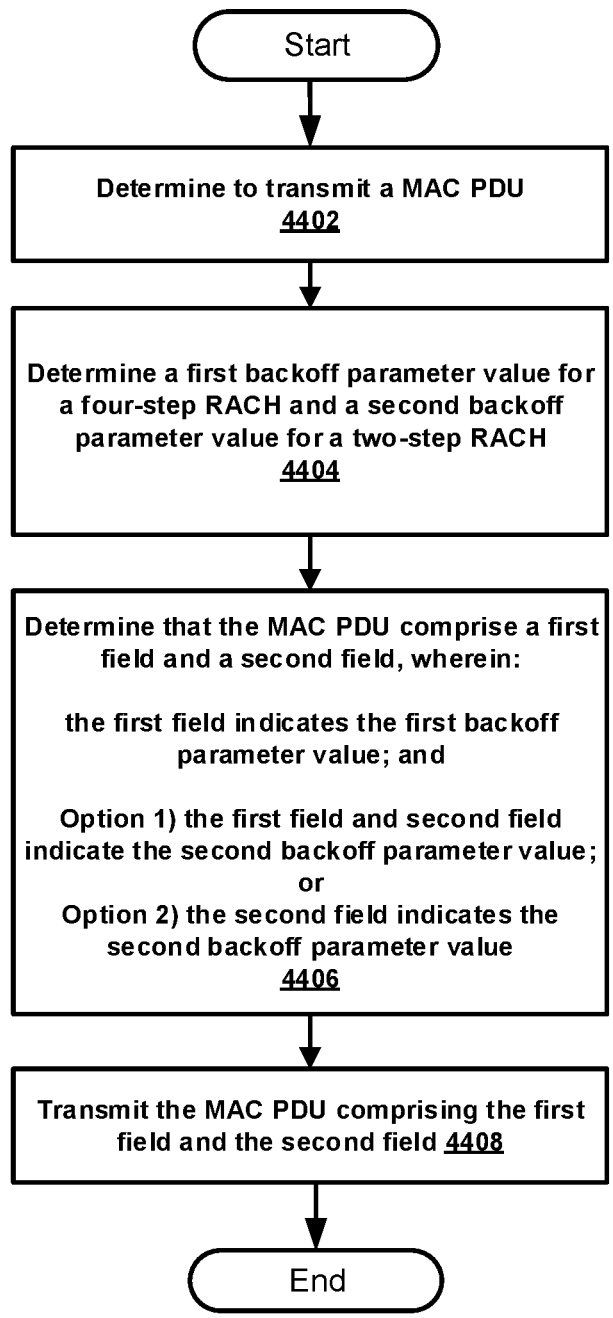
FIG. 44 shows an example of an RA procedure based on a backoff value.

FIG. 44 shows an example of an RA procedure based on a backoff parameter value. The steps in FIG. 44 may be performed by a base station. The receiving and sending steps in FIG. 44 that may be performed by a base station may correspond to the sending and receiving steps, respectively, in FIG. 43 that may be performed by a wireless device. The base station may determine to send (e.g., transmit) a MAC RAR (e.g., MAC PDU) to a wireless device (block 4402). The base station may determine a first backoff parameter value for a four-step RACH and a second backoff indicator value for a two-step RACH (block 4404). The base station may determine a MAC PDU that comprises first and second fields (block 4406). The first field of the MAC PDU may indicate the first backoff parameter value. The base station may use the second field to indicate the second backoff parameter value. The base station may determine a field value of the second field such that the first and second field of the MAC PDU indicate the second backoff parameter value. The base station may determine a field value of the second field such that the second field indicates the second backoff parameter value. The base station may send (e.g., transmit) the MAC PDU comprising the first and second fields to the wireless device (block 4408).

FIG. 45 shows an example table of backoff parameter values. The backup parameter values and corresponding indexes may be applied in any of the procedures involving backup parameters such as described herein. An index may comprise any quantity of values, for example, 0 to 15 (or any other quantity). Any quantity of index may be added or removed from the table. Each index may correspond to a particular value for a backoff parameter value (e.g., in ms or any other duration). One or more backoff parameter values may be reserved for a parameter that may be determined by a device (e.g., a wireless device, a base station, etc.) or that may be determined for a future use. A range of backoff parameters may comprise multiples of a time duration (e.g., a duration half, twice, or another multiple greater than or less than a duration of an adjacent index). A backoff parameter value may comprise any value and/or time duration.

A wireless device may cause transmission of a preamble and a cell-radio network temporary identifier (C-RNTI). The transmission of the preamble and the C-RNTI may comprise a MsgA transmission. The wireless device may monitor for a response to the transmission that: based on being identified by a random access-radio network temporary identifier (RA-RNTI), indicates proceeding with a transmission associated with a contention resolution procedure; or based on being identified by the C-RNTI, indicates a successful completion of a random access procedure. Based on a received response being identified by the RA-RNTI and comprising an identifier of the preamble, the wireless device may cause transmission of a contention resolution identifier parameter. The wireless device may determine, based on a received response being identified by the C-RNTI, a successful completion of a random access procedure. The random access procedure (e.g., the random access procedure that is successfully completed) may comprise a two-step random access procedure. The received response (e.g., the received response being identified by the C-RNTI) may be associated with a Msg B reception. The wireless device may monitor for the response based on the RA-RNTI and the C-RNTI. For example, the wireless may use the RA-RNTI and the C-RNTI to identify the response. The wireless device may use the RA-RNTI and the C-RNTI to decode (e.g., unscramble, decrypt, demodulate) a transmission comprising the response. The wireless device may receive the response, based on the RA-RNTI and/or the C-RNTI. The causing transmission of the contention resolution identifier parameter may be based on the response not comprising the contention resolution identifier parameter. The causing transmission of the contention resolution identifier parameter may comprise causing a Msg3 transmission that comprises the contention resolution identifier parameter. The response may be associated with a Msg B reception. The response may consist of at least one of each of: a timing advance command, an uplink grant, a temporary C-RNTI, and a reserve bit. The transmission of the preamble and the C-RNTI may comprise a Msg A transmission. The wireless may device may determine, based on the response, to fall back from a two-step random access procedure to a four-step random access procedure. The causing transmission of the contention resolution identifier parameter may be associated with the four-step random access procedure. The wireless device may cause, by the wireless device, second transmission of: a preamble and the C-RNTI. The wireless device may monitor for a response to the second transmission. The wireless device may determine, based on a received response to the second transmission being identified by the C-RNTI, a successful completion of a random access procedure. The random access procedure may comprise a two-step random access procedure. The first response may comprise: an uplink grant, a temporary C-RNTI, and/or a timing advance command. The monitoring for the response to the transmission may comprise monitoring a common search space. The wireless device may determine, based on at least one of a time offset or a transmission of a packet comprising the C-RNTI, to start the monitoring for the response to the transmission. The transmission of the preamble may be via a random access channel. The transmission of the C-RNTI may be in a packet transmission via an uplink channel multiplexed in time with the random access channel.

Systems, devices, and computer-readable medium may be configured with the described method. A wireless device may comprise one or more processors. The wireless device may comprise memory storing instructions that, when executed by the one or more processors, cause the wireless device to perform the described method, additional operations, and/or include the additional elements. A system may comprise a wireless device configured to perform the described method, and a base station configured to send the response to the transmission. A computer-readable medium may store instructions that when executed, may cause performance of the described method.

A wireless device may cause transmission of a preamble, and a cell-radio network temporary identifier (C-RNTI). The transmission of the preamble and the C-RNTI may comprise a Msg A transmission. The wireless device may monitor for a response to the transmission based on a random access-radio network temporary identifier (RA-RNTI) and the C-RNTI. The wireless device may, based on receiving the response to the transmission, perform at least one of: causing transmission of a contention resolution identifier parameter, based on the received response being identified by the RA-RNTI and comprising an identifier of the preamble; or determining a successful completion of a random access procedure, based on the received response being identified by the C-RNTI. The wireless device may receive the response. The wireless device may monitor for the response based on the RA-RNTI and the C-RNTI. The wireless device may determine, based on the monitoring for the response, that the response is identified by the RA-RNTI and comprises the identifier of the preamble, wherein the causing transmission of the contention resolution identifier parameter may be performed. The causing transmission of the contention resolution identifier parameter may comprise causing a Msg3 transmission that comprises the contention resolution identifier parameter. The wireless device may determine, based on the response, to fall back from a two-step random access procedure to a four-step random access procedure, wherein the causing transmission of the contention resolution identifier parameter is associated with the four-step random access procedure. The wireless device may determine, based on the monitoring for the response, that the response is identified by the C-RNTI, wherein the determining the successful completion of the random access procedure may be performed. The response (e.g., which may be identified by the C-RNTI) may be associated with a Msg B reception.

Systems, devices, and computer-readable medium may be configured with the described method. A wireless device may comprise one or more processors. The wireless device may comprise memory storing instructions that, when executed by the one or more processors, cause the wireless device to perform the described method, additional operations, and/or include the additional elements. A system may comprise a wireless device configured to perform the described method, and a base station configured to send the response to the transmission. A computer-readable medium may store instructions that when executed, may cause performance of the described method.

Figure 46:
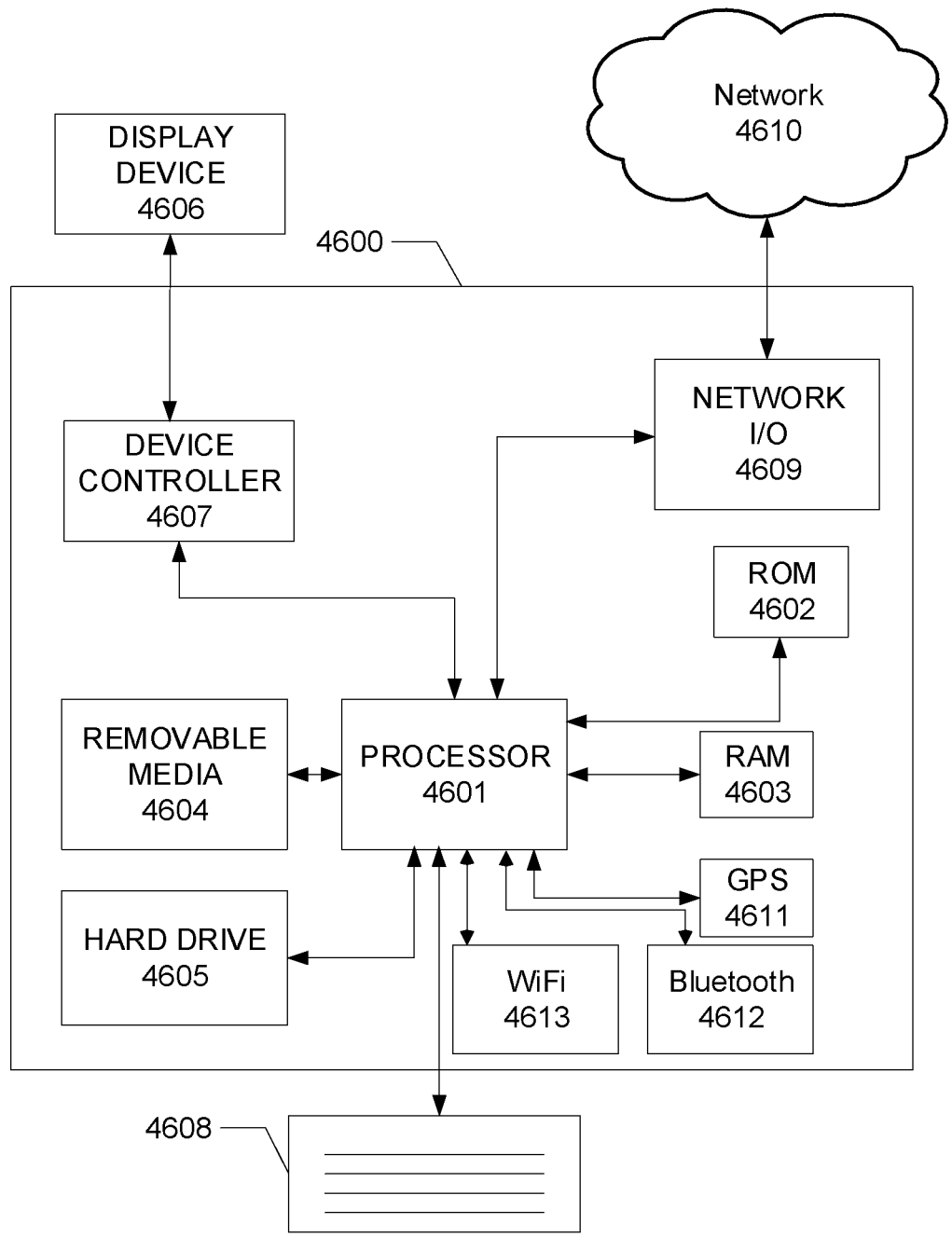
FIG. 46 shows example elements of a computing device that may be used to implement any of the various devices described herein.

FIG. 46 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 4600 may include one or more processors 4601, which may execute instructions stored in the random-access memory (RAM) 4603, the removable media 4604 (such as a Universal Serial Bus (USB) drive, compact disk (CD) or digital versatile disk (DVD), or floppy disk drive), or any other desired storage medium. Instructions may also be stored in an attached (or internal) hard drive 4605. The computing device 4600 may also include a security processor (not shown), which may execute instructions of one or more computer programs to monitor the processes executing on the processor 4601 and any process that requests access to any hardware and/or software components of the computing device 4600 (e.g., ROM 4602, RAM 4603, the removable media 4604, the hard drive 4605, the device controller 4607, a network interface 4609, a GPS 4611, a Bluetooth interface 4612, a WiFi interface 4613, etc.). The computing device 4600 may include one or more output devices, such as the display 4606 (e.g., a screen, a display device, a monitor, a television, etc.), and may include one or more output device controllers 4607, such as a video processor. There may also be one or more user input devices 4608, such as a remote control, keyboard, mouse, touch screen, microphone, etc. The computing device 4600 may also include one or more network interfaces, such as a network interface 4609, which may be a wired interface, a wireless interface, or a combination of the two. The network interface 4609 may provide an interface for the computing device 4600 to communicate with a network 4610 (e.g., a RAN, or any other network). The network interface 4609 may include a modem (e.g., a cable modem), and the external network 4610 may include communication links, an external network, an in-home network, a provider's wireless, coaxial, fiber, or hybrid fiber/coaxial distribution system (e.g., a DOCSIS network), or any other desired network. Additionally, the computing device 4600 may include a location-detecting device, such as a global positioning system (GPS) microprocessor 4611, which may be configured to receive and process global positioning signals and determine, with possible assistance from an external server and antenna, a geographic position of the computing device 4600.

The example in FIG. 46 may be a hardware configuration, although the components shown may be implemented as software as well. Modifications may be made to add, remove, combine, divide, etc. components of the computing device 4600 as desired. Additionally, the components may be implemented using basic computing devices and components, and the same components (e.g., processor 4601, ROM storage 4602, display 4606, etc.) may be used to implement any of the other computing devices and components described herein. For example, the various components described herein may be implemented using computing devices having components such as a processor executing computer-executable instructions stored on a computer-readable medium, as shown in FIG. 46. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   causing, by a wireless device, transmission of:
   a preamble; and
   a cell-radio network temporary identifier (C-RNTI);
   monitoring for a random access response to the transmission, wherein:
   a received random access response that is scheduled by received downlink control information (DCI) identified by a radio network temporary identifier (RNTI) associated with a two-step random access procedure and that comprises an identifier of a preamble indicates proceeding with a transmission associated with a contention resolution procedure; and
   received DCI that is identified by the C-RNTI indicates successful completion of a two-step random access procedure; and
   based on receiving a random access response that is scheduled by received DCI identified by the RNTI associated with a two-step random access procedure and that comprises the identifier of the preamble, causing transmission of a contention resolution identifier parameter.

2. The method of claim 1, further comprising receiving a random access response, wherein the monitoring for the random access response comprises monitoring for the random access response based on the RNTI and the C-RNTI.

3. The method of claim 1, wherein the causing transmission of the contention resolution identifier parameter is further based on the random access response not comprising the contention resolution identifier parameter.

4. The method of claim 1, wherein the causing transmission of the contention resolution identifier parameter comprises causing a Msg3 transmission that comprises the contention resolution identifier parameter.

5. The method of claim 1, wherein the transmission of the preamble and the C-RNTI comprises a Msg A transmission.

6. The method of claim 1, wherein the received DCI that is identified by the C-RNTI consists of at least one of each of:
   a timing advance command;
   an uplink grant;
   a temporary C-RNTI; and
   a reserve bit.

7. The method of claim 1, further comprising:
   determining, based on the received DCI that is identified by the RNTI, to fall back from a two-step random access procedure to a four-step random access procedure, wherein the causing transmission of the contention resolution identifier parameter is associated with the four-step random access procedure.

8. The method of claim 1, further comprising:
   causing, by the wireless device, second transmission of:
      a preamble; and
      the C-RNTI;
   monitoring for a response to the second transmission; and
   determining, based on receiving a response to the second transmission that is identified by the C-RNTI, successful completion of a two-step random access procedure.

9. The method of claim 1, further comprising:
   starting, based on causing transmission of the preamble and the C-RNTI, a random access response time window; and
   stopping, based on received DCI that is identified by the RNTI associated with the random access response, the random access response time window.

10. The method of claim 1, further comprising:
   stopping the monitoring of the random access response based on received DCI that is identified by the C-RNTI; or
   stopping the monitoring of the random access response based on received DCI that is identified by the RNTI.

11. The method of claim 1, wherein the RNTI associated with the random access response is different from an RNTI associated with a four-step random access response.

12. A method comprising:
   causing, by a wireless device, transmission of:
      a preamble; and
      a cell-radio network temporary identifier (C-RNTI), wherein the transmission of the preamble and the C-RNTI comprises a Msg A transmission;
   monitoring for a random access response to the transmission, wherein:
      a received random access response that is scheduled by received downlink control information (DCI) identified by a radio network temporary identifier (RNTI) associated with a two-step random access procedure and that comprises an identifier of the preamble indicates proceeding with a transmission associated with a contention resolution procedure; and
      received DCI that is identified by the C-RNTI indicates successful completion of a two-step random access procedure; and
   sending data using an uplink grant in the received DCI that is identified by the C-RNTI.

13. The method of claim 12, further comprising receiving a random access response, wherein the monitoring for the random access response comprises monitoring for the random access response based on the RNTI and the C-RNTI.

14. The method of claim 12, further comprising determining, based on the received DCI that is identified by the C-RNTI, the successful completion of the two-step random access procedure.

15. The method of claim 12, wherein the received DCI that is identified by the RNTI is associated with a Msg B reception.

16. The method of claim 12, wherein the received DCI that is identified by the C-RNTI consists of at least one of each of:
   a timing advance command;
   an uplink grant;
   a temporary C-RNTI; and
   a reserve bit.

17. The method of claim 12, further comprising:
   starting, based on causing the transmission of the preamble and the C-RNTI, a random access response time window; and
   stopping, based on the received DCI that is identified by the C-RNTI, the random access response time window.

18. The method of claim 12, further comprising:
   stopping the monitoring of the random access response based on the received DCI that is identified by the C-RNTI; or
   stopping the monitoring of the random access response based on received DCI that is identified by the RNTI.

19. A method comprising:
   causing, by a wireless device, transmission of:
      a preamble; and
      a cell-radio network temporary identifier (C-RNTI);
   monitoring for a random access response to the transmission based on a radio network temporary identifier (RNTI) and the C-RNTI; and
   based on receiving a random access response that is scheduled by received downlink control information (DCI) being identified by the RNTI associated with a two-step random access procedure and that comprises an identifier of the preamble, causing transmission of a contention resolution identifier parameter, wherein the two-step random access procedure is not successfully completed based on the received DCI not being identified by the C-RNTI.

20. The method of claim 19, further comprising receiving the random access response.

21. The method of claim 19, wherein the causing transmission of the contention resolution identifier parameter comprises causing a Msg3 transmission that comprises the contention resolution identifier parameter.

22. The method of claim 19, further comprising:
   determining, based on the received DCI, to fall back from the two-step random access procedure to a four-step random access procedure, wherein the causing transmission of the contention resolution identifier parameter is associated with the four-step random access procedure.

23. The method of claim 19, further comprising:
   determining, based on the monitoring for the random access response, that the two-step random access procedure is not successfully completed.

24. The method of claim 19, wherein the transmission of the preamble and the C-RNTI comprises a Msg A transmission, and wherein the received DCI is associated with a Msg B reception.

25. The method of claim 19, further comprising:
   starting, based on causing the transmission of the preamble and the C-RNTI, a random access response time window; and
   stopping, based on the received DCI that is identified by the RNTI associated with the two-step random access procedure, the random access response time window.

26. The method of claim 19, further comprising:
stopping the monitoring of the random access response based on received DCI that is identified by the C-RNTI; or
stopping the monitoring of the random access response based on the received DCI that is identified by the RNTI.

* * * * *

UNITED STATES PATENT AND TRADEMARK OFFICE
CERTIFICATE OF CORRECTION

PATENT NO. : 11,985,706 B2
APPLICATION NO. : 16/832901
DATED : May 14, 2024
INVENTOR(S) : Jeon et al.

It is certified that error appears in the above-identified patent and that said Letters Patent is hereby corrected as shown below:

On the Title Page

In the References under item (56)

Page 3, Column 1, Other Publications, Line 42:
Delete "JE" and insert --UE--

Page 3, Column 1, Other Publications, Line 57:
Delete "of of" and insert --of--

In the Drawings

Sheet 37, Figure 34, Reference Numeral 3406:
Delete "isa" and insert --is a--

In the Specification

Column 14, Line 66:
After "channel", insert --.--

Column 31, Line 23:
After "running", insert --.--

Column 32, Line 16:
Delete "1250," and insert --1240,--

Column 57, Line 27:
After "running", insert --.--

Signed and Sealed this
Thirteenth Day of May, 2025

Coke Morgan Stewart
*Acting Director of the United States Patent and Trademark Office*

Column 71, Line 24:
After "demands", insert --.--

Column 71, Line 55:
After "enabled", insert --.--

Column 72, Line 52:
After "channel", insert --.--

Column 79, Line 61:
Delete "127." and insert --120.--

Column 82, Line 1:
Delete "16 us," and insert --16 µs,--

Column 83, Line 20:
Delete "procedurea" and insert --procedure--

Column 83, Line 62:
Delete "a a" and insert --a--

Column 96, Lines 44-45:
Delete "failurem" and insert --failure--

Column 102, Line 14:
Delete "device)" and insert --device--

Column 102, Line 15:
Delete "examplem" and insert --example,--

Column 103, Line 55:
Delete "examplem" and insert --example,--

Column 104, Line 18:
Delete "assignment)." and insert --assignment 2).--

Column 107, Line 36:
Delete "the the" and insert --the--

Column 110, Line 15:
Delete "as as" and insert --as--

Column 113, Lines 66-67:
Delete "device device" and insert --device--

Column 118, Lines 21-22:
After "manner", insert --.--